United States Patent
Brewer

(10) Patent No.: US 11,093,251 B2
(45) Date of Patent: *Aug. 17, 2021

(54) SYSTEM HAVING A HYBRID THREADING PROCESSOR, A HYBRID THREADING FABRIC HAVING CONFIGURABLE COMPUTING ELEMENTS, AND A HYBRID INTERCONNECTION NETWORK

(71) Applicant: Micron Technology, Inc., Boise, ID (US)

(72) Inventor: Tony M. Brewer, Plano, TX (US)

(73) Assignee: Micron Technology, Inc., Boise, ID (US)

(*) Notice: Subject to any disclaimer, the term of this patent is extended or adjusted under 35 U.S.C. 154(b) by 300 days.

This patent is subject to a terminal disclaimer.

(21) Appl. No.: 16/176,434

(22) Filed: Oct. 31, 2018

(65) Prior Publication Data

US 2019/0171604 A1 Jun. 6, 2019

Related U.S. Application Data

(60) Provisional application No. 62/579,749, filed on Oct. 31, 2017, provisional application No. 62/651,128, (Continued)

(51) Int. Cl.
*G06F 9/38* (2018.01)
*G06F 15/80* (2006.01)
*G06F 15/78* (2006.01)

(52) U.S. Cl.
CPC .......... *G06F 9/3851* (2013.01); *G06F 9/3877* (2013.01); *G06F 15/7889* (2013.01); *G06F 15/80* (2013.01)

(58) Field of Classification Search
CPC ............ G06F 13/4022; G06F 13/1684; G06F 13/4027; G06F 2213/40; G06F 9/3851; G06F 15/80; G06F 15/7889; G06F 9/3877

See application file for complete search history.

(56) References Cited

U.S. PATENT DOCUMENTS 5,442,797 A 8/1995 Casavant et al.
5,742,822 A 4/1998 Motomura
(Continued)

FOREIGN PATENT DOCUMENTS

EP 2441013 B1 8/2014
GB 2140347 B1 5/2017
(Continued)

OTHER PUBLICATIONS

Edwards (Hybrid Threading: A New Approach for Performance and Productivity); White Paper; Convey Computer Corporation; 16 pages; Oct. 29, 2015; accessed on Nov. 18, 2020 at https://media-www.micron.com/-/media/client/global/documents/products/white-paper/wp_convey_ht_overview.pdf (Year: 2015).*
(Continued)

*Primary Examiner* — Keith E Vicary
(74) *Attorney, Agent, or Firm* — Nancy R. Gamburd; Gamburd Law Group LLC

(57) ABSTRACT

Representative apparatus, method, and system embodiments are disclosed for configurable computing. In a representative embodiment, a system includes an interconnection network, a processor, a host interface, and a configurable circuit cluster. The configurable circuit cluster may include a plurality of configurable circuits arranged in an array; an asynchronous packet network and a synchronous network coupled to each configurable circuit of the array; and a memory interface circuit and a dispatch interface circuit coupled to the asynchronous packet network and to the
(Continued)

interconnection network. Each configurable circuit includes instruction or configuration memories for selection of a current data path configuration, a master synchronous network input, and a data path configuration for a next configurable circuit.

136 Claims, 44 Drawing Sheets

Related U.S. Application Data filed on Mar. 31, 2018, provisional application No. 62/651,131, filed on Mar. 31, 2018, provisional application No. 62/651,132, filed on Mar. 31, 2018, provisional application No. 62/651,134, filed on Mar. 31, 2018, provisional application No. 62/651,135, filed on Mar. 31, 2018, provisional application No. 62/651,137, filed on Mar. 31, 2018, provisional application No. 62/651,140, filed on Mar. 31, 2018, provisional application No. 62/651,142, filed on Mar. 31, 2018, provisional application No. 62/667,666, filed on May 7, 2018, provisional application No. 62/667,679, filed on May 7, 2018, provisional application No. 62/667,691, filed on May 7, 2018, provisional application No. 62/667,699, filed on May 7, 2018, provisional application No. 62/667,717, filed on May 7, 2018, provisional application No. 62/667,749, filed on May 7, 2018, provisional application No. 62/667,760, filed on May 7, 2018, provisional application No. 62/667,780, filed on May 7, 2018, provisional application No. 62/667,792, filed on May 7, 2018, provisional application No. 62/667,820, filed on May 7, 2018, provisional application No. 62/667,850, filed on May 7, 2018.

(56) References Cited

U.S. PATENT DOCUMENTS

| | | | |
|---|---|---|---|
| 5,892,962 | A | 4/1999 | Cloutier |
| 6,131,155 | A | 10/2000 | Alexander et al. |
| 6,223,258 | B1 | 4/2001 | Palanca et al. |
| 6,973,650 | B1 | 12/2005 | Parkes et al. |
| 7,263,602 | B2 | 8/2007 | Schmit |
| 7,539,845 | B1* | 5/2009 | Wentzlaff ............ G06F 15/8007 712/10 |
| 7,635,987 | B1 | 12/2009 | Agarwal |
| 7,987,338 | B2 | 7/2011 | Doerr et al. |
| 8,108,659 | B1 | 1/2012 | Le Grand |
| 8,390,325 | B2 | 3/2013 | Box et al. |
| 2001/0005853 | A1 | 6/2001 | Parkes et al. |
| 2002/0156998 | A1 | 10/2002 | Casselman |
| 2004/0034759 | A1 | 2/2004 | Katzman et al. |
| 2004/0078790 | A1 | 4/2004 | Wu et al. |
| 2006/0136930 | A1 | 6/2006 | Kaler et al. |
| 2007/0046326 | A1* | 3/2007 | Fujisawa ............ H04L 49/15 326/41 |
| 2008/0155196 | A1 | 6/2008 | Black et al. |
| 2009/0049279 | A1 | 2/2009 | Steiss et al. |
| 2009/0193239 | A1 | 7/2009 | Hanai et al. |
| 2010/0122067 | A1 | 5/2010 | Lindholm et al. |
| 2010/0223598 | A1 | 9/2010 | Levine et al. |
| 2010/0268862 | A1 | 10/2010 | Park et al. |
| 2011/0222553 | A1 | 9/2011 | Mital et al. |
| 2012/0079503 | A1 | 3/2012 | Dally et al. |
| 2012/0089812 | A1 | 4/2012 | Smith |
| 2012/0180072 | A1 | 7/2012 | Sander et al. |
| 2012/0230341 | A1 | 9/2012 | Mital et al. |
| 2012/0274961 | A1 | 11/2012 | Makabe |
| 2013/0138913 | A1 | 5/2013 | Box et al. |
| 2013/0339971 | A1 | 12/2013 | Boland et al. |
| 2015/0317190 | A1 | 11/2015 | Ebcioglu et al. |
| 2017/0123795 | A1 | 5/2017 | Chen et al. |
| 2017/0161214 | A1 | 6/2017 | Dobbs et al. |
| 2018/0089140 | A1 | 3/2018 | Metzgen |

FOREIGN PATENT DOCUMENTS

| | | |
|---|---|---|
| WO | WO1993002414 A2 | 2/1993 |
| WO | WO1997024671 A1 | 7/1997 |
| WO | WO2003102758 A1 | 12/2003 |
| WO | WO2010142987 A1 | 12/2010 |

OTHER PUBLICATIONS

Brewer (Hybrid Threaded Processing for Sparse Data Kernels); RISC-V Workshop Day 2; 13 slides; May 9, 2018 (Year: 2018).*
Xuejun, Yang et al., Processor self-scheduling for parallel loops in preemptive environments, Future Generation Computer Systems 6 (1990) pp. 97-103.
Notification of Transmittal of the International Search Report and Written Opinion of the International Searching Authority, or the Declaration for International Application No. PCT/US2018/058539, dated Apr. 23, 2019, pp. 1-12.
Francis, R.S. et al., Self Scheduling and Execution Threads, Parallel and Distributed Processing, 1990; Proceedings of the Second IEEE Symposium, Dallas, TX, USA, Dec. 9-13, 1990, IEEE Computer Society Dec. 9, 1990, pp. 586-590.
Theobald, K.B. et al. Superconducting Processors for HTMT: issues and challenges, Frontiers of Massively Parallel Computation 1999, The Seventh Symposium, Annapolis, MD, USA, Feb. 21-25, IEEE Computer Society Feb. 21, 1999, pp. 260-261.
Baumgarte, V. et al., PACT XPP—A Self-Reconfigurable Data Processing Architecture, Journal of Supercomputing, vol. 26, Jan. 1, 2003, pp. 167-184.
Anonymous, Network Topology, Wikipedia, https://en.wikipedia.org/wiki/Network_topology, Jun. 20, 2020, retrieved on Sep. 16, 2020.
Anonymous, Thread Pool, Wikipedia, https://en.wikipedia.org/wiki/Thread_pool, Feb. 22, 2018, retrieved on Jun. 18, 2019.

* cited by examiner

| FIG. 9A | FIG. 9B |

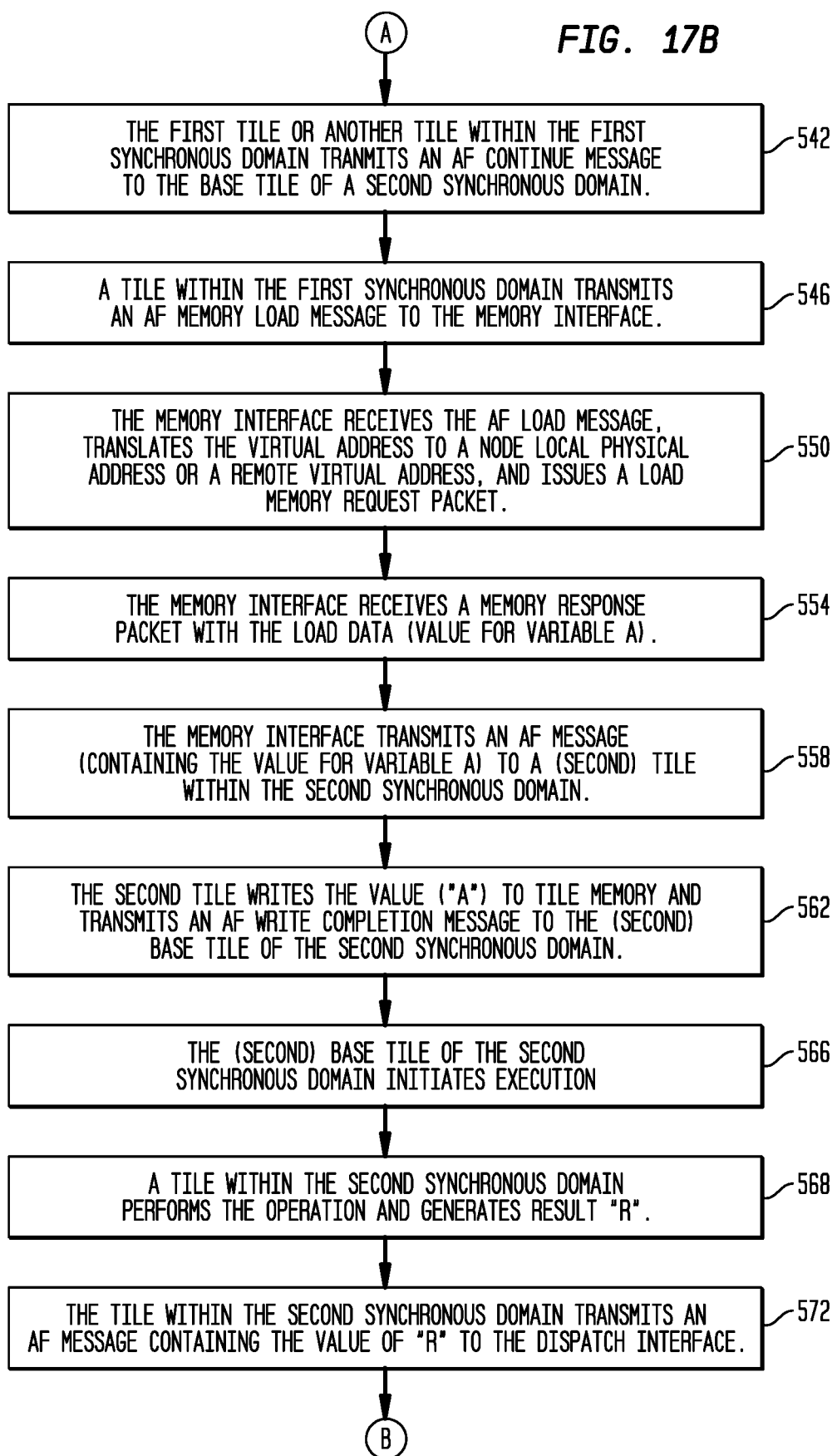

FIG. 37

| EXTERNAL HOST, LOCAL, PRIVATE LOWER RANGE | 0x0 3B | 0x0 13B | | VIRTUAL ADDRESS 48B | | | FORMAT 0 |
|---|---|---|---|---|---|---|---|
| INTERNAL HOST, LOCAL, PRIVATE, LOWER RANGE | 0x1 3B | 0x0 13B-N | NODE ID (N BITS) | VIRTUAL ADDRESS 48B | | | FORMAT 1 |
| SHARED NON-INTERLEAVED | 0x2 3B | 0x0 13B-N | NODE ID (N BITS) | VIRTUAL ADDRESS 48B | | | FORMAT 2 |
| SHARED INTERLEAVED | 0x3 3B | 0x0 13B-N | | VIRTUAL ADDRESS 36B | NODE ID (N BITS) | OFFSET 12B | FORMAT 3 |
| INTERNAL HOST, LOCAL, PRIVATE, UPPER RANGE | 0x6 3B | 0xF 13B-N | NODE ID (N BITS) | VIRTUAL ADDRESS 48B | | | FORMAT 6 |
| EXTERNAL HOST, LOCAL, PRIVATE, UPPER RANGE | 0x7 3B | 0x1FFF 13B | | VIRTUAL ADDRESS 48B | | | FORMAT 7 |

SYSTEM HAVING A HYBRID THREADING PROCESSOR, A HYBRID THREADING FABRIC HAVING CONFIGURABLE COMPUTING ELEMENTS, AND A HYBRID INTERCONNECTION NETWORK

CROSS-REFERENCE TO RELATED APPLICATIONS

This application is a nonprovisional of and claims the benefit of and priority to (1) U.S. Provisional Patent Application No. 62/579,749, filed Oct. 31, 2017; (2) U.S. Provisional Patent Application No. 62/651,128, filed Mar. 31, 2018; (3) U.S. Provisional Patent Application No. 62/651,131, filed Mar. 31, 2018; (4) U.S. Provisional Patent Application No. 62/651,132, filed Mar. 31, 2018; (5) U.S. Provisional Patent Application No. 62/651,134, filed Mar. 31, 2018; (6) U.S. Provisional Patent Application No. 62/651,135, filed Mar. 31, 2018; (7) U.S. Provisional Patent Application No. 62/651,137, filed Mar. 31, 2018; (8) U.S. Provisional Patent Application No. 62/651,140, filed Mar. 31, 2018; (9) U.S. Provisional Patent Application No. 62/651,142, filed Mar. 31, 2018; (10) U.S. Provisional Patent Application No. 62/667,666, filed May 7, 2018; (11) U.S. Provisional Patent Application No. 62/667,679, filed May 7, 2018; (12) U.S. Provisional Patent Application No. 62/667,691, filed May 7, 2018; (13) U.S. Provisional Patent Application No. 62/667,699, filed May 7, 2018; (14) U.S. Provisional Patent Application No. 62/667,717, filed May 7, 2018; (15) U.S. Provisional Patent Application No. 62/667,749, filed May 7, 2018; (16) U.S. Provisional Patent Application No. 62/667,760, filed May 7, 2018; (17) U.S. Provisional Patent Application No. 62/667,780, filed May 7, 2018; (18) U.S. Provisional Patent Application No. 62/667,792, filed May 7, 2018; (19) U.S. Provisional Patent Application No. 62/667,820, filed May 7, 2018; and (20) U.S. Provisional Patent Application No. 62/667,850, filed May 7, 2018; which are commonly assigned herewith, and all of which is hereby incorporated herein by reference in their entireties with the same full force and effect as if set forth in their entirety herein (hereinafter referred to as the "related applications").

FIELD OF THE INVENTION

The present invention, in general, relates to configurable computing circuitry, and more particularly, relates to a heterogeneous computing system which includes a self-scheduling processor, configurable computing circuitry with an embedded interconnection network, dynamic reconfiguration, and dynamic control over energy or power consumption.

BACKGROUND OF THE INVENTION

Many existing computing systems have reached significant limits for computation processing capabilities, both in terms of speed of computation, energy (or power) consumption, and associated heat dissipation. For example, existing computing solutions have become increasingly inadequate as the need for advanced computing technologies grows, such as to accommodate artificial intelligence and other significant computing applications.

Accordingly, there is an ongoing need for a computing architecture capable of providing high performance and energy efficient solutions for compute-intensive kernels, such as for computation of Fast Fourier Transforms (FFTs) and finite impulse response (FIR) filters used in sensing, communication, and analytic applications, such as synthetic aperture radar, 5G base stations, and graph analytic applications such as graph clustering using spectral techniques, machine learning, 5G networking algorithms, and large stencil codes, for example and without limitation.

In addition, there is an ongoing need for a configurable computing architecture capable of being configured for any of these various applications, but most importantly, also capable of dynamic self-configuration and self-reconfiguration. Lastly, there is also an ongoing need for a processor architecture capable of significant parallel processing and further interacting with and controlling a configurable computing architecture for performance of any of these various applications.

SUMMARY OF THE INVENTION

As discussed in greater detail below, the representative apparatus, system and method provide for a computing architecture capable of providing high performance and energy efficient solutions for compute-intensive kernels, such as for computation of Fast Fourier Transforms (FFTs) and finite impulse response (FIR) filters used in sensing, communication, and analytic applications, such as synthetic aperture radar, 5G base stations, and graph analytic applications such as graph clustering using spectral techniques, machine learning, 5G networking algorithms, and large stencil codes, for example and without limitation.

Significantly, the various representative embodiments provide a multi-threaded, coarse-grained configurable computing architecture capable of being configured for any of these various applications, but most importantly, also capable of self-scheduling, dynamic self-configuration and self-reconfiguration, conditional branching, backpressure control for asynchronous signaling, ordered thread execution and loop thread execution (including with data dependencies), automatically starting thread execution upon completion of data dependencies and/or ordering, providing loop access to private variables, providing rapid execution of loop threads using a reenter queue, and using various thread identifiers for advanced loop execution, including nested loops.

Also as discussed in greater detail below, the representative apparatus, system and method provide for a processor architecture capable of self-scheduling, significant parallel processing and further interacting with and controlling a configurable computing architecture for performance of any of these various applications.

In a representative embodiment, a system comprises: a first, interconnection network; a processor coupled to the interconnection network; a host interface coupled to the interconnection network; and at least one configurable circuit cluster coupled to the interconnection network, the configurable circuit cluster comprising: a plurality of configurable circuits arranged in an array; a second, asynchronous packet network coupled to each configurable circuit of the plurality of configurable circuits of the array; a third, synchronous network coupled to each configurable circuit of the plurality of configurable circuits of the array; a memory interface circuit coupled to the asynchronous packet network and to the interconnection network; and a dispatch interface circuit coupled to the asynchronous packet network and to the interconnection network.

For any of the various representative embodiments, the interconnection network may comprise: a first plurality of crossbar switches having a Folded Clos configuration and a plurality of direct, mesh connections at interfaces with system endpoints 935. For any of the various representative embodiments, the asynchronous packet network may comprise: a second plurality of crossbar switches, each crossbar switch coupled to at least one configurable circuit of the plurality of configurable circuits of the array and to another crossbar switch of the second plurality of crossbar switches. For any of the various representative embodiments, the synchronous network may comprise: a plurality of direct point-to-point connections coupling adjacent configurable circuits of the array of the plurality of configurable circuits of the configurable circuit cluster.

In a representative embodiment, a configurable circuit may comprise: a configurable computation circuit; a plurality of synchronous network inputs coupled to the configurable computation circuit; a plurality of synchronous network outputs coupled to the configurable computation circuit; and a configuration memory coupled to the configurable computation circuit, to the control circuitry, to the synchronous network inputs, and to the synchronous network outputs, with the configuration memory comprising: a first, instruction memory storing a plurality of data path configuration instructions to configure a data path of the configurable computation circuit; and a second, instruction and instruction index memory storing a plurality of spoke instructions and data path configuration instruction indices for selection of a master synchronous input of the synchronous network inputs.

In a representative embodiment, each configurable circuit of the plurality of configurable circuits comprises: a configurable computation circuit; a control circuit coupled to the configurable computation circuit, the control circuit comprising: a memory control circuit; a thread control circuit; and a plurality of control registers; a first memory circuit coupled to the configurable computation circuit; a plurality of synchronous network inputs coupled to the configurable computation circuit and to the synchronous network; a plurality of synchronous network outputs coupled to the configurable computation circuit and to the synchronous network; an asynchronous network input queue coupled to the asynchronous packet network; an asynchronous network output queue coupled to the asynchronous packet network; a second, configuration memory circuit coupled to the configurable computation circuit, to the control circuitry, to the synchronous network inputs, and to the synchronous network outputs, the configuration memory circuit comprising: a first, instruction memory storing a plurality of data path configuration instructions to configure a data path of the configurable computation circuit; and a second, instruction and instruction index memory storing a plurality of spoke instructions and data path configuration instruction indices for selection of a master synchronous input of the synchronous network inputs.

In another representative embodiment, a system may comprise: a first, interconnection network; a processor coupled to the interconnection network; a host interface coupled to the interconnection network; and at least one configurable circuit cluster coupled to the interconnection network, the configurable circuit cluster comprising: a plurality of configurable circuits arranged in an array, each configurable circuit comprising: a configurable computation circuit; a first memory circuit coupled to the configurable computation circuit; a plurality of synchronous network inputs and outputs coupled to the configurable computation circuit; an asynchronous network input queue and an asynchronous network output queue; a second, configuration memory circuit coupled to the configurable computation circuit, to the control circuitry, to the synchronous network inputs, and to the synchronous network outputs, the second, configuration memory comprising: a first, instruction memory storing a plurality of data path configuration instructions to configure a data path of the configurable computation circuit; and a second, instruction and instruction index memory storing: a plurality of spoke instructions and data path configuration instruction indices for selection of a master synchronous input of the synchronous network inputs, for selection of a current data path configuration instruction for the configurable computation circuit, and for selection of a next data path instruction or next data path instruction index for a next configurable computation circuit; and a control circuit coupled to the configurable computation circuit, the control circuit comprising: a memory control circuit; a plurality of control registers, wherein the plurality of control registers store a completion table having a first, data completion count; and a thread control circuit adapted to queue a thread for execution.

In another representative embodiment, a system may comprise: a first, interconnection network; a host interface coupled to the interconnection network; at least one configurable circuit cluster coupled to the interconnection network, the configurable circuit cluster comprising a plurality of configurable circuits arranged in an array; and a processor coupled to the interconnection network, the processor comprising: a processor core adapted to execute a plurality of instructions; and a core control circuit coupled to the processor core, the core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, a data cache, and a general-purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; and an instruction cache coupled to the processor core and to the control logic and thread selection circuit to receive the initial program count and provide to the processor core a corresponding instruction for execution, of the plurality of instructions.

In another representative embodiment, a configurable circuit may comprise: a configurable computation circuit; and a configuration memory coupled to the configurable computation circuit, to the control circuitry, to the synchronous network inputs, and to the synchronous network outputs, the configuration memory comprising: a first, instruction memory storing a plurality of data path configuration instructions to configure a data path of the configurable computation circuit; and a second, instruction and instruction index memory storing a plurality of spoke instructions and data path configuration instruction indices for selection of a current data path configuration instruction for the configurable computation circuit.

In another representative embodiment, a configurable circuit may comprise: a configurable computation circuit; and a configuration memory coupled to the configurable computation circuit, to the control circuitry, to the synchronous network inputs, and to the synchronous network outputs, the configuration memory comprising: a first, instruction memory storing a plurality of data path configuration instructions to configure a data path of the configurable computation circuit; and a second, instruction and instruction index memory storing a plurality of spoke instructions and data path configuration instruction indices for selection of a next data path configuration instruction for a next configurable computation circuit.

In another representative embodiment, a configurable circuit may comprise: a configurable computation circuit; a control circuit coupled to the configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs, the configuration memory circuit comprising: a first, instruction memory storing a plurality of data path configuration instructions to configure a data path of the configurable computation circuit; and a second, instruction and instruction index memory storing a plurality of spoke instructions and data path configuration instruction indices for selection of a master synchronous input of the synchronous network inputs.

In yet another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and a control circuit coupled to the configurable computation circuit, the control circuit comprising: a memory control circuit; a thread control circuit; and a plurality of control registers.

In another representative embodiment, a configurable circuit may comprise: a configurable computation circuit; a configuration memory coupled to the configurable computation circuit, to the control circuitry, to the synchronous network inputs, and to the synchronous network outputs, the configuration memory comprising: a first, instruction memory storing a plurality of data path configuration instructions to configure a data path of the configurable computation circuit; and a second, instruction and instruction index memory storing a plurality of spoke instructions and data path configuration instruction indices for selection of a next data path instruction or next data path instruction index for a next configurable computation circuit; and a conditional logic circuit coupled to the configurable computing circuit, wherein depending upon an output from the configurable computing circuit, the conditional logic circuit is adapted to provide conditional branching by modifying the next data path instruction or next data path instruction index provided on a selected output of the plurality of synchronous network outputs.

In another representative embodiment, a configurable circuit may comprise: a configurable computation circuit; a control circuit coupled to the configurable computation circuit; a first memory circuit coupled to the configurable computation circuit; a plurality of synchronous network inputs coupled to the configurable computation circuit; a plurality of synchronous network outputs coupled to the configurable computation circuit; an asynchronous network input queue coupled to an asynchronous packet network and to the first memory circuit; an asynchronous network output queue; and a flow control circuit coupled to the asynchronous network output queue, the flow control circuit adapted to generate a stop signal when a predetermined threshold has been reached in the asynchronous network output queue.

In another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and a control circuit coupled to the configurable computation circuit, the control circuit comprising: a memory control circuit; a thread control circuit; and a plurality of control registers, wherein the plurality of control registers store a loop table having a plurality of thread identifiers and, for each thread identifier, a next thread identifier for execution following execution of a current thread to provide ordered thread execution.

In another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and a control circuit coupled to the configurable computation circuit, the control circuit comprising: a memory control circuit; a plurality of control registers, wherein the plurality of control registers store a completion table having a first, data completion count; and a thread control circuit adapted to queue a thread for execution when, for its thread identifier, its completion count has decremented to zero.

In another representative embodiment, a configurable circuit may comprise: a configurable computation circuit; a first memory circuit coupled to the configurable computation circuit; a plurality of synchronous network inputs and outputs coupled to the configurable computation circuit; an asynchronous network input queue and an asynchronous network output queue; a second, configuration memory circuit coupled to the configurable computation circuit, to the control circuitry, to the synchronous network inputs, and to the synchronous network outputs, the second, configuration memory comprising: a first, instruction memory storing a plurality of data path configuration instructions to configure a data path of the configurable computation circuit; and a second, instruction and instruction index memory storing: a plurality of spoke instructions and data path configuration instruction indices for selection of a master synchronous input of the synchronous network inputs, for selection of a current data path configuration instruction for the configurable computation circuit, and for selection of a next data path instruction or next data path instruction index for a next configurable computation circuit; and the configurable circuit further comprising a control circuit coupled to the configurable computation circuit, the control circuit comprising: a memory control circuit; a plurality of control registers, wherein the plurality of control registers store a completion table having a first, data completion count; and a thread control circuit adapted to queue a thread for execution when, for its thread identifier, its completion count has decremented to zero.

In another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and a control circuit coupled to the configurable computation circuit, the control circuit comprising: a memory control circuit; a plurality of control registers, wherein the plurality of control registers store a completion table having a first, data completion count; and a thread control circuit adapted to queue a thread for execution when, for its thread identifier, its completion count has decremented to zero and its thread identifier is the next thread.

In yet another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and the configurable circuit further comprising a control circuit coupled to the configurable computation circuit, the control circuit comprising: a memory control circuit; a thread control circuit; and a plurality of control registers storing a completion table having a plurality of types of thread identifiers, with each type of thread identifier indicating a loop level for loop and nested loop execution, and wherein the plurality of control registers further store a top of thread identifiers stack to allow each type of thread identifier access to private variables for a selected loop.

In another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and a control circuit coupled to the configurable computation circuit, the control circuit comprising: a memory control circuit; a plurality of control registers; and a thread control circuit comprising: a continuation queue storing one or more thread identifiers for computation threads having completion counts allowing execution but do not yet have an assigned thread identifier; and a reenter queue storing one or more thread identifiers for computation threads having completion counts allowing execution and having an assigned thread identifier to provide for execution of the threads in the reenter queue upon a designated spoke count.

In another representative embodiment, a configurable circuit may comprise: a configurable computation circuit; a first memory circuit coupled to the configurable computation circuit; a plurality of synchronous network inputs coupled to the configurable computation circuit; a plurality of synchronous network outputs coupled to the configurable computation circuit; and a second, configuration memory circuit coupled to the configurable computation circuit, to the control circuitry, to the synchronous network inputs, and to the synchronous network outputs; and a control circuit coupled to the configurable computation circuit, the control circuit comprising: a memory control circuit; a plurality of control registers storing a thread identifier pool and a completion table having a loop count of an active number of loop threads; and a thread control circuit, wherein in response to receipt of an asynchronous fabric message returning a thread identifier to the thread identifier pool, the control circuit decrements the loop count and, when the loop count reaches zero, transmits an asynchronous fabric completion message.

In a representative embodiment, a system is disclosed, which may comprise: an asynchronous packet network; a synchronous network; and a plurality of configurable circuits arranged in an array, each configurable circuit of the plurality of configurable circuits coupled to both the synchronous network and to the asynchronous packet network, the plurality of configurable circuits adapted to perform a plurality of computations using the synchronous network to form a plurality of synchronous domains, and the plurality of configurable circuits further adapted to generate and transmit a plurality of control messages over the asynchronous packet network, the plurality of control messages comprising one or more completion messages and continue messages.

In another representative embodiment, a system may comprise: a plurality of configurable circuits arranged in an array; a synchronous network coupled to each configurable circuit of the plurality of configurable circuits of the array; and an asynchronous packet network coupled to each configurable circuit of the plurality of configurable circuits of the array.

In another representative embodiment, a system may comprise: an interconnection network; a processor coupled to the interconnection network; and a plurality of configurable circuit clusters coupled to the interconnection network.

In a representative embodiment, a system may comprise: an interconnection network; a processor coupled to the interconnection network; a host interface coupled to the interconnection network; and a plurality of configurable circuit clusters coupled to the interconnection network, each configurable circuit cluster of the plurality of configurable circuit clusters comprising: a plurality of configurable circuits arranged in an array; a synchronous network coupled to each configurable circuit of the plurality of configurable circuits of the array; an asynchronous packet network coupled to each configurable circuit of the plurality of configurable circuits of the array; a memory interface coupled to the asynchronous packet network and to the interconnection network; and a dispatch interface coupled to the asynchronous packet network and to the interconnection network.

In another representative embodiment, a system may comprise: a hierarchical interconnection network comprising a first plurality of crossbar switches having a Folded Clos configuration and a plurality of direct, mesh connections at interfaces with endpoints; a processor coupled to the interconnection network; a host interface coupled to the interconnection network; and a plurality of configurable circuit clusters coupled to the interconnection network, each configurable circuit cluster of the plurality of configurable circuit clusters comprising: a plurality of configurable circuits arranged in an array; a synchronous network coupled to each configurable circuit of the plurality of configurable circuits of the array and providing a plurality of direct connections between adjacent configurable circuits of the array; an asynchronous packet network comprising a second plurality of crossbar switches, each crossbar switch coupled to at least one configurable circuit of the plurality of configurable circuits of the array and to another crossbar switch of the second plurality of crossbar switches; a memory interface coupled to the asynchronous packet network and to the interconnection network; and a dispatch interface coupled to the asynchronous packet network and to the interconnection network.

In another representative embodiment, a system may comprise: an interconnection network; a processor coupled to the interconnection network; a host interface coupled to the interconnection network; and a plurality of configurable circuit clusters coupled to the interconnection network, each configurable circuit cluster of the plurality of configurable circuit clusters comprising: a synchronous network; an asynchronous packet network; a memory interface coupled to the asynchronous packet network and to the interconnection network; a dispatch interface coupled to the asynchronous packet network and to the interconnection network; and a plurality of configurable circuits arranged in an array, each configurable circuit comprising: a configurable computation circuit; a control circuit coupled to the configurable computation circuit, the control circuit comprising: a memory control circuit; a thread control circuit; and a plurality of control registers; a first memory circuit coupled to the configurable computation circuit; a plurality of synchronous network inputs and outputs coupled to the configurable computation circuit and to the synchronous network; an asynchronous network input queue and an asynchronous network output queue coupled to the asynchronous packet network; a second, configuration memory circuit coupled to the configurable computation circuit, to the control circuitry, to the synchronous network inputs, and to the synchronous network outputs, the configuration memory circuit comprising: a first, instruction memory storing a plurality of data path configuration instructions to configure a data path of the configurable computation circuit; and a second, instruction and instruction index memory storing a plurality of spoke instructions and data path configuration instruction indices for selection of a master synchronous input of the synchronous network inputs.

In any of the various representative embodiments, the second, instruction and instruction index memory may further store a plurality of spoke instructions and data path configuration instruction indices for selection of a current data path configuration instruction for the configurable computation circuit.

In any of the various representative embodiments, the second, instruction and instruction index memory may further store a plurality of spoke instructions and data path configuration instruction indices for selection of a next data path configuration instruction for a next configurable computation circuit.

In any of the various representative embodiments, the second, instruction and instruction index memory may further store a plurality of spoke instructions and data path configuration instruction indices for selection of a synchronous network output of the plurality of synchronous network outputs.

In any of the various representative embodiments, the configurable circuit or system may further comprise: a configuration memory multiplexer coupled to the first, instruction memory and to the second, instruction and instruction index memory.

In any of the various representative embodiments, when a selection input of the configuration memory multiplexer has a first setting, the current data path configuration instruction may be selected using an instruction index from the second, instruction and instruction index memory.

In any of the various representative embodiments, when the selection input of the configuration memory multiplexer has a second setting different from the first setting, the current data path configuration instruction may be selected using an instruction index from the master synchronous input.

In any of the various representative embodiments, the second, instruction and instruction index memory may further store a plurality of spoke instructions and data path configuration instruction indices for configuration of portions of the configurable circuit independently from the current data path instruction.

In any of the various representative embodiments, a selected spoke instruction and data path configuration instruction index of the plurality of spoke instructions and data path configuration instruction indices may be selected according to a modulo spoke count.

In any of the various representative embodiments, the configurable circuit or system may further comprise: a conditional logic circuit coupled to the configurable computing circuit.

In any of the various representative embodiments, depending upon an output from the configurable computing circuit, the conditional logic circuit may be adapted to modify the next data path instruction index provided on a selected output of the plurality of synchronous network outputs.

In any of the various representative embodiments, depending upon an output from the configurable computing circuit, the conditional logic circuit may be adapted to provide conditional branching by modifying the next data path instruction or next data path instruction index provided on a selected output of the plurality of synchronous network outputs.

In any of the various representative embodiments, the conditional logic circuit, when enabled, may be adapted to provide conditional branching by ORing the least significant bit of the next data path instruction with the output from the configurable computing circuit to designate the next data path instruction or data path instruction index.

In any of the various representative embodiments, the conditional logic circuit, when enabled, may be adapted to provide conditional branching by ORing the least significant bit of the next data path instruction index with the output from the configurable computing circuit to designate the next data path instruction index.

In any of the various representative embodiments, the plurality of synchronous network inputs may comprise: a plurality of input registers coupled to a plurality of communication lines of a synchronous network; and an input multiplexer coupled to the plurality of input registers and to the second, instruction and instruction index memory for selection of the master synchronous input.

In any of the various representative embodiments, the plurality of synchronous network outputs may comprise: a plurality of output registers coupled to a plurality of communication lines of the synchronous network; and an output multiplexer coupled to the configurable computing circuit for selection of an output from the configurable computing circuit.

In any of the various representative embodiments, the configurable circuit or system may further comprise: an asynchronous fabric state machine coupled to the asynchronous network input queue and to the asynchronous network output queue, the asynchronous fabric state machine adapted to decode an input data packet received from the asynchronous packet network and to assemble an output data packet for transmission on the asynchronous packet network.

In any of the various representative embodiments, the asynchronous packet network may comprise a plurality of crossbar switches, each crossbar switch coupled to a plurality of configurable circuits and to at least one other crossbar switch.

In any of the various representative embodiments, the configurable circuit or system may further comprise: an array of a plurality of configurable circuits, wherein: each configurable circuit is coupled through the plurality of synchronous network inputs and the plurality of synchronous network outputs to the synchronous network; and each configurable circuit is coupled through the asynchronous network input and the asynchronous network output to the asynchronous packet network.

In any of the various representative embodiments, the synchronous network may comprise a plurality of direct point-to-point connections coupling adjacent configurable circuits of the array of the plurality of configurable circuits.

In any of the various representative embodiments, each configurable circuit may comprise: a direct, pass through connection between the plurality of input registers and the plurality of output registers. In any of the various representative embodiments, the direct, pass through connection may provide a direct, point-to-point connection for data transmission from a second configurable circuit received on the synchronous network to a third configurable circuit transmitted on the synchronous network.

In any of the various representative embodiments, the configurable computation circuit may comprise an arithmetic, logical and bit operation circuit adapted to perform at least one integer operation selected from the group consisting of: signed and unsigned addition, absolute value, negate, logical NOT, add and negate, subtraction A−B, reverse subtraction B−A, signed and unsigned greater than, signed and unsigned greater than or equal to, signed and unsigned less than, signed and unsigned less than or equal to, comparison of equal or not equal to, logical AND operation, logical OR operation, logical XOR operation, logical NAND operation, logical NOR operation, logical NOT XOR operation, logical AND NOT operation, logical OR NOT operation, and an interconversion between integer and floating point.

In any of the various representative embodiments, the configurable computation circuit may comprise an arithmetic, logical and bit operation circuit adapted to perform at least one floating point operation selected from the group consisting of: signed and unsigned addition, absolute value, negate, logical NOT, add and negate, subtraction A−B, reverse subtraction B−A, signed and unsigned greater than, signed and unsigned greater than or equal to, signed and unsigned less than, signed and unsigned less than or equal to, comparison of equal or not equal to, logical AND operation, logical OR operation, logical XOR operation, logical NAND operation, logical NOR operation, logical NOT XOR operation, logical AND NOT operation, logical OR NOT operation, an interconversion between integer and floating point, and combinations thereof.

In any of the various representative embodiments, the configurable computation circuit may comprise a multiply and shift operation circuit adapted to perform at least one integer operation selected from the group consisting of: multiply, shift, pass an input, signed and unsigned multiply, signed and unsigned shift right, signed and unsigned shift left, bit order reversal, a permutation, an interconversion between integer and floating point, and combinations thereof.

In any of the various representative embodiments, the configurable computation circuit may comprise a multiply and shift operation circuit adapted to perform at least floating point operation selected from the group consisting of: multiply, shift, pass an input, signed and unsigned multiply, signed and unsigned shift right, signed and unsigned shift left, bit order reversal, a permutation, an interconversion between integer and floating point, and combinations thereof.

In any of the various representative embodiments, the array of the plurality of configurable circuits may be further coupled to a first interconnection network.

In any of the various representative embodiments, the array of the plurality of configurable circuits may further comprise: a third, system memory interface circuit; and a dispatch interface circuit. In any of the various representative embodiments, the dispatch interface circuit may be adapted to receive a work descriptor packet over the first interconnection network, and in response to the work descriptor packet, to generate one or more data and control packets to the plurality of configurable circuits to configure the plurality of configurable circuits for execution of a selected computation.

In any of the various representative embodiments, the configurable circuit or system may further comprise: a flow control circuit coupled to the asynchronous network output queue, the flow control circuit adapted to generate a stop signal when a predetermined threshold has been reached in the asynchronous network output queue. In any of the various representative embodiments, in response to the stop signal, each asynchronous network output queue stops outputting data packets on the asynchronous packet network. In any of the various representative embodiments, in response to the stop signal, each configurable computation circuit stops executing upon completion of its current instruction.

In any of the various representative embodiments, a first plurality of configurable circuits of the array of a plurality of configurable circuits may be coupled in a first predetermined sequence through the synchronous network to form a first synchronous domain; and wherein a second plurality of configurable circuits of the array of a plurality of configurable circuits are coupled in a second predetermined sequence through the synchronous network to form a second synchronous domain. In any of the various representative embodiments, the first synchronous domain may be adapted to generate a continuation message to the second synchronous domain transmitted through the asynchronous packet network. In any of the various representative embodiments, the second synchronous domain may be adapted to generate a completion message to the first synchronous domain transmitted through the asynchronous packet network.

In any of the various representative embodiments, the plurality of control registers may store a completion table having a first, data completion count. In any of the various representative embodiments, the plurality of control registers further store the completion table having a second, iteration count. In any of the various representative embodiments, the plurality of control registers may further store a loop table having a plurality of thread identifiers and, for each thread identifier, a next thread identifier for execution following execution of a current thread. In any of the various representative embodiments, the plurality of control registers may further store, in the loop table, an identification of a first iteration and an identification of a last iteration.

In any of the various representative embodiments, the control circuit may be adapted to queue a thread for execution when, for its thread identifier, its completion count has decremented to zero and its thread identifier is the next thread.

In any of the various representative embodiments, the control circuit may be adapted to queue a thread for execution when, for its thread identifier, its completion count indicates completion of any data dependencies. In any of the various representative embodiments, the completion count may indicate a predetermined number of completion messages to be received, per selected thread of a plurality of threads, prior to execution of the selected thread.

In any of the various representative embodiments, the plurality of control registers may further store a completion table having a plurality of types of thread identifiers, with each type of thread identifier indicating a loop level for loop and nested loop execution.

In any of the various representative embodiments, the plurality of control registers may further store a completion table having a loop count of an active number of loop threads, and wherein in response to receipt of an asynchronous fabric message returning a thread identifier to a thread identifier pool, the control circuit decrements the loop count and, when the loop count reaches zero, transmits an asynchronous fabric completion message. In any of the various representative embodiments, the plurality of control registers may further store a top of thread identifiers stack to allow each type of thread identifier access to private variables for a selected loop.

In any of the various representative embodiments, the control circuit may further comprise: a continuation queue; and a reenter queue. In any of the various representative embodiments, the continuation queue stores one or more thread identifiers for computation threads having completion counts allowing execution but do not yet have an assigned thread identifier. In any of the various representative embodiments, the reenter queue may store one or more thread identifiers for computation threads having completion counts allowing execution and having an assigned thread identifier. In any of the various representative embodiments, any thread having a thread identifier in the reenter queue may be executed prior to execution of any thread having a thread identifier in the continuation queue.

In any of the various representative embodiments, the control circuit may further comprise: a priority queue, wherein any thread having a thread identifier in the priority queue may be executed prior to execution of any thread having a thread identifier in the continuation queue or in the reenter queue.

In any of the various representative embodiments, the control circuit may further comprise: a run queue, wherein any thread having a thread identifier in the run queue may be executed upon an occurrence of a spoke count for the thread identifier.

In any of the various representative embodiments, the second, configuration memory circuit may comprise: a first, instruction memory storing a plurality of data path configuration instructions to configure a data path of the configurable computation circuit; and a second, instruction and instruction index memory storing a plurality of spoke instructions and data path configuration instruction indices for selection of a master synchronous input of the synchronous network inputs.

In any of the various representative embodiments, the control circuit may be adapted to self-schedule a computation thread for execution.

In any of the various representative embodiments, the conditional logic circuit may be adapted to branch to a different, second next instruction for execution by a next configurable circuit.

In any of the various representative embodiments, the control circuit may be adapted to order computation threads for execution. In any of the various representative embodiments, the control circuit may be adapted to order loop computation threads for execution. In any of the various representative embodiments, the control circuit may be adapted to commence execution of computation threads in response to one or more completion signals from data dependencies.

Various method embodiments of configuring a configurable circuit are also disclosed. A representative method embodiment may comprise: using a first, instruction memory, providing a plurality of data path configuration instructions to configure a data path of the configurable computation circuit; and using a second, instruction and instruction index memory, providing a plurality of spoke instructions and data path configuration instruction indices for selection of a master synchronous input of a plurality of synchronous network inputs.

In any of the various representative embodiments, a method of configuring a configurable circuit may comprise: using a first, instruction memory, providing a plurality of data path configuration instructions to configure a data path of the configurable computation circuit; and using a second, instruction and instruction index memory, providing a plurality of spoke instructions and data path configuration instruction indices for selection of a current data path configuration instruction for the configurable computation circuit.

In any of the various representative embodiments, a method of configuring a configurable circuit may comprise: using a first, instruction memory, providing a plurality of data path configuration instructions to configure a data path of the configurable computation circuit; and using a second, instruction and instruction index memory, providing a plurality of spoke instructions and data path configuration instruction indices for selection of a next data path configuration instruction for a next configurable computation circuit.

A method of controlling thread execution of a multi-threaded configurable circuit is also disclosed, with the configurable circuit having a configurable computation circuit. A representative method embodiment may comprise: using a conditional logic circuit, depending upon an output from the configurable computing circuit, providinge conditional branching by modifying the next data path instruction or next data path instruction index provided to a next configurable circuit.

Another representative method embodiment of controlling thread execution of a multi-threaded configurable circuit may comprise: using a flow control circuit, generating a stop signal when a predetermined threshold has been reached in an asynchronous network output queue.

Another representative method embodiment of controlling thread execution of a multi-threaded configurable circuit may comprise: using a plurality of control registers, storing a loop table having a plurality of thread identifiers and, for each thread identifier, a next thread identifier for execution following execution of a current thread to provide ordered thread execution.

Another representative method embodiment of controlling thread execution of a multi-threaded configurable circuit may comprise: using a plurality of control registers, storing a completion table having a first, data completion count; and using a thread control circuit, queueing a thread for execution when, for its thread identifier, its completion count has decremented to zero.

A method of configuring and controlling thread execution of a multi-threaded configurable circuit having a configurable computation circuit is disclosed, with a representative method embodiment comprising: using a first, instruction memory, providing a plurality of configuration instructions to configure a data path of the configurable computation circuit; using a second, instruction and instruction index memory, providing a plurality of spoke instructions and data path configuration instruction indices for selection of a master synchronous input of a plurality of synchronous network inputs, for selection of a current data path configuration instruction for the configurable computation circuit, and for selection of a next data path instruction or next data path instruction index for a next configurable computation circuit; using a plurality of control registers, providing a completion table having a first, data completion count; and using a thread control circuit, queueing a thread for execution when, for its thread identifier, its completion count has decremented to zero.

Another method of configuring and controlling thread execution of a multi-threaded configurable circuit may comprise: using a first, instruction memory, providing a plurality of configuration instructions to configure a data path of the configurable computation circuit; using a second, instruction and instruction index memory, providing a plurality of spoke instructions and data path configuration instruction indices for selection of a master synchronous input of a plurality of synchronous network inputs, for selection of a current data path configuration instruction for the configurable computation circuit, and for selection of a next data path instruction or next data path instruction index for a next configurable computation circuit; using a plurality of control registers, providing a completion table having a first, data completion count; and using a thread control circuit, queueing a thread for execution when, for its thread identifier, its completion count has decremented to zero and its thread identifier is the next thread.

Another method of controlling thread execution of a multi-threaded configurable circuit may comprise: using a plurality of control registers, storing a completion table having a plurality of types of thread identifiers, with each type of thread identifier indicating a loop level for loop and nested loop execution, and wherein the plurality of control registers further store a top of thread identifiers stack; and allowing each type of thread identifier access to private variables for a selected loop.

Another method of controlling thread execution of a multi-threaded configurable circuit may comprise: using a plurality of control registers, storing a completion table having a data completion count; using a thread control circuit, providing a continuation queue storing one or more thread identifiers for computation threads having completion counts allowing execution but do not yet have an assigned thread identifier; and using a thread control circuit, providing a reenter queue storing one or more thread identifiers for computation threads having completion counts allowing execution and having an assigned thread identifier to provide for execution of the threads in the reenter queue upon a designated spoke count.

Another method of controlling thread execution of a multi-threaded configurable circuit may comprise: using a plurality of control registers, storing a thread identifier pool and a completion table having a loop count of an active number of loop threads; and using a thread control circuit, in response to receipt of an asynchronous fabric message returning a thread identifier to the thread identifier pool, decrementing the loop count and, when the loop count reaches zero, transmitting an asynchronous fabric completion message.

In any of the various representative embodiments, the method may further comprise: using the second, instruction and instruction index memory, providing a plurality of spoke instructions and data path configuration instruction indices for selection of a current data path configuration instruction for the configurable computation circuit.

In any of the various representative embodiments, the method may further comprise: using the second, instruction and instruction index memory, providing a plurality of spoke instructions and data path configuration instruction indices for selection of a next data path configuration instruction for a next configurable computation circuit.

In any of the various representative embodiments, the method may further comprise: using the second, instruction and instruction index memory, providing a plurality of spoke instructions and data path configuration instruction indices for selection of a synchronous network output of the plurality of synchronous network outputs.

In any of the various representative embodiments, the method may further comprise: using a configuration memory multiplexer, providing a first selection setting to select the current data path configuration instruction using an instruction index from the second, instruction and instruction index memory.

In any of the various representative embodiments, the method may further comprise: using a configuration memory multiplexer, providing a second selection setting, the second setting different from the first setting, to select the current data path configuration instruction using an instruction index from a master synchronous input.

In any of the various representative embodiments, the method may further comprise: using the second, instruction and instruction index memory, providing a plurality of spoke instructions and data path configuration instruction indices for configuration of portions of the configurable circuit independently from the current data path instruction.

In any of the various representative embodiments, the method may further comprise: using a configuration memory multiplexer, selecting a spoke instruction and data path configuration instruction index of the plurality of spoke instructions and data path configuration instruction indices according to a modulo spoke count.

In any of the various representative embodiments, the method may further comprise: using a conditional logic circuit and depending upon an output from the configurable computing circuit, modifying the next data path instruction or next data path instruction index.

In any of the various representative embodiments, the method may further comprise: using a conditional logic circuit and depending upon an output from the configurable computing circuit, providing conditional branching by modifying the next data path instruction or next data path instruction index.

In any of the various representative embodiments, the method may further comprise: enabling a conditional logic circuit; and using the conditional logic circuit and depending upon an output from the configurable computing circuit, providing conditional branching by ORing the least significant bit of the next data path instruction with the output from the configurable computing circuit to designate the next data path instruction or data path instruction index.

In any of the various representative embodiments, the method may further comprise: using an input multiplexer, selecting the master synchronous input. In any of the various representative embodiments, the method may further comprise: using an output multiplexer, selecting an output from the configurable computing circuit.

In any of the various representative embodiments, the method may further comprise: using an asynchronous fabric state machine coupled to an asynchronous network input queue and to an asynchronous network output queue, decoding an input data packet received from the asynchronous packet network and assembling an output data packet for transmission on the asynchronous packet network.

In any of the various representative embodiments, the method may further comprise: using the synchronous network, providing a plurality of direct point-to-point connections coupling adjacent configurable circuits of the array of the plurality of configurable circuits.

In any of the various representative embodiments, the method may further comprise: using the configurable circuit, providing a direct, pass through connection between a plurality of input registers and a plurality of output registers. In any of the various representative embodiments, the direct, pass through connection provides a direct, point-to-point connection for data transmission from a second configurable circuit received on the synchronous network to a third configurable circuit transmitted on the synchronous network.

In any of the various representative embodiments, the method may further comprise: using the configurable computation circuit, performing at least one integer or floating point operation selected from the group consisting of: signed and unsigned addition, absolute value, negate, logical NOT, add and negate, subtraction A–B, reverse subtraction B–A, signed and unsigned greater than, signed and unsigned greater than or equal to, signed and unsigned less than, signed and unsigned less than or equal to, comparison of equal or not equal to, logical AND operation, logical OR operation, logical XOR operation, logical NAND operation, logical NOR operation, logical NOT XOR operation, logical AND NOT operation, logical OR NOT operation, and an interconversion between integer and floating point.

In any of the various representative embodiments, the method may further comprise: using the configurable computation circuit, performing at least one integer or floating point operation selected from the group consisting of: multiply, shift, pass an input, signed and unsigned multiply, signed and unsigned shift right, signed and unsigned shift left, bit order reversal, a permutation, an interconversion between integer and floating point, and combinations thereof.

In any of the various representative embodiments, the method may further comprise: using a dispatch interface circuit, receiving a work descriptor packet over the first interconnection network, and in response to the work descriptor packet, to generate one or more data and control packets to the plurality of configurable circuits to configure the plurality of configurable circuits for execution of a selected computation.

In any of the various representative embodiments, the method may further comprise: using a flow control circuit, generating a stop signal when a predetermined threshold has been reached in the asynchronous network output queue. In any of the various representative embodiments, in response to the stop signal, each asynchronous network output queue stops outputting data packets on the asynchronous packet network. In any of the various representative embodiments, in response to the stop signal, each configurable computation circuit stops executing upon completion of its current instruction.

In any of the various representative embodiments, the method may further comprise: coupling a first plurality of configurable circuits of the array of a plurality of configurable circuits in a first predetermined sequence through the synchronous network to form a first synchronous domain; and coupling a second plurality of configurable circuits of the array of a plurality of configurable circuits are coupled in a second predetermined sequence through the synchronous network to form a second synchronous domain.

In any of the various representative embodiments, the method may further comprise: generating a continuation message from the first synchronous domain to the second synchronous domain for transmission through the asynchronous packet network.

In any of the various representative embodiments, the method may further comprise: generating a completion message from the second synchronous domain to the first synchronous domain for transmission through the asynchronous packet network.

In any of the various representative embodiments, the method may further comprise storing a completion table having a first, data completion count in the plurality of control registers.

In any of the various representative embodiments, the method may further comprise: storing the completion table having a second, iteration count in the plurality of control registers.

In any of the various representative embodiments, the method may further comprise: storing a loop table having a plurality of thread identifiers in the plurality of control registers and, for each thread identifier, storing a next thread identifier for execution following execution of a current thread.

In any of the various representative embodiments, the method may further comprise: storing in the loop table in the plurality of control registers, an identification of a first iteration and an identification of a last iteration.

In any of the various representative embodiments, the method may further comprise: using the control circuit, queueing a thread for execution when, for its thread identifier, its completion count has decremented to zero.

In any of the various representative embodiments, the method may further comprise: using the control circuit, queueing a thread for execution when, for its thread identifier, its completion count has decremented to zero and its thread identifier is the next thread.

In any of the various representative embodiments, the method may further comprise: using the control circuit, queueing a thread for execution when, for its thread identifier, its completion count indicates completion of any data dependencies. In any of the various representative embodiments, the completion count may indicate a predetermined number of completion messages to be received, per selected thread of a plurality of threads, prior to execution of the selected thread.

In any of the various representative embodiments, the method may further comprise: storing a completion table, in the plurality of control registers, having a plurality of types of thread identifiers, with each type of thread identifier indicating a loop level for loop and nested loop execution.

In any of the various representative embodiments, the method may further comprise: storing, in the plurality of control registers, a completion table having a loop count of an active number of loop threads, and wherein in response to receipt of an asynchronous fabric message returning a thread identifier to a thread identifier pool, using the control circuit, decrementing the loop count and, when the loop count reaches zero, transmitting an asynchronous fabric completion message.

In any of the various representative embodiments, the method may further comprise: storing a top of thread identifiers stack in the plurality of control registers to allow each type of thread identifier access to private variables for a selected loop.

In any of the various representative embodiments, the method may further comprise: using a continuation queue, storing one or more thread identifiers for computation threads having completion counts allowing execution but do not yet have an assigned thread identifier.

In any of the various representative embodiments, the method may further comprise: using a reenter queue, storing one or more thread identifiers for computation threads having completion counts allowing execution and having an assigned thread identifier.

In any of the various representative embodiments, the method may further comprise: executing any thread having a thread identifier in the reenter queue prior to execution of any thread having a thread identifier in the continuation queue.

In any of the various representative embodiments, the method may further comprise: executing any thread having a thread identifier in a priority queue prior to execution of any thread having a thread identifier in the continuation queue or in the reenter queue.

In any of the various representative embodiments, the method may further comprise: executing any thread in a run queue upon an occurrence of a spoke count for the thread identifier.

In any of the various representative embodiments, the method may further comprise: using a control circuit, self-scheduling a computation thread for execution.

In any of the various representative embodiments, the method may further comprise: using the conditional logic circuit, branching to a different, second next instruction for execution by a next configurable circuit.

In any of the various representative embodiments, the method may further comprise: using the control circuit, ordering computation threads for execution.

In any of the various representative embodiments, the method may further comprise: using the control circuit, ordering loop computation threads for execution.

In any of the various representative embodiments, the method may further comprise: using the control circuit, commencing execution of computation threads in response to one or more completion signals from data dependencies.

A self-scheduling processor is disclosed. In a representative embodiment, the processor comprises: a processor core adapted to execute a received instruction; and a core control circuit coupled to the processor core, the core control circuit adapted to automatically schedule an instruction for execution by the processor core in response to a received work descriptor data packet. In another representative embodiment, the processor comprises: a processor core adapted to execute a received instruction; and a core control circuit coupled to the processor core, the core control circuit adapted to automatically schedule an instruction for execution by the processor core in response to a received event data packet.

A multi-threaded, self-scheduling processor is also disclosed which can create threads on local or remote compute elements. In a representative embodiment, the processor comprises: a processor core adapted to execute a fiber create instruction; and a core control circuit coupled to the processor core, the core control circuit adapted to automatically schedule the fiber create instruction for execution by the processor core and generate one or more work descriptor data packets to another processor or hybrid threading fabric circuit for execution of a corresponding plurality of execution threads. In another representative embodiment, the processor comprises: a processor core adapted to execute a fiber create instruction; and a core control circuit coupled to the processor core, the core control circuit adapted to schedule the fiber create instruction for execution by the processor core, to reserve a predetermined amount of memory space in a thread control memory to store return arguments, and to generate one or more work descriptor data packets to another processor or hybrid threading fabric circuit for execution of a corresponding plurality of execution threads.

In another representative embodiment, a processor comprises: a core control circuit comprising: an interconnection network interface; a thread control memory coupled to the interconnection network interface; an execution queue coupled to the thread control memory; a control logic and thread selection circuit coupled to the execution queue, to the thread control memory; and an instruction cache coupled to the control logic and thread selection circuit; and further, a processor core is coupled to the instruction cache of the core control circuit.

In another representative embodiment, a processor comprises: a core control circuit comprising: an interconnection network interface; a thread control memory coupled to the interconnection network interface; a network response memory; an execution queue coupled to the thread control memory; a control logic and thread selection circuit coupled to the execution queue, to the thread control memory; an instruction cache coupled to the control logic and thread selection circuit; and a command queue; and further, a processor core is coupled to the instruction cache and to the command queue of the core control circuit.

In another representative embodiment, a processor comprises: a processor core and a core control circuit coupled to the processor core, with the core control circuit comprising: an interconnection network interface coupleable to an interconnection network to receive a work descriptor data packet, to decode the received work descriptor data packet into an execution thread having an initial program count and any received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of the execution thread.

In another representative embodiment, a processor comprises: a processor core and a core control circuit coupled to the processor core, with the core control circuit comprising: an interconnection network interface coupleable to an interconnection network to receive a work descriptor data packet, to decode the received work descriptor data packet into an execution thread having an initial program count and any received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of an execution thread by a processor core.

In another representative embodiment, a processor comprises: a processor core and a core control circuit coupled to the processor core, with the core control circuit comprising: an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of an execution thread by the processor core.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a program count register storing a received program count, a data cache, and a general-purpose register storing a received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of the execution thread by the processor core, the processor core using data stored in the data cache or general-purpose register.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a program count register storing a received program count, and thread state registers storing a valid state or a paused state for each thread identifier of the plurality of thread identifiers; an execution queue coupled to the thread control memory; and a control logic and thread selection circuit coupled to the execution queue, the control logic and thread selection circuit adapted to assign an available thread identifier to the execution thread, to automatically place the thread identifier in the execution queue when it has a valid state, and for as long as the valid state remains, to periodically select the thread identifier for execution of an instruction of the execution thread by the processor core until completion of the execution thread.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a program count register storing a received program count, and thread state registers storing a valid state or a paused state for each thread identifier of the plurality of thread identifiers; an execution queue coupled to the thread control memory; and a control logic and thread selection circuit coupled to the execution queue, the control logic and thread selection circuit adapted to assign an available thread identifier to the execution thread, to automatically place the thread identifier in the execution queue when it has a valid state, and for as long as the valid state remains, to periodically select the thread identifier for execution of an instruction of the execution thread by the processor core, and to pause thread execution by not returning the thread identifier to the execution queue when it has a pause state.

In another representative embodiment, a processor comprises: a processor core and a core control circuit coupled to the processor core, with the core control circuit comprising: a thread control memory comprising a plurality of registers, the plurality of registers comprising a thread identifier pool register storing a plurality of thread identifiers, a thread state register, a program count register storing a received program count, a data cache, and a general-purpose register storing a received argument; an execution queue coupled to the thread control memory; and a control logic and thread selection circuit coupled to the execution queue, the control logic and thread selection circuit adapted to assign an available thread identifier to the execution thread, to automatically place the thread identifier in the execution queue, and to periodically select the thread identifier for execution of an instruction of an execution thread by the processor core.

In another representative embodiment, a processor comprises: a processor core adapted to execute a plurality of instructions; and a core control circuit coupled to the processor core, with the core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, a data cache, and a general-purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; and an instruction cache coupled to the processor core and to the control logic and thread selection circuit to receive the initial program count and provide to the processor core a corresponding instruction for execution, of the plurality of instructions.

In another representative embodiment, a processor comprises: a core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, a data cache, and a general-purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to automatically place the thread identifier in the execution queue, to periodically select the thread identifier for execution, to access the thread control memory using the thread identifier as an index to select the initial program count for the execution thread; and an instruction cache coupled to the control logic and thread selection circuit to receive the initial program count and provide a corresponding instruction for execution; and further, a processor core is coupled to the instruction cache of the core control circuit, the processor core adapted to execute the corresponding instruction.

In another representative embodiment, a processor comprises: a core control circuit comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, and a general-purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; an instruction cache coupled to the control logic and thread selection circuit to receive the initial program count and provide a corresponding instruction for execution; and a command queue; and further, a processor core is coupled to the instruction cache and the command queue of the core control circuit, the processor core adapted to execute the corresponding instruction.

In another representative embodiment, a processor comprises: a core control circuit coupled to the interconnection network interface and comprising: an interconnection network interface coupleable to an interconnection network to receive a work descriptor data packet, to decode the received work descriptor data packet into an execution thread having an initial program count and any received argument; a thread control memory coupled to the interconnection network interface and comprising a plurality of registers, the plurality of registers comprising a thread identifier pool register storing a plurality of thread identifiers, a thread state register, a program count register storing the received program count, and a general-purpose register storing the received argument; an execution queue coupled to the thread control memory; a control logic and thread selection circuit coupled to the execution queue and to the thread control memory, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread, and an instruction cache coupled to the control logic and thread selection circuit to receive the initial program count and provide a corresponding instruction for execution; and further, a processor core is coupled to the instruction cache of the core control circuit, the processor core adapted to execute the corresponding instruction.

In another representative embodiment, a processor comprises: a core control circuit comprising: an interconnection network interface coupleable to an interconnection network to receive a call work descriptor data packet, to decode the received work descriptor data packet into an execution thread having an initial program count and any received argument, and to encode a work descriptor packet for transmission to other processing elements; a thread control memory coupled to the interconnection network interface and comprising a plurality of registers, the plurality of registers comprising a thread identifier pool register storing a plurality of thread identifiers, a thread state register, a program count register storing the received program count, and a general-purpose register storing the received argument; an execution queue coupled to the thread control memory; a network response memory coupled to the interconnection network interface; a control logic and thread selection circuit coupled to the execution queue, to the thread control memory, and to the instruction cache, the control logic and thread selection circuit adapted to assign an available thread identifier to the execution thread, to place the thread identifier in the execution queue, to select the thread identifier for execution, to access the thread control memory using the thread identifier as an index to select the initial program count for the execution thread; an instruction cache coupled to the control logic and thread selection circuit to receive the initial program count and provide a corresponding instruction for execution; and a command queue storing one or more commands for generation of one or more work descriptor packets; and further, a processor core is coupled to the instruction cache and the command queue of the core control circuit, the processor core adapted to execute the corresponding instruction.

For any of the various representative embodiments, the core control circuit may further comprise: an interconnection network interface coupleable to an interconnection network, the interconnection network interface adapted to receive a work descriptor data packet, to decode the received work descriptor data packet into an execution thread having an initial program count and any received argument. For any of the various representative embodiments, the interconnection network interface may be further adapted to receive an event data packet, to decode the received event data packet into an event identifier and any received argument.

For any of the various representative embodiments, the core control circuit may further comprise: a control logic and thread selection circuit coupled to the interconnection network interface, the control logic and thread selection circuit adapted to assign an available thread identifier to the execution thread.

For any of the various representative embodiments, the core control circuit may further comprise: a thread control memory having a plurality of registers, with the plurality of registers comprising one or more of the following, in any selected combination: a thread identifier pool register storing a plurality of thread identifiers; a thread state register; a program count register storing a received initial program count; a general-purpose register storing the received argument; a pending fiber return count register; a return argument buffer or register; a return argument link list register; a custom atomic transaction identifier register; an event state register; an event mask register; and a data cache.

For any of the various representative embodiments, the interconnection network interface may be further adapted to store the execution thread having the initial program count and any received argument in the thread control memory using a thread identifier as an index to the thread control memory.

For any of the various representative embodiments, the core control circuit may further comprise: a control logic and thread selection circuit coupled to the thread control memory and to the interconnection network interface, the control logic and thread selection circuit adapted to assign an available thread identifier to the execution thread.

For any of the various representative embodiments, the core control circuit may further comprise: an execution queue coupled to the thread control memory, the execution queue storing one or more thread identifiers.

For any of the various representative embodiments, the core control circuit may further comprise: a control logic and thread selection circuit coupled to the execution queue, to the interconnection network interface, and to the thread control memory, the control logic and thread selection circuit adapted to assign an available thread identifier to the execution thread, to place the thread identifier in the execution queue, to select the thread identifier for execution, and to access the thread control memory using the thread identifier as an index to select the initial program count for the execution thread.

For any of the various representative embodiments, the core control circuit may further comprise: an instruction cache coupled to the control logic and thread selection circuit to receive the initial program count and provide a corresponding instruction for execution.

In another representative embodiment, the processor further may further comprise: a processor core coupled to the instruction cache of the core control circuit, the processor core adapted to execute the corresponding instruction.

For any of the various representative embodiments, the core control circuit may be further adapted to assign an initial valid state to the execution thread. For any of the various representative embodiments, the core control circuit may be further adapted to assign a pause state to the execution thread in response to the processor core executing a memory load instruction. For any of the various representative embodiments, the core control circuit may be further adapted to assign a pause state to the execution thread in response to the processor core executing a memory store instruction.

For any of the various representative embodiments, the core control circuit may be further adapted to end execution of a selected thread in response to the execution of a return instruction by the processor core. For any of the various representative embodiments, the core control circuit may be further adapted to return a corresponding thread identifier of the selected thread to the thread identifier pool register in response to the execution of a return instruction by the processor core. For any of the various representative embodiments, the core control circuit may be further adapted to clear the registers of the thread control memory indexed by the corresponding thread identifier of the selected thread in response to the execution of a return instruction by the processor core.

For any of the various representative embodiments, the interconnection network interface may be further adapted to generate a return work descriptor packet in response to the execution of a return instruction by the processor core.

For any of the various representative embodiments, the core control circuit may further comprise: a network response memory. For any of the various representative embodiments, the network response memory may comprise one or more of the following, in any selected combination: a memory request register; a thread identifier and transaction identifier register; a request cache line index register; a bytes register; and a general-purpose register index and type register.

For any of the various representative embodiments, the interconnection network interface may be adapted to generate a point-to-point event data message. For any of the various representative embodiments, the interconnection network interface may be adapted to generate a broadcast event data message.

For any of the various representative embodiments, the core control circuit may be further adapted to use an event mask stored in the event mask register to respond to a received event data packet. For any of the various representative embodiments, the core control circuit may be further adapted to determine an event number corresponding to a received event data packet. For any of the various representative embodiments, the core control circuit may be further adapted to change the status of a thread identifier from pause to valid in response to a received event data packet to resume execution of a corresponding execution thread. For any of the various representative embodiments, the core control circuit may be further adapted to change the status of a thread identifier from pause to valid in response to an event number of a received event data packet to resume execution of a corresponding execution thread.

For any of the various representative embodiments, the control logic and thread selection circuit may be further adapted to successively select a next thread identifier from the execution queue for execution of a single instruction of a corresponding execution thread. For any of the various representative embodiments, the control logic and thread selection circuit may be further adapted to perform a round-robin selection of a next thread identifier from the execution queue, of the plurality of thread identifiers, each for execution of a single instruction of a corresponding execution thread. For any of the various representative embodiments, the control logic and thread selection circuit may be further adapted to perform a round-robin selection of a next thread identifier from the execution queue, of the plurality of thread identifiers, each for execution of a single instruction of a corresponding execution thread until completion of the execution thread. For any of the various representative embodiments, the control logic and thread selection circuit may be further adapted to perform a barrel selection of a next thread identifier from the execution queue, of the plurality of thread identifiers, each for execution of a single instruction of a corresponding execution thread.

For any of the various representative embodiments, the control logic and thread selection circuit may be further adapted to assign a valid status or a pause status to a thread identifier. For any of the various representative embodiments, the control logic and thread selection circuit may be further adapted to assign a priority status to a thread identifier. For any of the various representative embodiments, the control logic and thread selection circuit may be further adapted to, following execution of a corresponding instruction, to return the corresponding thread identifier to the execution queue with an assigned valid status and an assigned priority.

For any of the various representative embodiments, the core control circuit may further comprise: a network command queue coupled to the processor core.

For any of the various representative embodiments, the interconnection network interface may comprise: an input queue; a packet decoder circuit coupled to the input queue, to the control logic and thread selection circuit, and to the thread control memory; an output queue; and a packet encoder circuit coupled to the output queue, to the network response memory, and to the network command queue.

For any of the various representative embodiments, the execution queue may further comprise: a first priority queue; and a second priority queue. For any of the various representative embodiments, the control logic and thread selection circuit may further comprise: thread selection control circuitry coupled to the execution queue, the thread selection control circuitry adapted to select a thread identifier from the first priority queue at a first frequency and to select a thread identifier from the second priority queue at a second frequency, the second frequency lower than the first frequency. For any of the various representative embodiments, the thread selection control circuitry may be adapted to determine the second frequency as a skip count from selection of a thread identifier from the first priority queue.

For any of the various representative embodiments, the core control circuit may further comprise: data path control circuitry adapted to control access size over the first interconnection network. For any of the various representative embodiments, the core control circuit may further comprise: data path control circuitry adapted to increase or decrease memory load access size in response to time-averaged usage levels. For any of the various representative embodiments, the core control circuit may further comprise: data path control circuitry adapted to increase or decrease memory store access size in response to time-averaged usage levels. For any of the various representative embodiments, the control logic and thread selection circuit may be further adapted to increase a size of a memory load access request to correspond to a cache line boundary of the data cache.

For any of the various representative embodiments, the core control circuit may further comprise: system call circuitry adapted to generate one or more system calls to a host processor. For any of the various representative embodiments, the system call circuitry may further comprise: a plurality of system call credit registers storing a predetermined credit count to modulate a number of system calls in any predetermined period of time.

For any of the various representative embodiments, the core control circuit may be further adapted, in response to a request from a host processor, to generate a command to the command queue for the interconnection network interface to copy and transmit all data from the thread control memory corresponding to a selected thread identifier for monitoring thread state.

For any of the various representative embodiments, the processor core may be adapted to execute a fiber create instruction to generate one or more commands to the command queue for the interconnection network interface to generate one or more call work descriptor packets to another processor core or to a hybrid threading fabric circuit. For any of the various representative embodiments, the core control circuit may be further adapted, in response to execution of a fiber create instruction by the processor core, to reserve a predetermined amount of memory space in the general-purpose registers or return argument registers.

For any of the various representative embodiments, in response to the generation of one or more call work descriptor packets to another processor core or to a hybrid threading fabric, the core control circuit may be adapted to store a thread return count in the thread return register. For any of the various representative embodiments, in response to receipt of a return data packet, the core control circuit may be adapted to decrement the thread return count stored in the thread return register. For any of the various representative embodiments, in response to the thread return count in the thread return register being decremented to zero, the core control circuit may be adapted to change a paused status to a valid status for a corresponding thread identifier for subsequent execution of a thread return instruction for completion of the created fibers or threads.

For any of the various representative embodiments, the processor core may be adapted to execute a waiting or nonwaiting fiber join instruction. For any of the various representative embodiments, the processor core may be adapted to execute a fiber join all instruction.

For any of the various representative embodiments, the processor core may be adapted to execute a non-cached read or load instruction to designate a general-purpose register for storage of data received from a memory. For any of the various representative embodiments, the processor core may be adapted to execute a non-cached write or store instruction to designate data in a general-purpose register for storage in a memory.

For any of the various representative embodiments, the core control circuit may be adapted to assign a transaction identifier to any load or store request to memory and to correlate the transaction identifier with a thread identifier.

For any of the various representative embodiments, the processor core may be adapted to execute a first thread priority instruction to assign a first priority to an execution thread having a corresponding thread identifier. For any of the various representative embodiments, the processor core may be adapted to execute a second thread priority instruction to assign a second priority to an execution thread having a corresponding thread identifier.

For any of the various representative embodiments, the processor core may be adapted to execute a custom atomic return instruction to complete an executing thread of a custom atomic operation. For any of the various representative embodiments, in conjunction with a memory controller, the processor core may be adapted to execute a floating point atomic memory operation. For any of the various representative embodiments, in conjunction with a memory controller, the processor core may be adapted to execute a custom atomic memory operation.

A method of self-scheduling execution of an instruction is also disclosed, with a representative method embodiment comprising: receiving a work descriptor data packet; and automatically scheduling the instruction for execution in response to the received work descriptor data packet.

Another method of self-scheduling execution of an instruction is also disclosed, with a representative method embodiment comprising: receiving an event data packet; and automatically scheduling the instruction for execution in response to the received event data packet.

A method of a first processing element to generate a plurality of execution threads for performance by a second processing element is also disclosed, with a representative method embodiment comprising: executing a fiber create instruction; and in response to the execution of the fiber create instruction generating one or more work descriptor data packets to the second processing element for execution of the plurality of execution threads.

A method of a first processing element to generate a plurality of execution threads for performance by a second processing element is also disclosed, with a representative method embodiment comprising: executing a fiber create instruction; and in response to the execution of the fiber create instruction reserving a predetermined amount of memory space in a thread control memory to store return arguments and generating one or more work descriptor data packets to the second processing element for execution of the plurality of execution threads.

A method of self-scheduling execution of an instruction is also disclosed, with a representative method embodiment comprising: receiving a work descriptor data packet; decoding the received work descriptor data packet into an execution thread having an initial program count and any received argument; assigning an available thread identifier to the execution thread; automatically queuing the thread identifier for execution of the execution thread; and periodically selecting the thread identifier for execution of the execution thread.

Another method of self-scheduling execution of an instruction is also disclosed, with a representative method embodiment comprising: receiving a work descriptor data packet; decoding the received work descriptor data packet into an execution thread having an initial program count and any received argument; assigning an available thread identifier to the execution thread; automatically queuing the thread identifier for execution of the execution thread when it has a valid state; and for as long as the valid state remains, periodically selecting the thread identifier for execution of an instruction of the execution thread until completion of the execution thread.

Another method of self-scheduling execution of an instruction is also disclosed, with a representative method embodiment comprising: receiving a work descriptor data packet; decoding the received work descriptor data packet into an execution thread having an initial program count and any received argument; assigning an available thread identifier to the execution thread; automatically queuing the thread identifier in an execution queue for execution of the execution thread when it has a valid state; and for as long as the valid state remains, periodically selecting the thread identifier for execution of an instruction of the execution thread; and pausing thread execution by not returning the thread identifier to the execution queue when it has a pause state.

Another method of self-scheduling execution of an instruction is also disclosed, with a representative method embodiment comprising: receiving a work descriptor data packet; decoding the received work descriptor data packet into an execution thread having an initial program count and any received argument; storing the initial program count and any received argument in a thread control memory; assigning an available thread identifier to the execution thread; automatically queuing the thread identifier for execution of the execution thread when it has a valid state; accessing the thread control memory using the thread identifier as an index to select the initial program count for the execution thread; and for as long as the valid state remains, periodically selecting the thread identifier for execution of an instruction of the execution thread until completion of the execution thread.

For any of the various representative embodiments, the method may further comprise: receiving an event data packet; and decoding the received event data packet into an event identifier and any received argument.

For any of the various representative embodiments, the method may further comprise: assigning an initial valid state to the execution thread.

For any of the various representative embodiments, the method may further comprise: assigning a pause state to the execution thread in response to the execution of a memory load instruction. For any of the various representative embodiments, the method may further comprise: assigning a pause state to the execution thread in response to the execution of a memory store instruction.

For any of the various representative embodiments, the method may further comprise: terminating execution of a selected thread in response to the execution of a return instruction. For any of the various representative embodiments, the method may further comprise: returning a corresponding thread identifier of the selected thread to the thread identifier pool in response to the execution of a return instruction. For any of the various representative embodiments, the method may further comprise: clearing the registers of a thread control memory indexed by the corresponding thread identifier of the selected thread in response to the execution of a return instruction. For any of the various representative embodiments, the method may further comprise: generating a return work descriptor packet in response to the execution of a return instruction.

For any of the various representative embodiments, the method may further comprise: generating a point-to-point event data message. For any of the various representative embodiments, the method may further comprise: generating a broadcast event data message.

For any of the various representative embodiments, the method may further comprise: using an event mask to respond to a received event data packet. For any of the various representative embodiments, the method may further comprise: determining an event number corresponding to a received event data packet. For any of the various representative embodiments, the method may further comprise: changing the status of a thread identifier from pause to valid in response to a received event data packet to resume execution of a corresponding execution thread. For any of the various representative embodiments, the method may further comprise: changing the status of a thread identifier from pause to valid in response to an event number of a received event data packet to resume execution of a corresponding execution thread.

For any of the various representative embodiments, the method may further comprise: successively selecting a next thread identifier from the execution queue for execution of a single instruction of a corresponding execution thread. For any of the various representative embodiments, the method may further comprise: performing a round-robin selection of a next thread identifier from the execution queue, of the plurality of thread identifiers, each for execution of a single instruction of a corresponding execution thread. For any of the various representative embodiments, the method may further comprise: performing a round-robin selection of a next thread identifier from the execution queue, of the plurality of thread identifiers, each for execution of a single instruction of a corresponding execution thread until completion of the execution thread. For any of the various representative embodiments, the method may further comprise: performing a barrel selection of a next thread identifier from the execution queue, of the plurality of thread identifiers, each for execution of a single instruction of a corresponding execution thread.

For any of the various representative embodiments, the method may further comprise: assigning a valid status or a pause status to a thread identifier. For any of the various representative embodiments, the method may further comprise: assigning a priority status to a thread identifier.

For any of the various representative embodiments, the method may further comprise: following execution of a corresponding instruction, returning the corresponding thread identifier to the execution queue with an assigned valid status and an assigned priority.

For any of the various representative embodiments, the method may further comprise: selecting a thread identifier from a first priority queue at a first frequency and selecting a thread identifier from a second priority queue at a second frequency, the second frequency lower than the first frequency. For any of the various representative embodiments, the method may further comprise: determining the second frequency as a skip count from selection of a thread identifier from the first priority queue.

For any of the various representative embodiments, the method may further comprise: controlling data path access size. For any of the various representative embodiments, the method may further comprise: increasing or decreasing memory load access size in response to time-averaged usage levels. For any of the various representative embodiments, the method may further comprise: increasing or decreasing memory store access size in response to time-averaged usage levels. For any of the various representative embodiments, the method may further comprise: increasing a size of a memory load access request to correspond to a cache line boundary of the data cache.

For any of the various representative embodiments, the method may further comprise: generating one or more system calls to a host processor. For any of the various representative embodiments, the method may further comprise: using a predetermined credit count, modulating a number of system calls in any predetermined period of time.

For any of the various representative embodiments, the method may further comprise: in response to a request from a host processor, copying and transmitting all data from a thread control memory corresponding to a selected thread identifier for monitoring thread state.

For any of the various representative embodiments, the method may further comprise: executing a fiber create instruction to generate one or more commands to generate one or more call work descriptor packets to another processor core or to a hybrid threading fabric circuit. For any of the various representative embodiments, the method may further comprise: in response to execution of a fiber create instruction, reserving a predetermined amount of memory space for storing any return arguments. For any of the various representative embodiments, the method may further comprise: in response to the generation of one or more call work descriptor packets, storing a thread return count in the thread return register. For any of the various representative embodiments, the method may further comprise: in response to receipt of a return data packet, decrementing the thread return count stored in the thread return register. For any of the various representative embodiments, the method may further comprise: in response to the thread return count in the thread return register being decremented to zero, changing a paused status to a valid status for a corresponding thread identifier for subsequent execution of a thread return instruction for completion of the created fibers or threads.

For any of the various representative embodiments, the method may further comprise: executing a waiting or non-waiting fiber join instruction. For any of the various representative embodiments, the method may further comprise: executing a fiber join all instruction.

For any of the various representative embodiments, the method may further comprise: executing a non-cached read or load instruction to designate a general-purpose register for storage of data received from a memory.

For any of the various representative embodiments, the method may further comprise: executing a non-cached write or store instruction to designate data in a general-purpose register for storage in a memory.

For any of the various representative embodiments, the method may further comprise: assigning a transaction identifier to any load or store request to memory and to correlate the transaction identifier with a thread identifier.

For any of the various representative embodiments, the method may further comprise: executing a first thread priority instruction to assign a first priority to an execution thread having a corresponding thread identifier. For any of the various representative embodiments, the method may further comprise: executing a second thread priority instruction to assign a second priority to an execution thread having a corresponding thread identifier.

For any of the various representative embodiments, the method may further comprise: executing a custom atomic return instruction to complete an executing thread of a custom atomic operation.

For any of the various representative embodiments, the method may further comprise: executing a floating point atomic memory operation.

For any of the various representative embodiments, the method may further comprise: executing a custom atomic memory operation.

Numerous other advantages and features of the present invention will become readily apparent from the following detailed description of the invention and the embodiments thereof, from the claims and from the accompanying drawings.

BRIEF DESCRIPTION OF THE DRAWINGS

The objects, features and advantages of the present invention will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 17A, 17B, and 17C (collectively referred to as FIG. 17) is a flow chart of representative asynchronous packet network messaging and execution by hybrid threading fabric configurable computing circuits (tiles) for performance of the computation of FIG. 16 by a hybrid threading fabric circuit cluster.

FIG. 37 illustrates representative virtual address space formats supported by the system architecture.

DETAILED DESCRIPTION OF REPRESENTATIVE EMBODIMENTS

Figure 1:
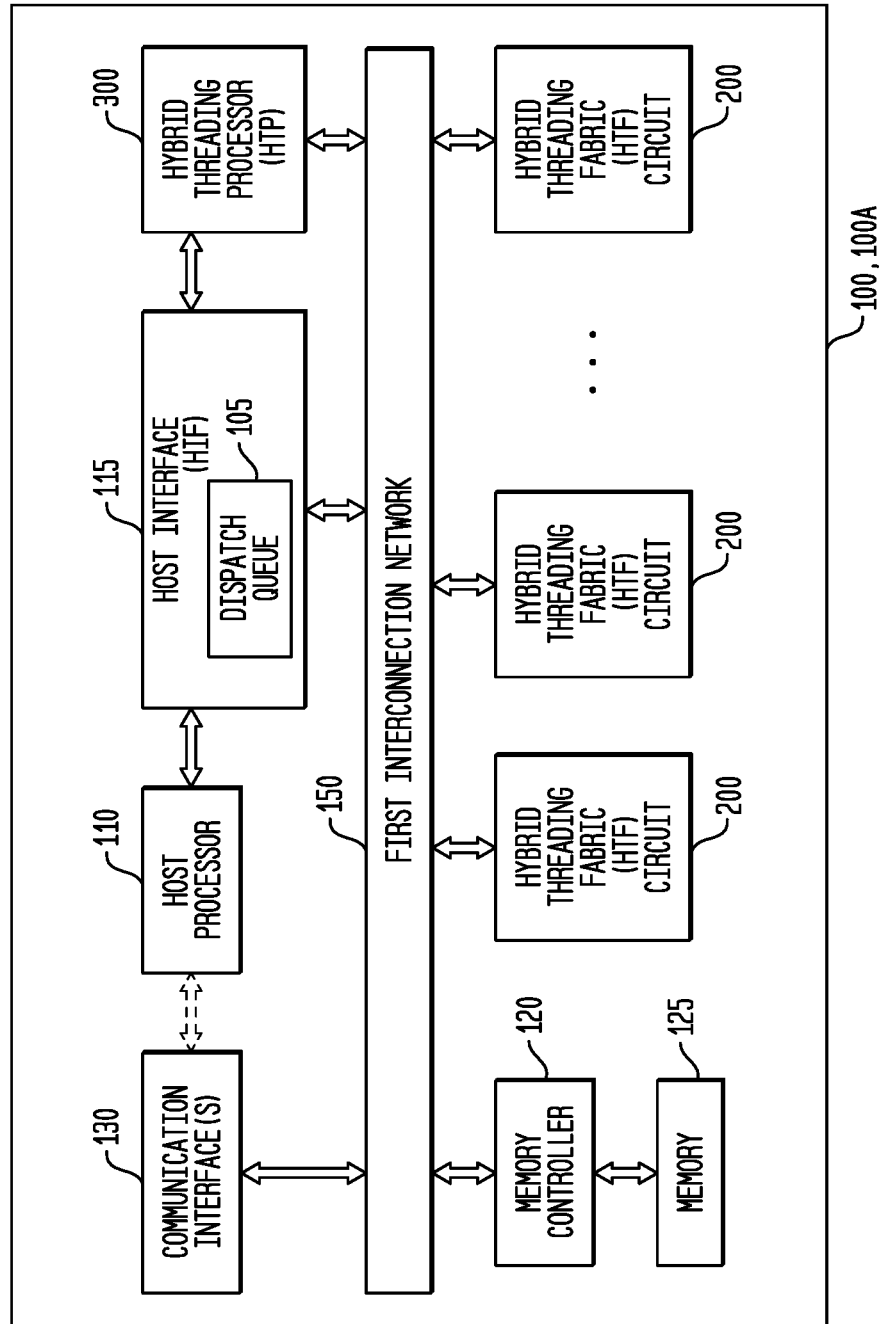
FIG. 1 is a block diagram of a representative first embodiment of a hybrid computing system.

While the present invention is susceptible of embodiment in many different forms, there are shown in the drawings and will be described herein in detail specific exemplary embodiments thereof, with the understanding that the present disclosure is to be considered as an exemplification of the principles of the invention and is not intended to limit the invention to the specific embodiments illustrated. In this respect, before explaining at least one embodiment consistent with the present invention in detail, it is to be understood that the invention is not limited in its application to the details of construction and to the arrangements of components set forth above and below, illustrated in the drawings, or as described in the examples. Methods and apparatuses consistent with the present invention are capable of other embodiments and of being practiced and carried out in various ways. Also, it is to be understood that the phraseology and terminology employed herein, as well as the abstract included below, are for the purposes of description and should not be regarded as limiting.

Figure 2:
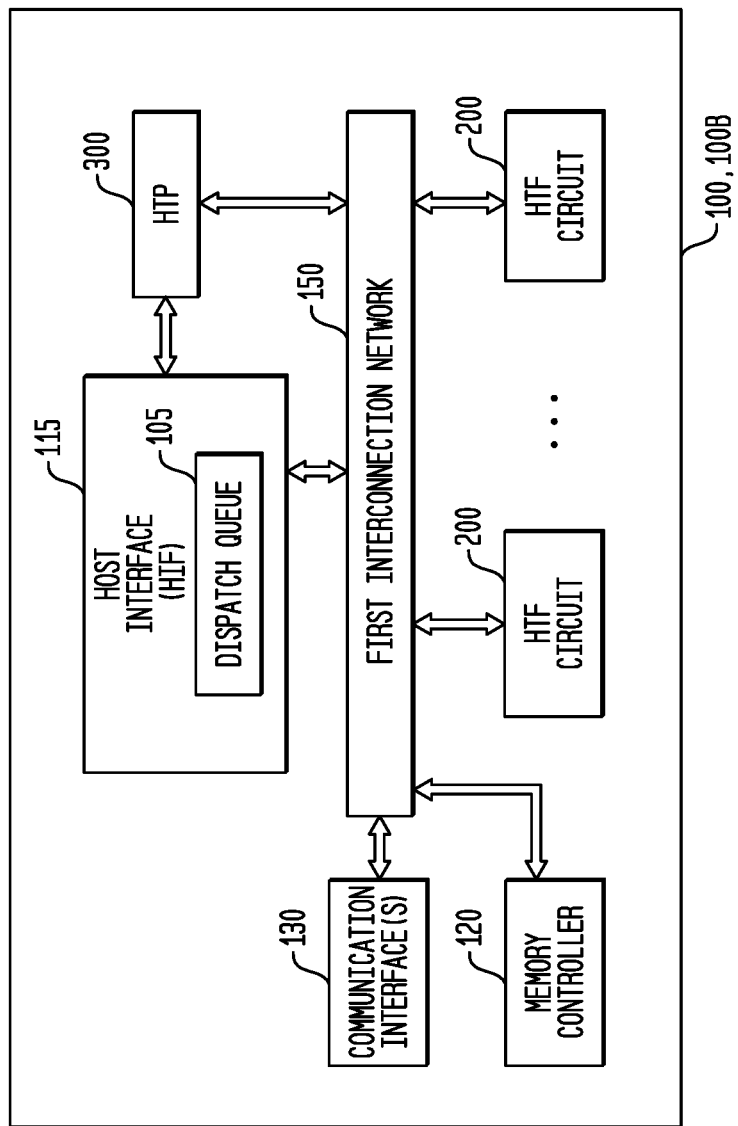
FIG. 2 is a block diagram of a representative second embodiment of a hybrid computing system.
Figure 3:
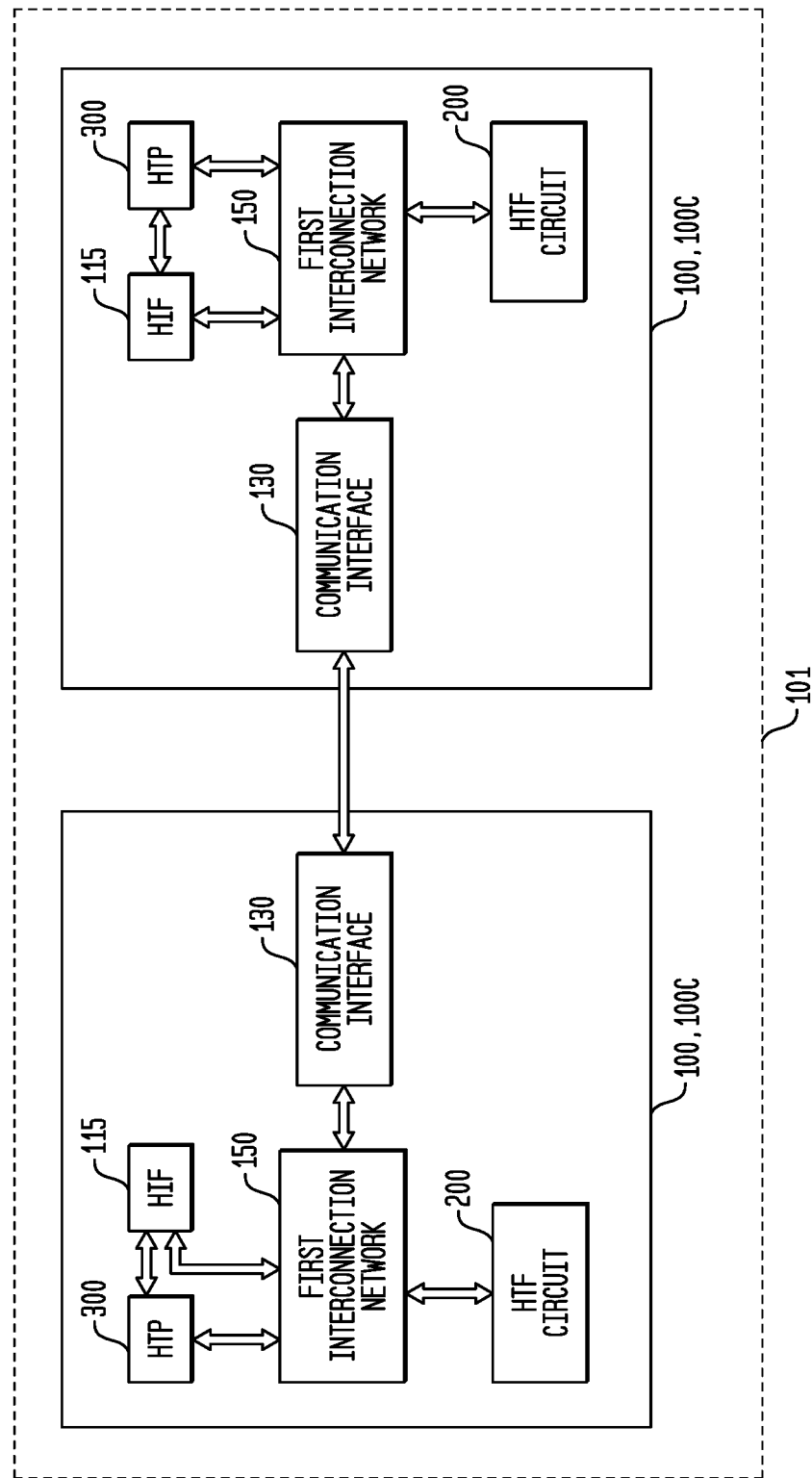
FIG. 3 is a block diagram of a representative third embodiment of a hybrid computing system.
Figure 4:
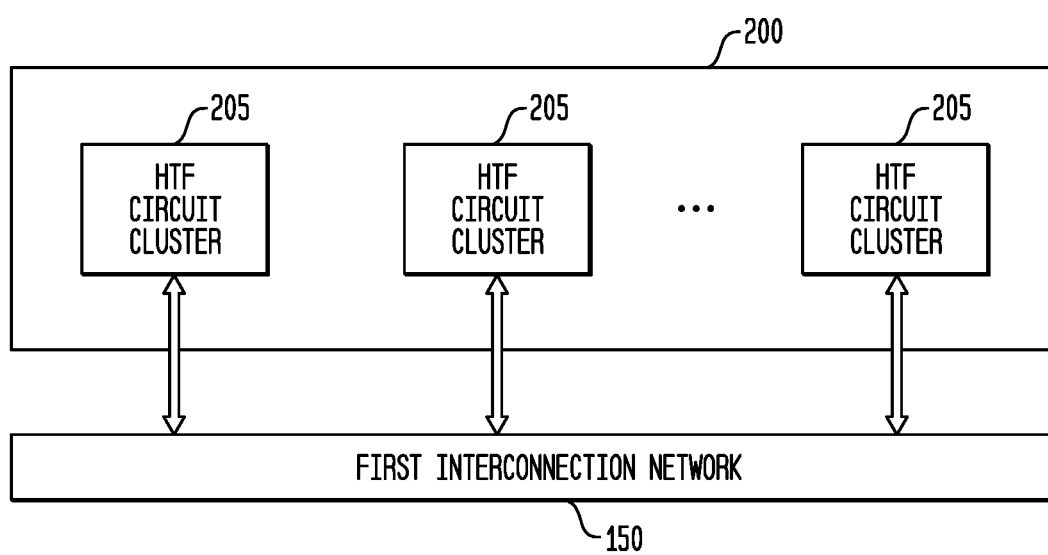
FIG. 4 is a block diagram of a representative embodiment of a hybrid threading fabric having configurable computing circuitry coupled to a first interconnection network.
Figure 5:
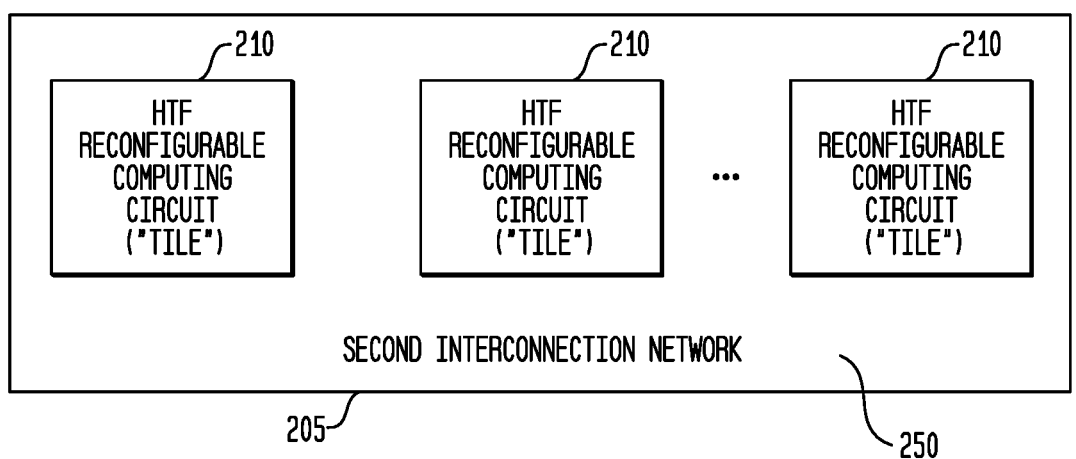
FIG. 5 is a high-level block diagram of a portion of a representative embodiment of a hybrid threading fabric circuit cluster.
Figure 6:
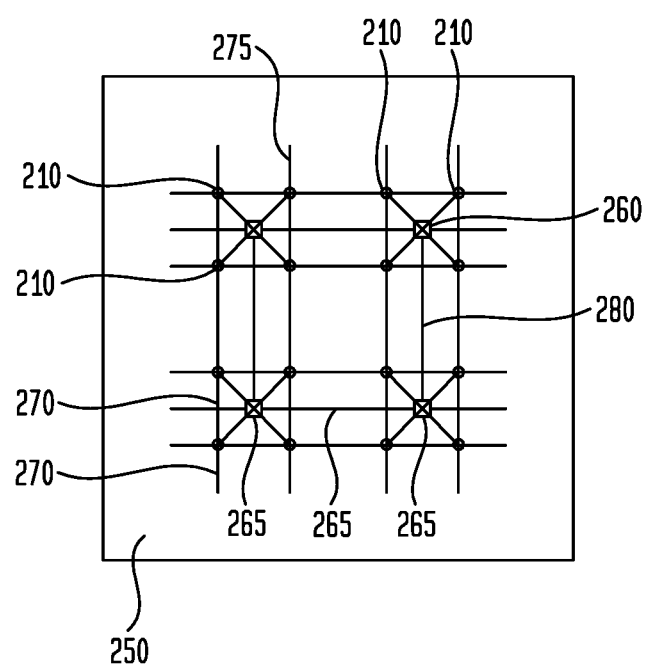
FIG. 6 is a high-level block diagram of a second interconnection network within a hybrid threading fabric circuit cluster.
Figure 7:
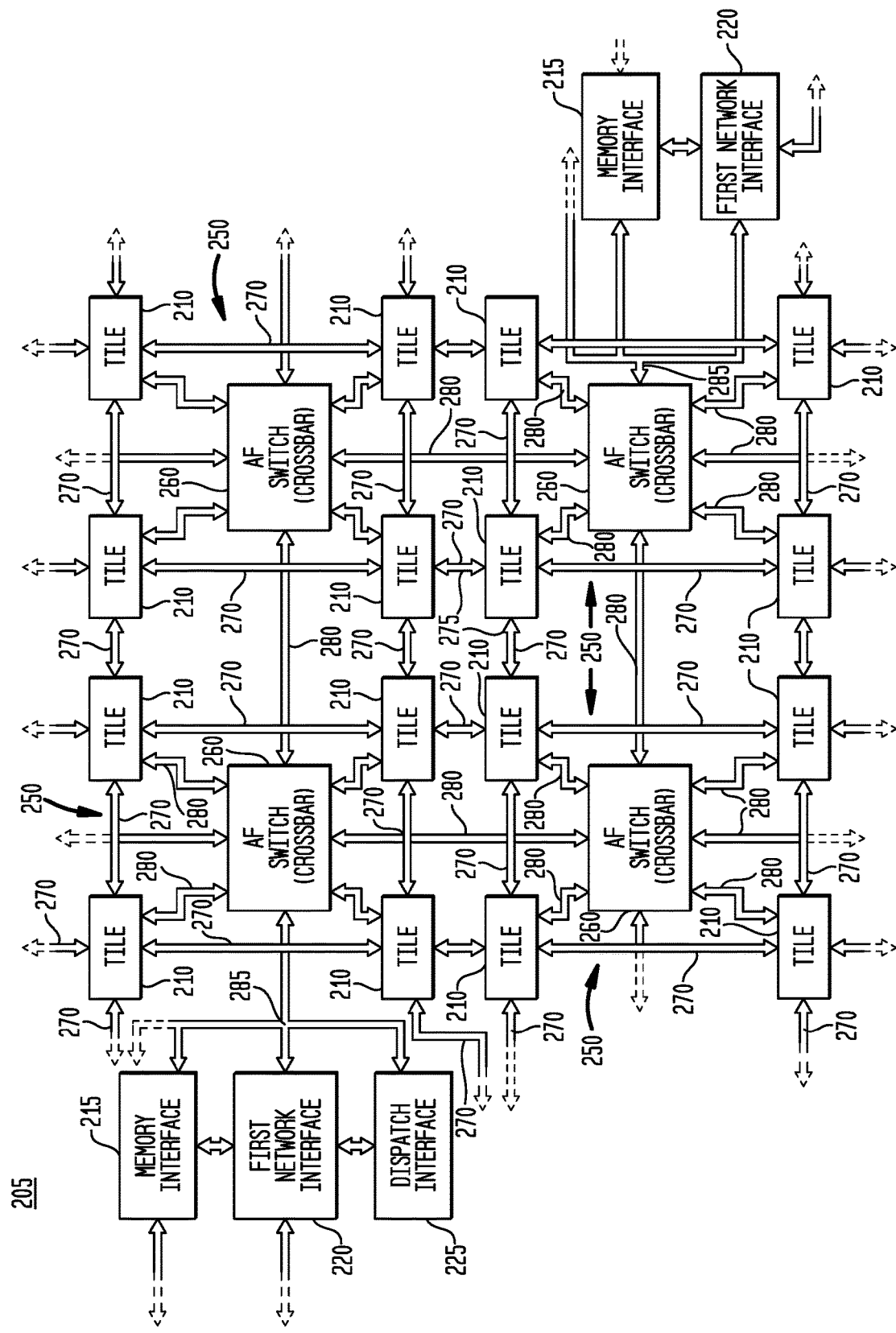
FIG. 7 is a detailed block diagram of a representative embodiment of a hybrid threading fabric circuit cluster.

I. Hybrid Computing System 100 and Interconnection Networks:

FIGS. 1, 2 and 3 are block diagrams of representative first, second, and third embodiments of a hybrid computing system 100A, 100B, 100C (collectively referred to as a system 100). FIG. 4 is a block diagram of a representative embodiment of a hybrid threading fabric ("HTF") 200 having configurable computing circuitry coupled to a first interconnection network 150 (also abbreviated and referred to as a "NOC", as a "Network On a Chip"). FIG. 5 is a high-level block diagram of a portion of a representative embodiment of a hybrid threading fabric circuit cluster 205 with a second interconnection network 250. FIG. 6 is a high-level block diagram of a second interconnection network within a hybrid threading fabric cluster 205. FIG. 7 is a detailed block diagram of a representative embodiment of a hybrid threading fabric (HTF) cluster 205.

Figure 8:
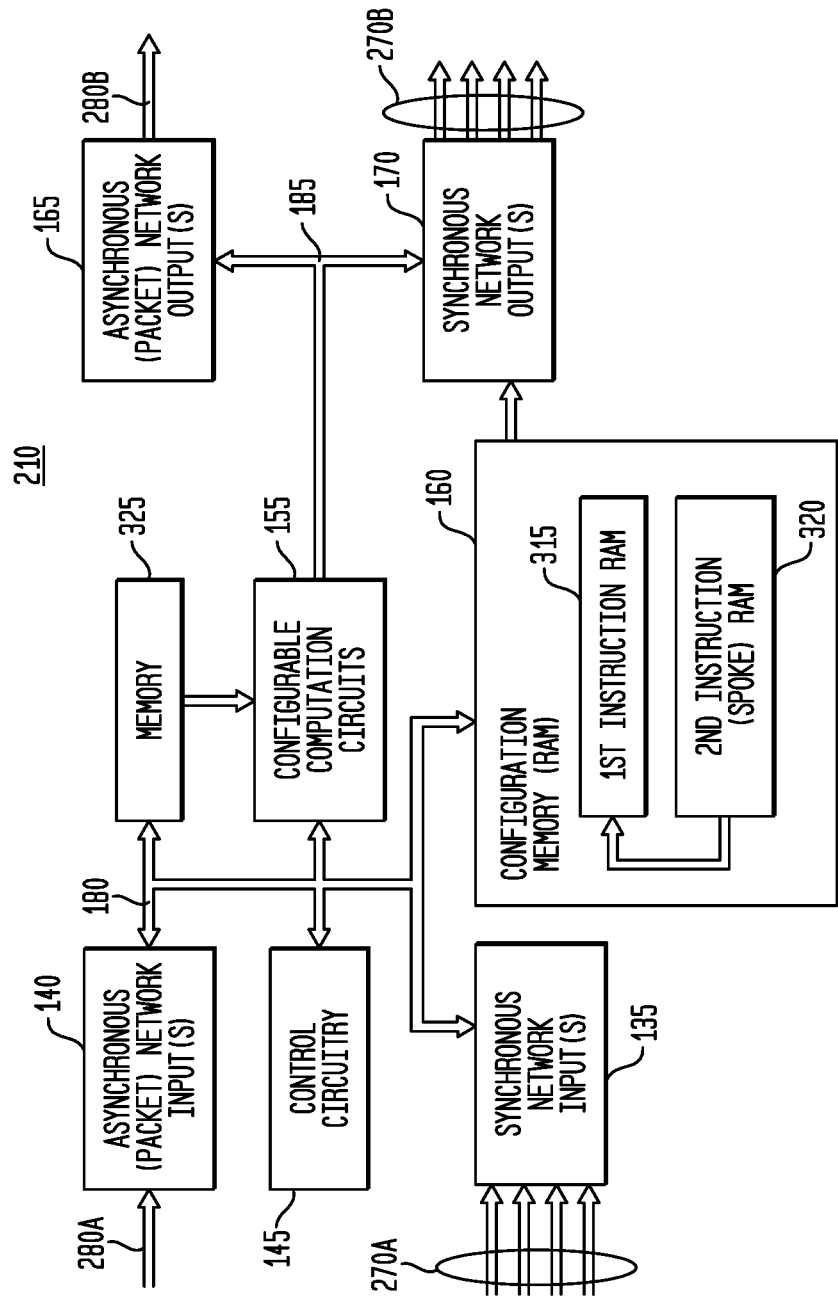
FIG. 8 is a detailed block diagram of a representative embodiment of a hybrid threading fabric configurable computing circuit (tile).
Figures 9, 9A:
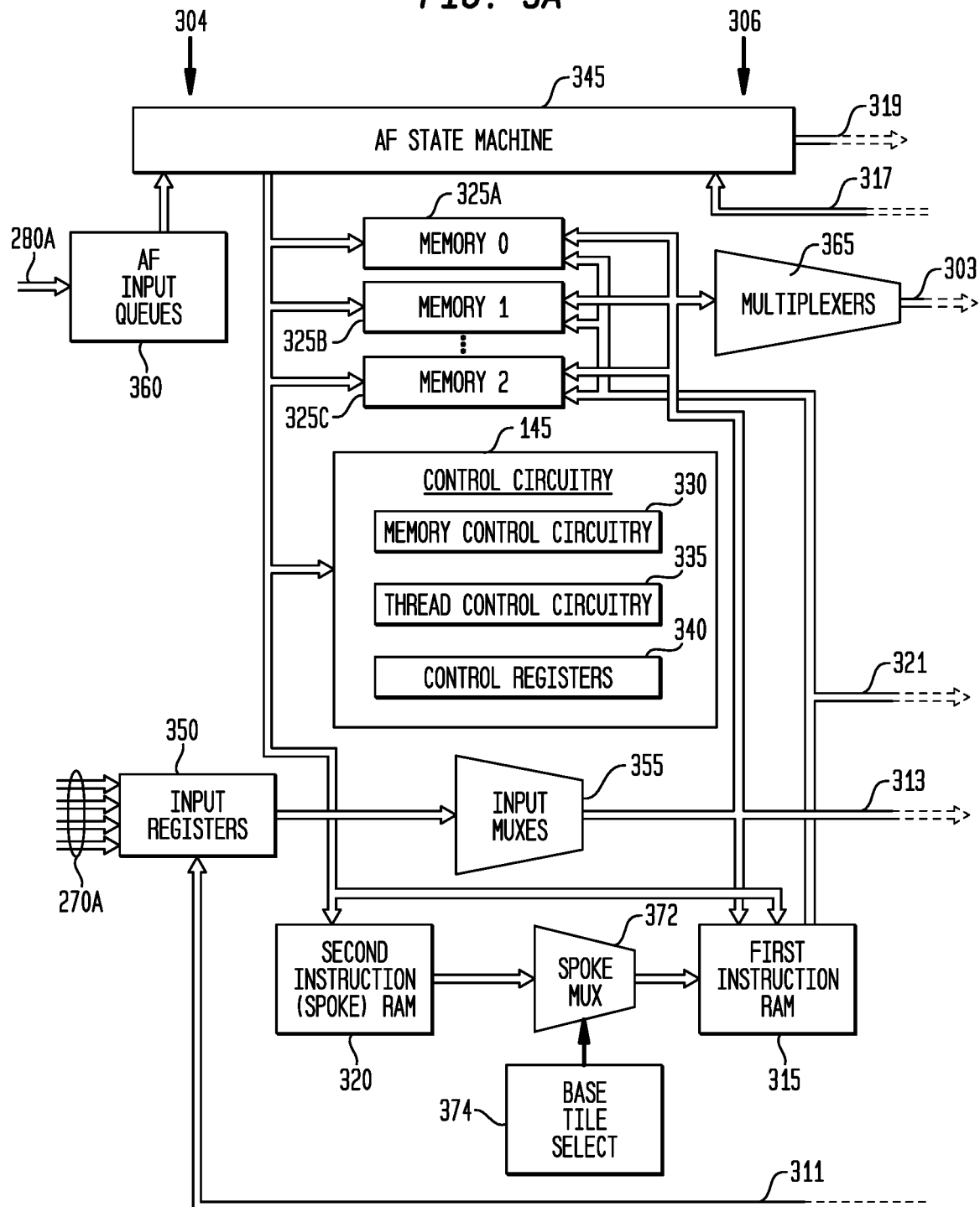
FIGS. 9A and 9B (collectively referred to as FIG. 9) are collectively a detailed block diagram of a representative embodiment of a hybrid threading fabric configurable computing circuit (tile).
Figure 9B:
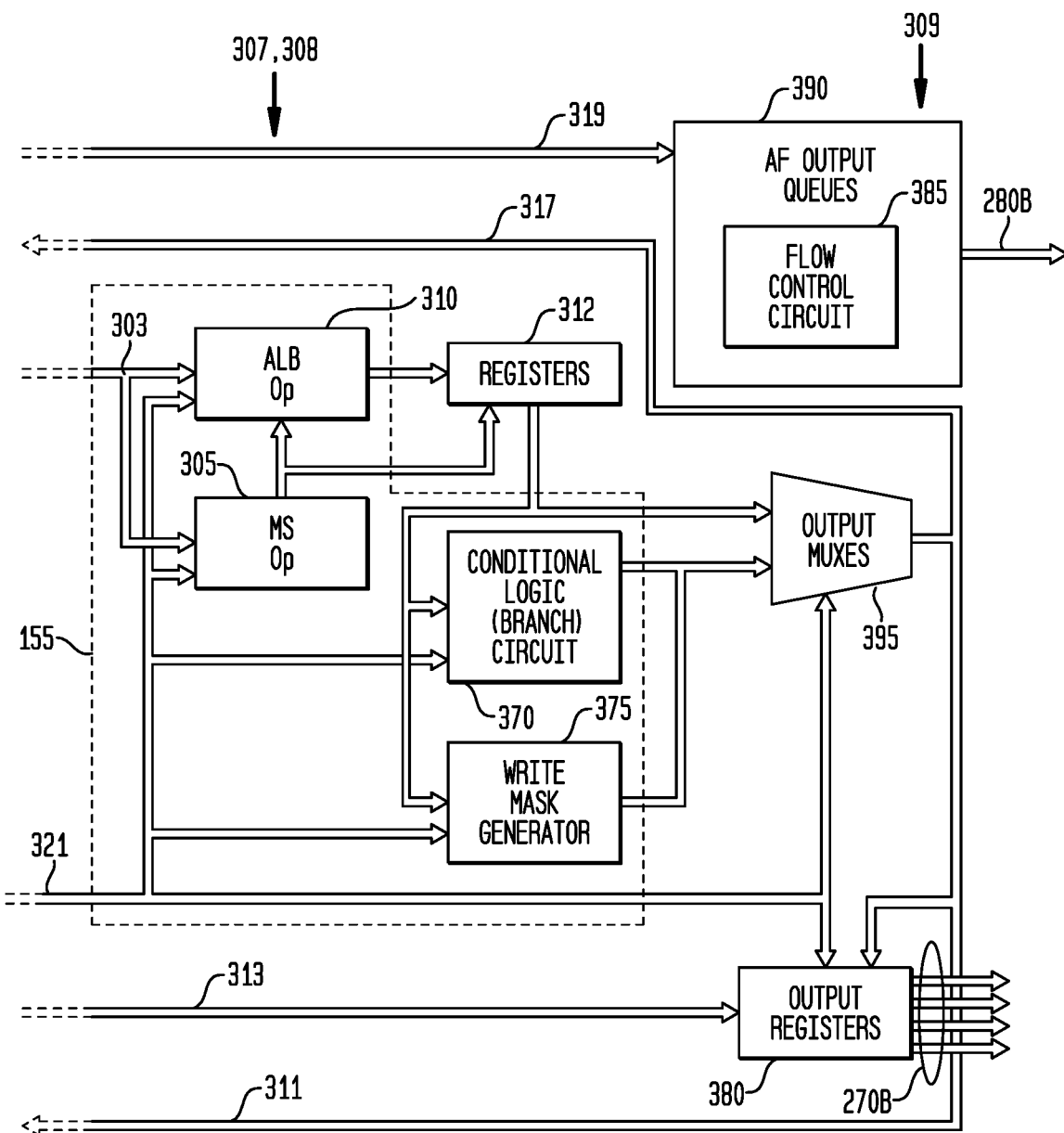

FIG. 8 is a high-level block diagram of a representative embodiment of a hybrid threading fabric configurable computing circuit 210, referred to as a "tile" 210. FIG. 9 is a detailed block diagram of a representative embodiment of a hybrid threading fabric configurable computing circuit 210A, referred to as a "tile" 210A, as a particular representative instantiation of a tile 210. Unless specifically referred to as a tile 210A, reference to a tile 210 shall mean and refer, individually and collectively, to a tile 210 and tile 210A. The hybrid threading fabric configurable computing circuit 210 is referred to as a "tile" 210 because all such hybrid threading fabric configurable computing circuits 210, in a representative embodiment, are identical to each other and can be arrayed and connected in any order, i.e., each hybrid threading fabric configurable computing circuit 210 can be "tiled" to form a hybrid threading fabric cluster 205.

Referring to FIGS. 1-9, a hybrid computing system 100 includes a hybrid threading processor ("HTP") 300, discussed in greater detail below with reference to FIGS. 25-33, which is coupled through a first interconnection network 150 to one or more hybrid threading fabric ("HTF") circuits 200. It should be understood that term "fabric", as used herein, means and includes an array of computing circuits, which in this case are reconfigurable computing circuits. FIGS. 1, 2, and 3 show different system 100A, 100B, and 100C arrangements which include additional components forming comparatively larger and smaller systems 100, any and all of which are within the scope of the disclosure. As shown in FIGS. 1 and 2, which may each be an arrangement suitable for a system-on-a-chip ("SOC"), for example and without limitation, a hybrid computing system 100A, 100B, in various combinations as illustrated, may also include, optionally, a memory controller 120 which may be coupled to a memory 125 (which also may be a separate integrated circuit), any of various communication interfaces 130 (such as a PCIe communication interface), one or more host processor(s) 110, and a host interface ("HIF") 115. As shown in FIG. 3, which may each be an arrangement suitable for a "chiplet" configuration on a common substrate 101, for example and without limitation, a hybrid computing system 100C may also include, optionally, a communication interface 130, with or without these other components. Any and all of these arrangements are within the scope of the disclosure, and collectively are referred to herein as a system 100. Any of these hybrid computing systems 100 also may be considered a "node", operating under a single operating system ("OS"), and may be coupled to other such local and remote nodes as well.

Each node of a system 100 runs a separate Operating System (OS) instance, controlling the resources of the associated node. An application that spans multiple nodes is executed through the coordination of the multiple OS instances of the spanned nodes. The process associated with the application running on each node has an address space that provides access to node private memory, and to the globally shared memory that is distributed across nodes. Each OS instance includes a driver that manages the local node resources. An application's shared address space is managed collectively by the set of drivers running on the nodes. The shared address space is allocated a Global Space ID (GSID). The number of global spaces that are active at any given time is expected to be relatively small. The GSID is set at 8 bits wide.

Hybrid threading, as used herein, refers to the capability to spawn multiple fibers and threads of computation across different, heterogeneous types of processing circuits (hardware), such as across HTF circuits 200 (as a reconfigurable computing fabric) and across a processor, such as the HTP 300 or another type of RISC-V processor. Hybrid threading also refers to a programming language/style in which a thread of work transitions from one compute element to the next to move the compute to where the data is located, which is also implemented in representative embodiments. A host processor 110 is typically a multi-core processor, which may be embedded within the hybrid computing system 100, or which may be an external host processor coupled into the hybrid computing system 100 via a communication interface 130, such as a PCIe-based interface. These processors, such as the HTP 300 and the one or more host processor(s) 110, are described in greater detail below.

The memory controller 120 may be implemented as known or becomes known in the electronic arts. Alternatively, in a representative embodiment, the memory controller 120 may be implemented as described in the related applications. The first memory 125 also may be implemented as known or becomes known in the electronic arts, and as described in greater detail below.

Also in a representative embodiment, the HTP 300 is a RISC-V ISA based multi-threaded processor having one or more processor cores 705 having an extended instruction set, with one or more core control circuits 710 and one or more second memories 715, referred to as a core control (or thread control) memories 715, as discussed in greater detail below. Generally, the HTP 300 provides barrel-style, round-robin instantaneous thread switching to maintain a high instruction-per-clock rate.

The HIF 115, for the purposes herein, provides for a host processor 110 to send work to the HTP 300 and the HTF circuits 200, and for the HTP 300 to send work to the HTF circuits 200, both as "work descriptor packets" transmitted over the first interconnection network 150. A unified mechanism is provided to start and end work on an HTP 300 and an HTF circuit 200: "call" work descriptor packets are utilized to start work on an HTP 300 and an HTF circuit 200, and "return" work descriptor packets are utilized to end work on an HTP 300 and an HTF circuit 200. The HIF 115 includes a dispatch circuit and queue (abbreviated "dispatch queue" 105), which also provides management functionality for monitoring the load provided to and resource availability of the HTF circuits 200 and/or HTP 300. When resources are available on the HTF circuits 200 and/or HTP 300, the dispatch queue 105 determines the HTF circuit 200 and/or HTP 300 resource that is least loaded. In the case of multiple HTF circuit clusters 205 with the same or similar work loading, it chooses an HTF circuit cluster 205 that is currently executing the same kernel if possible (to avoid having to load or reload a kernel configuration). Similar functionality of the HIF 115 may also be included in an HTP 300, for example, particularly for system 100 arrangements which may not include a separate HIF 115. Other HIF 115 functions are described in greater detail below. An HIF 115 may be implemented as known or becomes known in the electronic arts, e.g., as one or more state machines with registers (forming FIFOs, queues, etc.).

The first interconnection network 150 is a packet-based communication network providing data packet routing between and among the HTF circuits 200, the hybrid threading processor 300, and the other optional components such as the memory controller 120, a communication interface 130, and a host processor 110. For purposes of the present disclosure, the first interconnection network 150 forms part of an asynchronous switching fabric ("AF"), meaning that a data packet may be routed along any of various paths, such that the arrival of any selected data packet at an addressed destination may occur at any of a plurality of different times, depending upon the routing. This is in contrast with the synchronous mesh communication network 275 of the second interconnection network 250 discussed in greater detail below.

Figure 31:
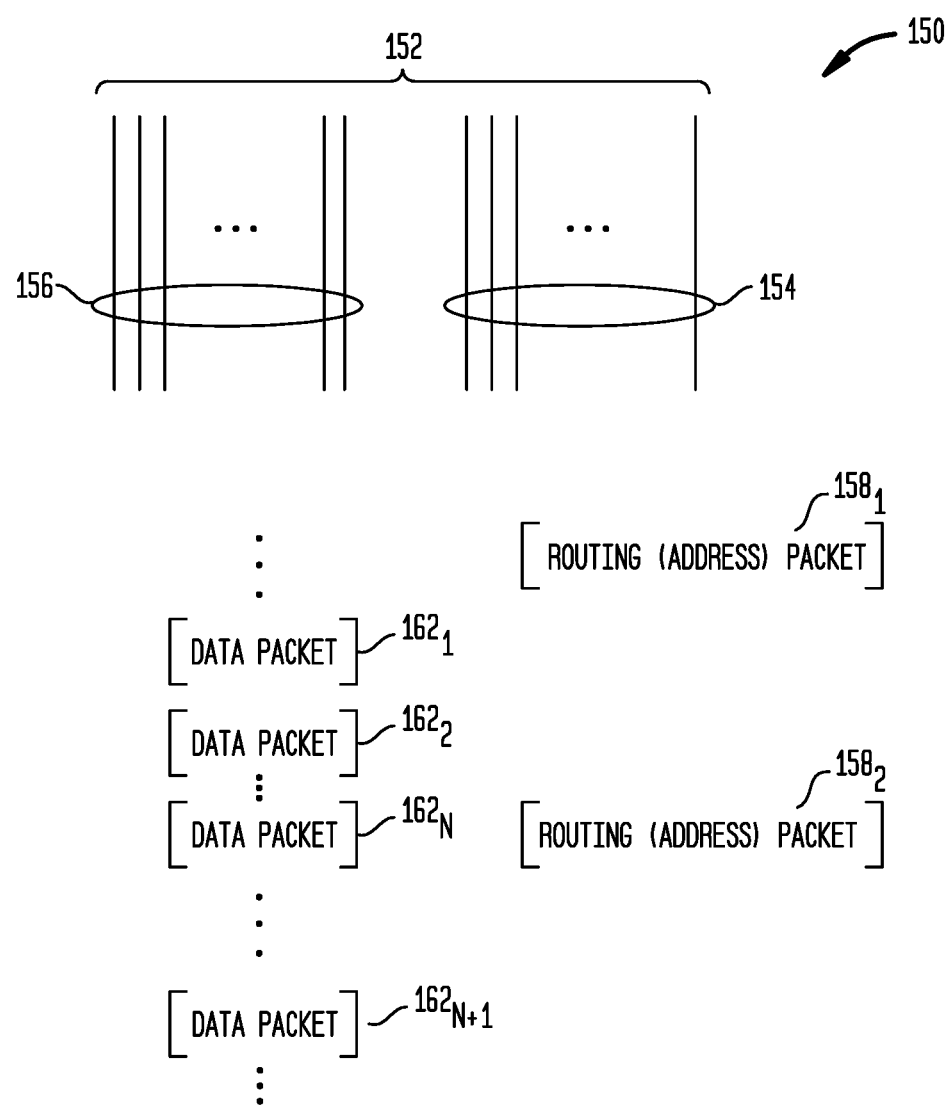
FIG. 31 is a block diagram of a representative embodiment of a portion of the first interconnection network and representative data packets.

FIG. 31 is a diagram of a representative embodiment of a portion of the first interconnection network 150 and representative data packets. In representative embodiment, the first interconnection network 150 includes a network bus structure 152 (a plurality of wires or lines), in which a first plurality of the network lines 154 are dedicated for addressing (or routing) data packets (158), and are utilized for setting the data path through the various crossbar switches, and the remaining second plurality of the network lines 156 are dedicated for transmission of data packets (the data load, illustrated as a train or sequence of "N" data packets $162_1$ through $162_N$) containing operand data, arguments, results, etc.) over the path established through the addressing lines (first plurality of the network lines 154). Two such network bus structures 152 are typically provided, into and out of each compute resource, as channels, a first channel for receiving data, and a second channel for transmitting data. A single, first addressing (or routing) data packet (illustrated as addressing (or routing) data packet $158_1$) may be utilized to establish the routing to a first designated destination, and may be followed (generally several clock cycles later, to allow for the setting of the switches) by one or more data packets 162 which are to be transmitted to the first designated destination, up to a predetermined number of data packets 162 (e.g., up to N data packets). While that predetermined number of data packets 162 are being routed, another, second addressing (or routing) data packet (illustrated as addressing (or routing) data packet $158_2$) may be transmitted and utilized to establish a routing to a second designated destination, for other, subsequent one or more data packets 162 which will be going to this second designated destination (illustrated as data packet $162_{N+1}$). Accordingly, data communication over the interconnection network is performed using a split header and payload configuration for pipelining a plurality of communications, the interconnection network 150 is adapted to use the split header and payload configuration for delayed payload switching, and the interconnection network 150 is adapted to use a single header to route a plurality of data payloads as a sequential data burst. In addition, the interconnection network 150 is adapted to interleave a first acknowledgment message to a destination in an unused header field of a second message to the destination, and the interconnection network 150 is adapted to provide power gating or clock gating based on load requirements.

Figure 34:
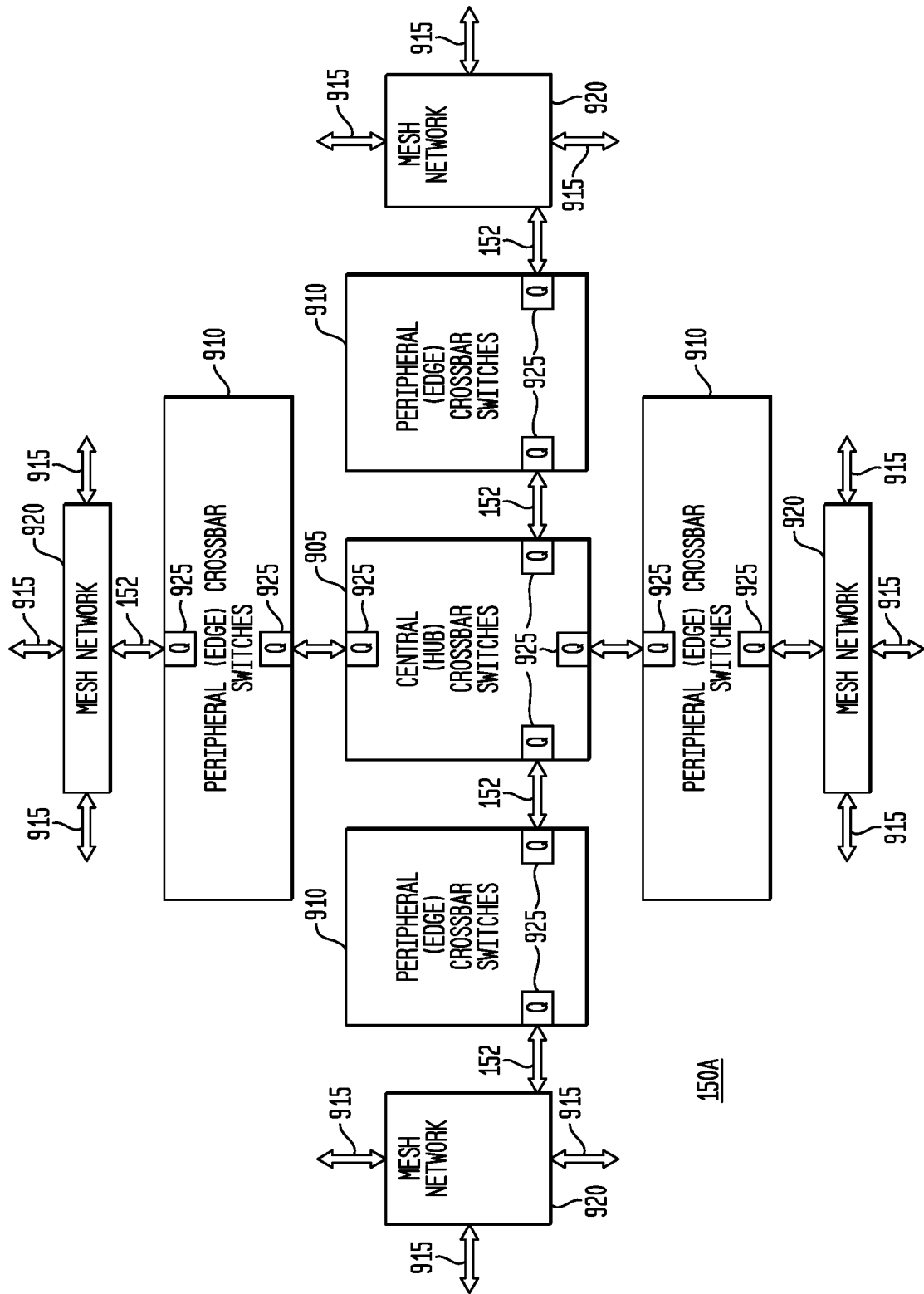
FIG. 34 is a block diagram of a representative first embodiment of a first interconnection network.
Figure 35:
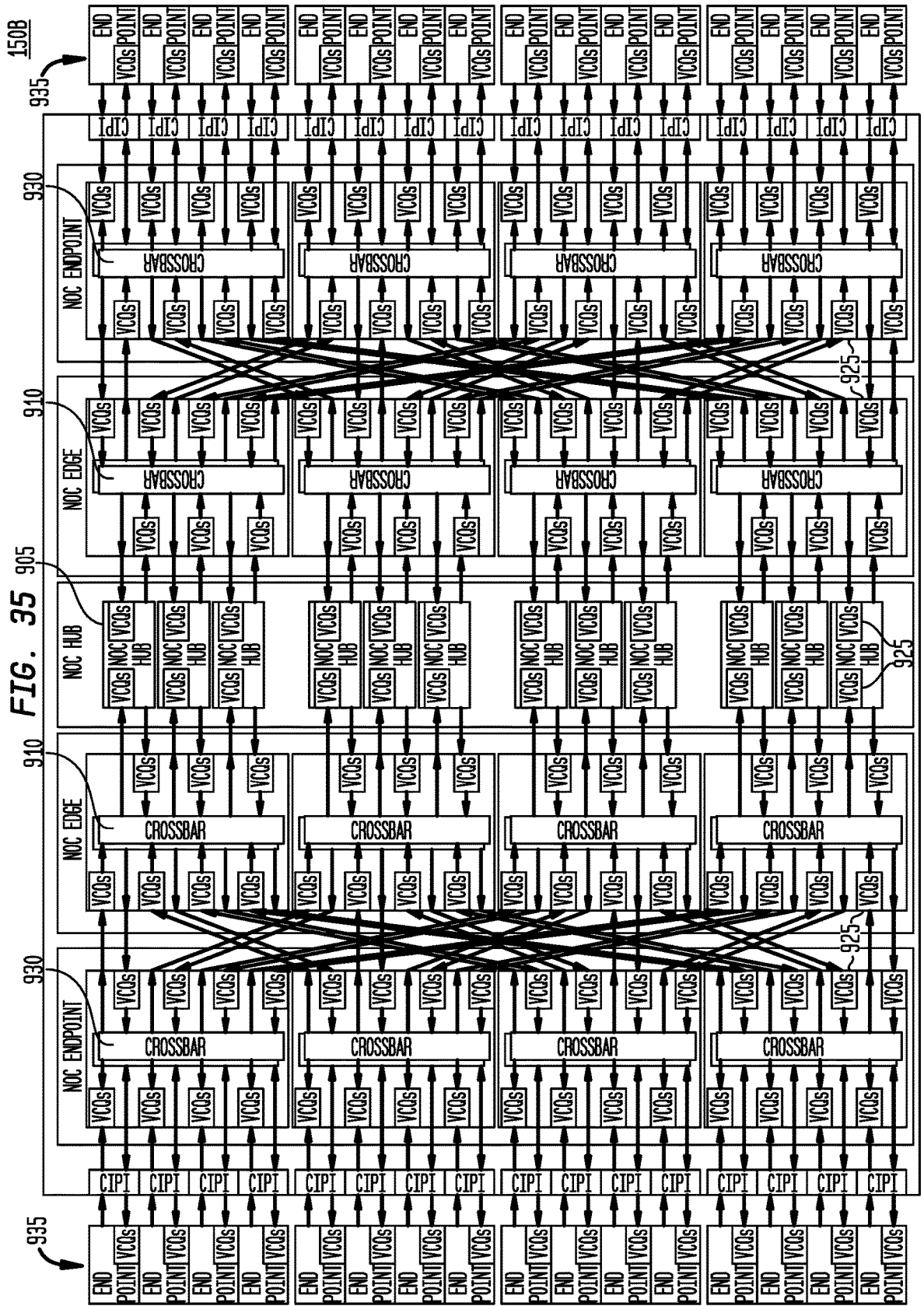
FIG. 35 is a block diagram of a representative second embodiment of a first interconnection network.
Figure 36:
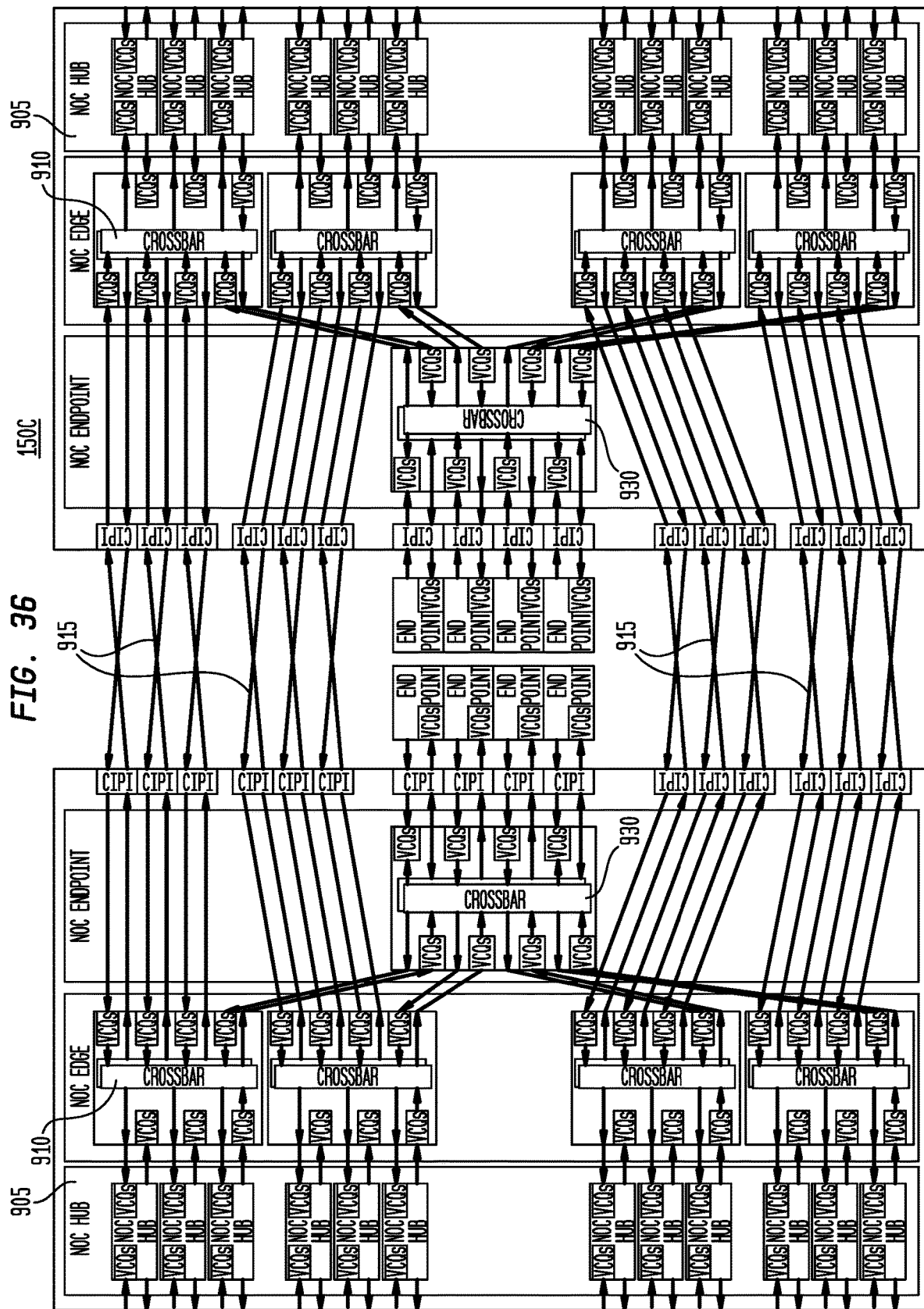
FIG. 36 is a block diagram of a representative third embodiment of a first interconnection network.

FIGS. 34-36 are block diagrams of representative first, second, and third embodiments of a first interconnection network 150, illustrating as examples various topologies of a first interconnection network 150, such as first interconnection networks 150A, 150B, 150C (any and all of which are referred to herein as a first interconnection network 150). The first interconnection network 150 is typically embodied as a plurality of crossbar switches 905, 910 having a folded clos configuration, illustrated as central (or hub) crossbar switches 905 which are coupled through queues 925 to peripheral (or edge) crossbar switches 910, and with the peripheral crossbar switches 910 coupled in turn (also via queues 925) to a mesh network 920 which provides for a plurality of additional, direct connections 915, such as between chiplets, e.g., up, down, left, right, depending upon the system 100 embodiment. Numerous network topologies are available and within the scope of this disclosure, such as illustrated in FIGS. 35 and 36, with the first interconnection network 150B, 150C further including endpoint crossbar switches 930.

Routing through any of the various first interconnection networks 150 includes load balancing, such that packets moving toward the central (or hub) crossbar switches 905 from the peripheral (or edge) crossbar switches 910 may be routed through any available crossbar switch of the central (or hub) crossbar switches 905, and packets moving toward the peripheral (or edge) crossbar switches 910 from the endpoint crossbar switches 930 may be routed through any available peripheral (or edge) crossbar switches 910, such as routing with a round-robin distribution or a random distribution to any available switch 905, 910. For routing from the central (or hub) crossbar switches 905 through the peripheral (or edge) crossbar switches 910 and/or endpoint crossbar switches 930 to any endpoint (or destination), which may be a HTF 200 or HTP 300, a memory controller 120, a host processor 110, etc., the identifier or address (e.g., virtual) of the endpoint (or destination) is utilized, typically having an address or identifier with five fields: (a) a first (or horizontal) identifier; (b) a second (or vertical) identifier; (c) a third, edge identifier; (d) a fourth, group identifier; and (e) a fifth, endpoint identifier. The first (or horizontal) identifier and the second (or vertical) identifier are utilized to route to the correct destination hub, the edge identifier is utilized to route to the selected chip or chiplet edge (of four available edges), the group identifier is utilized to route to the selected communication interface which may be at the selected edge, and an endpoint identifier is utilized for any additional routing, such as through endpoint crossbar switches 930 or the mesh networks 920. For power savings, any of the various central (or hub) crossbar switches 905, peripheral (or edge) crossbar switches 910, and endpoint crossbar switches 930 may be power gated or clock gated, to turn off the various switches when routing demand may be lower and less capacity may be needed and to turn on the various switches when routing demand may be higher and greater capacity may be needed. Additional aspects of the first interconnection network 150 are discussed in greater detail below with reference to FIG. 30.

A first interconnection network 150 packet consists of a fixed generic packet header, plus a variable sized packet payload. A single packet header is required per packet and is used to route the packet from a source component within the system 100 to a destination component. The payload is variable in size depending on the type of request or response packet. Table 1 shows the information contained in the generic header for first interconnection network 150 packets, Table 2 shows the information contained in a first interconnection network 150 read request packet, and Table 3 shows the information contained in a first interconnection network 150 read response packet for a 16B read with 8B Flit size.

TABLE 1

First Interconnection Network 150 Generic Packet Header

| Field Name | Flit | Field Size (bits) | Field Description |
|---|---|---|---|
| DCID | 0 | 10 | Destination Component ID - used to route the packet from the source component through the first interconnection network 150 to the destination component. |
| LEN | 0 | 4 | Length of packet - Number of data transfers where a data transfer is one clock cycle. |
| VC | 0 | 3 | Virtual Channel - Virtual channels are used to separate communication flows across the fabric such that one flow cannot indefinitely stall another channel causing a deadlock situation. |
| Credit Ready | 0 | 1 | |
| Credit VC | 0 | 3 | |
| ECC | 0 | 6 | Error Correcting Code - Provides error checking and correcting on the information required to route a packet through the NOC. |
| Header Size | | 27 | |

TABLE 2

First Interconnection Network 150 Read Request Packet

| Field Name | Flit | Field Size (bits) | Field Description |
|---|---|---|---|
| GPH | 0 | 27 | Generic Packet Header - Common to all first interconnection network 150 packets. |
| ADDR | 0 | 46 | Read Request Address - Set at 48 bits (256 TB) to allow persistent memory to be mapped into the address space. |
| SCID | 0 | 10 | Source Component ID - used to route response back to requester. |
| REQ TYPE | 0 | 8 | Request Type - Field |
| TID | 0 | 8 | Transaction ID - A unique value provided by the source of the request and returned with the response. |
| ECC | 0 | 8 | Error Correcting Code - Provides error checking and correcting on the information that traverses end to end through the NOC. This ECC field does not cover the Generic Packet Header information. |
| Packet Size | | 107 | |

TABLE 3

First Interconnection Network 150 16 B Read Response Packet (with 8 B Flits)

| Field Name | Flit | Field Size (bits) | Field Description |
|---|---|---|---|
| GPH | 0 | 27 | Generic Packet Header - Common to all first interconnection network 150 packets. |
| DATA | 0 | 64 | First 64 bits of data |
| TID | 0 | 8 | TID for response packet |
| ECC | 0 | 8 | Error Correcting Code - Provides error checking and correction for DATA in Flit #0 |
| GPH | 1 | 27 | Generic Packet Header - Ignored for Flit ! = 0 |
| DATA | 1 | 64 | Second 64 bits of data |
| TID | 1 | 8 | TID - Ignored for Flit ! = 0 |
| ECC | 1 | 8 | Error Correcting Code - Provides error checking and correction for DATA in Flit #1 |
| Packet Size | | 214 | |

A HTF circuit 200, in turn, typically comprises a plurality of HTF circuit clusters 205, with each HTF circuit cluster 205 coupled to the first interconnection network 150 for data packet communication. Each HTF circuit cluster 205 may operate independently from each of the other HTF circuit clusters 205. Each HTF circuit cluster 205, in turn, comprises an array of a plurality of HTF reconfigurable computing circuits 210, which are referred to equivalently herein as "tiles" 210, and a second interconnection network 250. The tiles 210 are embedded in or otherwise coupled to the second interconnection network 250, which comprises two different types of networks, discussed in greater detail below. In a representative embodiment, each HTF circuit cluster 205 also comprises a memory interface 215, an optional first network interface 220 (which provides an interface for coupling to the first interconnection network 150), and a HTF dispatch interface 225. The various memory interfaces 215, the HTF dispatch interface 225, and the optional first network interface 220 may be implemented using any appropriate circuitry, such as one or more state machine circuits, to perform the functionality specified in greater detail below.

The HTP 300 is a barrel style multi-threaded processor that is designed to perform well on applications with high degree of parallelism operating on sparse data sets (i.e., applications having minimal data reuse). The HTP 300 is based on the open source RISC-V processor, and executes in user mode. The HTP 300 includes more RISC-V user mode instructions, plus a set of custom instructions to allow thread management, sending and receiving events to/from other HTPs 300, HTF circuits 200 and one or more host processors 110, and instructions for efficient access to memory 125.

Sparse data sets typically cause poor cache hit rates. The HTP 300 with many threads per HTP processor core 705 allow some threads to be waiting for response from memory 125 while other threads are continuing to execute instructions. This style of compute is tolerant of latency to memory 125 and allows high sustained executed instructions per clock. The event mechanism allows threads from many HTP cores 705 to communicate in an efficient manner. Threads pause executing instruction while waiting for memory 125 responses or event messages, allowing other threads to use the instruction execution resources. The HTP 300 is self-scheduling and event driven, allowing threads to efficiently be created, destroyed and communicate with other threads. The HTP 300 is discussed in greater detail below with reference to FIGS. 25-33.

II. Hybrid Threading:

The hybrid threading of the system 100 allows compute tasks to transition from a host processor 110, to an HTP 300 and/or HTF 200 on one node, and then on to an HTP 300 or HTF 200 on possibly a different node. During this entire sequence of transitioning work from one compute element to another, all aspects are handled completely in user space. Additionally, the transition of a compute task from an HTP 300 to another HTP 300 or to an HTF 200 can occur by executing a single HTP 300 instruction and without reference to memory 125. This extremely lightweight thread management mechanism allows applications to quickly create large numbers of threads to handle parallelizable kernels of an application, and then rejoin when the kernel is complete. The HTP 300 and HTF 200 compute elements handle compute tasks very differently (RISC-V instruction execution versus data flow), however they both support the hybrid threading approach and can seamlessly interact on behalf of an application.

Work descriptor packets are utilized to commence work on an HTP 300 and a HTF circuit 200. Receipt of a work descriptor packet by an HTP 300 and/or HTF 200 constitutes an "event" which will trigger hardware-based self-scheduling and subsequent execution of the associated functions or work, referred to as threads of execution, in the HTP 300 and/or HTF 200, without the need for further access to main memory 125. Once a thread is started it executes instructions until a thread return instruction is executed (by the HTP 300) or a return message is generated (by the HTF 200). The thread return instruction sends a return work descriptor packet to the original caller.

For purposes of the present disclosure, at a high or general level, a work descriptor packet includes: (1) the information needed to route the work descriptor packet to its destination; (2) to initialize a thread context for the HTP 300 and/or an HTF circuit 200, such as a program count (e.g., as a 64-bit address) for where in the stored instructions (stored in instruction cache 740, FIG. 28 or first instruction RAM 315, FIG. 9, respectively) to commence thread execution; (3) any arguments or addresses in first memory 125 to obtain arguments or other information which will be used in the thread execution; and (4) a return address for transmission of computation results, for example and without limitation. While referred to in singular form as a single "work descriptor packet", as mentioned above, such a work descriptor packet is actually divided into multiple packets for transmission over the first interconnection network 150, an addressing (or routing) data packet 158 and one or more data packets 162. There can be many different kinds of work descriptor packets, depending upon the operations or instructions to be performed, with many examples illustrated and discussed below. The instruction cache 740 and/or first instruction RAM 315 has been populated in advance of any execution, such as in the initial system 100 configuration. For an HTF circuit 200, generally, the work descriptor call packet also will have similar information, such as addressing, a payload (e.g., a configuration, argument values, etc.), a call identifier (ID), and return information (for the provision of results to that endpoint, for example), and other information as discussed in greater detail below.

At a high or general level, and as discussed in much greater detail below, a host processor 110 or HTP 300 can initiate a thread on another HTP 300 or HTF 200 by sending it a call work descriptor packet. The call information includes the destination node, the call's entry instruction address, and up to four 64-bit argument values. Each HTP 300 is initialized to have a pool of stack and context structures. These structures reside in user space. When an HTP 300 receives a call, it selects a stack and context structure from the free pool. The HTP 300 then initializes the new thread with the call information and the stack structure address. At this point, the initialized thread is put into the active thread queue to begin execution. The steps to initiate a thread on an HTP 300 may be implemented as a hardware state machine (as opposed to executing instructions) to maximize thread creation throughput. A similar hardware-based approach exists for initiating work on the HTF 200, also as discussed below.

Once a thread is put in the active thread queue on an HTP 300, it will be selected to execute instructions. Eventually, the thread will complete its compute task. At this point, the HTP 300 will send a return message back to the calling processor by executing a single custom RISC-V send return instruction. Sending a return is similar to sending a call. The instruction frees the stack and context structure and sends up to four 64-bit parameters back to the calling processor. A calling HTP 300 executes a receive return custom RISC-V instruction to receive the return. The HTP calling processor 300 copies the return arguments into ISA visible registers for access by the executing thread. The original send call includes the necessary information for the called HTP 300 to know where to send its return. The information consists of the source HTP 300 and thread ID of the calling thread.

An HTP 300 has three options for sending a work task to another HTP 300 or HTF 200 compute element. These options are to perform a call, fork or transfer, illustrated in FIGS. 39-41:

(a) A call (901) initiates a compute task on the remote HTP 300 or HTF 200 and pauses further instruction execution until the return (902) is received. The return information passed to the remote compute element is used by the remote compute task when it has completed and is ready to return.

(b) A fork (903) initiates a compute task on the remote HTP 300 or HTF 200 and continues executing instructions. A single thread could initiate many compute tasks on remote HTP 300 or HTF 200 compute elements using the send fork mechanism. The original thread must wait until a return (902) has been received from each forked thread prior to sending its return. The return information passed to the remote compute element is used by the remote compute task when it has completed and is ready to return.

(c) A transfer (904) initiates a compute task on a remote HTP 300 or HTF 200 and terminates the original thread. The return (902) information passed to the remote compute element is the return information from the call, fork or transfer that initiated the current thread. The send fork (903) includes information to return to the thread that executed the sent fork instruction on a first HTP 300. The send transfer (Xfer) executed on the second HTP 300 includes the information to return to the thread that executed the send fork instruction on the first HTP 300. Essentially, a send transfer just passes on the return information it was provided when it was initiated. Finally, the thread that executes the send return on a third or fourth HTP 300 uses the return information it received to determine the destination for the return.

Figure 39:
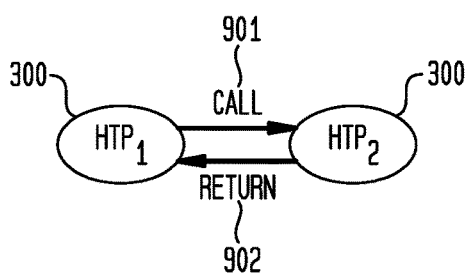
FIG. 39 illustrates a representative send call example for hybrid threading.
Figure 40:
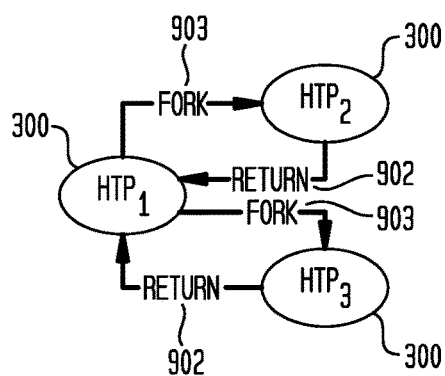
FIG. 40 illustrates a representative send fork example for hybrid threading.
Figure 41:
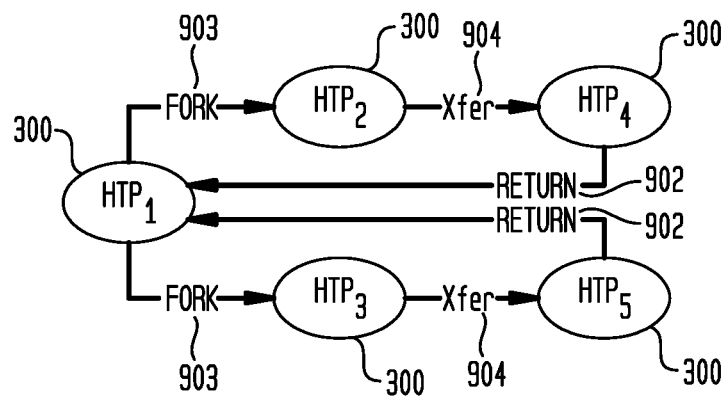
FIG. 41 illustrates a representative send transfer example for hybrid threading.
Figure 42:
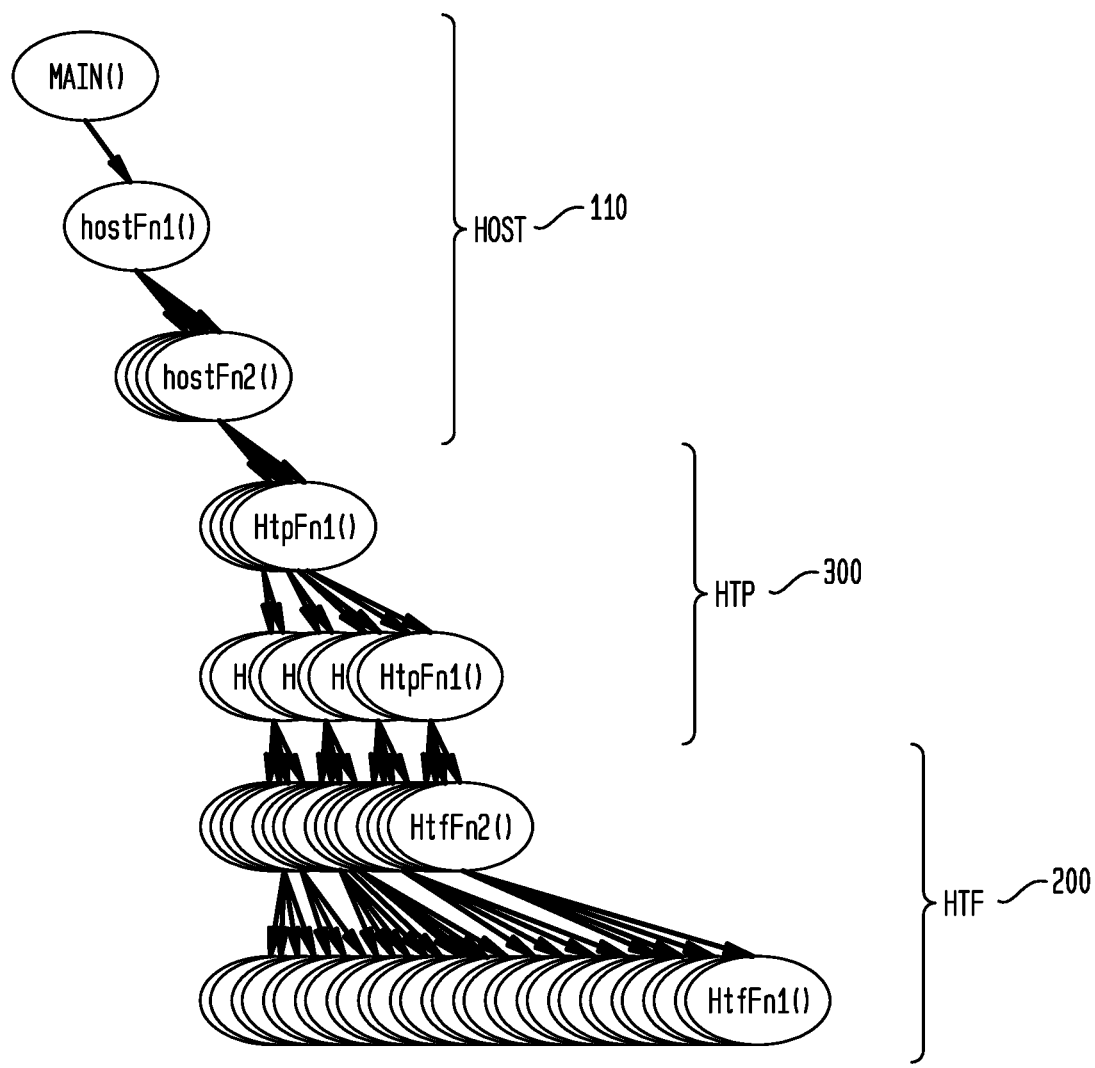
FIG. 42 illustrates a representative call chain use example for hybrid threading.

While the call, fork, and transfer are illustrated in FIGS. 39-41 for communication between HTPs 300, an HTP 300 may also send similar work descriptor packets to an HTF 200, as illustrated in FIG. 42 for a call chain example.

A thread has access to private memory on the local node as well as shared memory on local and remote nodes through references to the virtual address space. An HTP 300 thread will primarily use the provided inbound call arguments and private memory stack to manipulate data structures stored in shared memory. Similarly, an HTF 200 thread will use the inbound call arguments and in-fabric memories to manipulate data structures stored in shared memory.

An HTP 300 thread is typically provided up to four call arguments and a stack when the thread is created. The arguments are located in registers (memory 715, discussed below), and the stack is located in node private memory. A thread will typically use the stack for thread private variables and HTP 300 local calls using the standard stack frame based calling approach. An HTP 300 thread also has access to the entire partitioned global memory of the application. It is expected that application data structures are primarily allocated from the partitioned global address space to allow all node compute elements to participate in computations with direct load/store accesses.

Each HTP 300 thread has a context block provided when the thread is initiated. The context block provides a location in memory 125 to which the thread context can be saved when needed. Typically, this will occur for debugging purposes, and it will occur if more threads are created than hardware resources are available to handle them. A user can limit the number of active threads to prevent a thread from ever writing state to its memory-based context structure (other than possibly for debugging visibility).

An HTF 200 thread is also typically provided up to four call arguments when a thread is created. The arguments are placed in in-fabric memory structures for access by the data flow computations. In-fabric memories are also used for thread private variables. An HTF 200 thread has access to the entire partitioned global memory of the application.

The compute elements of the system 100 have different capabilities that make each uniquely suited for specific compute tasks. The host processor 110 (either internal or external to device) is designed for lowest possible latency when executing a single thread. The HTP 300 is optimized for executing a large set of threads concurrently to provide the highest execution throughput. The HTF 200 is optimized for very high performance on data flow style kernels. The compute elements have been architected to very efficiently hand off compute tasks from one element to the next to execute a compute kernel as efficiently as possible. FIG. 42 illustrates a representative call chain use example for hybrid threading that leverages each of the compute elements, and shows a traditional hierarchically structured usage model like a simulation. High throughput data intensive applications are likely to use a different usage model oriented towards a number of independent streams.

All applications start execution on a host processor 110 (internal or external). The host processor 110 will typically make a set of nested calls as it decides the appropriate action to take based on input parameters. Eventually, the application reaches the compute phase of the program. The compute phase may best be suited for execution on the host processor 110, or for accelerated execution by calling either the HTP 300 and/or HTF 200 compute elements. FIG. 42 shows the host processor 110 performing multiple calls (901) to the HTPs 300. Each HTP 300 will typically fork (903) a number of threads to perform its compute task. The individual threads can perform computation (integer and floating point), access memory (reads, writes), as well as transfer thread execution to another HTP 300 or HTF 200 (on the same node or a remote node), such as through calls (901) to an HTF 200. The ability to move the execution of a kernel to another node can be advantageous by allowing the compute task to be performed near the memory that needs to be accessed. Performing work on the appropriate node device can greatly reduce inter-node memory traffic, accelerating the execution of the application. It should be noted that an HTF 200 does not make calls to the host processor 110 or HTPs 300 in representative embodiments, and only makes calls to HTFs 200 in special situations (i.e., when defined at compile time).

A host processor 110 is able to initiate a thread on an HTP 300 or HTF 200 on the local node. For an external host processor 110, the local node is the node connected to the host via the PCIe or other communication interface 130. For an internal host processor 110, the local node is the node in which the host processor 110 is embedded. A description of how work is initiated by the host processor 110 on an HTP core 705 is presented. A similar approach is used for initiating work on an HTF 200.

The host processor 110 initiates work on an HTP core 705 by writing a work descriptor to dispatch queue 105 of a host interface (HIF) 115. The dispatch queue 105 is located in private memory such that the host processor 110 is writing to cached data to optimize host processor 110 performance. An entry in the dispatch queue 105 is typically 64 bytes in size, allowing sufficient space for remote call information and up to four 64-bit parameters. It should be noted that in a representative embodiment, there is one dispatch queue 105 per application per node. For a 64 node system, there would be 64 operating system instances. Each OS instance would have one or more processes, each with their own dispatch queue 105.

The HIF 115 monitors the write pointer for the dispatch queue 105 to determine when an entry has been inserted. When a new entry exists, the HIF 115 verifies that space exists in the host processor 110 return queue for the 64-byte return message. This check is needed to ensure that the status for a completed call is not dropped due to lack of return queue space. Assuming return space exists, then the HIF 115 reads the call entry from the dispatch queue 105 and forwards it on to the HTP 300 or HTF 200 as a work descriptor packet. The HTP 300 or HTF 200 then process the work descriptor packet, as discussed in greater detail below, and generate a return packet.

The entire process of the host processor 110 starting a new thread on an HTP 300 or HTF 200 requires the call information to be staged through the dispatch queue 105 (64 bytes written to the queue, and 64 bytes read from the queue), but no other accesses to DRAM memory. Staging the call information through the dispatch queue 105 provides a needed backpressure mechanism. If the dispatch queue 105 becomes full, then the host processor 110 will pause until progress has been made and a dispatch queue 105 entry has become available.

The return packet is transmitted over the first interconnection network 150 to the HIF 115. The HIF 115 writes the return packet to an available return queue entry. The host processor 110 will typically be periodically polling the return queue to complete the call and obtain any returned status. It should be noted that the return queue is accessed in a FIFO order. If returns must be matched to specific calls, then a runtime library can be used to perform this ordering. For many applications, it is sufficient to know that all returns have been received and the next phase of the application can begin.

III. Hybrid Threading Fabric 200:

As an overview, the HTF circuit 200 is a coarse grained reconfigurable compute fabric comprised of interconnected compute tiles 210. The tiles 210 are interconnected with a synchronous fabric referred to as the synchronous mesh communication network 275, allowing data to traverse from one tile 210 to another tile 210 without queuing. This synchronous mesh communication network 275 allows many tiles 210 to be pipelined together to produce a continuous data flow through arithmetic operations, and each such pipeline of tiles 210 connected through the synchronous mesh communication network 275 for performance of one or more threads of computation is referred to herein as a "synchronous domain", which may have series connections, parallel connections, and potentially branching connections as well. The first tile 210 of a synchronous domain is referred to herein as a "base" tile 210.

Figure 16:
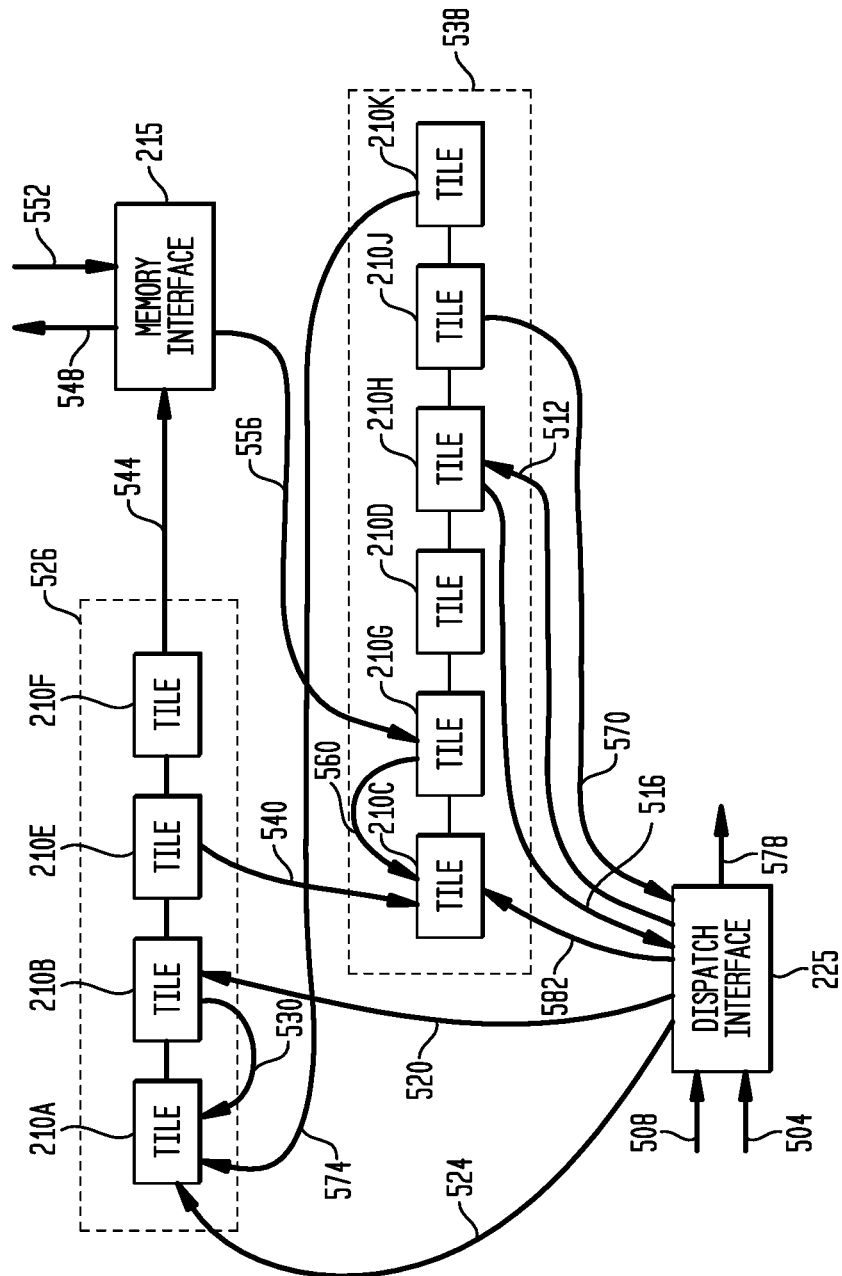
FIG. 16 is a diagram of representative hybrid threading fabric configurable computing circuits (tiles) forming synchronous domains and representative asynchronous packet network messaging for performance of a computation by a hybrid threading fabric circuit cluster.
Figure 18:
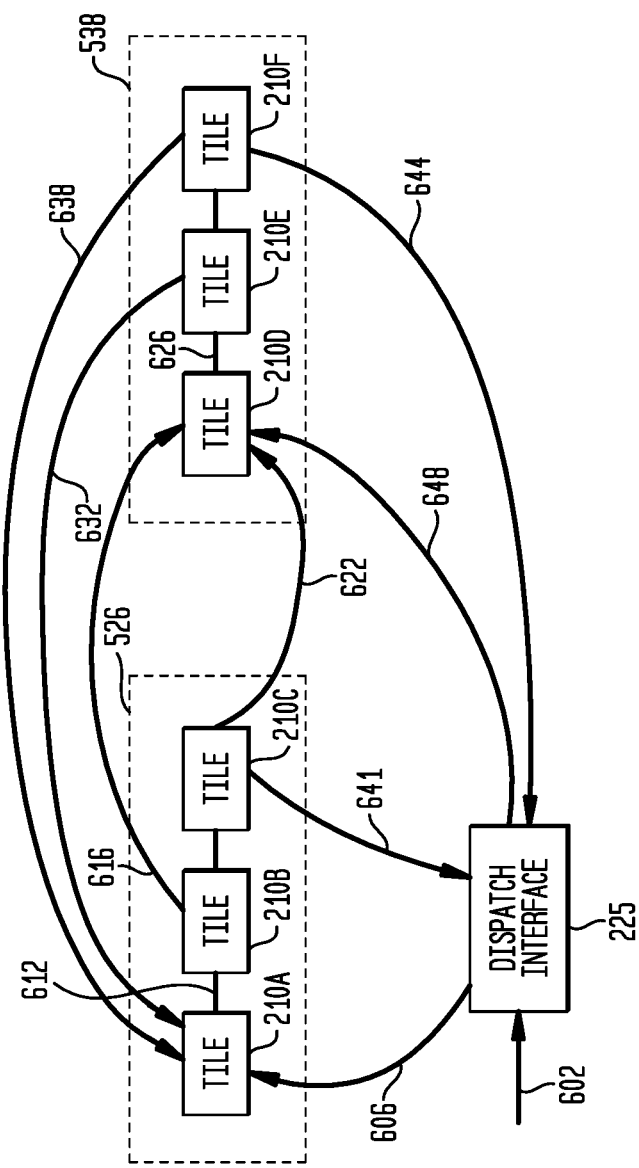
FIG. 18 is a diagram of representative hybrid threading fabric configurable computing circuits (tiles) forming synchronous domains and representative asynchronous packet network messaging for performance of a computation by a hybrid threading fabric circuit cluster.
Figure 20:
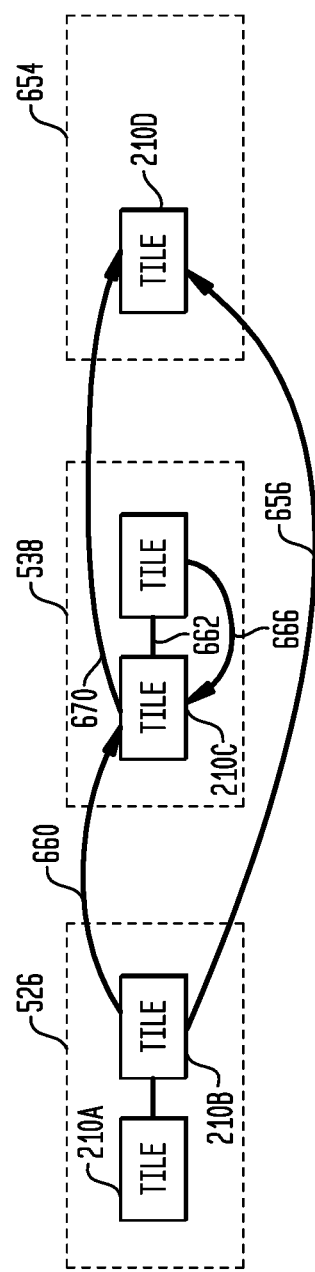
FIG. 20 is a diagram of representative hybrid threading fabric configurable computing circuits (tiles) forming synchronous domains and representative asynchronous packet network messaging for performance of a loop in a computation by a hybrid threading fabric circuit cluster.

The tiles 210 are also interconnected with an asynchronous fabric referred to as an asynchronous packet network 265 that allows synchronous domains of compute to be bridged by asynchronous operations, with all packets on the asynchronous packet network 265 capable of being communicated in a single clock cycle in representative embodiments. These asynchronous operations include initiating synchronous domain operations, transferring data from one synchronous domain to another, accessing system memory 125 (read and write), and performing branching and looping constructs. Together, the synchronous and asynchronous fabrics allow the tiles 210 to efficiently execute high level language constructs. The asynchronous packet network 265 differs from the first interconnection network 150 in many ways, including requiring less addressing, being a single channel, being queued with a depth-based backpressure, and utilizing packed data operands, such as with a data path of 128 bits, for example and without limitation. It should be noted that the internal data paths of the various tiles 210 are also 128 bits, also for example and without limitation. Examples of synchronous domains, and examples of synchronous domains communicating with each other over the asynchronous packet network 265, are illustrated in FIGS. 16, 18, 20, for example and without limitation.

In a representative embodiment, under most circumstances, thread (e.g., kernel) execution and control signaling are separated between these two different networks, with thread execution occurring using the synchronous mesh communication network 275 to form a plurality of synchronous domains of the various tiles 210, and control signaling occurring using messaging packets transmitted over the asynchronous packet network 265 between and among the various tiles 210. For example, the plurality of configurable circuits are adapted to perform a plurality of computations using the synchronous mesh communication network 275 to form a plurality of synchronous domains, and the plurality of configurable circuits are further adapted to generate and transmit a plurality of control messages over the asynchronous packet network 265, with the plurality of control messages comprising one or more completion messages and continue messages, for example and without limitation.

In a representative embodiment, the second interconnection network 250 typically comprises two different types of networks, each providing data communication between and among the tiles 210, a first, asynchronous packet network 265 overlaid or combined with a second, synchronous mesh communication network 275, as illustrated in FIGS. 6 and 7. The asynchronous packet network 265 is comprised of a plurality of AF switches 260, which are typically implemented as crossbar switches (which may or may not additionally or optionally have a Clos or Folded Clos configuration, for example and without limitation), and a plurality of communication lines (or wires) 280, 285, connecting the AF switches 260 to the tiles 210, providing data packet communication between and among the tiles 210 and the other illustrated components discussed below. The synchronous mesh communication network 275 provides a plurality of direct (i.e., unswitched, point-to-point) connections over communication lines (or wires) 270 between and among the tiles 210, which may be register-staged at the inputs and outputs of the tile 210, but otherwise without queuing between tiles 210, and without requiring formation of a data packet. (In FIG. 6, to better illustrate the overlaying of the two networks with tiles 210 embedded in the second interconnection network 250, the tiles 210 are represented as the vertices of the synchronous mesh communication network 275, and the AF switches 260 are illustrated as "Xs", as indicated.)

Referring to FIG. 8, a tile 210 comprises one or more configurable computation circuits 155, control circuitry 145, one or more memories 325, a configuration memory (e.g., RAM) 160, synchronous network input(s) 135 (coupled to the synchronous mesh communication network 275), synchronous network output(s) 170 (also coupled to the synchronous mesh communication network 275), asynchronous (packet) network input(s) 140 (coupled to the asynchronous packet network 265), and asynchronous (packet) network output(s) 165 (also coupled to the asynchronous packet network 265). Each of these various components are shown coupled to each other, in various combinations as illustrated, over busses 180, 185. Those having skill in the electronic arts will recognize that fewer or more components may be included in a tile 210, along with any of various combinations of couplings, any and all of which are considered equivalent and within the scope of the disclosure.

Representative examples of each of these various components are illustrated and discussed below with reference to FIG. 9. For example, in a representative embodiment, the one or more configurable computation circuits 155 are embodied as a multiply and shift operation circuit ("MS Op") 305 and an Arithmetic, Logical and Bit Operation circuit ("ALB Op") 310, with associated configuration capabilities, such as through intermediate multiplexers 365, and associated registers, such as registers 312, for example and without limitation. Also in a representative embodiment, the one or more configurable computation circuits 155 may include a write mask generator 375 and conditional (branch) logic circuitry 370, also for example and without limitation. Also in a representative embodiment, control circuitry 145 may include memory control circuitry 330, thread control circuitry 335, and control registers 340, such as those illustrated for a tile 210A, for example and without limitation. Continuing with the examples, synchronous network input(s) 135 may be comprised of input registers 350 and input multiplexers 355, synchronous network output(s) 170 may be comprised of output registers 380 and output multiplexers 395, asynchronous (packet) network input(s) 140 may be comprised of AF input queues 360 and asynchronous (packet) network output(s) 165 may be comprised of AF output queues 390, and may also include or share an AF message state machine 345.

Significantly, and as discussed in greater detail below, the configuration memory (e.g., RAM) 160 is comprised of configuration circuitry (such as configuration memory multiplexer 372) and two different configuration stores which perform different configuration functions, a first instruction RAM 315 (which is used to configure the internal data path of a tile 210) and a second instruction and instruction index memory (RAM) 320, referred to herein as a "spoke" RAM 320 (which is used for multiple purposes, including to configure portions of a tile 210 which are independent from a current instruction, to select a current instruction and an instruction of a next tile 210, and to select a master synchronous input, among other things, all as discussed in greater detail below).

As illustrated in FIG. 8 and FIG. 9, the communication lines (or wires) 270 are illustrated as communication lines (or wires) 270A and 270B, such that communication lines (or wires) 270A are the "inputs" (input communication lines (or wires)) feeding data into the input registers 350, and the communication lines (or wires) 270B are the "outputs" (output communication lines (or wires)) moving data from the output registers 380. In a representative embodiment, there are a plurality of sets or busses of communication lines (or wires) 270 into and out of each tile 210, from and to each adjacent tile (e.g., synchronous mesh communication network 275 up link, down link, left link, and right link), and from and to other components for distribution of various signals, such as data write masks, stop signals, and instructions or instruction indices provided from one tile 210 to another tile 210, as discussed in greater detail below. Alternatively, and not separately illustrated, there may also be various dedicated communication lines, such as for asserting a stop signal, such that a stop signal generated from any tile 210 in a HTF circuit cluster 205 can be received promptly, in a limited number of clock cycles, by all other tiles 210 in the HTF circuit cluster 205.

It should be noted that there are various fields in the various sets or busses of communication lines forming the synchronous mesh communication network 275. For example, FIG. 8 and FIG. 9 illustrate four busses of incoming and outgoing communication lines (or wires) 270A and 270B, respectively. Each one of these sets of communication lines (or wires) 270A and 270B may carry different information, such as data, an instruction index, control information, and thread information (such as TID, XID, loop dependency information, write mask bits for selection of valid bits, etc.). One of the inputs 270A may also be designated as a master synchronous input, including input internal to a tile 210 (from feedback of an output), which can vary for each time slice of a tile 210, which may have the data for an instruction index for that tile 210 of a synchronous domain, for example and without limitation, discussed in greater detail below.

In addition, as discussed in greater detail below, for any input received on the synchronous mesh communication network 275 and held in one or more input registers 350 (of the synchronous network input(s) 135), each tile 210 may transfer that input directly to one or more output registers 380 (of the synchronous network output(s) 170) for output (typically on a single clock cycle) to another location of the synchronous mesh communication network 275, thereby allowing a first tile 210 to communicate, via one or more intermediate, second tiles 210, with any other third tile 210 within the HTF circuit cluster 205. This synchronous mesh communication network 275 enables configuration (and reconfiguration) of a statically scheduled, synchronous pipeline between and among the tiles 210, such that once a thread is started along a selected data path between and among the tiles 210, as a synchronous domain, completion of the data processing will occur within a fixed period of time. In addition, the synchronous mesh communication network 275 serves to minimize the number of any required accesses to memory 125, as accesses to memory 125 may not be required to complete the computations for that thread be performed along the selected data path between and among the tiles 210.

In the asynchronous packet network 265, each AF switch 260 is typically coupled to a plurality of tiles 210 and to one or more other AF switches 260, over communication lines (or wires) 280. In addition, one or more selected AF switches 260 are also coupled (over communication lines (or wires) 285) to one or more of the memory interface 215, the optional first network interface 220, and the HTF dispatch interface 225. As illustrated, as an example and without limitation, the HTF circuit cluster 205 includes a single HTF dispatch interface 225, two memory interfaces 215, and two optional first network interfaces 220. Also as illustrated, as an example and without limitation, in addition to being coupled to the other AF switches 260, one of the AF switches 260 is further coupled to a memory interface 215, to an optional first network interface 220, and to the HTF dispatch interface 225, while another one of the AF switches 260 is further coupled to a memory interface 215 and to the optional first network interface 220.

Depending upon the selected embodiment, each of the memory interfaces 215 and the HTF dispatch interface 225 may also be directly connected to the first interconnection network 150, with capability for receiving, generating, and transmitting data packets over both the first interconnection network 150 and the asynchronous packet network 265, and a first network interface 220 is not utilized or included in HTF circuit clusters 205. For example, the HTF dispatch interface 225 may be utilized by any of the various tiles 210 for transmission of a data packet to and from the first interconnection network 150. In other embodiments, any of the memory interfaces 215 and the HTF dispatch interface 225 may utilize the first network interface 220 for receiving, generating, and transmitting data packets over the first interconnection network 150, such as to use the first network interface 220 to provide additional addressing needed for the first interconnection network 150.

Those having skill in the electronic arts will recognize that the connections between and among the AF switches 260, the tiles 210, the optional first network interfaces 220, the memory interfaces 215, and the HTF dispatch interface 225 may occur in any selected combination, with any selected number of components, and with any all such component selections and combinations considered equivalent and within the scope of the disclosure. Those having skill in the electronic arts will recognize that the division of the HTF circuit 200 into a plurality of HTF clusters 205 is not required, and merely provides a conceptual division for ease of describing the various components and the connections between and among the various components. For example, while a HTF circuit cluster 205 is illustrated as having sixteen tiles 210, with four AF switches 260, a single HTF dispatch interface 225, two memory interfaces 215, and two first network interfaces 220 (optional), more or fewer of any of these components may be included in either or both a HTF circuit cluster 205 or a HTF circuit 200, and as described in greater detail below, for any selected embodiment, an HTF circuit cluster 205 may be partitioned to vary the number and type of component which may be active (e.g., powered on and functioning) at any selected time.

The synchronous mesh communication network 275 allows multiple tiles 210 to be pipelined without the need for data queuing. All tiles 210 that participate in a synchronous domain act as a single pipelined data path. The first tile of such a sequence of tiles 210 forming a single pipelined data path is referred to herein as a "base" tile 210 of a synchronous domain, and such a base tile 210 initiates a thread of work through the pipelined tiles 210. The base tile 210 is responsible for starting work on a predefined cadence referred to herein as the "spoke count". As an example, if the spoke count is three, then the base tile 210 can initiate work every third clock. It should also be noted that the computations within each tile 210 can also be pipelined, so that parts of different instructions can be performed while other instructions are executing, such as data being input for a next operation while a current operation is executing.

Each of the tiles 210, the memory interfaces 215, and the HTF dispatch interface 225 has a distinct or unique address (e.g., as a 5-bit wide endpoint ID), as a destination or end point, within any selected HTF circuit cluster 205. For example, the tiles 210 may have endpoint IDs of 0-15, memory interfaces 215 (0 and 1) may have endpoint IDs of 20 and 21, and HTF dispatch interface 225 may have endpoint ID of 18 (with no address being provided to the optional first network interface 220, unless it is included in a selected embodiment). The HTF dispatch interface 225 receives a data packet containing work to be performed by one or more of the tiles 210, referred to as a work descriptor packet, which have been configured for various operations, as discussed in greater detail below. The work descriptor packet will have one or more arguments, which the HTF dispatch interface 225 will then provide or distribute to the various tiles, as a packet or message (AF message) transmitted through the AF switches 260, to the selected, addressed tiles 210, and further, will typically include an identification of a region in tile memory 325 to store the data (argument(s)), and a thread identifier ("ID") utilized to track and identify the associated computations and their completion.

Messages are routed from source endpoint to destination endpoint through the asynchronous packet network 265. Messages from different sources to the same destination take different paths and may encounter different levels of congestion. Messages may arrive in a different order than when they are sent out. The messaging mechanisms are constructed to work properly with non-deterministic arrival order.

Figure 13:
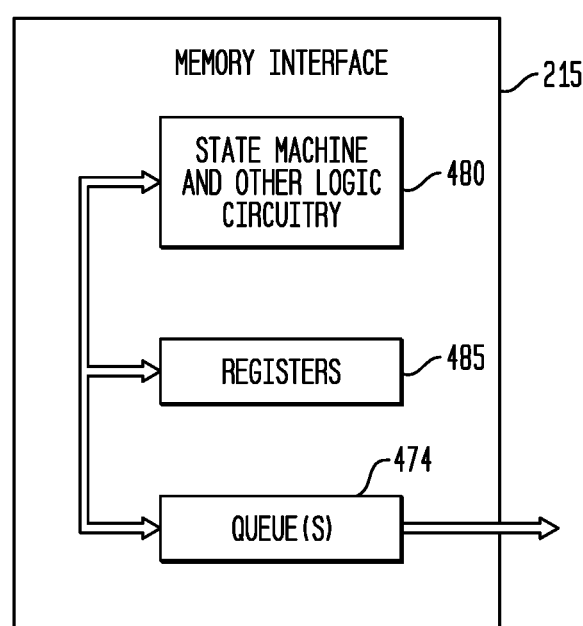
FIG. 13 is a block diagram of a representative embodiment of a memory interface.

FIG. 13 is a block diagram of a representative embodiment of a memory interface 215. Referring to FIG. 13, each memory interface 215 comprises a state machine (and other logic circuitry) 480, one or more registers 485, and optionally one or more queues 474. The state machine 480 receives, generates, and transmits data packets on the asynchronous packet network 265 and the first interconnection network 150. The registers 485 store addressing information, such as virtual addresses of tiles 210, physical addresses within a given node, and various tables to translate virtual addresses to physical addresses. The optional queues 474 store messages awaiting transmission on the first interconnection network 150 and/or the asynchronous packet network 265.

The memory interface 215 allows the tiles 210 within a HTF circuit cluster 205 to make requests to the system memory 125, such as DRAM memory. The memory request types supported by the memory interface 215 are loads, stores and atomics. From the memory interface 215 perspective, a load sends an address to memory 125 and data is returned. A write sends both an address and data to memory 125 and a completion message is returned. An atomic operation sends an address and data to memory 125, and data is returned. It should be noted that an atomic that just receives data from memory (i.e. fetch-and-increment) would be handled as a load request by the memory interface 215. All memory interface 215 operations require a single 64-bit virtual address. The data size for an operation is variable from a single byte to 64 bytes. Larger data payload sizes are more efficient for the device and can be used; however, the data payload size will be governed by the ability of the high level language compiler to detect access to large blocks of data.

Figure 14:
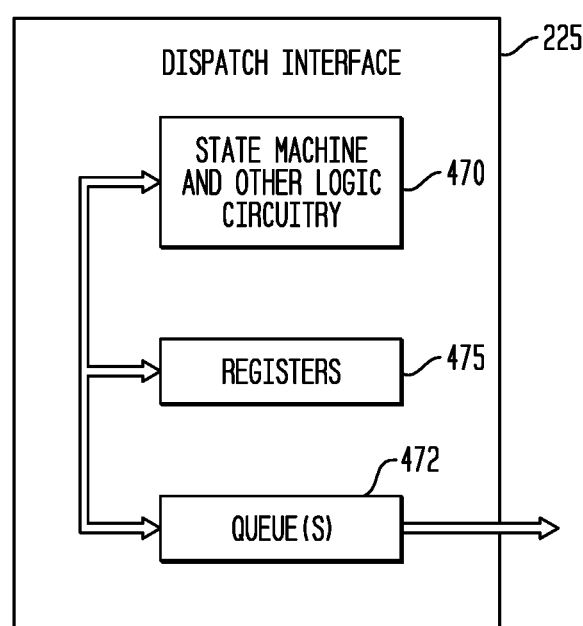
FIG. 14 is a block diagram of a representative embodiment of a dispatch interface.

FIG. 14 is a block diagram of a representative embodiment of a HTF dispatch interface 225. Referring to FIG. 14, a HTF dispatch interface 225 comprises a state machine (and other logic circuitry) 470, one or more registers 475, and one or more dispatch queues 472. The state machine 470 receives, generates, and transmits data packets on the asynchronous packet network 265 and the first interconnection network 150. The registers 475 store addressing information, such as virtual addresses of tiles 210, and a wide variety of tables tracking the configurations and workloads distributed to the various tiles, discussed in greater detail below. The dispatch queues 472 store messages awaiting transmission on the first interconnection network 150 and/or the asynchronous packet network 265.

As mentioned above, the HTF dispatch interface 225 receives work descriptor call packet (messages), such as from the host interface 115, over the first interconnection network 150. The work descriptor call packet will have various information, such as a payload (e.g., a configuration, argument values, etc.), a call identifier (ID), and return information (for the provision of results to that endpoint, for example). The HTF dispatch interface 225 will create various AF data messages for transmission over the asynchronous packet network 265 to the tiles 210, including to write data into memories 325, which tile 210 will be the base tile 210 (a base tile ID, for transmission of an AF completion message), a thread ID (thread identifier or "TID"), and will send a continuation message to the base tile 210 (e.g., with completion and other counts for each TID), so that the base tile 210 can commence execution once it has received sufficient completion messages. The HTF dispatch interface 225 maintains various tables in registers 475 to track what has been transmitted to which tile 210, per thread ID and XID. As results are generated or executions completed, the HTF dispatch interface 225 will receive AF data messages (indicating complete and with data) or AF completion messages (indicating completion but without data). The HTF dispatch interface 225 has also maintained various counts (in registers 475) of the number of completion and data messages it will need to receive to know that kernel execution has completed, and will then assemble and transmit the work descriptor return data packets, with the resulting data, a call ID, the return information (e.g., address of the requestor), via the first interconnection network 150, and frees the TID. Additional features and functionality of the HTF dispatch interface 225 are described in greater detail below.

It should be noted, as mentioned above, that multiple levels (or multiple types) of TIDs may be and typically are utilized. For example, the HTF dispatch interface 225 allocates a first type of TID, from a pool of TIDs, which it transmits to a base tile 210. The base tile 210, in turn, may allocate additional TIDs, such as second and third types of TIDs, such as for tracking the threads utilized in loops and nested loops, for example and without limitation. These different TIDs then can also be utilized to access variables which are private to a given loop. For example, a first type of TID may be used for an outer loop, and second and third types of TIDs may be utilized to track iterations of nested loops.

It should also be noted that a separate transaction ID is utilized for tracking various memory requests over the first interconnection network 150.

Figure 15:
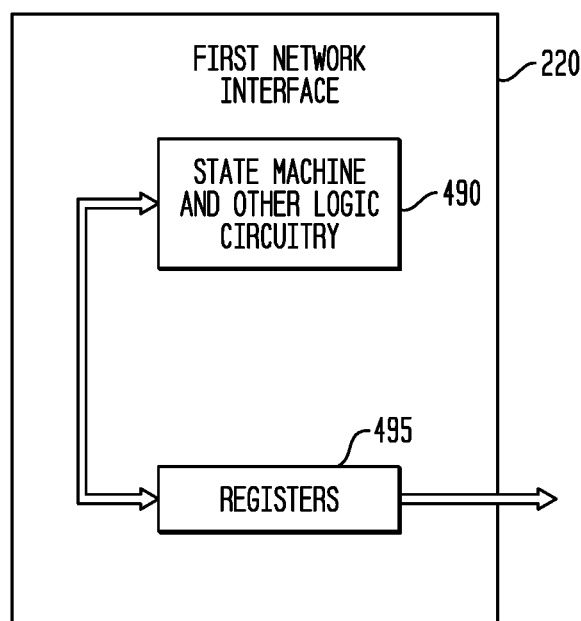
FIG. 15 is a block diagram of a representative embodiment of an optional first network interface.

FIG. 15 is a block diagram of a representative embodiment of an optional first network interface. Referring to FIG. 15, when included each first network interface 220 comprises a state machine (and other logic circuitry) 490 and one or more registers 495. The state machine 490 receives, generates, and transmits data packets on the asynchronous packet network 265 and the first interconnection network 150. The registers 495 store addressing information, such as virtual addresses of tiles 210, physical addresses within a given node, and various tables to translate virtual addresses to physical addresses.

Referring again to FIG. 9, a representative HTF reconfigurable computing circuit (tile) 210A comprises at least one multiply and shift operation circuit ("MS Op") 305, at least one Arithmetic, Logical and Bit Operation circuit ("ALB Op") 310, a first instruction RAM 315, a second, instruction (and index) RAM 320 referred to herein as a "spoke" RAM 320, one or more tile memory circuits (or memory) 325 (illustrated as memory "0" 325A, memory "1" 325B, through memory "N" 325C, and individually and collectively referred to as memory 325 or tile memory 325). In addition, as previously mentioned, a representative tile 210A also typically includes input registers 350 and output registers 380 coupled over communication lines (or wires) 270A, 270B to the synchronous mesh communication network 275, and AF input queues 360 and AF output queues 390 coupled over the communication lines (or wires) 280 of the asynchronous packet network 265 to the AF switches 260. Control circuits 145 are also typically included in a tile 210, such as memory control circuitry 330, thread control circuitry 335, and control registers 340 illustrated for a tile 210A. For decoding and for preparing (assembling) data packets received from or provided to the asynchronous packet network 265, an AF message state machine 345 is also typically included in a tile 210. As part of configurability of the tile 210, one or more multiplexers are typically included, illustrated as input multiplexer 355, output multiplexer 395, and one or more intermediate multiplexer(s) 365 for selection of the inputs to the MS Op 305 and the ALB Op 310. Optionally, other components may also be included in a tile 210, such as conditional (branch) logic circuit 370, write mask generator 375, and flow control circuit 385 (which is illustrated as included as part of the AF output queues 390, and which may be provided as a separate flow control circuit, equivalently). The capabilities of the MS Op 305 and the ALB Op 310 are described in greater detail below.

The synchronous mesh communication network 275 transfers information required for the synchronous domain to function. The synchronous mesh communication network 275 includes the fields specified below. In addition, many of the parameters used in these fields are also stored in the control registers 340, and are assigned to a thread to be executed in the synchronous domain formed by a plurality of tiles 210. The specified fields of the synchronous mesh communication network 275 include:

1. Data, typically having a field width of 64 bits, and comprising computed data being transferred from one tile 210 to the next tile 210 in a synchronous domain.

2. An instruction RAM 315 address, abbreviated "INSTR", typically having a field width of 8 bits, and comprising an instruction RAM 315 address for the next tile 210. The base tile 210 specifies the instruction RAM 315 address for the first tile 210 in the domain. Subsequent tiles 210 can pass the instruction unmodified, or can conditionally change the instruction for the next tile 210 allowing conditional execution (i.e. if-then-else or switch statements), described in greater detail below.

3. A thread identifier, referred to herein as a "TID", typically having a field width of 8 bits, and comprising a unique identifier for threads of a kernel, with a predetermined number of TIDs (a "pool of TIDs") stored in the control registers 340 and potentially available for use by a thread (if not already in use by another thread). The TID is allocated at a base tile 210 of a synchronous domain and can be used as a read index into the tile memory 325. The TID can be passed from one synchronous domain to another through the asynchronous packet network 265. As there are a finite number of TIDs available for use, to perform other functions or computations, eventually the TID should be freed back to the allocating base tile's TID pool for subsequent reuse. The freeing is accomplished using an asynchronous fabric message transmitted over the asynchronous packet network 265.

4. A transfer identifier referred to as an "XID", typically having a field width of 8 bits, and comprising a unique identifier for transferring data from one synchronous domain to another, with a predetermined number of XIDs (a "pool of XIDs") stored in the control registers 340 and potentially available for use by a thread (if not already in use by another thread). The transfer may be a direct write of data from one domain to another, as an "XID_WR", or it may be the result of a memory 125 read (as an "XID_RD") where the source domain sends a virtual address to memory 125 and the destination domain receives memory read data. The XID_WR is allocated at the base tile 210 of the source domain. The XID_WR in the source domain becomes the XID_RD in the destination domain. The XID_WR can be used as a write index for tile memory 325 in the destination domain. XID_RD is used in the destination domain as a tile memory 325 read index. As there are a finite number of XIDs available for use, to perform other functions or computations, eventually the XID should be freed back to the allocating base tile's XID pool for subsequent reuse. The destination domain should free the XID by sending an asynchronous message to the source domain's base tile 210, also over the asynchronous packet network 265.

The synchronous mesh communication network 275 provides both data and control information. The control information (INSTR, XID, TID) is used to setup the data path, and the DATA field can be selected as a source for the configured data path. Note that the control fields are required much earlier (to configure the data path) than the data field. In order to minimize the synchronous domain pipeline delay through a tile 210, the control information arrives at a tile 210 a few clock cycles earlier than the data.

A particularly inventive feature of the architecture of the HTF circuit 200 and its composite HTF circuit clusters 205 and their composite tiles 210 is the use of two different configuration RAMs, the instruction RAM 315 for data path configuration, and the spoke RAM 320 for multiple other functions, including configuration of portions of a tile 210 which are independent from any selected or given data path, selection of data path instructions from the instruction RAM 315, selection of the master synchronous input (among the available inputs 270A) for each clock cycle, and so on. As discussed in greater detail below, this novel use of both an instruction RAM 315 and an independent spoke RAM 320 enables, among other things, dynamic self-configuration and self-reconfiguration of the HTF circuit cluster 205 and of the HTF circuit 200 as a whole.

Each tile has an instruction RAM 315 that contains configuration information to setup the tile 210 data path for a specific operation, i.e., data path instructions that determine, for example, whether a multiplication, a shift, an addition, etc. will be performed in a given time slice of the tile 210, and using which data (e.g., data from a memory 325, or data from an input register 350). The instruction RAM 315 has multiple entries to allow a tile 210 to be time sliced, performing multiple, different operations in a pipelined synchronous domain, with representative pipeline sections 304, 306, 307, 308, and 309 of a tile 210 illustrated in FIG. 9. Any given instruction may also designate which inputs 270A will have the data and/or control information to be utilized by that instruction. Additionally, each time slice could conditionally perform different instructions depending on previous tile 210 time slice data dependent conditional operations, discussed with reference to FIG. 24. The number of entries within the instruction RAM 315 typically will be on the order of 256. The number may change depending on the experience gained from porting kernels to the HTF 200.

The supported instruction set should match the needs of the target applications, such as for applications having data types of 32 and 64-bit integer and floating point values. Additional applications such as machine learning, image analysis, and 5G wireless processing may be performed using the HTF 200. This total set of applications would need 16, 32 and 64-bit floating point, and 8, 16, 32 and 64-bit integer data types. The supported instruction set needs to support these data types for load, store and arithmetic operations. The operations supported need to allow a compiler to efficiently map high level language source to tile 210 instructions. In a representative embodiment, the tiles 210 support the same instruction set as a standard high performance processor, including single instruction multiple data (SIMD) instruction variants.

The spoke RAM 320 has multiple functions, and in representative embodiments, one of those functions is to be utilized to configure parts of (a time slice of) the tile 210 that is or are independent of the current instruction for the data path, i.e., the tile 210 configurations held in the spoke RAM 320 can be used to configure invariant parts of the configuration of the tile 210, e.g., those settings for the tile 210 which remain the same across different data path instructions. For example, the spoke RAM 320 is used to specify which input (e.g., one of several sets of input communication lines 270A or input registers 350) of the tile 210 is the master synchronous input for each clock cycle, as the selection control of input multiplexer(s) 355. This is significant because the instruction index to select an instruction (from the instruction RAM 315) for a given time slice of the tile 210, and a thread ID (TID), is provided on the master synchronous input. As a result, even if the actual instruction index provided on an input 270A to a given tile 210 may be varied (as described with reference to FIG. 24), what set of inputs 270A that will have that selected instruction index is not varied, so that any given tile 210 knows in advance what input it will use to receive a selected instruction index, independently of the instruction specified by that selected instruction index. The configurations held in the spoke RAM 320 also usually designate which outputs 270B will be utilized for the selected instruction (or time slice). The spoke RAM 320 read address input, i.e., the spoke index, comes from a counter that counts (modulo) from zero to the spoke count minus one. All tiles 210 within an HTF circuit cluster 205 generally should have the same spoke RAM input value each clock to have proper synchronous domain operation. The spoke RAM 320 also stores instruction indices and is also utilized to select instructions from the instruction RAM 315, so that a series of instructions may be selected for execution by the tile 210 as the count of the spoke RAM 320 changes, for a base tile 210 of a synchronous domain. For subsequent tiles in the synchronous domain, the instruction index may be provided by a previous tile 210 of the synchronous domain. This aspect of the spoke RAM 320 is also discussed with reference to FIG. 24, as the spoke RAM 320 is highly inventive, enabling dynamic self-configuration and reconfiguration of a HTF circuit cluster 205.

The spoke RAM 320 also specifies when a synchronous input 270A is to be written to tile memory 325. This situation occurs if multiple inputs are required for a tile instruction, and one of the inputs arrives early. The early arriving input can be written to tile memory 325 and then later read from the memory 325 when the other inputs have arrived. The tile memory 325, for this situation, is accessed as a FIFO. The FIFO read and write pointers are stored in the tile memory region ram.

Each tile 210 contains one or more memories 325, and typically each are the width of the data path (64-bits), and the depth will be in the range of 512 to 1024 elements, for example. The tile memories 325 are used to store data required to support data path operations. The stored data can be constants loaded as part of a kernel's cluster 205 configuration, or variables calculated as part of the data flow. The tile memory 325 can be written from the synchronous mesh communication network 275 as either a data transfer from another synchronous domain, or the result of a load operation initiated by another synchronous domain. The tile memory is only read via synchronous data path instruction execution.

Tile memory 325 is typically partitioned into regions. A small tile memory region RAM stores information required for memory region access. Each region represents a different variable in a kernel. A region can store a shared variable (i.e., a variable shared by all executing threads). A scalar shared variable has an index value of zero. An array of shared variables has a variable index value. A region can store a thread private variable indexed by the TID identifier. A variable can be used to transfer data from one synchronous domain to the next. For this case, the variable is written using the XID_WR identifier in the source synchronous domain, and read using the XID_RD identifier in the destination domain. Finally, a region can be used to temporarily store data produced by a tile 210 earlier in the synchronous data path until other tile data inputs are ready. For this case, the read and write indices are FIFO pointers. The FIFO pointers are stored in the tile memory region RAM.

The tile memory region RAM typically contains the following fields:

1. A Region Index Upper, which are the upper bits of a tile memory region index. The lower index bits are obtained from an asynchronous fabric message, the TID, XID_WR or XID_RD identifiers, or from the FIFO read/write index values. The Region Index Upper bits are OR'ed with the lower index bits to produce the tile memory 325 index.

2. A Region SizeW, which is the width of a memory region's lower index. The memory region's size is $2^{SizeW}$ elements.

3. A Region FIFO Read Index, which is the read index for a memory region acting as a FIFO.

4. A Region FIFO Write Index, which is the write index for a memory region acting as a FIFO. The tile performs compute operations for the HTF 200.

The compute operations are performed by configuring the data path within the tile 210. There are two functional blocks that perform all compute for the tile 210: the multiply and shift operation circuit ("MS Op") 305, and the Arithmetic, Logical and Bit Operation circuit ("ALB Op") 310. The MS Op 305 and ALB Op 310 are under the control of the instructions from the instruction RAM 315, and can be configured to perform two pipelined operations such as a Multiply and Add, or Shift and AND, for example and without limitation. (In a representative embodiment, all devices that support the HTF 200 would have the complete supported instruction set. This would provide binary compatibility across all devices. However, it may be necessary to have a base set of functionality and optional instruction set classes to meet die size tradeoffs. This approach is similar to how the RISC-V instruction set has a base and multiple optional instruction subsets.) As illustrated in FIG. 9, the outputs of the MS Op 305 and ALB Op 310 may be provided to registers 312, or directly to other components, such as output multiplexers 395, conditional logic circuitry 370, and/or write mask generator 375.

The various operations performed by the MS Op 305 include, for example and without limitation: integer and floating point multiply, shift, pass either input, signed and unsigned integer multiply, signed and unsigned shift right, signed and unsigned shift left, bit order reversal, permutations, any and all of these operations as floating point operations, and interconversions between integer and floating point, such as double precision floor operations or convert floating point to integer. The various operations performed by the ALB Op 310 include, for example and without limitation: signed and unsigned addition, absolute value, negate, logical NOT, add and negate, subtraction A−B, reverse subtraction B−A, signed and unsigned greater than, signed and unsigned greater than or equal to, signed and unsigned less than, signed and unsigned less than or equal to, comparison (equal or not equal to), logical operations (AND, OR, XOR, NAND, NOR, NOT XOR, AND NOT, OR NOT, any and all of these operations as floating point operations, and interconversions between integer and floating point, such as floor operations or convert floating point to integer.

The inputs to the ALB Op 310 and the MS Op 305 are from either the synchronous tile inputs 270A (held in registers 350), from the internal tile memories 325, or from a small constant value provided within the instruction RAM 315. The following Table 4, showing tile 210 data path input sources, lists the typical inputs for the ALB Op 310 and the MS Op 305.

TABLE 4

| Source Name | Source Description |
| --- | --- |
| SYNC_U | Synchronous mesh communication network 275 up link |
| SYNC_D | Synchronous mesh communication network 275 down link |
| SYNC_L | Synchronous mesh communication network 275 left link |
| SYNC_R | Synchronous mesh communication network 275 right link |
| TILE_OUT | Output of ALB Op 310 within the tile 210. |
| RDMEM0_T | Memory 0 read data. Memory 325 region is indexed using TID from the Master Synchronous Interface. |
| RDMEM0_X | Memory 0 read data. Memory 325 region is indexed using XID from the Master Synchronous Interface. |
| RDMEM0_C | Memory 0 read data. Memory 325 region is indexed using instruction ram constant value. |
| RDMEM0_V | Memory 0 read data. Memory 325 region is indexed using value received from a synchronous input, as variable indexing. |
| RDMEM0_F | Memory 0 read data. Memory 325 region is read using FIFO ordering. |
| RDMEM0_Z | Memory 0 read data. Memory 325 region is indexed using the value zero. |
| RDMEM1_T | Memory 1 read data. Memory 325 region is indexed using TID from the Master Synchronous Interface. |
| RDMEM1_X | Memory 1 read data. Memory 325 region is indexed using XID from the Master Synchronous Interface. |
| RDMEM1_C | Memory 1 read data. Memory 325 region is indexed using instruction ram constant value. |

TABLE 4-continued

| Source Name | Source Description |
| --- | --- |
| RDMEM1_V | Memory 1 read data. Memory 325 region is indexed using value received from a synchronous input, as variable indexing. |
| RDMEM1_F | Memory 1 read data. Memory 325 region is read using FIFO ordering. |
| RDMEM1_Z | Memory 1 read data. Memory 325 region is indexed using the value zero. |
| CONST | The data path input is the zero extended constant value within an instruction. |
| ITER_IDX | The data path input is the zero extended loop iteration value, described in greater detail below. |
| ITER_W | The data path input is the zero extended loop iterator width value. See the loop section for more information. |

Each of the outputs 270B of a tile 210, as part of the communication lines 270 of the synchronous mesh communication network 275, are individually enabled allowing clock gating of the disabled outputs. The output of the ALB Op 310 can be sent to multiple destinations, shown in Table 5.

TABLE 5

| Destination Name | Destination Description |
| --- | --- |
| SYNC_U | Synchronous mesh communication network 275 up link |
| SYNC_D | Synchronous mesh communication network 275 down link |
| SYNC_L | Synchronous mesh communication network 275 left link |
| SYNC_R | Synchronous mesh communication network 275 right link |
| WRMEM0_Z | Write Memory 0. Memory 325 region is written using the value zero as the index. |
| WRMEM0_C | Write Memory 0. Memory 325 region is written using the instruction constant field as the index. |
| WRMEM0_T | Write Memory 0. Memory 325 region is written using the TID value as the index. |

At a high level, and all as representative examples without limitation, the general operation of a tile 210 is as follows. The synchronous mesh communication network 275 and synchronous domains of the various tiles 210 are all scheduled as part of the program compilation and when the configuration is loaded into the system. Unless paused or stopped, a tile 210 can execute its operations when all required inputs are ready, for example, data variables are in input registers 350 or memory 325, and are available to be read or taken from the registers or memory and used, as described in greater detail below. In a representative embodiment, each pipeline stage may operate in a single clock cycle, while in other representative embodiments, additional clock cycles may be utilized per pipeline stage. In a first pipeline stage 304, data is input, such as into the AF input queues 360 and input registers 350, and optionally directly into the memory 325. In a next pipeline stage 306, AF messages are decoded by AF state machine 345 and moved into memory 325; the AF state machine 345 reads data from memory 325 or received from the output multiplexers 395 and generates a data packet for transmission over the asynchronous packet network 265; data in the input registers 350 is moved into memory 325 or selected as operand data (using input multiplexers 355 and intermediate multiplexers 365), or passed directly to output registers 380 for output on the synchronous mesh communication network 275; for example. In one or more of the next pipeline stages 307 and 308, computations are performed by the ALB Op 310 and/or the MS Op 305, write masks may be generated by write mask generator 375, and instructions (or instruction indices) may be selected based on test conditions in conditional (branch) logic circuitry 370. In a next pipeline stage 309, outputs are selected using output multiplexers 395, and output messages (which may have been stored in the AF output queues 390) are transmitted on the asynchronous packet network 265, and output data in any of the output registers 380 are transmitted on the synchronous mesh communication network 275.

Figure 10:
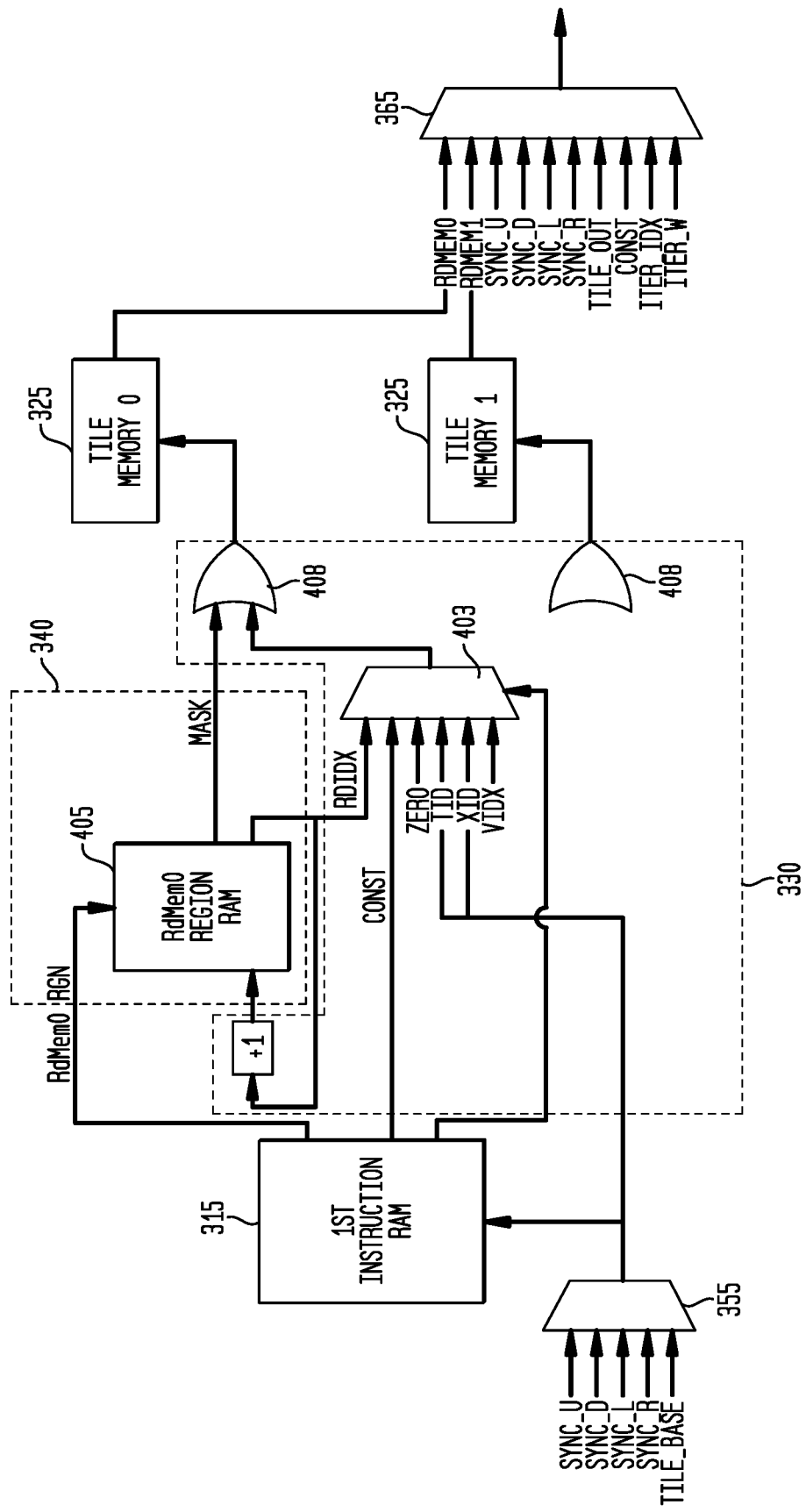
FIG. 10 is a detailed block diagram of a representative embodiment of a memory control circuit of a hybrid threading fabric configurable computing circuit (tile).

FIG. 10 is a detailed block diagram of a representative embodiment of a memory control circuit 330 (with associated control registers 340) of a hybrid threading fabric configurable computing circuit (tile) 210. FIG. 10 shows a diagram of the tile memory 325 read indexing logic of the memory control circuit 330, and is duplicated for each memory 325 (not separately illustrated). The instruction RAM 315 has a field that specifies which region of the tile memory 325 is being accessed, and a field that specifies the access indexing mode. The memory region RAM 405 (part of the control registers 340) specifies a region read mask that provides the upper memory address bits for the specific region. The mask is OR'ed (OR gate 408) in with the lower address bits supplied by the read index selection mux 403. The memory region RAM 405 also contains the read index value when the tile memory 325 is accessed in FIFO mode. The read index value in the RAM 405 is incremented and written back when accessing in FIFO mode. The memory region RAM 405, in various embodiments, may also maintain a top of TID stack through nested loops, described below.

FIG. 10 also shows the control information (INSTR, XID, TID) for the synchronous mesh communication network 275 is required a few clocks earlier than the data input. For this reason, the control information is sent out of the previous tile 210 a few clocks prior to sending the data. This staging of synchronous mesh communication network 275 information reduces the overall pipeline stages per tile 210, but it makes it challenging to use a calculated value as an index to the tile memories 325. Specifically, the synchronous mesh communication network 275 data may arrive too late to be used as an index into the tile memories 325. The architected solution to this problem is to provide the calculated index from a previous tile 210 in a variable index register of the control registers 340. Later, another input 270A causes the variable index register to be used as a tile memory 325 index.

The asynchronous packet network 265 is used to perform operations that occur asynchronous to a synchronous domain. Each tile 210 contains an interface to the asynchronous packet network 265 as shown in FIG. 9. The inbound interface (from communication lines 280A) is the AF input queues 360 (as a FIFO) to provide storage for messages that cannot be immediately processed. Similarly, the outbound interface (to communication lines 280B) is the AF output queues 390 (as a FIFO) to provide storage for messages that cannot be immediately sent out. The messages over the asynchronous packet network 265 can be classified as either data messages or control. Data messages contain a 64-bit data value that is written to one of the tile memories 325. Control messages are for controlling thread creation, freeing resources (TID or XID), or issuing external memory references. The following Table 6 lists the asynchronous packet network 265 outbound message operations:

TABLE 6

| Operation Name | Operation Description |
|---|---|
| FREE_XID | A message sent to the base tile 210 of a synchronous domain to free an XID_RD. |
| FREE_TID | A message sent to the base tile 210 of a synchronous domain to free a TID. |
| CONT_X | A first type of continuation message sent to the base tile 210 of a synchronous domain to indicate that a thread should be initiated after a specified number of completion messages have been received. |
| CONT_T | A second type of continuation message sent to the base tile 210 of a synchronous domain to indicate that a thread should be initiated after a specified number of completion messages have been received. |
| INNER_LOOP | A message sent to initiate an inner loop of a strip mined loop construct. The message specifies the number of loop iterations to perform. A work thread is initiated for each iteration. The iteration index is available within the base tile 210 as an input to the data path source multiplexer 365 (ITER_IDX). |
| OUTER_LOOP | A message sent to initiate an outer loop of a strip mined loop construct. The message specifies the number of loop iterations to perform. A work thread is initiated for each iteration. The iteration index is available within the base tile 210 as an input to the data path source multiplexer 365 (ITER_IDX). |
| COMP | A completion message is sent to indicate a synchronous domain work thread has completed. A base tile 210 counts the received completion messages in conjunction with receiving a call or continue message in order to allow a subsequent work thread to be initiated. The message sends the TID identifier as the pause table index, described below. |
| CALL | A call message is sent to continue a work thread on the same or another synchronous domain. A TID and/or an XID can optionally be allocated when the work thread is initiated. |
| CALL_DATA | A call data message is sent to continue a work thread on the same or another synchronous domain. A TID and/or an XID can optionally be allocated when the work thread is initiated. This message sends 128 bits (two 64-bit values) to be written to tile memory 325 within the base tile 210, along with a mask indicating which bytes of the 128 bit value to write. This is generally also the case for all asynchronous messages |
| DATA_R | A message is sent to write to tile memory 325 of the destination tile 210. The TID value is used to specify the write index for the destination tile's memory. A completion message is sent once the tile memory 325 is written to specified base tile 210. |

TABLE 6-continued

| Operation Name | Operation Description |
| --- | --- |
| DATA_X | A message is sent to write to tile memory 325 of the destination tile 210. The XID_WR value is used to specify the write index for the destination tile's memory 325. A completion message is sent once the tile memory 325 is written to specified base tile 210. |
| LD_ADDR_T | A message is sent to the Memory Interface 215 to specify the address for a memory load operation. The TID identifier is used as the write index for the destination tile's memory. |
| LD_ADDR_X | A message is sent to the Memory Interface 215 to specify the address for a memory load operation. The XID_WR identifier is used as the write index for the destination tile's memory. |
| LD_ADDR_Z | A message is sent to the Memory Interface 215 to specify the address for a memory load operation. Zero is used as the write index for the destination tile's memory. |
| ST_ADDR | A message is sent to the Memory Interface 215 to specify the address for a memory store operation. |
| ST_DATA | A message is sent to the Memory Interface 215 to specify the data for a memory store operation. |

The asynchronous packet network 265 allows messages to be sent and received from tiles 210 in different synchronous domains. There are few situations where it makes sense for a synchronous domain to send a message to itself, such as when a synchronous domain's base tile 210 allocates a TID, and the TID is to be freed by that same synchronous domain.

Figure 22:
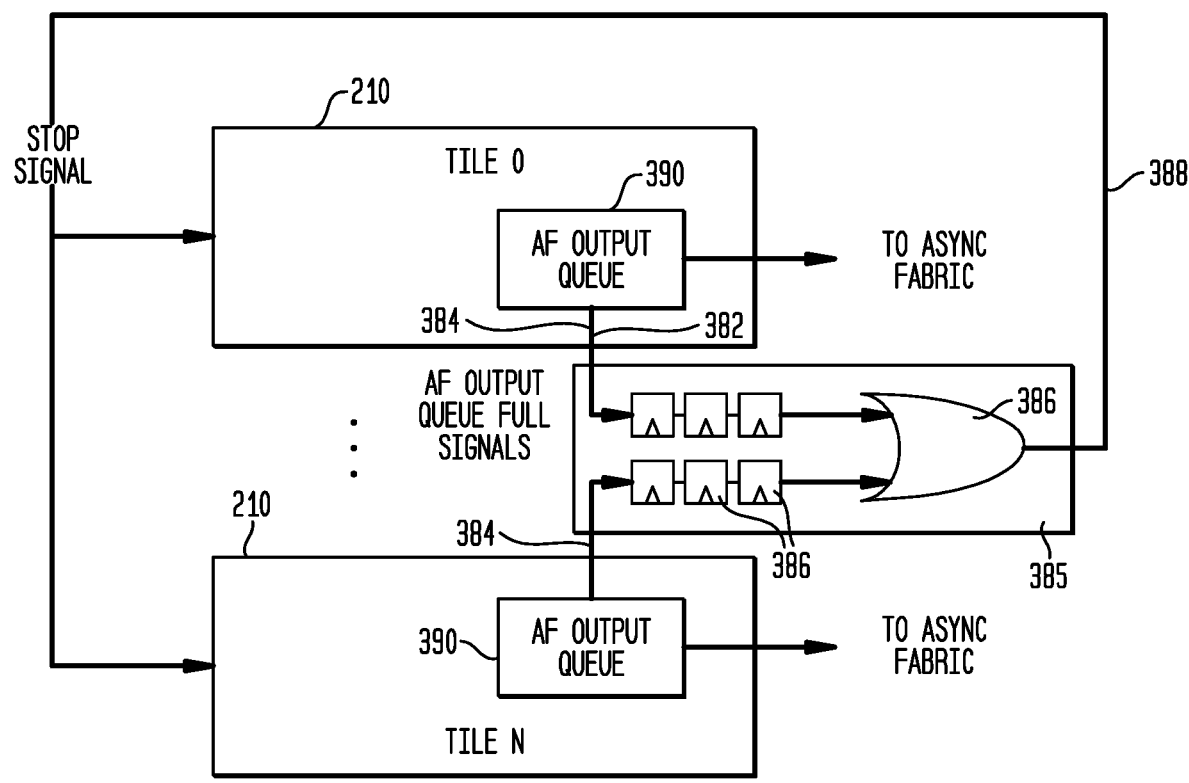
FIG. 22 is a block diagram of a representative flow control circuit.

The asynchronous packet network 265 can become congested if the synchronous domains of the various tiles 210 generate and send messages faster than they can be received, routed and processed by the asynchronous packet network 265 or receiving endpoints. In this situation, a backpressure mechanism is provided to alleviate any such congestion. FIG. 22 is a block diagram of a representative flow control circuit 385. Generally, there is at least one flow control circuit 385 per HTF circuit cluster 205. The tile 210 asynchronous fabric output queues 390 will hold messages as they wait to be sent on the asynchronous packet network 265. A predetermined threshold is provided for the output queue 390 that, when reached, will cause an output queue 390 of a tile 210 to generate an indicator, such as setting a bit, which is asserted as a "stop" signal 382 on a communication line 384 provided to the flow control circuit 385. Each communication line 384 from a tile 210 in a HTF circuit cluster 205 is provided to the flow control circuit 385. The flow control circuit 385 has one or more OR gates 386, which will continue to assert the stop signal 382 on communication line 388 distributed to all tiles 210 within the affected HTF circuit cluster 205, for as long as any one of the tiles 210 is generating a stop signal 382.

The stop signal 382 may be distributed over a dedicated communication line 388 which is not part of either the synchronous mesh communication network 275 or the asynchronous packet network 265 as illustrated, or over the synchronous mesh communication network 275. In a representative embodiment, there is a single stop signal 382 that all tile output queues 390 within a HTF circuit cluster 205 can assert, and all tiles 210 within that HTF circuit cluster 205 are held (paused or stopped) when a stop signal 382 is asserted. This stop signal 382 continues to allow all AF input queues 360 to receive AF messages and packets, avoiding deadlock, but also causes all synchronous domain pipelines to be held or paused (which also prevents the generation of additional AF data packets). The stop signal 382 allows the asynchronous packet network 265 to drain the tile 210 output queues 390 to the point where the number of messages in the output queue 390 (of the triggering output queue(s) 390) has fallen below the threshold level. Once the size of the output queue 390 has fallen below the threshold level, then the signal over the communication line 384 is returned to zero (the stop signal 382 is no longer generated) for that tile 210. When that has happened for all of the tiles 210 in the HTF circuit cluster 205, the signal on communication line 388 also returns to zero, meaning the stop signal is no longer asserted, and ending the stop or pause on the tiles 210.

The first or "base" tile 210 of a synchronous domain has the responsibility to initiate threads of work through the multi-tile 210 synchronous pipeline. A new thread can be initiated on a predetermined cadence. The cadence interval referred to herein as the "spoke count", as mentioned above. For example, if the spoke count is three, then a new thread of work can be initiated on the base tile 210 every three clocks. If starting a new thread is skipped (e.g., no thread is ready to start), then the full spoke count must be waited before another thread can be started. A spoke count greater than one allows each physical tile 210 to be used multiple times within the synchronous pipeline. As an example, if a synchronous domain is executed on a single physical tile and the spoke count is one, then the synchronous domain can contain only a single tile time slice. If, for this example the spoke count is four, then the synchronous domain can contain four tile time slices. Typically, a synchronous domain is executed by multiple tiles 210 interconnected by the synchronous links of the synchronous mesh communication network 275. A synchronous domain is not restricted to a subset of tiles 210 within a cluster 205, i.e., multiple synchronous domains can share the tiles 210 of a cluster 205. A single tile 210 can participate in multiple synchronous domains, e.g., spoke 0, a tile 210 works on synchronous domain "A"; spoke 1, that tile 210 works on synchronous domain "B"; spoke 2, that tile 210 works on synchronous domain "A"; and spoke 3, that tile 210 works on synchronous domain "C". Thread control for a tile is described below with reference to FIG. 11.

Figure 11:
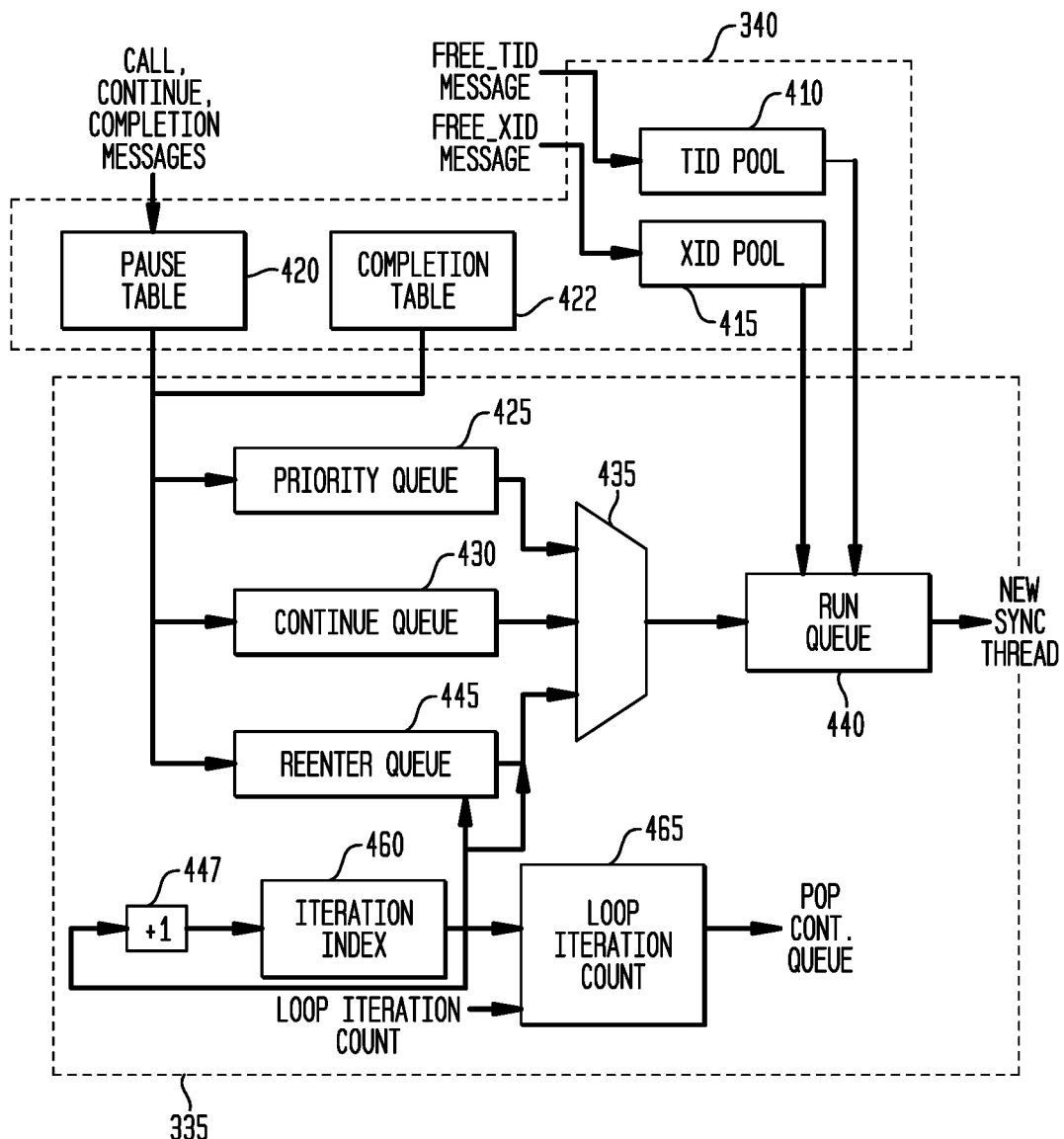
FIG. 11 is a detailed block diagram of a representative embodiment of a thread control circuit of a hybrid threading fabric configurable computing circuit (tile).

FIG. 11 is a detailed block diagram of a representative embodiment of a thread control circuit 335 (with associated control registers 340) of a hybrid threading fabric configurable computing circuit (tile) 210. Referring to FIG. 11, several registers are included within the control registers 340, namely, a TID pool register 410, an XID pool register 415, a pause table 420, and a completion table 422. In various embodiments, the data of the completion table 422 may be equivalently held in the pause table 420, and vice-versa. The thread control circuitry 335 includes a continue queue 430, a reenter queue 445, a thread control multiplexer 435, a run queue 440, an iteration increment 447, an iteration index 460, and a loop iteration count 465. Alternatively, the continue queue 430 and the run queue 440 may be equivalently embodied in the control registers 340.

Figure 12:
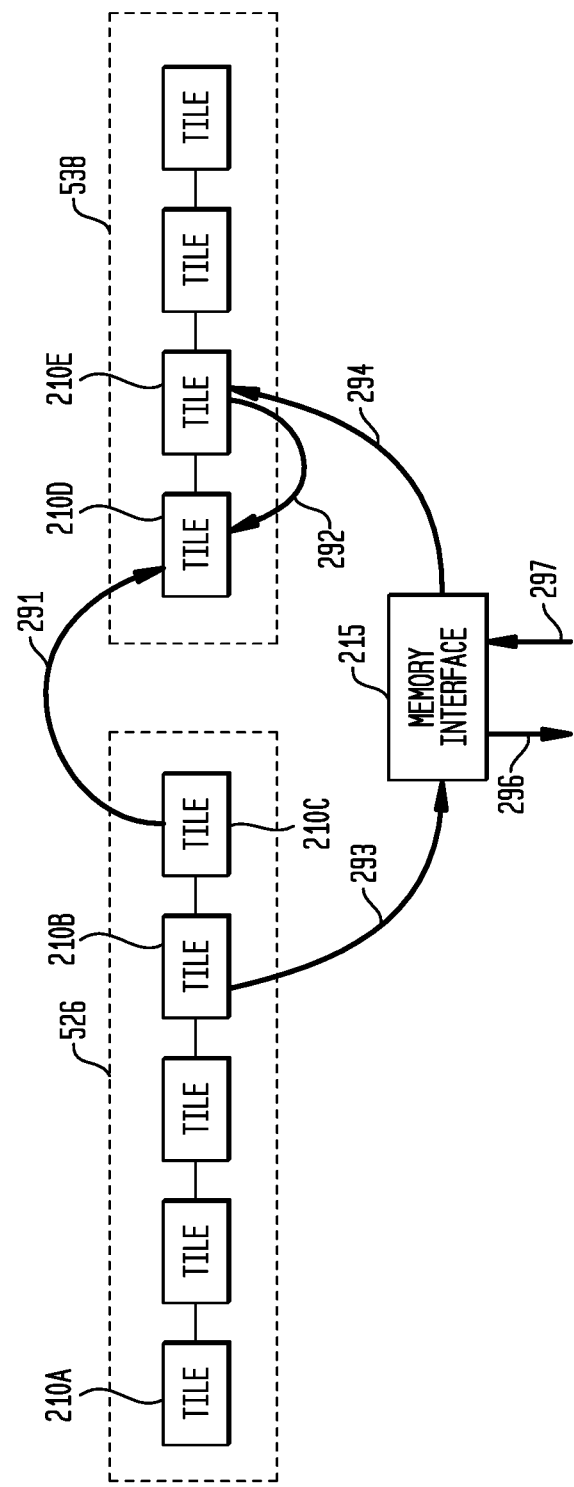
FIG. 12 is a diagram of representative hybrid threading fabric configurable computing circuits (tiles) forming synchronous domains and representative asynchronous packet network messaging.

FIG. 12 is a diagram of tiles 210 forming first and second synchronous domains 526, 538 and representative asynchronous packet network messaging. One difficulty with having an asynchronous packet network 265 is that required data may arrive at tiles 210 at different times, which can make it difficult to ensure that a started thread can run to completion with a fixed pipeline delay. In representative embodiments, the tiles 210 forming a synchronous domain do not execute a compute thread until all resources are ready, such as by having the required data available, any required variables, etc., all of which have been distributed to the tiles over the asynchronous packet network 265, and therefore may have arrived at the designated tile 210 at any of various times. In addition, data may have to be read from system memory 125 and transferred over the asynchronous packet network 265, and therefore also may have arrived at the designated tile 210 at any of various times.

To provide for a thread to run to completion with a fixed pipeline delay, the representative embodiments provide a completion table 422 (or pause table 420) indexed by a thread's TID at the base tile 210 of a synchronous domain. The completion table 422 (or pause table 420) maintains a count of dependency completions that must be received prior to initiating execution of the thread. The completion table 422 (or pause table 420) includes a field named the "completion count", which is initialized to zero at reset. Two types of AF messages are used to modify the count field. The first message type is a thread start or continue message, and increments the field by a count indicating the number of dependences that must be observed before a thread can be started in the synchronous domain. The second AF message type is a completion message and decrements the count field by one indicating that a completion message was received. Once a thread start message is received, and the completion count field reaches zero, then the thread is ready to be started.

As illustrated in FIG. 12, a tile 210B of a first synchronous domain 526 has transmitted an AF memory load message (293) to the memory interface 215 over the asynchronous packet network 265, which in turn will generate another message (296) to system memory 125 over the first interconnect network 150 to obtain the requested data (returned in message 297). That data, however, is to be utilized by and is transmitted (message 294) to a tile 201E in the second synchronous domain 538. As the first synchronous domain 526 has completed its portion of the pipeline, one of the tiles (210C) in the first synchronous domain 526 transmits an AF continue message (291) to the base tile 210D of the second synchronous domain 538. That AF continue message (291) includes the TID of the thread of the first synchronous domain 526 (e.g., TID=1, which was also included in the other messages of FIG. 12), and a completion count of 1, indicating that the base tile 210D of the second synchronous domain 538 will be waiting to start the thread on the second synchronous domain 538 until it has received one completion message.

Accordingly, when a tile 210 receives such data, such as tile 210E in FIG. 12, it acknowledges that receipt by sending a completion message (with the thread ID (TID)) back to the base tile 210, here, base tile 210D of the second synchronous domain 538. As part of the configuration provided to the base tile 210 (at initial configuration or as part of the continue message), and stored in the completion table 422 (or pause table 420) as a completion count, the base tile 210D knows how many such completion messages the base tile 210 must receive in order to commence execution by the tiles 210 of the synchronous domain, in this case, the second synchronous domain 538. As completion messages are received by the base tile 210, for the particular thread having that TID, the completion count of the pause table is decremented, and when it reaches zero for that thread, indicating all required completion messages have been received, the base tile 210 can commence execution of the thread. To commence execution, the TID of the thread is transferred to the continue queue 430, from which it is selected to run (at the appropriate spoke count for the appropriate time slice of the tile 210). It should be noted that completion messages are not required for data which is determined during execution of the thread and which may be transferred between tiles 210 of the synchronous domain over the synchronous mesh communication network 275.

There are several advantages to this type of thread control. This thread control waits for all dependencies to be completed prior to starting the thread, allowing the started thread to have a fixed synchronous execution time. The fixed execution time allows for the use of register stages throughout the pipeline instead of FIFOs. In addition, while one thread of a tile 210 may be waiting to execute, other threads may be executing on that tile 210, providing for a much higher overall throughput, and minimizing idle time and minimizing unused resources.

Similar control is provided when spanning synchronous domains, such as for performance of multiple threads (e.g., for related compute threads forming a compute fiber). For example, a first synchronous domain will inform the base tile 210 of the next synchronous domain, in a continuation message transmitted over the asynchronous packet network 265, how many completion messages it will need to receive in order for it to begin execution of the next thread. Also for example, for iterative looping spanning synchronous domains, a first synchronous domain will inform the base tile 210 of the next synchronous domain, in a loop message (having a loop count and the same TID) transmitted over the asynchronous packet network 265, how many completion messages it will need to receive in order for it to begin execution of the next thread.

It should also be mentioned that various delays may need to be implemented, such as when first data is available from a first tile 210, while second data is still being determined by a second tile 210, both of which will be needed in a next calculation by a third tile 210. For such cases, delay may be introduced either at the output registers 380 at the first tile 210 which created the first data, or in a tile memory 325 of the third tile 210. This delay mechanism is also applicable to data which may be transferred from a first tile 210, using a second tile 210 as a pass-through, to a third tile 210.

The pause table 420 is used to hold or pause the creation of a new synchronous thread in the tile 210 until all required completion messages have been received. A thread from a previous synchronous domain sends a message to a base tile 210 that contains the number of completion messages to expect for the new synchronous thread, and the action to take when all of the completion messages have been received. The actions include: call, continue, or loop. Many pause operations are typically active concurrently. All messages for a specific pause operation (i.e., a set of pause and completion messages) will have the same pause index within the respective messages. The pause index is the TID from the sending tile 210. Pause table 420 entries are initialized to be inactive with a completion delta count of zero. Receiving a pause message increments the delta count by the number of required completion counts, and sets the pause table 420 entry to active. Receiving a completion message decrements the delta count by one. It should be noted that a completion message may arrive prior to the associated pause message, resulting in the delta count being negative. When a pause table 420 entry is active with a delta count of zero then the associated activity (e.g., the new thread) is initiated (and the pause table 420 entry is de-activated).

The continuation (or call) queue 430 holds threads ready to be started on a synchronous domain. A thread is pushed into the continuation queue 430 when all completions for a call operation are received. It should be noted that threads in the continuation queue 430 may require a TID and/or XID to be allocated before the thread can be started on a synchronous domain, e.g., if all TIDs are in use, the threads in the continuation queue 430 can be started once a TID is freed and available i.e., the thread may be waiting until TID and/or XIDs are available.

The reenter queue 445 holds threads ready to be started on a synchronous domain, with execution of those threads having priority over those in the continuation queue 430. A thread is pushed into the reenter queue 445 when all completions for a continue operation are received, and the thread already has a TID. It should be noted that that threads in the reenter queue 445 cannot require allocation of a TID. Separate reenter and continue (or continuation) queues 445, 430 are provided to avoid a deadlock situation. A special type of continue operation is a loop. A loop message contains a loop iteration count. The count is used to specify how many times a thread is to be started once the pause operation completes.

An optional priority queue 425 may also be implemented, such that any thread having a thread identifier in the priority queue 425 is executed prior to execution of any thread having a thread identifier in the continuation queue 430 or in the reenter queue 445.

An iteration index 460 state is used when starting threads for a loop operation. The iteration index 460 is initialized to zero and incremented for each thread start. The iteration index 460 is pushed into the run queue 440 with the thread information from the continue queue 430. The iteration index 460 is available as a selection to the data path input multiplexer 365 within the first tile (base tile) 210 of the synchronous domain.

The loop iteration count 465 is received as part of a loop message, saved in the pause table 420, pushed into the continue queue 430, and then used to determine when the appropriate number of threads have been started for a loop operation.

The run queue 440 holds ready-to-run threads that have assigned TIDs and/or XIDs and can execute when the appropriate spoke count clocks have occurred. The TID pool 410 provides unique thread identifiers (TIDs) to threads as they are started on the synchronous domain. Only threads within the continuation queue 430 can acquire a TID. The XID pool 415 provides unique transfer identifiers (XIDs) to threads as they are started on the synchronous domain. Threads from the continue queue 430 can acquire an XID. An allocated XID becomes the XID_WR for the started thread.

For any given or selected program to be executed, the code or instructions for that program, written or generated in any appropriate or selected programming language, are compiled for and loaded into the system 100, including instructions for the HTP 300 and HTF circuits 200, and any which may be applicable to the host processor 110, to provide the selected configuration to the system 100. As result, various sets of instructions for one or more selected computations are loaded into the instruction RAMs 315 and the spoke RAMs 320 of each tile 210, and loaded into any of the various registers maintained in the memory interfaces 215 and HTF dispatch interface 225 of each tile 210, providing the configurations for the HTF circuits 200, and depending upon the program, also loaded into the HTP 300.

A kernel is started with a work descriptor message that contains zero or more arguments, typically generated by the host processor 110 or the HTP 300, for performance by one or more HTF circuits 200, for example and without limitation. The arguments are sent within the work descriptor AF message to the HTF dispatch interface 225. These arguments provide thread-specific input values. A host processor 110 or HTP 300, using its respective operating system ("OS") can send a "host" message to a kernel that initializes a tile memory 325 location, with such host messages providing non-thread specific values. A typical example is a host message that sends the base address for a data structure that is used by all kernel threads.

A host message that is sent to a kernel is sent to all HTF circuit clusters 205 where that kernel is loaded. Further, the order of sending host messages and sending kernel dispatches is maintained. Sending a host message essentially idles that kernel prior to sending the message. Completion messages ensure that the tile memory 325 writes have completed prior to starting new synchronous threads.

The control messaging over the asynchronous packet network 265 is as follows:

(1) The HTF dispatch interface 225 receives the host message and sends an AF Data message to the destination tile 210. The destination tile 210 writes the selected memory with the data of the AF Data message.

(2) The destination tile 210 sends an AF Complete message to the HTF dispatch interface 225 acknowledging that the tile write is complete.

(3) The HTF dispatch interface 225 holds all new kernel thread starts until all message writes have been acknowledged. Once acknowledged, the HTF dispatch interface 225 transmits an AF Call message to the base tile of the synchronous domain to start a thread.

The HTF dispatch interface 225 is responsible for managing the HTF circuit cluster 205, including: (1) interactions with system 100 software to prepare the HTF circuit cluster 205 for usage by a process; (2) dispatching work to the tiles 210 of the HTF circuit cluster 205, including loading the HTF circuit cluster 205 with one or more kernel configurations; (3) saving and restoring contexts of the HTF circuit cluster 205 to memory 125 for breakpoints and exceptions. As mentioned above, the registers 475 of the HTF dispatch interface 225 may include a wide variety of tables to track what has been dispatched to and received from any of the various tiles 210, such as tracking any of the messaging utilized in representative embodiments. The HTF dispatch interface 225 primitive operations utilized to perform these operations are listed in Table 7.

TABLE 7

| Primitive Operation | Location | Initiated by | Operation Description |
| --- | --- | --- | --- |
| HTF Cluster Load Kernel Configuration | HTF Dispatch Interface | Application | A HTF circuit cluster 205 checks each received work descriptor to determine if the required kernel configuration matches the currently loaded configuration. If the work descriptor's kernel configuration does not match the currently loaded configuration, then the HTF circuit cluster 205 waits for all previous work to complete and loads the new kernel configuration. Each work descriptor has the virtual address for the required kernel configuration. |
| HTF Cluster Reset | HTF Dispatch Interface | OS | Reset all state within a HTF circuit cluster 205 to allow a new kernel configuration or kernel context to be loaded. |
| HTF Cluster Store Context | HTF Dispatch Interface | OS | An HTF circuit cluster 205 can pause execution due to an exception or breakpoint. The HTF circuit cluster 205 sends an interrupt to the OS to inform it of the event. The OS determines if process context must be stored to memory for debugger access. If process context is required, then the OS initiates the operation by interacting with the dispatch interface 225 of the HTF circuit cluster 205. |
| HTF Cluster Load Context | HTF Dispatch Interface | OS | The context for an HTF circuit cluster 205 can be loaded from memory in preparation to resume execution. The OS initiates the operation by interacting with the dispatch interface 225 of the HTF circuit cluster 205. |
| HTF Cluster Pause | HTF Dispatch Interface | OS | The OS may need to pause execution on running HTF circuit clusters 205 when the owning process needs to be stopped. The process may need to be stopped if an exception or breakpoint occurred by a processor or different HTF circuit cluster 205, or the process received a Linux Signal. The OS initiates the pause by interacting with the dispatch interface 225. |
| HTF Cluster Resume | HTF Dispatch Interface | OS | Execution of a paused HTF circuit cluster 205 can be resumed by removal of the pause signal of the HTF circuit cluster 205. The OS initiates the resume by interacting with the dispatch interface 225 of the HTF circuit cluster 205. |
| HTF Cluster Is Idle | HTF Dispatch Interface | OS | The OS may need to determine when an HTF circuit cluster 205 is idle and ready to accept a new operation. The dispatch interface 225 has a number of state machines that perform various commands. These commands include context load, context store, pause, and configuration load. The OS must ensure that an HTF circuit cluster 205 is idle prior to issuing a command. |

Figure 17A:
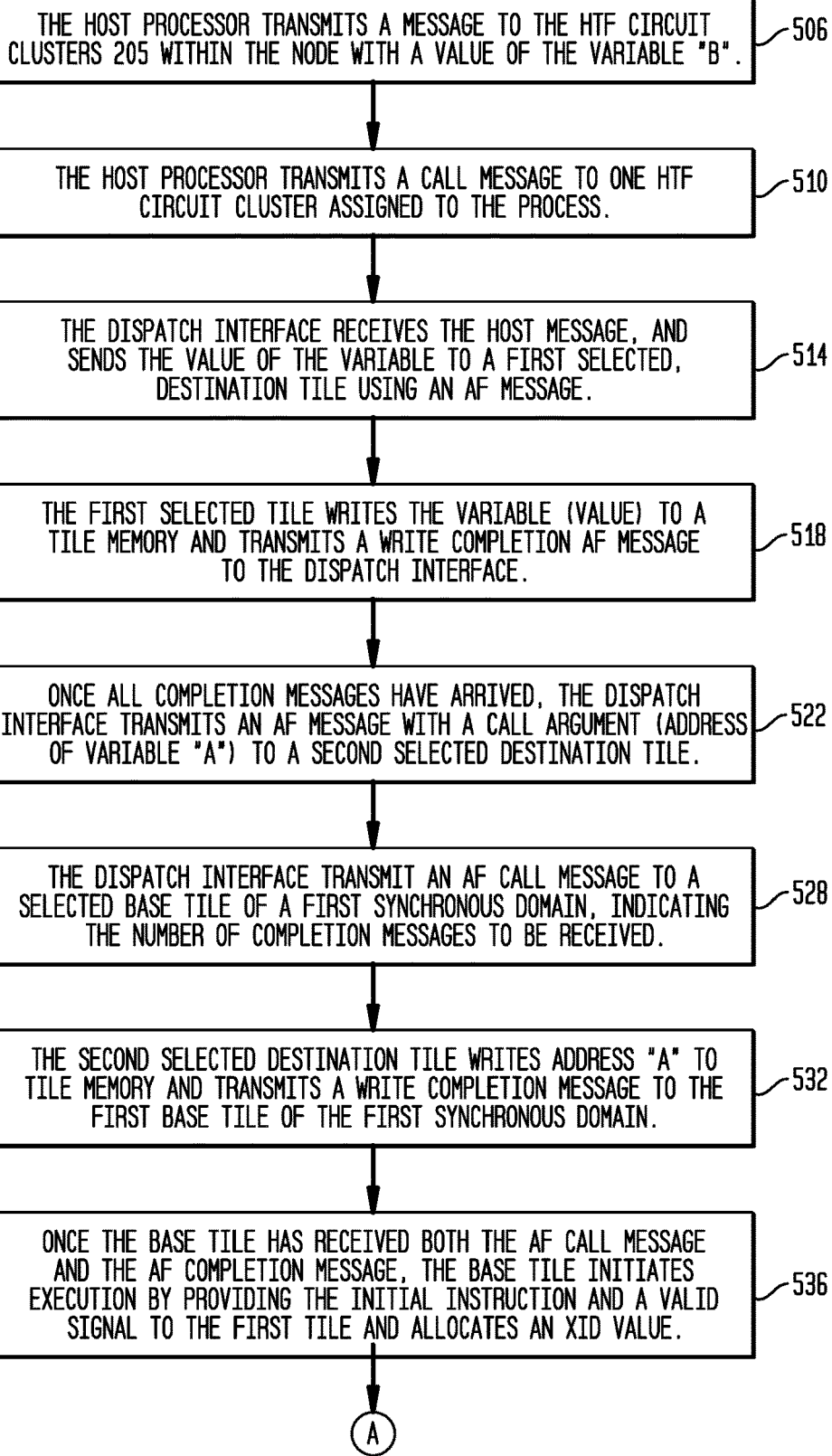
Figure 17C:
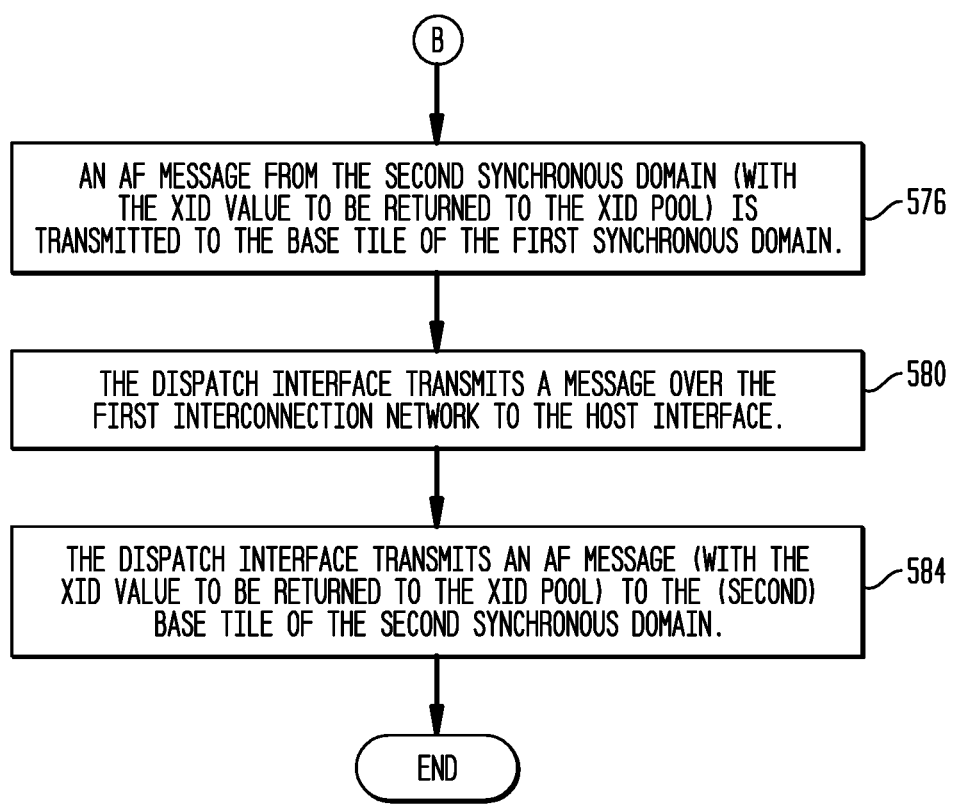

FIGS. 16 and 17 provide an example of messaging and thread control within a system 100, with an example computation provided to show how the synchronous mesh communication network 275 and asynchronous packet network 265 work together to execute a simple kernel, here, solving the simple expression R=*A+B. To show such messaging, the computation has been divided across two different synchronous domains 526 and 538. The variable B is passed as a host message to all HTF circuit clusters 205, and the address of A is passed as an argument to the call in the work descriptor packet. The result R is passed back in the return data packet over the first interconnection network 150. The example does almost no compute so the number of messages per compute performed is very high. The HTF circuits 200 have much higher performance when significant computation is performed within a loop such that the number of messages per compute is low.

FIG. 16 is a diagram of representative hybrid threading fabric configurable computing circuits (tiles) 210 forming synchronous domains and representative asynchronous packet network messaging for performance of a computation by a HTF circuit cluster 205. FIG. 17 is a flow chart of representative asynchronous packet network messaging and execution by hybrid threading fabric configurable computing circuits (tiles) for performance of the computation of FIG. 16 by a HTF circuit cluster 205. To begin, the host processor 110 sends a message (504) to the all HTF circuit clusters 205 within the node, step 506. The message is the value of the variable B. The message is contained in a single data packet, typically referred to as a work descriptor packet, that is written to a dispatch queue 105 of the HIF 115 (illustrated in FIGS. 1 and 2) associated with the process. The HIF 115 reads the message from the dispatch queue 105 and sends a copy of the packet to each HTF circuit cluster 205 assigned to the process. The dispatch interface 225 of the assigned HTF circuit cluster 205 receives the packet. It should also be noted that the HIF 115 performs various load balancing functions across all HTP 300 and HTF 200 resources.

The host processor 110 sends a call message (508) to one HTF circuit cluster 205 assigned to the process, step 510. The host processor 110 can either manually target a specific HTF circuit cluster 205 to execute the kernel, or allow the HTF circuit cluster 205 to be automatically selected. The host processor 110 writes the call parameters to the dispatch queue associated with the process. The call parameters include the kernel address, starting instruction, and the single argument (address of variable A). The host interface (HIF) 115 reads the queued message and forwards the message as data packet on the first interconnection network 150 to the assigned HTF circuit cluster 205, typically the HTF circuit cluster 205 with the least load.

The HTF dispatch interface 225 receives the host message (value of variable B), waits until all previous calls to the HTF circuit cluster 205 have completed, and sends the value to a first selected, destination tile 210H using an AF message (512) over the asynchronous packet network 265, step 514. The HTF dispatch interface 225 has a table of information, stored in registers 475, for each possible host message that indicates the destination tile 210H, tile memory 325 and memory region (in RAM 405) for that tile 210H. The tile 210H uses the message information to write the value to a memory 325 in the tile 210H, and once the value is written to tile memory, then a write completion AF message (516) is sent via the asynchronous packet network 265 back to the HTF dispatch interface 225, step 518.

The HTF dispatch interface 225 waits for all message completion messages to arrive (in this case just a single message). Once all completion messages have arrived, then the HTF dispatch interface 225 sends the call argument (address of variable A) in an AF message (520) to a second selected destination tile 210B for the value to be written into tile memory 325, step 522. The HTF dispatch interface 225 has a call arguments table stored in registers 475 that indicates the destination tile 210B, tile memory 325 and memory region (in RAM 405) for that tile 210B.

The HTF dispatch interface 225 next sends an AF call message (524) to the base tile 210A of the first synchronous domain 526, step 528. The AF call message indicates that a single completion message should be received before the call can start execution through the synchronous tile 210 pipeline. The required completion message has not arrived so the call is paused.

Once the value is written to the tile memory 325 for that tile 210B, then a write completion message (530) is sent by the tile 210B via the asynchronous packet network 265 to the base tile 210A of the first synchronous domain 526, step 532.

The base tile 210A has received both the call message (524) and the required completion message (530), and is now ready to initiate execution on the synchronous domain 526 (tile pipeline). The base tile 210A initiates execution by providing the initial instruction and a valid signal (534) to the tile 210B, via the synchronous mesh communication network 275, step 536. The base tile 210A allocates an XID value from an XID pool 415 for use in the first synchronous domain 526. If the XID pool 415 is empty, then the base tile 210A must wait to start the synchronous pipeline until an XID is available.

As execution proceeds, the tile 210B or another tile 210E within the first synchronous domain 526 sends an AF continue message (540) to the base tile 210C of a second synchronous domain 538, step 542. The continue message contains the number of required completion messages that must arrive before the second synchronous domain 538 can initiate execution (in this case a single completion message). The continue message also includes the transfer ID (XID). The XID is used as a write index in one synchronous domain (526), and then as a read index in the next synchronous domain (538). The XID provides a common tile memory index from one synchronous domain to the next.

The tile 210B or another tile 210F within the first synchronous domain 526 sends an AF memory load message (544) to the memory interface 215 of the HTF circuit cluster 205, step 546. The message contains a request ID, a virtual address, and the XID to be used as the index for writing the load data to a destination tile (210G) memory 325.

The memory interface 215 receives the AF load message and translates the virtual address to a node local physical address or a remote virtual address. The memory interface 215 uses the AF message's request ID to index into a request table stored in registers 485 containing parameters for the memory request. The memory interface 215 issues a load memory request packet (548) for the first interconnection network 150 with the translated address and size information from the request table, step 550.

The memory interface 215 subsequently receives a memory response packet (552) over the first interconnection network 150 with the load data (value for variable A), step 554. The memory interface 215 sends an AF message (556) to a tile 210G within the second synchronous domain 538, step 558. The AF message contains the value for variable A and the value is written to tile memory using a parameter from the request table stored in registers 485.

Once the value is written to tile memory, then an AF write completion message (560) is sent via the asynchronous packet network 265 to the base tile 210C of the second synchronous domain 538, step 562.

The base tile 210C of the second synchronous domain 538 receives both the continue message (540) and the required completion message (560) and is ready to initiate execution on the second synchronous domain 538 (tile pipeline). The base tile 210C initiates execution by providing the initial instruction and a valid signal (564) to a tile 210 of the second synchronous domain 538, step 566, such as tile 210H. The base tile 210C also allocates an XID value from an XID pool for use in the second synchronous domain 538.

A tile 210H within the second synchronous domain performs the add operation of the B value passed in from a host message and the A value read from system memory 125, step 568. The resulting value is the R value of the expression.

A tile 210J within the second synchronous domain sends an AF message (570) containing the R value to the HTF dispatch interface 225, step 572. The AF message contains the allocated XID value from the base tile 210A. The XID value is used as an index within the HTF dispatch interface 225 for a table stored in registers 475 that hold return parameters until the values have been read and a return message generated for transmission over the first interconnection network 150.

An AF message (574) from the second synchronous domain (tile 210K) sends the XID value allocated in the first synchronous domain back to the base tile 210A to be returned to the XID pool, step 576. A first interconnection network 150 message (578) from the HTF dispatch interface 225 is sent to the HIF 115, step 580. The HIF writes the return work descriptor to the dispatch return queue. Once the first interconnection network 150 has sent the return packet, the XID value is sent in an AF message (582) by the HTF dispatch interface 225 to the base tile 210C of the second synchronous domain 538 to be returned to the XID pool, step 584.

It should be noted that in this example of FIGS. 16 and 17, many tiles 210 have been utilized in order to show a wide variety of AF messages which may be utilized for thread control. In practice, especially for such a simple computation, appreciably fewer tiles 210 can be utilized, such as to perform the computation completely within a single synchronous domain.

Figure 19A:
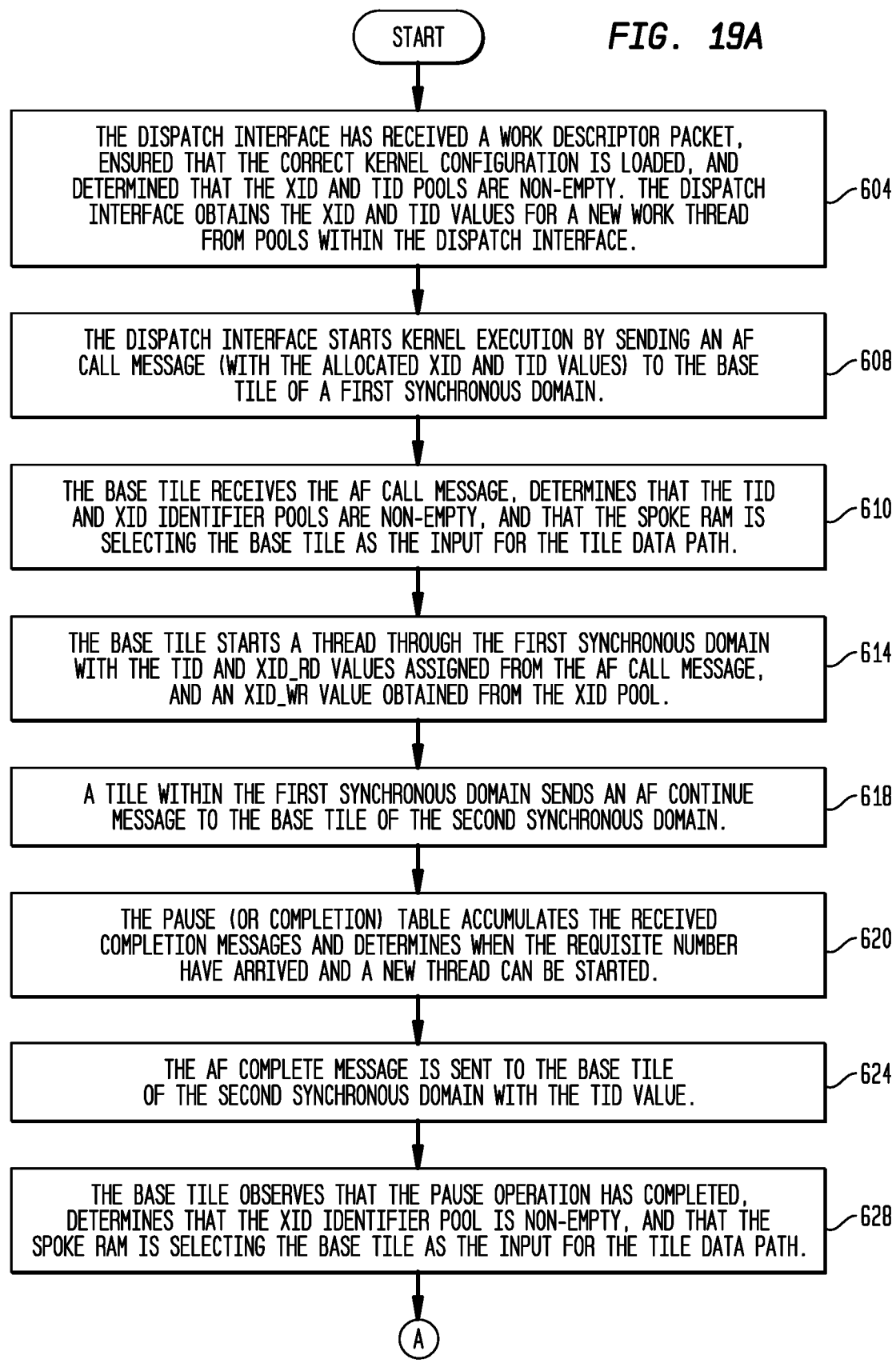
FIGS. 19A, and 19B (collectively referred to as FIG. 19) is a flow chart of representative asynchronous packet network messaging and execution by hybrid threading fabric configurable computing circuits (tiles) for performance of the computation of FIG. 18 by a hybrid threading fabric circuit cluster.
Figure 19B:
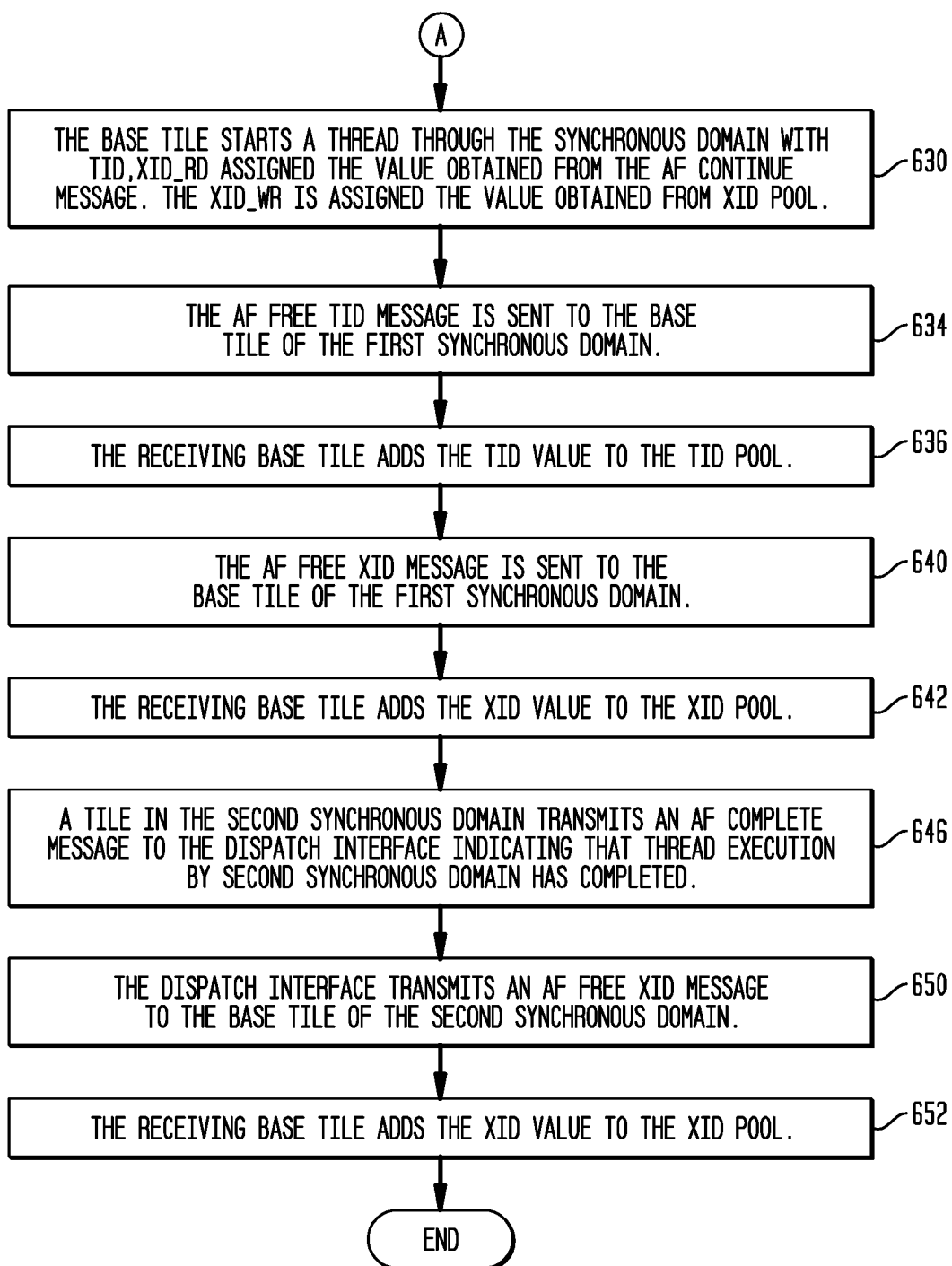

Another messaging example is provided for thread control across multiple synchronous domains in FIGS. 18 and 19, also using AF complete and continue messages on the asynchronous packet network 265. FIG. 18 is a diagram of representative hybrid threading fabric configurable computing circuits (tiles) forming synchronous domains and representative asynchronous packet network messaging for performance of a computation by a hybrid threading fabric circuit cluster. FIG. 19 is a flow chart of representative asynchronous packet network messaging and execution by hybrid threading fabric configurable computing circuits (tiles) for performance of the computation of FIG. 18 by a hybrid threading fabric circuit cluster.

For this example, the HTF dispatch interface 225 sends a message to the base tile 210A of the first synchronous domain 526. The message starts a thread on the first synchronous domain 526. The thread sends a thread continue message to a second synchronous domain 538. The continue message indicates that a thread is to be started on the second synchronous domain 538 when the specified number of completion messages have been received. The first synchronous domain 526 sends a completion message to the second synchronous domain 538 causing the pause to complete and start the synchronous, second thread. The second thread sends a complete message back to the HTF dispatch interface 225 indicating that the second synchronous thread completed, completing the dispatched kernel. Additional messages are shown in FIG. 18 that free TID and XID identifiers.

The HTF dispatch interface 225 has received a work descriptor packet (602), has ensured that the correct kernel configuration is loaded, has determined that the XID and TID pools are non-empty, obtaining the XID and TID values for a new work thread from TID and XID pools stored in registers 475 within the HTF dispatch interface 225, step 604. The HTF dispatch interface 225 starts kernel execution by sending an AF Call message (606) (with the allocated XID and TID values, e.g., XID=3 and (first type) TID=11) to the base tile 210A of a first synchronous domain 526, step 608. The base tile 210A receives the AF Call message (606), determines that the TID and XID pools (410, 415) are non-empty, allocates TID and XID values (e.g., XID_WR=7 and (second type) TID=1), and that the Spoke Ram 320 is selecting the Base Tile as the input for the tile data path, step 610, so that it begins execution with a first designated instruction designated by the instruction index held in its Spoke Ram 320, rather than potentially executing an instruction from an instruction index which may have been provided by a previous tile 210 (e.g., as discussed in greater detail below regarding conditional execution).

The base tile 210A starts a first thread (612) through the first synchronous domain 526 with the assigned TID value (e.g., (second type) TID=1), XID_RD assigned the value from the AF Call message (606) (e.g., XID_RD=3), XID_WR assigned the value obtained from the XID pool (e.g., XID_WR=7), and TID from the AF Call message (606) (e.g., (first type) TID=11), step 614.

As the computation proceeds in the first synchronous domain 526, another tile 210B within the first synchronous domain 526 sends an AF Continue message (616) to the base tile 210D of the second synchronous domain 538, step 618. The AF Continue message (616) provides the information necessary to start a second thread on the second synchronous domain 538 when the appropriate number of completion messages have arrived. The AF Continue message (616) includes a completion count field having a value that specifies the number of required completion messages. One of the tiles (210C) in the first synchronous domain 526 also transmits a free XID (e.g., XID=3) message (641) to the HTF dispatch interface 225.

The AF Continue message (616) can include either the TID or XID_WR value as the index into the pause table 420 on the destination base tile 210D. The pause table accumulates the received completion messages and determines when the requisite number have arrived and a new thread can be started, step 620. The tile 210B that sends the AF Continue message (616) sends the selected TID or XID_WR value as the PID (pause table index) and changes the synchronous domain's downstream TID value to the selected value (e.g., (first type) TID=11, (second type) TID=1). This new TID value is passed in all AF completion messages to be used as the index into the pause table 420 of the base tile 210D.

An AF Complete message (622) is sent to the base tile 210D of the second synchronous domain 538 with the TID value (e.g., (first type) TID=11), step 624. The AF Complete message (622) decrements the entry of a delta count field in the pause table 420 of the base tile 210D. The AF Complete message (622) and the AF Continue message (616) could arrive in any order. The last message to arrive will observe that the AF Continue message (616) has arrived and the delta count field in the pause table 420 has reached zero. This condition indicates that the pause has completed and a second synchronous thread (626) can be started. The base tile 210D also determines or observes that the pause operation has completed, determines that the XID identifier pool is non-empty and allocates an XID (e.g., XID=5), and that the Spoke Ram is selecting the Base Tile as the input for the tile data path, step 628.

The base tile 210D then starts the second synchronous thread (626) through the second synchronous domain 538, step 630, with TID and XID_RD assigned the value obtained from the AF Continue message (616) (e.g., (first type) TID=11, (second type) TID=1, XID_RD=7). The XID_WR is assigned the value obtained from the XID pool in step 628 (e.g., XID_WR=5).

When the computations of the second synchronous thread (626) have completed, several housekeeping messages are sent by the various tiles 210 of the second synchronous domain 538. An AF Free TID message (632) is sent to the base tile 210A of the first synchronous domain 526, step 634, and the receiving base tile 210A adds the TID value to the TID pool 410, step 636, so it is available once again for use. An AF Free XID message (638) is sent to the base tile 210A of the first synchronous domain 526, step 640, and the receiving base tile 210 adds the XID value to the XID pool 415, step 642, also so it is available once again for use. An AF Complete message (644) is sent to the HTF dispatch interface 225 indicating that the second synchronous thread 626 has completed, step 646. The HTF dispatch interface 225 has a count of expected completion messages. The AF Complete message (644) includes the XID_WR value and TID value ((first type) TID=11) of the second synchronous domain 538 to the dispatch interface. The HTF dispatch interface 225 then sends an AF Free XID message (648) to the base tile 210D of the second synchronous domain 538, step 650. The receiving base tile 210D then adds the XID value to the XID pool 415, step 652, so it is available once again for use.

A data transfer operation is used to transfer data from one synchronous domain to the next. Typically, a data transfer is used in conjunction with a load operation obtaining data from memory 125. Calculated data from the first synchronous domain 526 is needed in the second synchronous domain 538 once the load data has arrived at the second synchronous domain 538. In this case, a single pause is sent from the first synchronous domain 526 to the second synchronous domain 538 that contains the total count of completion messages from all load and data transfer operations.

The data transfer operation between synchronous domains then utilizes a variation of step 624. Instead of sending an AF Complete message (622) in step 624, the first synchronous domain 526 sends an AF Data message to the second synchronous domain 538 with data. The destination tile 210 in the second synchronous domain 538 writes the data within the AF Data message to the selected tile memory 325. The tile 210 that receives the AF Data message then sends an AF Complete message to the base tile 210 of the second synchronous domain 538. The base tile 210 of the second synchronous domain 538 may then launch the second thread on the second synchronous domain 538 once the load data has arrived at the second synchronous domain 538.

Figure 21:
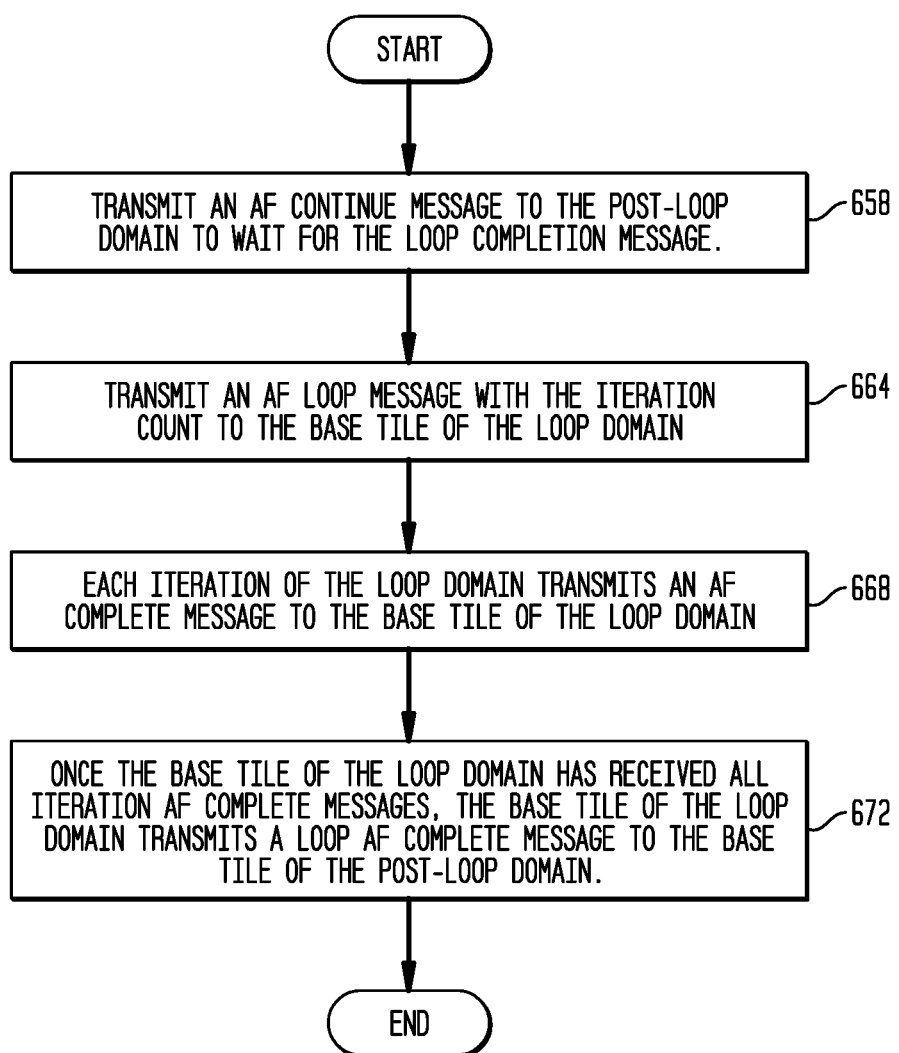
FIG. 21 is a flow chart of representative asynchronous packet network messaging and execution by hybrid threading fabric configurable computing circuits (tiles) for performance of the loop in a computation of FIG. 20 by a hybrid threading fabric circuit cluster.

Control over iterative thread looping across synchronous domains utilizes a similar control messaging schema. The loop message flow allows multiple synchronous domain starts from a single loop message. Each of the started synchronous threads is able to access its iteration index. FIG. 20 is a diagram of representative hybrid threading fabric configurable computing circuits (tiles) forming synchronous domains and representative asynchronous packet network messaging for performance of a loop in a computation by a hybrid threading fabric circuit cluster. FIG. 21 is a flow chart of representative asynchronous packet network messaging and execution by hybrid threading fabric configurable computing circuits (tiles) for performance of the loop in a computation of FIG. 20 by a hybrid threading fabric circuit cluster.

FIG. 20 shows three synchronous domains, first synchronous domain 526, second synchronous domain 538, and third synchronous domain 654. The first synchronous domain 526 is used for pre-loop setup, the second synchronous domain 538 is started with an iteration count (IterCnt) for the number of threads, and the final, third synchronous domain 654 is post-loop. It should be noted that loops can be nested, as well, using additional layers of indexing, discussed in greater detail below.

Referring again to FIG. 11, the control registers 340 include a completion table 422 (or pause table 420). For loops, two kinds of completion information are maintained in the completion table 422, a first completion count pertaining to the number of completion messages which should arrive before a thread may start, as discussed above, and a second, loop or iteration (completion) count, to track how many loop threads have been started and completed. A loop is started by sending an AF loop message containing a loop count (and various TIDs, discussed below) to the base tile 210 of a synchronous domain. The loop count is stored in the completion table 422 (or pause table 420), and is used to determine the number of times a new thread is started on the synchronous domain. In one embodiment, each thread is started with a new TID obtained from the TID pool 410. Each active thread has a unique TID allowing thread private variables, for example. The threads of nested loops are provided with access to the data or variables of its own TID, plus the TIDs of the outer loops. In a second embodiment discussed below, TIDs are re-used by successive threads of the loop.

TIDs are returned to the TID pool 410 by an AF message being sent from a tile within a synchronous domain when the thread is terminating, which may be either an AF Complete message, or for the second embodiment, an AF reenter message. This can also be accomplished by a Free TID message to the base tile 210. The AF message that returns the TID to the pool or re-uses the TID also is used by the loop base tile 210 to maintain a count of the number of active loop threads in the loop count of the completion table 422 (or pause table 420). When the number of active loop threads reaches zero, then the loop is complete. When the loop completion is detected by the loop count going to zero, then an AF Complete message is sent to the post-loop synchronous domain informing of the completion. This mechanism provides for minimal (if not zero) idle cycles for nested loops, resulting in better performance.

Referring to FIGS. 20 and 21, the first synchronous domain 526 (illustrated as tile 210B, although it can be from any other tile in the first synchronous domain 526) sends an AF Continue message (656) to the base tile 210D of the third, post-loop synchronous domain 654, step 658, to wait for the loop completion message (which will be from the second synchronous domain 538). One of the tiles in the first synchronous domain 526, illustrated as tile 210B, sends an AF Loop message (660) with the iteration (loop) count to the base tile 210C of the loop domain, which is the second synchronous domain 538, step 664. The base tile 210C starts the loop (IterCnt) threads ($662$, e.g., $662_0$, $662_1$, through $662_{N-1}$, where "N" is the iteration count (IterCnt)) on the second synchronous domain 538. Each thread 662 has the same TID and XID_RD identifiers. The XID_WR identifier is allocated by the loop base tile 210C if enabled. The iteration index (i.e., ordered from zero to IterCnt-1 (N−1)) is accessible as a data path multiplexer selection in the base tile 210C of the loop domain.

Each iteration of the loop domain then sends an AF Complete message (666) back to the base tile 210C of the second synchronous (loop) domain 538, step 668. It should be noted that the second synchronous domain 538 shown in FIG. 20 may actually be several synchronous domains. For the case in which multiple synchronous domains form the loop, the threads of the last synchronous domain of the loop should transmit the AF Complete messages (666), so that the post-loop third synchronous domain 654 properly waits for all loop operations to complete. Once the base tile 210C of the second synchronous (loop) domain 538 has received all iteration AF Complete messages (666), it then sends a loop AF Complete message (or an AF continuation message) (670) to the base tile 210D of the third (post-loop) synchronous domain 654.

For looping, including nested and doubly-nested looping, several additional and novel features are utilized, such as to minimize idle time, including a reenter queue 445 and additional sub-TIDs, such as a $TID_2$ for the outermost loop, a $TID_1$ for the middle or intermediate loop, and a $TID_0$ for the innermost loop, for example and without limitation. Each thread that is executing in the loop than also has a unique TID, such as $TID_{2s}$ 0-49 for an outer loop which will have fifty iterations, which are also utilized in the corresponding completion messages when each iteration completes execution, also for example and without limitation.

Referring again to FIG. 11, several novel mechanisms are provided to support efficient looping, and to minimize idle time. For example, loops with data-dependent end conditions (e.g., "while" loops) require that the end condition to be calculated as the loop is executed. Also for control and execution of looping, a potential deadlock issue may arise if all TIDs are allocated from the TID pool 410, but the thread at the head of a queue for execution is a new loop, which cannot execute because of a lack of available TIDs, blocking other looping threads which cannot complete and free up their assigned TIDs. Accordingly, in representative embodiments, control registers 340 include two separate queues for ready-to-run threads, with a first queue for initiating new loops (the continuation queue 430, also utilized for non-looping threads), and a second, separate queue (the reenter queue 445) for loop continuation. The continuation queue 430 allocates a TID from the TID pool 410 to start a thread, as previously discussed. The reenter queue 445 uses the previously allocated TID, as each iteration of a loop thread executes and transmits an AF reenter message with the previously allocated TID. Any thread (TID) in the reenter queue 445 will be moved into the run queue 440 ahead of the threads (TIDs) which may be in the other queues (continuation queue 430). As a result, once a loop is launched, loop iteration occurs very rapidly, with each next thread of the loop being launched rapidly through use of the separate reenter queue 445, and further, without the potential for deadlock issues. In addition, the reenter queue 445 allows this rapid execution that is very significant for loops with data-dependent end conditions, which can now run effectively without interruption to the last iteration which produces the data-dependent end conditions.

Referring again to FIGS. 9 and 10, control registers 340 include a memory region RAM 405. The memory region RAM 405, in various embodiments, may also maintain a top of TID stack (with identifiers) through nested loops, described below. As mentioned above, each nested loop initiates threads with a new (or re-used) set of TIDs. Threads of a loop may need to have access to its TID plus the TIDs of the outer loop threads. Having access to the TIDs of each nested loop thread allows access to each thread's private variables, such as the different level or types of TIDs described above, $TID_0$, $TID_1$ and $TID_2$. The top of stack TID identifier indicates the TID for the active thread. The top of stack TID identifier is used to select which of the three TIDs ($TID_0$, $TID_1$ and $TID_2$) is used for various operations. These three TIDs and the top of stack TID identifier are included in synchronous fabric control information (or messages) transmitted on the synchronous mesh communication network 275, so are known to each thread. Because multiple TIDs are included within a synchronous fabric message and include a top of stack TID identifier, the multiple TIDs allow a thread in a nested loop to access variables from any level within the nested loop threads. The selected TID plus a tile memory region RAM 405 identifier is used to access a private thread variable.

Figure 23:
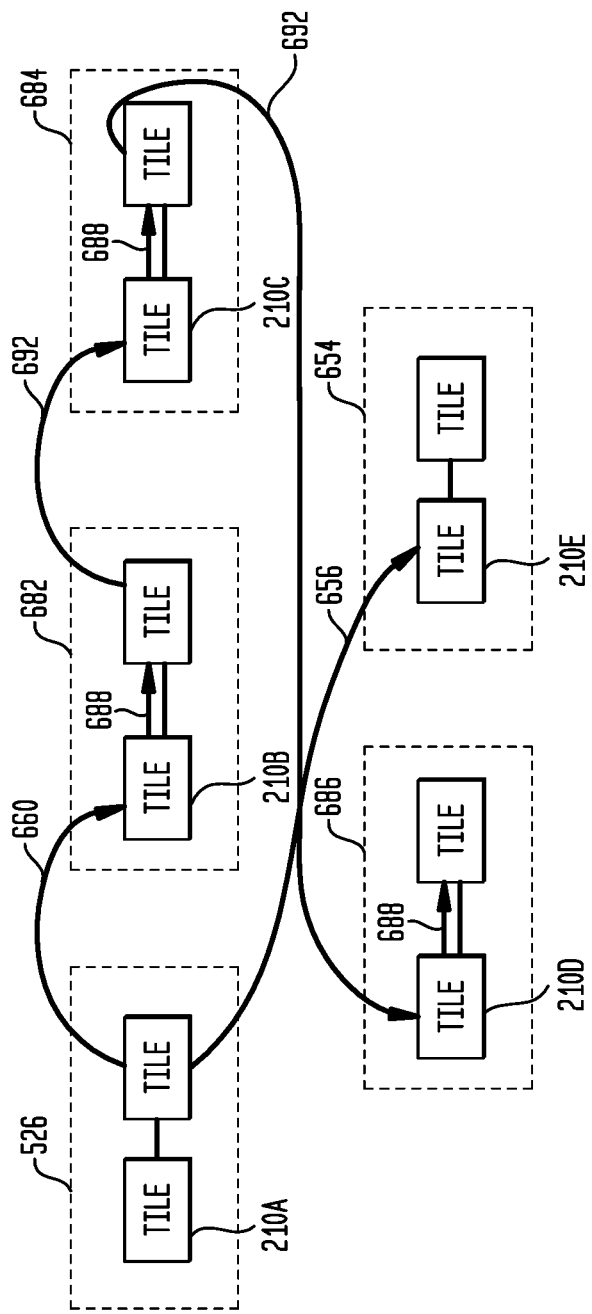
FIG. 23 is a diagram of representative hybrid threading fabric configurable computing circuits (tiles) forming synchronous domains and representative asynchronous packet network messaging and synchronous messaging for performance of a loop in a computation by a hybrid threading fabric circuit cluster.

Another novel feature of the present disclosure is the mechanism to order loop thread execution to handle loop iteration dependencies, which also accommodates any delays in completion messages and data received over the asynchronous packet network 265. FIG. 23 is a diagram of tiles 210 forming synchronous domains and representative asynchronous packet network messaging and synchronous messaging for performance of a loop in a computation by a hybrid threading fabric circuit cluster. As illustrated in FIG. 23, multiple synchronous domains 682, 684, and 686, are involved in performance of a loop computation, a second synchronous domain 682, a third synchronous domain 684, a fourth synchronous domain 686, in addition to the pre-loop first synchronous domain 526 and post-loop (fifth) synchronous domain 654. The loop computation may be any kind of loop, including nested loops, and in this case, there are data dependencies within the various loops. For example, these data dependencies may occur within a single iteration, such as when information is needed from memory 125, involving AF messaging over the asynchronous packet network 265. As a result, thread execution should proceed in a defined order, and not merely whenever any particular thread has a completion count of zero (meaning that thread is not waiting on any data, with all completion messages for that thread having arrived).

To provide ordered loop thread execution, in representative embodiments, additional messaging and additional fields are utilized in the completion table 422, for each loop iteration. The loop base tile 210B provides four pieces of information (for each loop iteration) that is passed in synchronous messages 688 through each synchronous domain 682, 684, 686 through the synchronous mesh communication network 275 (i.e., passed to every successive tile 210 in that given synchronous domain), and AF continue messages 692 to the base tiles 210 of successive synchronous domains via the asynchronous packet network 265 (which is then passed in synchronous messages to each successive tile 210 in that given synchronous domain). Those four fields of information are then stored and indexed in the completion table 422 and utilized for comparisons as the loop execution progresses. The four pieces of information are: a first flag indicating the first thread of a set of threads for a loop, a second flag indicating the last thread of a set of threads for a loop, the TID for the current thread, and the TID for the next thread. The TID for the current thread is obtained from a pool of TIDs, and the TID for the next thread is the TID from the pool that will be provided for the next thread. These four pieces of information are used by the base tile of each successive synchronous domain to order thread starts. A thread can be started if its dependency count has reached zero and the thread is the first thread for a loop, or the thread TID equals the next TID for the previously started thread.

Stated another way, the thread control circuitry 330 (which generally includes various state machines) checks the completion table 422, for each thread which has received all data completions (so would otherwise be ready-to-run), whether that thread is the next thread to run (having the next thread ID, e.g., TID=4), and if so, moves that thread (TID=4) into the run queue 440, and if not, does not start that thread (e.g., a thread whose data completion count went to zero but has a TID=5) but maintains the index of which TID is next to start. When the data completion for the thread having the next TID decrements to zero (TID=4 in this case), so all completion messages have arrived, that thread is queued for execution, and that thread (TID=4) which will be executing has a next TID as well, in this case, its next TID is TID=5. Accordingly, when the thread having TID=4 has completed, the thread control circuitry 330 checks the completion table 422 and now determines that the thread (TID=5) is the next thread ID, and queues that thread for execution. When the thread ID is then the last TID, following its execution, an AF completion message (656) can be transmitted to the post-loop base tile (in this case, 210E). It should be noted that this use of the additional fields in the completion table 422 may be extended to any situation in which a particular ordering of thread execution should be maintained.

Figure 24:
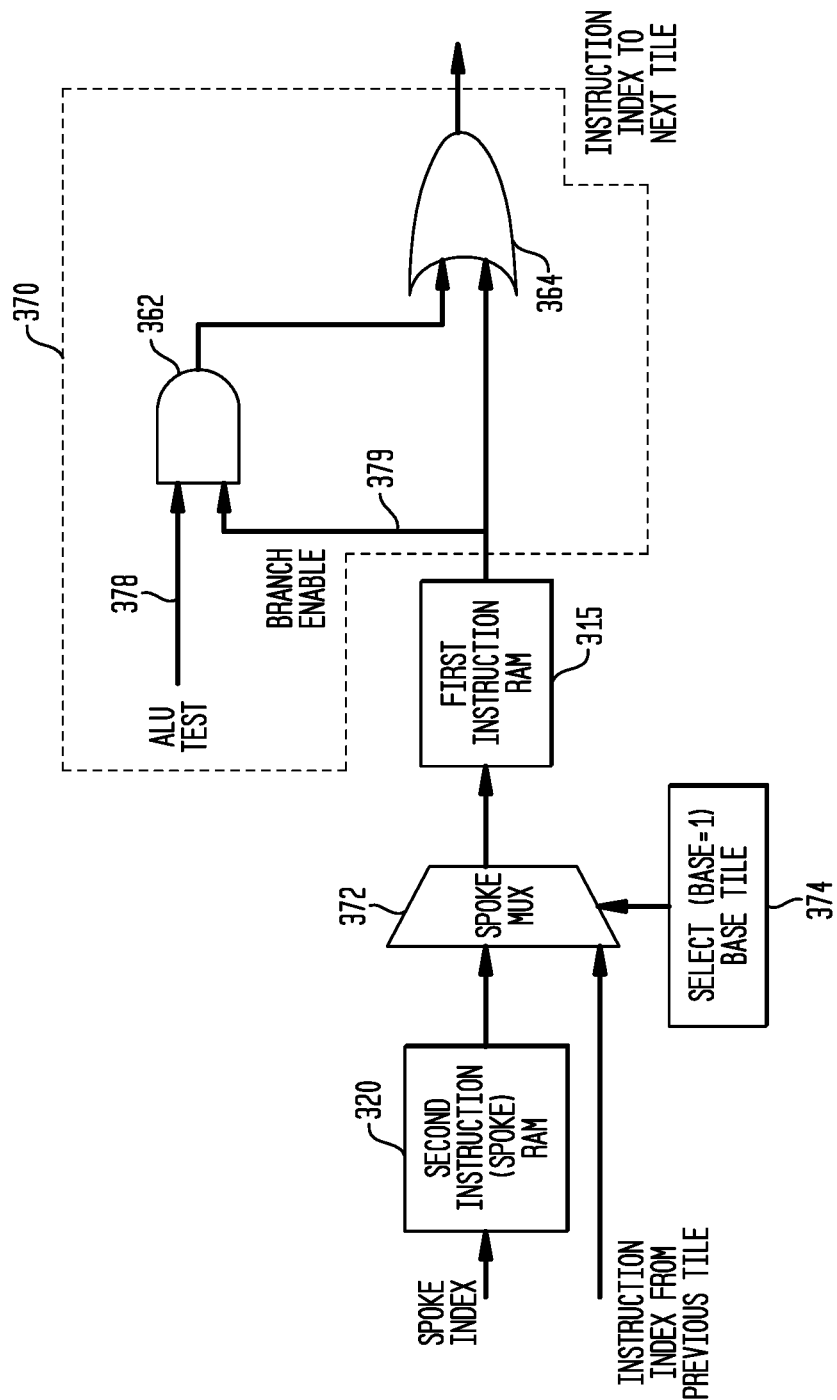
FIG. 24 is a block and circuit diagram of a representative embodiment of conditional branching circuitry.

FIG. 24 is a block and circuit diagram of a representative embodiment of conditional branching circuitry 370. A synchronous domain, such as the first, second and third synchronous domains mentioned above, is a set of interconnected tiles, connected in a sequence or series through the synchronous mesh communication network 275. Execution of a thread begins at the first tile 210 of the synchronous domain, referred to as a base tile 210, and progresses from there via the configured connections of the synchronous mesh communication network 275 to the other tiles 210 of the synchronous domain. As illustrated in FIG. 24, when a tile 210 has been configured as a base tile 210 of the synchronous domain (as those configurations have been loaded into the HTF circuit 200 in advance of run time), the selection 374 of a configuration memory multiplexer 372 is set equal to 1, which thereby selects the spoke RAM 320 to provide the instruction index for selection of instructions from the instruction RAM 315. For all other tiles 210 of the synchronous domain, the selection 374 of a configuration memory multiplexer 372 is set equal to 0, which thereby selects an instruction index provided by the previous tile 210 in the sequence of tiles 210 of the synchronous domain. As a result, the base tile 210 provides the instruction index (or the instruction) to be executed to the next, second tile of the domain, via designated fields (or portions) of the communication lines (or wires) 270B and 270A (which have been designated the master synchronous inputs, as mentioned above). By default, thereafter, this next tile 210, and each succeeding tile 210 of the synchronous domain, will provide the same instruction to each next tile 210 of the connected tiles 210 for execution, as a static configuration.

In representative embodiments, however, a mechanism is provided for dynamic self-configuration, using the spoke RAM 320, the instruction RAM 315, and the conditional branching circuitry 370. Referring to FIG. 24, for a current tile 210, the ALB Op 310 may be configured to generate an output which is the outcome of a test condition, such as whether one input is greater than a second input, for example. That test condition output is provided to the conditional branching circuitry 370, on communication lines (or wires) 378. When the conditional branching circuitry 370 is enabled (through one or more bits of an instruction provided on lines (or wires) 379), the test condition output is utilized to select the next instruction index (or instruction) which is provided to the next tile 210 of the synchronous domain, such as to select between "X" instruction or "Y" instruction for the next tile 210, providing conditional branching of the data path when the first or the second instruction is selected. Such conditional branching may also be cascaded, such as when the next tile 210 is also enabled to provide conditional branching. By selecting the next instruction for one or more of the next tiles 210, dynamic self-configuration and self-reconfiguration is enabled in each such HTF circuit cluster 205.

In a representative embodiment, the conditional branching circuitry 370 has been arranged to select or toggle between two different instructions, depending on the test condition result. The branch enable is provided in one of the fields of the current (or currently next) instruction, and is provided to an AND gate 362 of the conditional branching circuitry 370, where it is ANDed with the test condition output. Depending on the test condition output being a logical "0" or "1", AND gate 362 will generate a logical "0" or "1" as an output, which is provided as an input to OR gate 364. Another designated bit of a selected field of the currently next instruction index, typically the least significant bit ("LSB") of the next instruction index, is also provided to the OR gate 364, where it is ORed with the output of the AND gate 362. If the LSB of the next instruction index is a zero, and it is ORed with a logical "1" of the output of the AND gate 362, then the next instruction index which is output has been incremented by one, providing a different next instruction index to the next tile 210. If the LSB of the next instruction index is a zero, and it is ORed with a logical "0" of the output of the AND gate 362, then the next instruction index which is output has not been incremented by one, providing the same next instruction index to the next tile 210. As a result, the current tile 210 has conditionally specified an alternate instruction for connected tiles 210 to execute, enabling the performance of one or more case statements in the HTF circuit cluster 205. The alternate instruction is chosen by having the current tile's data path produce a Boolean conditional value, and using the Boolean value to choose between the current tile's instruction and the alternate instruction provided as the next instruction index to the next tile 210 in the synchronous domain. Also a result, the current tile 210 has dynamically configured the next tile 210, and so on, resulting in dynamic self-configuration and self-reconfiguration in each HTF circuit cluster 205.

Figure 25:
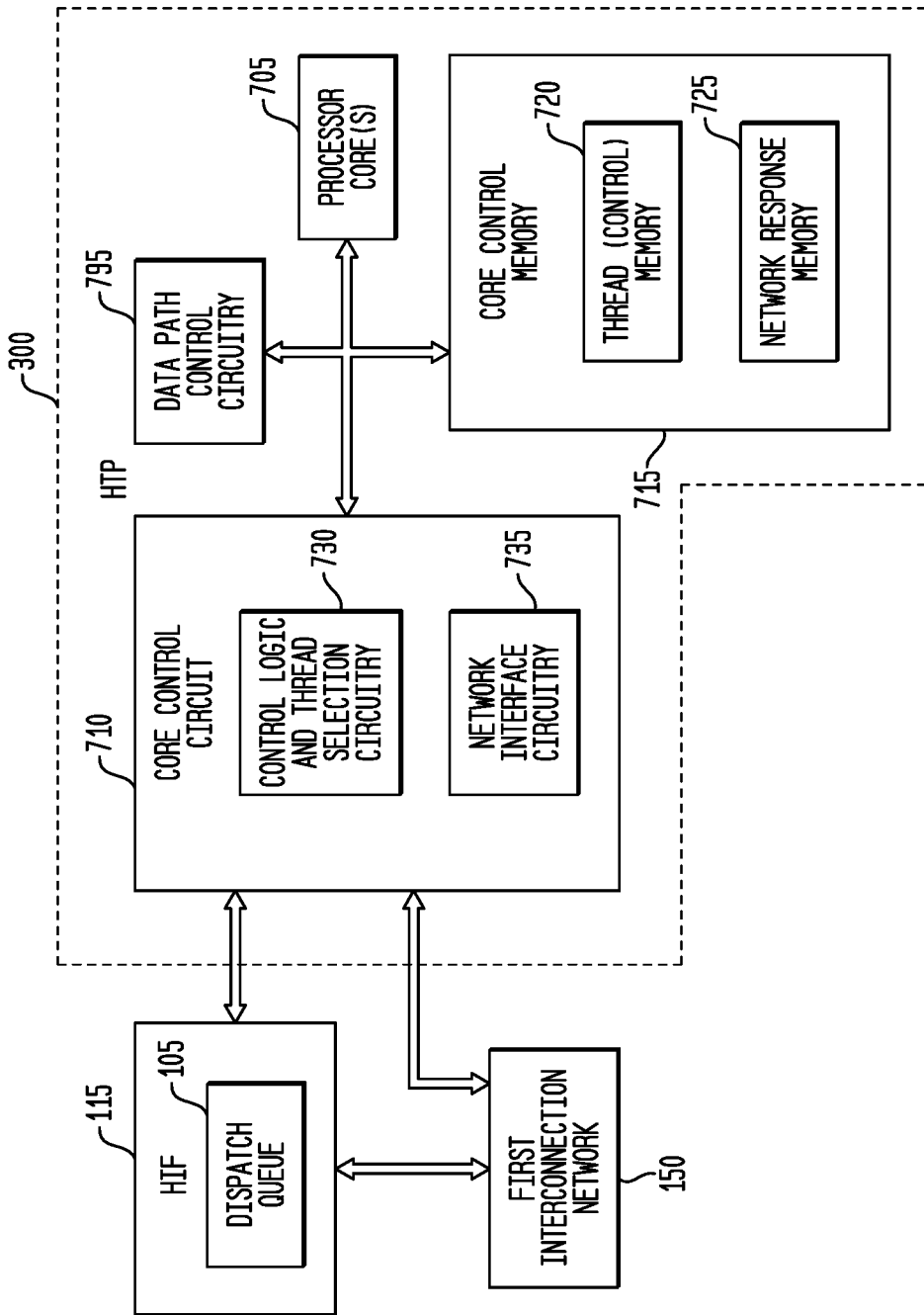
FIG. 25 is a high-level block diagram of a representative embodiment of a hybrid threading processor 300.
Figure 26:
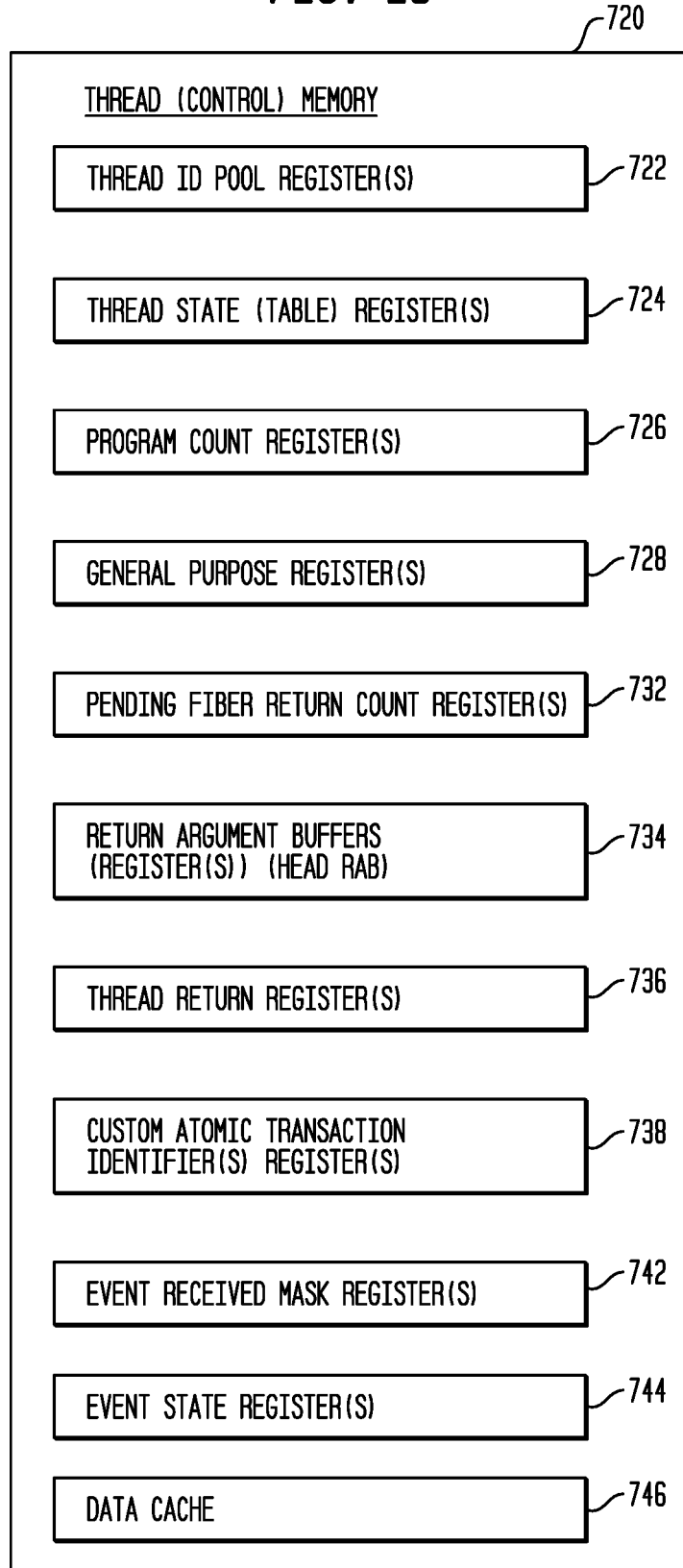
FIG. 26 is a detailed block diagram of a representative embodiment of a thread memory of the hybrid threading processor.
Figure 27:
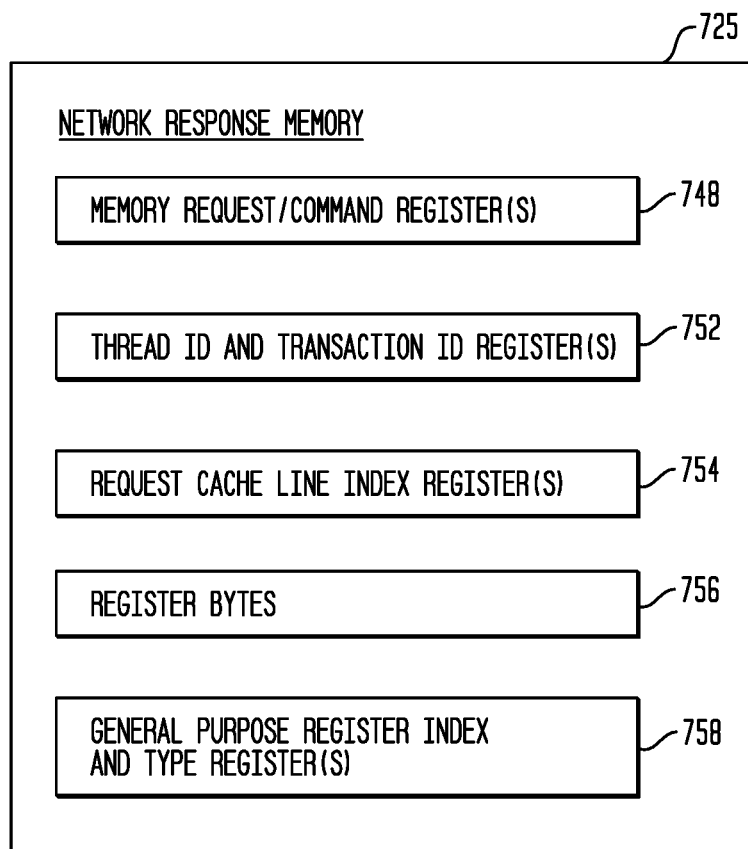
FIG. 27 is a detailed block diagram of a representative embodiment of a network response memory of the hybrid threading processor.
Figure 28:
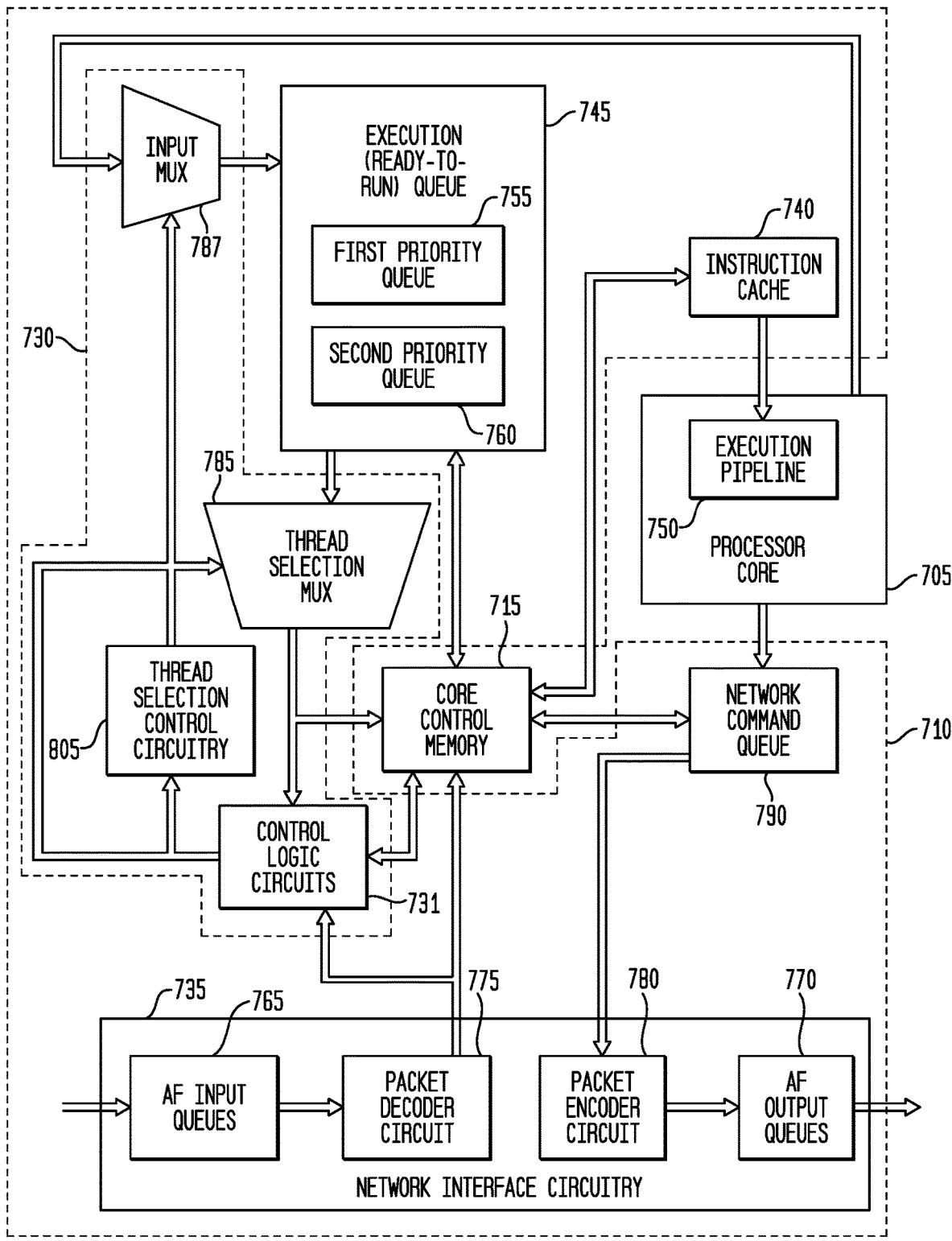
FIG. 28 is a detailed block diagram of a representative embodiment of a hybrid threading processor.
Figure 29A:
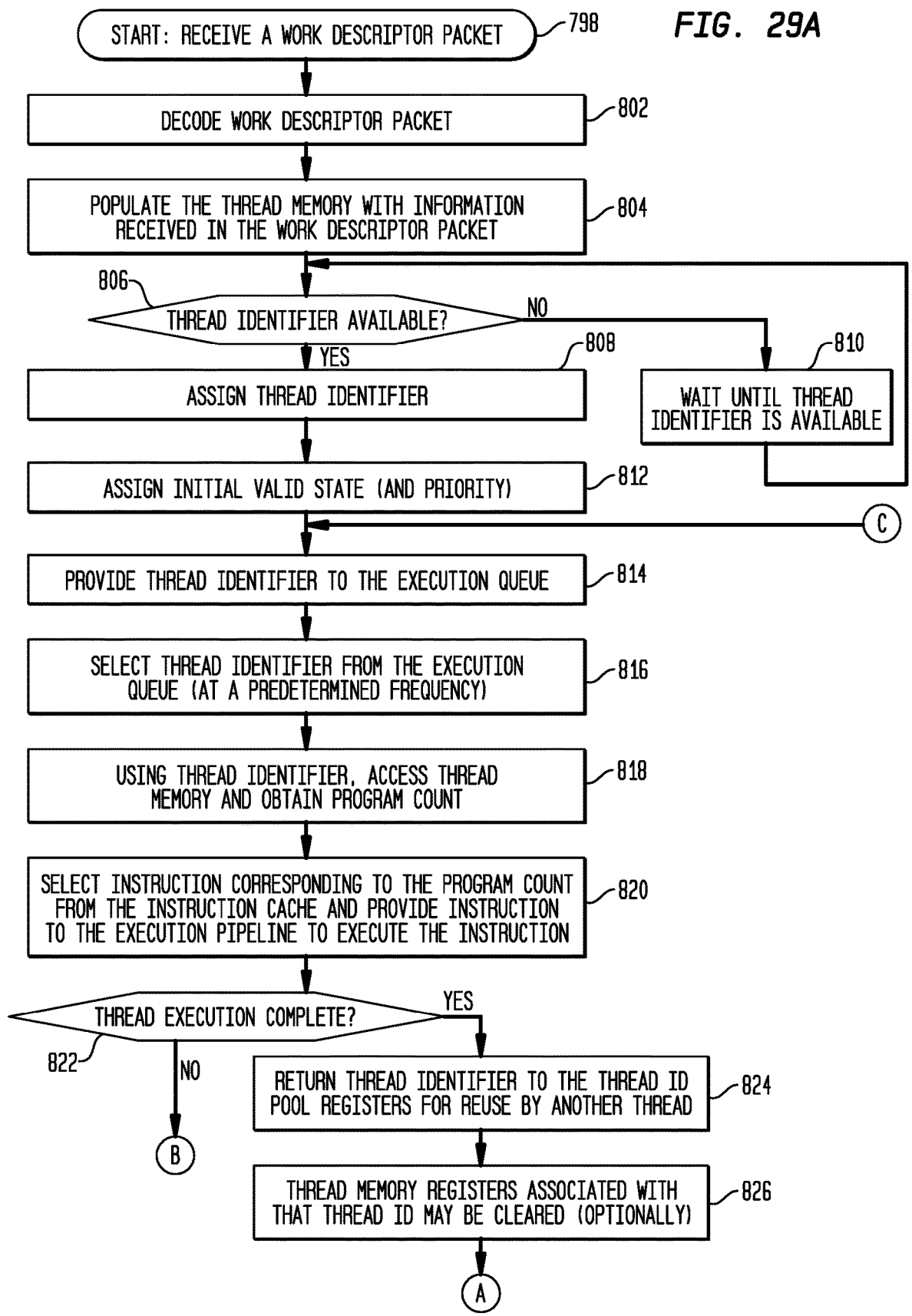
FIGS. 29A and 29B (collectively referred to as FIG. 29) are a flow chart of a representative embodiment of a method for self-scheduling and thread control for a hybrid threading processor.
Figure 29B:
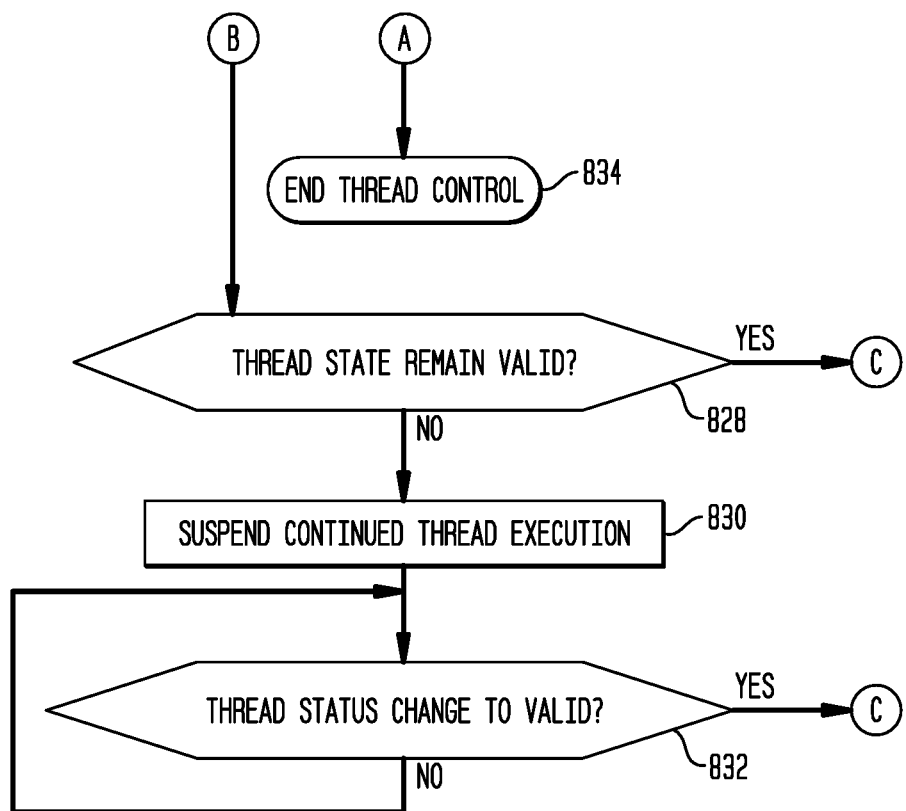

IV. Hybrid Threading Processor 300:

FIG. 25 is a high-level block diagram of a representative embodiment of a hybrid threading processor ("HTP") 300. FIG. 26 is a detailed block diagram of a representative embodiment of a thread memory 720 (also referred to as a thread control memory 720) of the HTP 300. FIG. 27 is a detailed block diagram of a representative embodiment of a network response memory 725 of the HTP 300. FIG. 28 is a detailed block diagram of a representative embodiment of an HTP 300. FIG. 29 is a flow chart of a representative embodiment of a method for self-scheduling and thread control for an HTP 300.

An HTP 300 typically comprises one or more processor cores 705 which may be any type of processor core, such as a RISC-V processor core, an ARM processor core, etc., all for example and without limitation. A core control circuit 710 and a core control memory 715 are provided for each processor core 705, and are illustrated in FIG. 25 for one processor core 705. For example, when a plurality of processor cores 705 are implemented, such as in one or more HTPs 300, corresponding pluralities of core control circuits 710 and core control memories 715 are also implemented, with each core control circuit 710 and core control memory 715 utilized in the control of a corresponding processor core 705. In addition, one or more of the HTPs 300 may also include data path control circuitry 795, which is utilized to control access sizes (e.g., memory 125 load requests) over the first interconnection network 150 to manage potential congestion of the data path.

In turn, a core control circuit 710 comprises control logic and thread selection circuitry 730 and network interface circuitry 735. The core control memory 715 comprises a plurality of registers or other memory circuits, conceptually divided and referred to herein as thread memory (or thread control memory) 720 and network response memory 725. The thread memory 720 includes a plurality of registers to store information pertaining to thread state and execution, while the network response memory 725 includes a plurality of registers to store information pertaining to data packets transmitted to and from first memory 125 on the first interconnection network 150, such as requests to the first memory 125 for reading or storing data, for example and without limitation.

Referring to FIG. 26, the thread memory 720 includes a plurality of registers, including thread ID pool registers 722 (storing a predetermined number of thread IDs which can be utilized, and typically populated when the system 100 is configured, such as with identification numbers 0 to 31, for a total of 32 thread IDs, for example and without limitation); thread state (table) registers 724 (storing thread information such as valid, idle, paused, waiting for instruction(s), first (normal) priority, second (low) priority, temporary changes to priority if resources are unavailable); program counter registers 726 (e.g., storing an address or a virtual address for where the thread is commencing next in the instruction cache 740); general-purpose registers 728 for storing integer and floating point data; pending fiber return count registers 732 (tracking the number of outstanding threads to be returned to complete execution); return argument buffers 734 ("RAB", such as a head RAB as the head of a link list with return argument buffers), thread return registers 736 (e.g., storing the return address, a call identifier, any thread identifier associated with the calling thread); custom atomic transaction identifier(s) registers 738; event received mask registers 742 (to designate which events to "listen" for, as discussed in greater detail below), even state registers 744, and a data cache 746 (typically providing 4-8 cache lines of cache memory for each thread). All of the various registers of the thread memory 720 are indexed using the assigned thread ID for a given or selected thread.

Referring to FIG. 27, the network response memory 725 includes a plurality of registers, such as memory request (or command) registers 748 (such as commands to read, write, or perform a custom atomic operation); thread ID and transaction identifiers ("transaction IDs") registers 752 (with transaction IDs utilized to track any requests to memory, and associating each such transaction ID with the thread ID for the thread which generated the request to memory 125); a request cache line index register 754 (to designate which cache line in the data cache 746 is to be written to when data is received from memory for a given thread (thread ID), register bytes register 756 (designating the number of bytes to write to the general-purpose registers 728); and a general-purpose register index and type registers 758 (indicating which general-purpose register 728 is to be written to, and whether it is sign extended or floating point).

As described in greater detail below, an HTP 300 will receive a work descriptor packet. In response, the HTP 300 will find an idle or empty context and initialize a context block, assigning a thread ID to that thread of execution (referred to herein generally as a "thread"), if a thread ID is available, and puts that thread ID in a an execution (i.e., "ready-to-nm") queue 745. Threads in the execution (ready-to-run) queue 745 are selected for execution, typically in a round-robin or "barrel" style selection process, with a single instruction for the first thread provided to the execution pipeline 750 of the processor core 705, followed by a single instruction for the second thread provided to the execution pipeline 750, followed by a single instruction for the third thread provided to the execution pipeline 750, followed by a single instruction for the next thread provided to the execution pipeline 750, and so on, until all threads in the execution (ready-to-run) queue 745 have had a corresponding instruction provided to the execution pipeline 750, at which point the thread selection commences again with a next instruction for the first thread in the execution (ready-to-run) queue 745 provided to the execution pipeline 750, followed by a next instruction for the second thread provided to the execution pipeline 750, and so on, cycling through all of the threads of the execution (ready-to-run) queue 745. This execution will continue for each such thread until execution for that thread has been completed, such as by executing a thread return instruction, at which point a response packet (having the results of the thread execution) is transmitted back to the source of the work descriptor packet, i.e., back to the source of the work descriptor call packet. In addition, in a representative embodiment and as discussed in greater detail below, the execution (ready-to-run) queue 745 is optionally provided with different levels of priority, illustrated as a first priority queue 755 and a second (lower) priority queue 760, with execution of the threads in the first priority queue 755 occurring more frequently than the execution of the threads in the second (lower) priority queue 760.

As a result, the HTP 300 is an "event driven" processor, and will automatically commence thread execution upon receipt of a work descriptor packet (provided a thread ID is available, but without any other requirements for initiating execution), i.e., arrival of a work descriptor packet automatically triggers the start of thread execution locally, without any reference to or additional requests to memory 125. This is tremendously valuable, as the response time to commence execution of many threads in parallel, such as thousands or threads, is comparatively low. The HTP 300 will continue thread execution until thread execution is complete, or it is waiting for a response, at which point that thread will enter a "pause" state, as discussed in greater detail below. A number of different pause states are discussed in greater detail below. Following receipt of that response, the thread is returned to an active state, at which point the thread resumes execution with its thread ID returned to the execution (ready-to-run) queue 745. This control of thread execution is performed in hardware, by the control logic and thread selection circuitry 730, in conjunction with thread state information stored in the thread memory 720.

In addition to a host processor 110 generating work descriptor packets, an HTP 300 can also generate and transmit work descriptor packets to initiate work, as one or more compute threads, on another computing resource, such as another HTP 300 or any HTF circuit 200. Such a work descriptor packet is a "call" work descriptor packet, and generally comprises a source identifier or address for the host processor 110 or the HTP 300 which is generating the call work descriptor packet, a thread ID (such as a 16-bit call identifier (ID)) used to identify or correlate the return with the original call, a 64-bit virtual kernel address (as a program count, to locate the first instruction to begin execution of the thread, typically held in the instruction cache 740 of an HTP 300 (or of a HTF circuit 200), which also may be a virtual address space), and one or more call arguments, e.g., up to four call arguments).

Similarly, when the thread has been completed, the HTP 300 or HTF circuit 200 generates another work descriptor packet, referred to as a "return" work descriptor packet, which is generally created when the HTP 300 or HTF circuit 200 executes the last instruction of the thread, referred to as a return instruction, with the return work descriptor packet assembled by the packet encoder 780, discussed below. The return packet will be addressed back to the source (using the identifier or address provided in the call work descriptor packet), the thread ID (or call ID) from the call work descriptor packet (to allow the source to correlate the return with the issued call, especially when multiple calls have been generated by the source and are simultaneously outstanding), and one or more return values (as results), such as up to four return values.

FIG. 28 is a detailed block diagram of a representative embodiment of an HTP 300. For ease of illustration and discussion, it should be noted that not all registers of the thread memory 720 and the network response memory 725 are illustrated in FIG. 28. Referring to FIG. 28, the core control circuit 710 comprises control logic and thread selection circuitry 730 and network interface circuitry 735. The control logic and thread selection circuitry 730 comprises circuitry formed using combinations of any of a plurality of various logic gates (e.g., NAND, NOR, AND, OR, EXCLUSIVE OR, etc.) and various state machine circuits (control logic circuit(s) 731, thread selection control circuitry 805), and multiplexers (e.g., input multiplexer 787, thread selection multiplexer 785), for example and without limitation. The network interface circuitry 735 includes AF input queues 765 to receive data packets (including work descriptor packets) from the first interconnection network 150; AF output queues 770 to transfer data packets (including work descriptor packets) to the first interconnection network 150; a data packet decoder circuit 775 to decode incoming data packets from the first interconnection network 150, take data (in designated fields) and transfer the data provided in the packet to the relevant registers of the thread memory 720 and the network response memory 725 (in conjunction with the thread ID assigned to the thread by the control logic and thread selection circuitry 730, as discussed in greater detail below, which thread ID also provides or forms the index to the thread memory 720; and data packet encoder circuit 780 to encode outgoing data packets (such as requests to memory 125, using a transaction ID from thread ID and transaction identifiers ("transaction IDs") registers 752) for transmission on the first interconnection network 150. The data packet decoder circuit 775 and the data packet encoder circuit 780 may each be implemented as state machines or other logic circuitry. Depending upon the selected embodiment, there may be a separate core control circuit 710 and separate core control memory 715 for each HTP processor core 705, or a single core control circuit 710 and single core control memory 715 may be utilized for multiple HTP processor cores 705.

When a work descriptor packet arrives, the control logic and thread selection circuitry 730 assigns an available thread ID to the thread of the word descriptor packet, from the thread ID pool registers 722, with the assigned thread ID used as an index to the other registers of the thread memory 720 which are then populated with corresponding data from the work descriptor packet, typically the program count and one or more arguments. The control logic and thread selection circuitry 730 initializes the remainder of the thread context state autonomously in preparation for starting the thread executing instructions, such as loading the data cache registers 746 and loading the thread return registers 736, for example and without limitation. Also for example, an executing thread has main memory stack space and main memory context space. The context space is only used if the state of the thread needs to be written to memory to be accessed by the host. Each HTP 300 processor core 705 is initialized with a core stack base address and a core context base address, where the base addresses point a block of stacks and a block of context spaces. The thread stack base address is obtained by taking the core stack base address and adding the thread ID multiplied by the thread stack size. The thread context base address is obtained in a similar fashion.

That thread ID is given a valid status (indicating it is ready to execute), and the thread ID is pushed to the first priority queue 755 of the execution (ready-to-run) queue(s) 745, as threads are typically assigned a first (or normal) priority. Selection circuitry of the control logic and thread selection circuitry 730, such as a multiplexer 785, selects the next thread ID in the execution (ready-to-run) queue(s) 745, which is used as in index into the thread memory 720 (the program count registers 726 and thread state registers 724), to select the instruction from the instruction cache 740 which is then provided to the execution pipeline 750 for execution. The execution pipeline then executes that instruction.

At completion of execution of the instruction, under the control of the control logic and thread selection circuitry 730 the same triplet of information (thread ID, valid state, and priority) can be returned to the execution (ready-to-run) queue(s) 745, for continued selection for round-robin execution, depending upon various conditions. For example, if the last instruction for a selected thread ID was a return instruction (indicating that thread execution was completed and a return data packet is being provided), the control logic and thread selection circuitry 730 will return the thread ID to the available pool of thread IDs in the thread ID pool registers 722, to be available for use by another, different thread. Also for example, the valid indicator could change, such as changing to a pause state (such as while the thread may be waiting for information to be returned from or written to memory 125 or waiting for another event), and in which case, the thread ID (now having a pause status) is not returned to the execution (ready-to-run) queue(s) 745 until the status changes back to valid.

Continuing with the former example, when the last instruction for a selected thread ID was a return instruction, the return information (thread ID and return arguments) is then pushed by the execution pipeline 750 to the network command queue 790, which is typically implemented as first-in, first out (FIFO). The thread ID is used as an index into the thread return registers 736 to obtain the return information, such as the transaction ID and the source (caller) address (or other identifier), and the packet encoder circuit then generates an outgoing return data packet (on the first interconnection network 150).

Continuing with the latter example, an instruction of a thread may be a load instruction, i.e., a read request to the memory 125, which is then pushed by the execution pipeline 750 to the network command queue 790. The packet encoder circuit then generates an outgoing data packet (on the first interconnection network 150) with the request to memory 125 (as either a read or a write request), including the size of the request and an assigned transaction ID (from the thread ID and transaction IDs registers 752, which is also used as an index into the network response memory 725), the address of the HTP 300 (as the return address of the requested information). When a packet is then received from the first interconnection network 150 and decoded, the transaction ID is used as an index into the network response memory 725, the thread ID of the thread which made the request is obtained, which also provides the location in the data cache 746 to write the data returned in the response, with the transaction ID then returned to the thread ID and transaction ID registers 752 to be reused, and the status of the corresponding thread ID is set again to valid and the thread ID is again pushed to the execution (ready-to-run) queue(s) 745, to resume execution.

A store request to memory 125 is executed similarly, with the outgoing packet also having the data to be written to memory 125, an assigned transaction ID, the source address of the HTP 300, and with the return packet being an acknowledgement with the transaction ID. The transaction ID is also then returned to the thread ID and transaction ID registers 752 to be reused, and the status of the corresponding thread ID is set again to valid and the thread ID is again pushed to the execution (ready-to-run) queue(s) 745, to resume execution.

FIG. 29 is a flow chart of a representative embodiment of a method for self-scheduling and thread control for an HTP 300, and provides a useful summary, with the HTP 300 having already been populated with instructions in the instruction cache 740 and a predetermined number of thread IDs in the thread identifier pool register 722. The method starts, step 798, upon reception of a work descriptor packet. The work descriptor packet is decoded, step 802, and the various registers of the thread memory 720 is populated with the information received in the work descriptor packet, initializing a context block, step 804. When a thread ID is available, step 806, a thread ID is assigned, step 808 (and if a thread ID is not available in step 806, the thread will wait until a thread ID becomes available, step 810). A valid status is initially assigned to the thread (along with any initially assigned priority, such as a first or second priority), step 812, and the thread ID is provided to the execution (ready-to-run) queue 745, step 814. A thread ID in the execution (ready-to-run) queue 745 is then selected for execution (at a predetermined frequency, discussed in greater detail below), step 816. Using the thread ID, the thread memory 720 is accessed, and a program count (or address) is obtained, step 818. The instruction corresponding to the program count (or address) is obtained from the instruction cache 740 and provided to the execution pipeline 750 for execution, step 820.

When the thread execution is complete, i.e., the instruction being executed is a return instruction, step 822, the thread ID is returned to the thread ID pool registers 722 for reuse by another thread, step 824, the thread memory 720 registers associated with that thread ID may be cleared (optionally), step 826, and the thread control may end for that thread, return step 834. When the thread execution is not complete in step 822, and when the thread state remains valid, step 828, the thread ID (with its valid state and priority) is returned to the execution (ready-to-run) queue 745, returning to step 814 for continued execution. When the thread state is no longer valid (i.e., the thread is paused) in step 828, with the paused status for that thread ID indicated in the thread memory 720, execution of that thread is suspended, step 830, until the status for that thread ID returns to valid, step 832, and the thread ID (with its valid state and priority) is returned to the execution (ready-to-run) queue 745, returning to step 814 for continued execution.

Similarly, the HTP 300 may generate calls, such as to create threads on local or remote compute elements, such as to create threads on other HTPs 300 or HTF circuits 200. Such calls are also created as outgoing data packets, and more specifically as outgoing work descriptor packets on the first interconnection network 150. For example, an instruction of a current thread being executed may be a "fiber create" instruction (stored as a possible instruction in the instruction cache 740), to spawn a plurality of threads for execution on the various compute resources. As discussed in greater detail below, such a fiber create instruction designates (using an address or virtual address (node identifier)) what computing resource(s) will execute the threads, and will also provide associated arguments. When the fiber create instruction is executed in the execution pipeline 750, the fiber create command is pushed into the network command queue 790, and the next instruction is executed in the execution pipeline 750. The command is pulled out of the network command queue 790, and the data packet encoder circuit 780 has the information needed to create and send a work descriptor packet to the specified destination HTF 200 or HTP 300.

If the created threads will have return arguments, then such an instruction will also allocate and reserve associated memory space, such as in the return argument buffers 734. If there is insufficient space in the return argument buffers 734, the instruction will be paused until return argument buffers 734 are available. The number of fibers or threads created is only limited by the amount of space to hold the response arguments. Created threads that do not have return arguments can avoid reserving return argument space, avoiding the possible pause state. This mechanism ensures that returns from completed threads always have a place to store their arguments. As the returns come back to the HTP 300 as data packets on the first interconnection network 150, those packets are decoded, as discussed above, with the return data stored in the associated, reserved space in the return argument buffers 734 of the thread memory 720, as indexed by the thread ID associated with the fiber create instruction. As many registers could be utilized for the return argument, the return argument buffers 734 can be provided as a link list of all the spawned threads or return argument buffers or registers allocated for that thread ID. Significantly, this mechanism can allow potentially thousands of threads to be created very quickly, effectively minimizing the time involved in a transition from a single thread execution to high thread count parallelism.

As discussed in greater detail below, various types of fiber join instructions are utilized to determine when all of the spawned threads have completed, and can be an instruction with or without waiting. A count of the number of spawned threads is maintained in the pending fiber return count registers 732, which count is decremented as thread returns are received by the HTP 300. A join operation can be carried out by copying the returns into the registers associated with the spawning thread ID. If the join instruction is a waiting instruction, it will stay in a paused state until the return arrives which designates that thread ID of the spawning thread. In the interim, other instructions are executed by the execution pipeline 750 until the pause state of the join instruction changes to a valid state and the join instruction is returned to the execution (ready-to-run) queue 745.

A thread return instruction may also be utilized as the instruction following the fiber create instruction, instead of a join instruction. When the count in the pending fiber return count registers 732 reaches zero, with the receipt of the last thread return data packet, a thread return instruction may also be executed, and indicates that the fiber create operation has been completed and all returns received, allowing the thread ID, the return argument buffers 734, and link list to be freed for other uses. In addition, it may also generate and transmit a work descriptor return packet (e.g., having result data) to the source which called the main thread (e.g., to the identifier or address of the source which generated the call).

The join all instruction does not require that arguments be returned, only acknowledgements which decrement the count in the pending fiber return count registers 732. When that count reaches zero, that thread is restarted, as the join all is now complete.

Communication between processing elements is required to facilitate processing of parallel algorithms. The representative embodiments provide an efficient means for threads of a set of processing resources to communicate, using various event messages, which may also include data (such as arguments or results). The event messaging allows any host processors 110 with hardware maintained cache coherency and any acceleration processors (such as the HTP 300) with software maintained cache coherency to efficiently participate in event messaging.

The event messaging supports both point to point and broadcast event messages. Each processing resource (HTP 300) can determine when a received event operation has completed and the processing resource should be informed. The event receive modes include simple (a single received event completes the operation), collective (a counter is used to determine when sufficient events have been received to complete the operation), and broadcast (an event received on a specific channel completes the event). Additionally, events can be sent with an optional 64-bit data value.

The HTP 300 has a set of event receive states, stored in the event state registers 744, that consists of a 2-bit receive mode, a 16-bit counter/channel number, and a 64-bit event data value. AN HTP 300 can have multiple sets of event receive states per thread context, where each set is indexed by an event number. Thus, an event can be targeted to a specific thread (thread ID) and event number. The sent event can be a point-to-point message with a single destination thread, or a broadcast message sent to all threads within a group of processing resources belonging to the same process. When such events are received, the paused or sleeping thread can be reactivated to resume processing.

This use of event state registers 744 is much more efficient than a standard Linux based host processor, which can send and receive events through an interface that allows the host processor 110 to periodically poll on completed receive events. Threads waiting on event messages can pause execution until the receive operation completes, i.e., the HTP 300 can pause execution of threads pending the completion of receive events, rather than waste resources by polling, allowing other threads to be executing during these intervals. Each HTP 300 also maintains a list of processing resources that should participate in receiving events to avoid process security issues.

A point-to-point message will specify an event number and the destination (e.g., node number, which HTP 300, which core, and which thread ID). On the receive side, an HTP 300 will have been configured or programmed with one or more event numbers held in the event state registers 744. If that HTP 300 receives an event message having that event number, it is triggered and transitions from a paused state to a valid state to resume execution, such as executing an event received instruction (e.g., EER, below). That instruction will then determine if the correct event number was received, and if so, write any associated 64-bit data into general-purpose registers 728, for use by another instruction. If the event received instruction executes and the correct event number was not received, it will be paused until that specific event number is received.

An event listen (EEL) instruction may also be utilized, with an event mask stored in the event received mask registers 742, indicating one or more events which will be used to trigger or wake up the thread. When an event message with any of those designated events arrives, the receiving HTP 300 will know which event number was triggered, e.g., what other process may have been completed, and will receive event data from those completed events. The event listen instruction may also have waiting and a no waiting variations, as discussed in greater detail below.

For event messaging in a collective mode, the receiving HTP 300 will collect (wait for) a set of receive events before triggering, setting a count in the event state registers 744 to the value required, which is decremented as the required event messages are received, and triggering once the count has been decremented to zero.

In a broadcast mode, a sender processing resource can transmit a message to any thread within the node. For example, a sending HTP 300 may transmit a series of point-to-point messages to each other HTP 300 within the node, and each receiving HTP 300 will then pass the message to each internal core 705. Each core control circuit 710 will go through its thread list to determine if it corresponds to an event number which it has been initialized to receive, and upon which channel that may have been designated on the first interconnection network 150.

This broadcast mode is especially useful when thousands of threads may be executing in parallel, in which the last thread to execute transmits a broadcast event message indicating completion. For example, a first count of all threads requiring completion may be maintained in the event state registers 744, while a second count of all threads which have executed may be maintained in memory 125. As each thread executes, it also performs a fetch and increment atomic operation on the second count, such as through an atomic operation of the memory 125 (and compares it to the first count), and sets its mode to receive a broadcast message by executing an EER instruction to wait until it receives a broadcast message. The last one to execute will see the fetched value of the second count as the required first count minus one, indicating that it is the last thread to execute, and therefore sends the broadcast message, which is a very fast and efficient way to indicate completion of significant parallel processing.

As mentioned above, while the HTP 300 may utilize standard RISC-V instructions, a significantly extended set of instructions are provided to take advantage of all the system 100 compute resources, as discussed in greater detail below. Threads created from the host processor 110 are typically referred to as master threads, and threads created from the HTP 300 are typically referred to as fibers or fiber threads, and all are executed identically on the destination HTP 300 and HTF 200, without going through the memory 125.

New Load Instructions:

The HTP 300 has a comparatively small number of read/write buffers per thread, also referred to as data cache registers 746. The buffers (data cache registers 746) temporarily store shared memory data for use by the owning thread. The data cache registers 746 are managed by a combination of hardware and software. Hardware automatically allocates buffers and evicts data when needed. Software, through the use of RISC-V instructions decides which data should be cached (read and write data), and when the data cache registers 746 should be invalidated (if clean) or written back to memory (if dirty). The RISC-V instruction set provides a FENCE instruction as well as acquire and release indicators on atomic instructions.

The standard RISC-V load instructions automatically use the read data cache registers 746. A standard load checks to see if the needed data is in an existing data cache register 746. If it is then the data is obtained from the data cache register 746 and the executing thread is able to continue execution without pausing. If the needed data is not in a data cache register 746, then the HTP 300 finds an available data cache register 746 (evicting data from a buffer needed), and reads 64-bytes from memory into the data cache register 746. The executing thread is paused until the memory read has completed and the load data is written into a RISC-V register.

Read buffering has two primary benefits: 1) larger accesses are more efficient for the memory controller 120, and 2) accesses to the buffer allow the executing thread to avoid stalling. However, there are situations when using the buffer causes problems. An example is a gather operation where accesses would typically cause thrashing of the data cache registers 746. For this reason, a set of special load instructions are provided to force a load instruction to check for a cache hit, but on a cache miss to issue a memory request for just the requested operand and not put the obtained data in a data cache register 746, and instead put the data into one of the general-purpose registers 728.

The new load instruction provides for "probabilistic" caching based upon anticipated frequency of access, for frequently used data versus sparsely or rarely used data. This is especially significant for use with sparse data sets, which if put into the data cache registers 746, would overwrite other data which will be needed again more frequently, effectively polluting the data cache registers 746. The new load instruction (NB or NC) allows frequently used data to remain in the data cache registers 746, and less frequently used (sparse) data which would be typically cached to be designated instead for non-cached storage in the general-purpose registers 728.

Instructions of this type have an NB suffix (non-buffered) (or equivalently, an NC suffice (non-cached):
LB.NB RA,40(SP).

The NB (NC) load instructions are expected to be used in runtime libraries written in assembly.

The following load instructions were added as 32 bit instructions, where Imm is the immediate field, RA is a register name, rs1 is a source index, rd is a destination index, and the bits in fields 14-12 and 6-0 specify the instruction, in Table 8.

TABLE 8

| 31 20 | 19 15 | 14 12 | 11 7 | 6 0 | |
|---|---|---|---|---|---|
| Imm[11:0] | rs1 | 000 | rd | 0000010 | LB.NB |
| Imm[11:0] | rs1 | 001 | rd | 0000010 | LH.NB |
| Imm[11:0] | rs1 | 010 | rd | 0000010 | LW.NB |
| Imm[11:0] | rs1 | 011 | rd | 0000010 | LD.NB |
| Imm[11:0] | rs1 | 100 | rd | 0000010 | LBU.NB |
| Imm[11:0] | rs1 | 101 | rd | 0000010 | LHU.NB |
| Imm[11:0] | rs1 | 110 | rd | 0000110 | LWU.NB |
| Imm[11:0] | rs1 | 010 | rd | 0000110 | FLW.NB |
| Imm[11:0] | rs1 | 011 | rd | 0000110 | FLD.NB |

Bandwidth to memory is often the major contributor to limiting an application's performance. The representative embodiments provides a means to inform the HTP 300 as to how large of a memory load request should be issued to memory 125. The representative embodiments reduce wasted memory and bandwidth of the first interconnection network 150 due to access memory data that is not used by the application.

A further optimization exists where an application knows the size of a data structure being accessed and can specify the amount of data to be loaded into a data cache register 746. As an example, if an algorithm uses a structure that is 16-bytes in size, and the structures are scattered in memory, then it would be optimal to issue 16-byte memory reads and place the data into a data cache register 746. The representative embodiments define a set of memory load instructions that provide both the size of the operand to be loaded into an HTP 300 register, and the size of the access to memory if the load misses the data cache register 746. The actual load to memory 125 may be smaller than the instruction specified size if the memory access would cross a cache line boundary. In this case, the access size is reduced to ensure that the response data is written to a single cache line of the data cache registers 746.

When the requested data would be less than a cache line, the load instruction may also request additional data that the HTP 300 is currently unneeded but likely to be needed in the future, which is worth obtaining at the same time (e.g., as a pre-fetch), optimizing the read size access to memory 125. This instruction can also override any reductions in access size which might have been utilized (as discussed in greater detail below with reference to FIG. 32) for bandwidth management.

The representative embodiments therefore minimize wasted bandwidth by only requesting memory data that is known to be needed. The result is an increase in application performance.

A set of load instructions have been defined that allow the amount of data to be accessed to be specified. The data is written into a buffer, and invalidated by an eviction, a FENCE, or an atomic with acquire specified. The load instructions provide hints as to how much additional data (in 8-byte increments) is to be accessed from memory and written to the memory buffer. The load will only access additional data to the next 64-byte boundary. A load instruction specifies the number of additional 8-byte elements to load using the operation suffix RB0-RB7:
LD.RB7 RA,40(SP)

The instruction formats are shown in Table 9. The number of 8-byte data elements to load into the buffer is specified as bits 6 and 4:3 of the 32-bit instruction. These load instructions can be used in assembly written routines, or ideally by a complier. It is expected that initially only hand written assembly will take advantage of these instructions.

TABLE 9

| 31 20 | 19 15 | 14 12 | 11 7 | 6 0 | |
|---|---|---|---|---|---|
| Imm[11:0] | rs1 | 000 | rd | x0xx010 | LB.RC1-7 |
| Imm[11:0] | rs1 | 001 | rd | x0xx010 | LH.RC1-7 |
| Imm[11:0] | rs1 | 010 | rd | x0xx010 | LW.RC1-7 |
| Imm[11:0] | rs1 | 011 | rd | x0xx010 | LD.RC1-7 |
| Imm[11:0] | rs1 | 100 | rd | x0xx010 | LBU.RC1-7 |
| Imm[11:0] | rs1 | 101 | rd | x0xx010 | LHU.RC1-7 |
| Imm[11:0] | rs1 | 110 | rd | x0xx010 | LWU.RC1-7 |
| Imm[11:0] | rs1 | 010 | rd | x0xx110 | FLW.RC1-7 |
| Imm[11:0] | rs1 | 011 | rd | x0xx110 | FLD.RC1-7 |

New Store Instructions

The HTP 300 has a small number of memory buffers that temporarily store shared memory data. The memory buffers allow multiple writes to memory to be consolidated into a smaller number of memory write requests. This has two benefits: 1) the fewer write requests is more efficient for the first interconnection network 150 and memory controllers 120, and 2) an HTP 300 suspends the thread that performs a memory store until the data is stored to either the HTP 300 memory buffer, or at the memory controller 120. Stores to the HTP 300 memory buffer are very quick and will typically not cause the thread to suspend execution. When a buffer is written to the memory controller 120, then the thread is suspended until a completion is received in order to ensure memory 125 consistency.

The standard RISC-V store instructions write data to the HTP 300 memory buffers. However, there are situations in which it is known that it is better to write the data directly to memory and not write to a memory buffer. One such situation is a scatter operation. A scatter operation would typically write just a single data value to the memory buffer. Writing to the buffer causes the buffers to thrash and other store data that would benefit from write coalescing is forced back to memory. A set of store instructions are defined for the HTP 300 to indicate that write buffering should not be used. These instructions write data directly to memory 125, causing the executing thread to be paused until the write completes.

The store no buffering instructions are expected to be used in hand assembled libraries and are indicated with a NB suffix:
ST.NB RA,40(SP)

The following store instructions were added as shown in Table 10.

TABLE 10

| 31 25 | 24 20 | 19 15 | 14 12 | 11 7 | 6 0 | |
|---|---|---|---|---|---|---|
| Imm[11:5] | rs2 | rs1 | 000 | Imm[4:0] | 0100010 | SB.NB |
| Imm[11:5] | rs2 | rs1 | 001 | Imm[4:0] | 0100010 | SH.NB |
| Imm[11:5] | rs2 | rs1 | 010 | Imm[4:0] | 0100010 | SW.NB |
| Imm[11:5] | rs2 | rs1 | 011 | Imm[4:0] | 0100010 | SD.NB |
| Imm[11:5] | rs2 | rs1 | 010 | Imm[4:0] | 0100110 | FSW.NB |
| Imm[11:5] | rs2 | rs1 | 011 | Imm[4:0] | 0100110 | FSD.NB |

Custom Atomic Store and Clear Lock (CL) Instructions:

Custom atomic operations set a lock on the provided address when the atomic operation is observed by the memory controller. The atomic operation is performed on an associated HTP 300. The HTP 300 should inform the memory controller when the lock should be cleared. This should be on the last store operation that the HTP 300 performs for the custom atomic operation (or on a fiber terminate instruction if no store is required). The HTP 300 indicates that the lock is to be cleared by executing a special store operation. The store and clear lock instructions.

The following sequence of instructions could be used to implement a custom atomic DCAS operation:

```
// a0 - atomic address
// a1 - 64-bit memory value of a0
// a2 - DCAS compare value 1
// a3 - DCAS compare value 2
// a4 - DCAS swap value 1
// a5 - DCAS swap value 2
atomic_dcas:
    bne    a1, a2, fail  // first 8-byte compare
    ld.nb  a6, 8(a0)     // load second 8-byte memory value -
                         should hit memory cache
    bne    a6, a3, fail  // second 8-byte compare
    sd     a4, 0(a0)     // store first 8-byte swap value to thread
                         store buffer
    sd.cl  a5, 8(a0)     // store second 8-byte value and clear
                         memory lock
    eft    x0            // AMO success response
fail:
    li     a1, 1
    eft.cl a1,(a0)       // AMO failure response (and clear
                         memory lock)
```

The store instructions that indicate the lock should be cleared are:

SB.CL RA,40(SP)
SH.CL RA,40(SP)
SW.CL RA,40(SP)
SD.CL RA,40(SP)
FSW.CL RA,40(SP)
FSD.CL RA,40(SP)

The format for these store instructions is shown Table 11.

TABLE 11

| 31 25 | 24 20 | 19 15 | 14 12 | 11 7 | 6 0 | |
|---|---|---|---|---|---|---|
| Imm[11:5] | rs2 | rs1 | 000 | Imm[4:0] | 0110010 | SB.CL |
| Imm[11:5] | rs2 | rs1 | 001 | Imm[4:0] | 0110010 | SH.CL |
| Imm[11:5] | rs2 | rs1 | 010 | Imm[4:0] | 0110010 | SW.CL |
| Imm[11:5] | rs2 | rs1 | 011 | Imm[4:0] | 0110010 | SD.CL |
| Imm[11:5] | rs2 | rs1 | 010 | Imm[4:0] | 0110110 | FSW.CL |
| Imm[11:5] | rs2 | rs1 | 011 | Imm[4:0] | 0110110 | FSD.CL |

```
atomic_float_add:
    fadd.d  a2, a1, a2   // a1 contains memory value, a2
                         contains value to be added in
    fsd.cl  a2, 0(a0)    // a0 contains memory address,
                         clear lock and terminate atomic
    eft                  // evict all line from buffer, terminate
                         atomic thread
```

Fiber Create Instructions:

The Fiber Create ("EFC") instruction initiates a thread on an HTP 300 or HTF 200.

EFC.HTP.A4

EFC.HTF.A4

This instruction performs a call on an HTP 300 (or HTF 200), begins execution at the address in register a0. (Optionally, a suffix .DA may be utilized. The instruction suffix DA indicates that the target HTP 300 is determined by the virtual address in register a1. If the DA suffix is not present, then an HTP 300 on the local system 100 is targeted.) The suffix A1, A1, A2 and A4 specifies the number of additional arguments to be passed to the HTP 300 or HTF 200. The argument count is limited to the values 0, 1, 2, or 4 (e.g., a packet should fit in 64B). The additional arguments are from register state (a2-a5).

It should be noted that if a return buffer is not available at the time the EFC instruction is executed, then the EFC instruction will wait until a return argument buffer is available to begin execution. Once the EFC instruction successfully creates a fiber, the thread continues at the instruction immediately following the EFC instruction.

It also should be noted that threads created by the host processor 110 are allowed to execute the EFC instruction and create fibers. Fibers created by an EFC instruction are not allowed to execute the EFC instruction and will force an exception, optionally. The format for these fiber create instructions is shown Table 12.

TABLE 12

| 31 25 | 24 20 | 19 15 | 14 12 | 11 7 | 6 0 | |
|---|---|---|---|---|---|---|
| 0000000 | 00000 | 00000 | ac | 00000 | 1110010 | EFC.HTP |
| 0001000 | 00000 | 00000 | ac | 00000 | 1110010 | EFC.HTP.DA |
| 0010000 | 00000 | 00000 | ac | 00000 | 1110010 | EFC.HTF |
| 0011000 | 00000 | 00000 | ac | 00000 | 1110010 | EFC.HTF.DA |

| ac Encoding | Suffix | Argument Count |
|---|---|---|
| 0 | No suffix | 0 |
| 1 | .A1 | 1 |
| 2 | .A2 | 2 |
| 3 | .A4 | 4 |

Thread Return Instructions:

The Thread Return (ETR) instruction passes arguments back to the parent thread that initiated the current thread (through a host processor 110 thread create or HTP 300 fiber create). Once the thread has completed the return instruction, the thread is terminated.

ETR.A2

This instruction performs a return to an HTP 300 or host processor 110. The ac suffix specifies the number of additional arguments to be passed to the HTP or host. Argument count can be the values 0, 1, 2 or 4. The arguments are from register state (a0-a3). The format for these thread return instructions is shown Table 13.

TABLE 13

| 31 25 | 24 20 | 19 15 | 14 12 | 11 7 | 6 0 | |
|---|---|---|---|---|---|---|
| 0100000 | 00000 | 00000 | ac | 00000 | 1110010 | EFR |

| ac Encoding | Suffix | Argument Count |
|---|---|---|
| 0 | No suffix | 0 |
| 1 | .A1 | 1 |
| 2 | .A2 | 2 |
| 3 | .A4 | 4 |

Fiber Join Instructions:

The Fiber Join (EFJ) instruction checks to see if a created fiber has returned. The instruction has two variants, join wait and non-wait. The wait variant will pause thread execution until a fiber has returned. The join non-wait does not pause thread execution but rather provides a success/failure status. For both variants, if the instruction is executed with no outstanding fiber returns then an exception is generated.

The arguments from the returning fiber (up to four) are written to registers a0-a3.

EFJ
EFJ.NW

The format for these fiber join instructions is shown Table 14.

TABLE 14

| 31 25 | 24 20 | 19 15 | 14 12 | 11 7 | 6 0 | |
|---|---|---|---|---|---|---|
| 0101000 | 00000 | 00000 | 000 | 00000 | 1110010 | EFJ |
| 0110000 | 00000 | 00000 | 000 | 00000 | 1110010 | EFJ.NW |

Fiber Join All Instructions:

The Fiber Join All instruction (EFJ.ALL) pends until all outstanding fibers have returned. The instruction can be called with zero or more pending fiber returns. No instruction status or exceptions are generated. Any returning arguments from the fiber returns are ignored.

EFJ.ALL

The format for these fiber join all instructions is shown Table 15.

TABLE 15

| 31 25 | 24 20 | 19 15 | 14 12 | 11 7 | 6 0 | |
|---|---|---|---|---|---|---|
| 0111000 | 00000 | 00000 | 000 | 00000 | 1110010 | EFJ.ALL |

Atomic Return Instructions:

The system 100 atomic return instruction (EAR) is used to complete the executing thread of a custom atomic operation and possibly provide a response back to the source that issued the custom atomic request.

The EAR instruction can send zero, one, or two 8-byte arguments value back to the issuing compute element. The number of arguments to send back is determine by the ac2 suffix (A1 or A2). No suffix means zero arguments, A1 implies a single 8-byte argument, and A2 implies two 8-byte arguments. The arguments, if needed, are obtained from X registers a1 and a2.

The EAR instruction is also able to clear the memory line lock associated with the atomic instruction. The EAR uses the value in the a0 register as the address to send the clear lock operation. The clear lock operation is issued if the instruction contains the suffix CL.

The following DCAS example sends a success or failure back to the requesting processor using the EAR instruction:

```
// a0 - atomic address
// a1 - 64-bit memory value of a0
// a2 - DCAS compare value 1
// a3 - DCAS compare value 2
// a4 - DCAS swap value 1
// a5 - DCAS swap value 2
atomic_dcas:
    bne     a1, a2, fail    // first 8-byte compare
    ld.nb   a6, 8(a0)       // load second 8-byte memory value - should
hit memory cache
```

-continued

|  | bne | a6, a3, fail | // second 8-byte compare |
|---|---|---|---|
|  | sd | a4, 0(a0) | // store first 8-byte swap value to thread store buffer |
|  | sd.cl | a5, 8(a0) | // store second 8-byte value and clear memory lock |
|  | li | a1, 0 |  |
|  | ear.a1 |  | // AMO success response |
| fail: |  |  |  |
|  | li | a1, 1 |  |
|  | ear.cl.a1 |  | // AMO failure response (and clear memory lock) |

The instruction has two variants that allow the EFT instruction to also clear the memory lock associated with the atomic operation. The format for the supported instructions is shown in Table 16.

TABLE 16

| 31 25 | 24 20 | 19 15 | 14 12 | 11 7 | 6 0 |  |
|---|---|---|---|---|---|---|
| 1010000 | 00000 | 00000 | ac2 | 00000 | 1110010 | EAR |
| 1011000 | 00000 | 00000 | ac2 | 00000 | 1110010 | EAR.CL |

| ac2 Encoding | Suffix | Argument Count |
|---|---|---|
| 0 | No suffix | 0 |
| 1 | .A1 | 1 |
| 2 | .A2 | 2 |

First and Second Priority Instructions:

The second (or low) priority instruction transitions the current thread having a first priority to a second, low priority. The instruction is generally used when a thread is polling on an event to occur (i.e. barrier).

ELP

The format for the ELP instruction is shown Table 17.

TABLE 17

| 31 25 | 24 20 | 19 15 | 14 12 | 11 7 | 6 0 |  |
|---|---|---|---|---|---|---|
| 1000000 | 00000 | 00000 | 000 | 00000 | 1110010 | ELP |

The first (or high) priority instruction transitions the current thread having a second (or low) priority to a first (or high or normal) priority. The instruction is generally used when a thread is polling and an event has occurred (i.e. barrier).

ENP

The format for the ENP instruction is shown Table 18.

TABLE 18

| 31 25 | 24 20 | 19 15 | 14 12 | 11 7 | 6 0 |  |
|---|---|---|---|---|---|---|
| 1001000 | 00000 | 00000 | 000 | 00000 | 1110010 | ENP |

Floating Point Atomic Memory Operations:

Floating point atomic memory operations are performed by the HTP 300 associated with a memory controller 120. The floating point operations performed are MIN, MAX and ADD, for both 32 and 64-bit data types.

The aq and rl bits in the instruction specify whether all write data is to be visible to other threads prior to issuing the atomic operation (aq), and whether all previously written data should be visible to this thread after the atomic completes (rl). Put another way, the aq bit forces all write buffers to be written back to memory, and the rl bit forces all read buffers to be invalidated. It should be noted that rs1 is an X register value, whereas rd and rs2 are F register values.

AMOFADD.S rd, rs2, (rs1)

AMOFMIN.S rd, rs2, (rs1)

AMOFMAX.S rd, rs2, (rs1)

AMOFADD.D rd, rs2, (rs1)

AMOFMIN.D rd, rs2, (rs1)

AMOFMAX.D rd, rs2, (rs1)

The format for these floating point atomic memory operation instructions is shown Table 19.

TABLE 19

| 31 27 | 26 | 25 | 24 20 | 19 15 | 14 12 | 11 7 | 6 0 |  |
|---|---|---|---|---|---|---|---|---|
| 00000 | aq | rl | rs2 | rs1 | 010 | rd | 0101110 | AMOFADD.S |
| 00001 | aq | rl | rs2 | rs1 | 010 | rd | 0101110 | AMOFMIN.S |
| 00010 | aq | rl | rs2 | rs1 | 010 | rd | 0101110 | AMOFMAX.S |
| 00000 | aq | rl | rs2 | rs1 | 011 | rd | 0101110 | AMOFADD.D |
| 00001 | aq | rl | rs2 | rs1 | 011 | rd | 0101110 | AMOFMIN.D |
| 00010 | aq | rl | rs2 | rs1 | 011 | rd | 0101110 | AMOFMAX.D |

Custom Atomic Memory Operations:

Custom atomic operations are performed by the HTP 300 associated with a memory controller 120. The operation is performed by executing RISC-V instructions. Up to 32 custom atomic operations can be available within the memory controllers 120 of a system 100. The custom atomics are a system wide resource, available to any process attached to the system 100.

The aq and rl bits in the instruction specify whether all write data is to be visible to other threads prior to issuing the atomic operation (rl), and whether all previously written data should be visible to this thread after the atomic completes (aq). Put another way, the rl bit forces all write buffers to be written back to memory, and the aq bit forces all read buffers to be invalidated.

The custom atomics use the a0 register to specify the memory address. The number of source arguments is provided by the suffix (A0, A1, A2 or A4), and are obtained from registers a1-a4. The number of result values returned from memory can be 0-2, and is defined by the custom memory operation. The result values are written to register a0-a1.

AMOCUST0.A4
The following custom atomic instructions are defined as shown in Table 20.

TABLE 20

| 31 27 | 26 | 25 | 24 20 | 19 15 | 14 12 | 11 7 | 6 0 | |
|---|---|---|---|---|---|---|---|---|
| 10000 | aq | rl | 00000 | 00000 | ac | 00000 | 0101110 | AMOCUST0 |
| 10001 | aq | rl | 00000 | 00000 | ac | 00000 | 0101110 | AMOCUST1 |
| 10010 | aq | rl | 00000 | 00000 | ac | 00000 | 0101110 | AMOCUST2 |
| 10011 | aq | rl | 00000 | 00000 | ac | 00000 | 0101110 | AMOCUST3 |
| 10100 | aq | rl | 00000 | 00000 | ac | 00000 | 0101110 | AMOCUST4 |
| 10101 | aq | rl | 00000 | 00000 | ac | 00000 | 0101110 | AMOCUST5 |
| 10110 | aq | rl | 00000 | 00000 | ac | 00000 | 0101110 | AMOCUST6 |
| 10111 | aq | rl | 00000 | 00000 | ac | 00000 | 0101110 | AMOCUST7 |

The ac field is used to specify the number of arguments (0, 1, 2, or 4). The following Table 21 shows the encodings.

TABLE 21

| ac Encoding | Suffix | Argument Count |
|---|---|---|
| 0 | No suffix | 0 |
| 1 | .A1 | 1 |
| 2 | .A2 | 2 |
| 3 | .A4 | 4 |

There are eight custom atomic instructions defined, with 4 argument count variants each, resulting a total of 32 possible custom atomic operators.

Event Management:

The system 100 is an event driven architecture. Each thread has a set of events that is able to monitor, utilizing the event received mask registers 742 and the event state registers 744. Event 0 is reserved for a return from a created fiber (HTP 300 or HTF 200). The remainder of the events are available for event signaling, either thread-to-thread, broadcast, or collection. Thread-to-thread allows a thread to send an event to one specific destination thread on the same or a different node. Broadcast allows a thread to send a named event to a subset of threads on its node. The receiving thread should specify which named broadcast event it is expecting. Collection refers to the ability to specify the number of events that are to be received prior to the event becoming active.

An event triggered bit can be cleared (using the EEC instruction), and all events can be listened for (using the EEL instruction). The listen operation can either pause the thread until an event has been triggered, or in non-waiting mode (NW) allowing a thread to periodically poll while other execution proceeds.

A thread is able to send an event to a specific thread using the event send instruction (EES), or broadcast an event to all threads within a node using the event broadcast instruction (EEB). Broadcasted events are named events where the sending thread specifies the event name (a 16-bit identifier), and the receiving threads filter received broadcast events for a pre-specified event identifier. Once received, the event should be explicitly cleared (EEC) to avoid receiving the same event again. It should be noted that all event triggered bits are clear when a thread starts execution.

Event Mode Instructions:

The event mode (EEM) instruction sets the operation mode for an event. Event 0 is reserved for thread return events, the remainder of the events can be in one of three receive modes: simple, broadcast, or collection.

In simple mode, a received event immediately causes the triggered bit to be set and increments the received message count by one. Each newly received event causes the received event count to be incremented. The receive event instruction (EER) causes the received event count to be decremented by one. The event triggered bit is cleared when the count transitions back to zero.

In broadcast mode, a received event's channel is compared to the event number's broadcast channel If the channels match, then the event triggered bit is set. The EER instruction causes the triggered bit to be cleared.

In collection mode, received event causes the event trigger count to be decremented by one. When the count reaches zero, then the event triggered bit is set. The EER instruction causes the triggered bit to be cleared.

The EEM instruction prepares the event number for the chosen mode of operation. In simple mode, the 16-bit event counter is set to zero. For broadcast mode, the 16-bit event channel number is set to the value specified by the EEM instruction. For collection mode, the 16-bit event counter is set to the value specified by the EEM instruction. Each of the three modes use the same 16-bit value differently.

| EEM.BM | rs1, rs2 | ; rs1=event #, rs2=broadcast channel |
| EEM.CM | rs1, rs2 | ; rs1=event #, rs2=collection count |
| EEM.SM | rs1 | ; rs1=event # |

The format for the event mode instruction is shown Table 22.

TABLE 22

| 31 25 | 24 20 | 19 15 | 14 12 | 11 7 | 6 0 | |
|---|---|---|---|---|---|---|
| 0000100 | rs2 | rs1 | 000 | 00000 | 1110010 | EEM.BM |
| 0001100 | rs2 | rs1 | 000 | 00000 | 1110010 | EEM.CM |
| 0010100 | 00000 | rs1 | 000 | 00000 | 1110010 | EEM.SM |

Event Destination Instruction:

The event destination (EED) instruction provides an identifier for an event within the executing thread. The identifier is unique across all executing threads within a node. The identifier can be used with the event send instruction to send an event to the thread using the EES instruction. The identifier is an opaque value that contains the information needed to send the event from a source thread to a specific destination thread.

The identifier can also be used to obtain a unique value for sending a broadcast event. The identifier includes space for an event number. The input register rs1 specifies the event number to encode within the destination thread identifier. The output rd register contains the identifier after the instruction executes.

EED rd, rs1

The format for the event destination instruction is shown Table 23.

TABLE 23

| 31 25 | 24 20 | 19 15 | 14 12 | 11 7 | 6 0 | |
|---|---|---|---|---|---|---|
| 0011100 | 00000 | rs1 | 000 | rd | 1110010 | EED |

The event destination instruction can also be utilized by a process to obtain its own address, which can then be used in other broadcast messages, for example, to enable that process to receive other event messages as a destination, e.g., for receiving return messages when the process is a master thread.

Event Send Instructions:

The event send (EES) instruction sends an event to a specific thread. Register rs1 provides the destination thread and event number. Register rs2 provides the optional 8-byte event data.

EES rs1
EES.A1rs1, rs2

The rs2 register provides the target HTP 300 for the event send operation. Register rs1 provides the event number to be sent. Legal values for rs1 are 2-7. The format for the event send instruction is shown Table 24.

TABLE 24

| 31 25 | 24 20 | 19 15 | 14 12 | 11 7 | 6 0 | |
|---|---|---|---|---|---|---|
| 0100100 | 00000 | rs1 | 000 | 00000 | 1110010 | EES |
| 0101100 | rs2 | rs1 | 000 | 00000 | 1110010 | EES.A1 |

Event Broadcast Instructions:

The event broadcast (EEB) instruction broadcasts an event to all threads within the node. Register rs1 provides the broadcast channel to be sent (0-65535). Register rs2 provides optional 8-byte event data.

EEB rs1
EEB.A1 rs1, rs2

The format for the event broadcast instruction is shown Table 25.

TABLE 25

| 31 25 | 24 20 | 19 15 | 14 12 | 11 7 | 6 0 | |
|---|---|---|---|---|---|---|
| 0110100 | 00000 | rs1 | 000 | 00000 | 1110010 | EEB |
| 0111100 | rs2 | rs1 | 000 | 00000 | 1110010 | EEB.A1 |

Event Listen Instructions:

The event listen (EEL) instruction allows a thread to monitor the status of received events. The instruction can operate in one of two modes: waiting and non-waiting. The waiting mode will pause the thread until an event is received, the non-waiting mode provides the received events at the time the instruction is executed.

EEL rd, rs1
EEL.NW rd, rs1

Register rs1 provides a mask of available events as the output of the listen operation. The non-waiting mode will return a value of zero in rs1 if no events are available. The format for the event listen instructions is shown Table 26.

TABLE 26

| 31 25 | 24 20 | 19 15 | 14 12 | 11 7 | 6 0 | |
|---|---|---|---|---|---|---|
| 1000100 | 00000 | rs1 | 000 | rd | 1110010 | EEL |
| 1001100 | 00000 | rs1 | 000 | rd | 1110010 | EEL.NW |

Event Receive Instructions:

The event receive (EER) instruction is used to receive an event. Receiving an event includes acknowledging that an event was observed, and receiving the optional 8-byte event data. Register rs1 provides the event number. Register rd contains optional 8-byte event data.

EER rs1
EER.A1 rd, rs1

The format for the event receive instructions is shown Table 27.

TABLE 27

| 31 25 | 24 20 | 19 15 | 14 12 | 11 7 | 6 0 | |
|---|---|---|---|---|---|---|
| 1010100 | 00000 | rs1 | 000 | 00000 | 1110010 | EER |
| 1011100 | 00000 | rs1 | 000 | rd | 1110010 | EER.A1 |

HTP 300 instruction formats are also provided for call, fork or transfer instructions, previously discussed.

Send Call Instruction:

The Thread Send Call instruction initiates a thread on an HTP 300 or HTF 200 and pauses the current thread until the remote thread performs a return operation:

HTSENDCALL.HTP.DA Ra, Rb, Args.

The Thread Send Call instruction performs a call on an HTP 300, begins execution at the address in register Ra. The instruction suffix DA indicates that the target HTP 300 is determined by the virtual address in register Rb. If the DA suffix is not present, then an HTP 300 on the local node is targeted. The constant integer value Args identifies the number of additional arguments to be passed to the remote HTP 300. Args is limited to the values 0 through 4 (e.g., a packet should fit in 64B). The additional arguments are from register state. It should be noted that if a return buffer is not available at the time the HTSENDCALL instruction is executed, then the HTSENDCALL instruction will wait until a buffer is available to begin execution. Once the HTSENDCALL has completed, the thread is paused until a return is received. When the return is received, the thread is resumed at the instruction immediately following the HTSENDCALL instruction. The instruction sends a first interconnection network 150 packet containing the following values, shown in Table 28:

TABLE 28

| FIELD | SIZE | DESCRIPTION |
| --- | --- | --- |
| PROCESS ID | 32 b | Process ID of process |
| RETURN NODE ID | 16 b | Return packet destination node |
| RETURN COMPONENT ID | 10 b | Return packet fabric endpoint |
| RETURN CONTEXT ID | 8 b | Context ID of source HTP thread |
| INSTRUCTION ADDRESS | 64 b | Target HTP instruction address |
| OPTIONAL ARGUMENTS 1-4 | 0-256 b | Optional Arguments 1-4 |

Thread Fork Instruction:

The Thread Fork instruction initiates a thread on an HTP 300 or HTF 200 and continues the current thread:
HTSENDFORK.HTF.DA Ra, Rb, Args.
The Thread Fork instruction performs a call on an HTF 200 (or HTP 300), begins execution at the address in register Ra. The instruction suffix DA indicates that the target HTF 200 is determined by the Node ID within the virtual address in register Rb. If the DA suffix is not present, then an HTF 200 on the local node is targeted. The constant integer value Args identifies the number of additional arguments to be passed to the remote HTF. Args is limited to the values 0 through 4 (e.g., a packet should fit in 64B). The additional arguments are from register state. It should be noted that if a return buffer is not available at the time the HTSENDFORK instruction is executed, then the HTSENDFORK instruction will wait until a buffer is available to begin execution. Once the HTSENDFORK has completed, the thread continues execution at the instruction immediately following the HTSENDFORK instruction. The Thread Fork instruction sends a first interconnection network 150 packet containing the following values, shown in Table 29:

TABLE 29

| FIELD | SIZE | DESCRIPTION |
| --- | --- | --- |
| PROCESS ID | 32 b | Process ID of process |
| RETURN NODE ID | 16 b | Return packet destination node |
| RETURN COMPONENT ID | 10 b | Return packet fabric endpoint |
| RETURN CONTEXT ID | 8 b | Context ID of source HTP 300 thread |
| KERNEL ADDRESS | 60 b | Target HTF 200 kernel address (bits 3-0 are implicitly zero) |
| ENTRY INSTRUCTION | 4 b | HTF entry instruction |
| OPTIONAL ARGUMENTS 1-4 | 0-256 b | Optional Arguments 1-4 |

Thread Transfer Instruction:

The Thread Transfer instruction initiates a thread on an HTP 300 or HTF 200 and terminates the current thread:
HTSENDXFER.HTP.DA Ra, Rb, Args.
The Thread Transfer instruction performs a transfer to an HTP 300 and begins execution at the address in register Ra. The instruction suffix DA indicates that the target HTP 300 is determined by the virtual address in register Rb. If the DA suffix is not present, then an HTP 300 on the local node is targeted. The constant integer value Args identifies the number of additional arguments to be passed to the remote HTP 300. Args is limited to the values 0 through 4 (packet must fit in 64B). The additional arguments are from register state. Once the HTSENDXFER has completed, the thread is terminated. The Thread Transfer instruction sends a first interconnection network 150 packet containing the following values shown in Table 30:

TABLE 30

| FIELD | SIZE | DESCRIPTION |
| --- | --- | --- |
| PROCESS ID | 32 b | Process ID of process |
| RETURN NODE ID | 16 b | Return packet destination node |
| RETURN COMPONENT ID | 10 b | Return packet fabric endpoint |
| RETURN CONTEXT ID | 8 b | Context ID of source HTP thread |
| INSTRUCTION ADDRESS | 64 b | Target HTP instruction address |
| OPTIONAL ARGUMENTS 1-4 | 0-256 b | Optional Arguments 1-4 |

Receive Return Instruction:

The thread receive return instruction HTRECVRTN.WT checks to see if a return for the thread has been received. If the WT suffix is present, then the receive return instruction will wait until a return has been received. Otherwise a testable condition code is set to indicate the status of the instruction. When a return is received, the return's arguments are loaded into registers. The instruction immediately following the HTRECVRTN instruction is executed after the return instruction completes.

Figure 30:
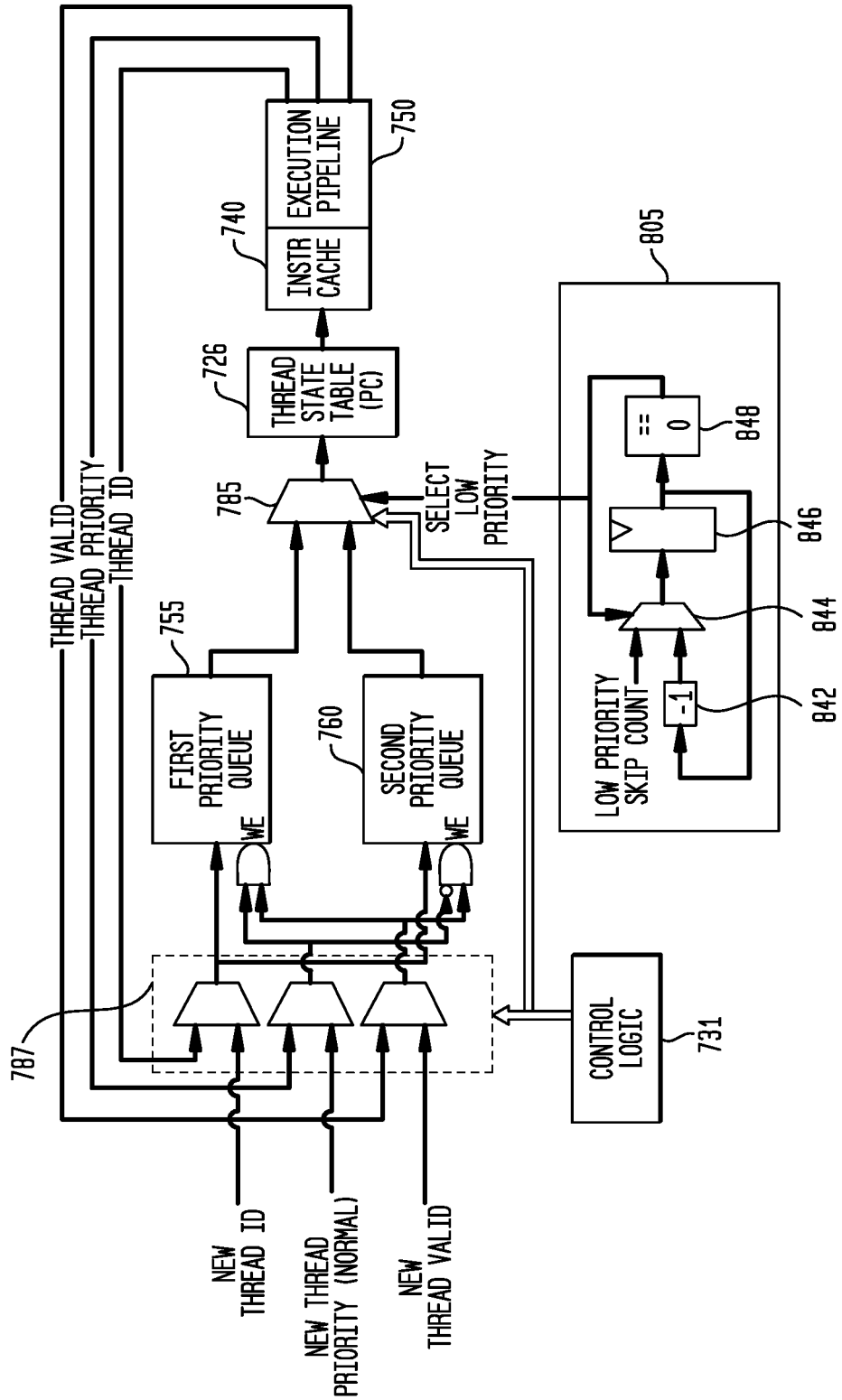
FIG. 30 is a detailed block diagram of a representative embodiment of a thread selection control circuitry of the control logic and thread selection circuitry of the hybrid threading processor.

FIG. 30 is a detailed block diagram of a representative embodiment of a thread selection control circuitry 805 of the control logic and thread selection circuitry 730 of the HTP 300. As mentioned above, a second or low priority queue 760 is provided, and thread IDs are selected from the first (or high) priority queue 755 or the second or low priority queue 760 using a thread selection multiplexer 785, under the control of the thread selection control circuitry 805. Threads in the second priority queue 760 are pulled from the queue and executed at a lower rate than threads in the first priority queue 760.

As mentioned above, a pair of instructions, ENP and ELP, are used to transition a thread from a first priority to second priority (ELP) and the second priority to the first priority (ENP).

Threads in a parallel application often must wait for other threads to complete priority to resuming execution (i.e., a barrier operation). The wait operation is completed through communication between the threads. This communication can be supported by an event that wakes a paused thread, or by the waiting thread polling on a memory location. When a thread is polling, it is wasting processing resources that could be used by the thread that must finish its work to allow all threads to resume productive execution. The second or low priority queue 760 allows the waiting threads to enter a low priority mode that will reduce the overhead of the polling threads. This serves to reduce the thread execution overhead of polling threads such that threads that must complete productive work consume the majority of the available processing resources.

A configuration register is used to determine the number of high priority threads that are to be run for each low priority thread, illustrated in FIG. 30 as the low priority skip count, provided to the thread selection control circuitry 805, which selects a thread from the second priority queue 760 at predetermined intervals. As illustrated, thread selection control circuitry 805 decrements the skip count (register 842, multiplexer 844, and adder 846) until it is equal to zero (logic block 848), at which point the selection input of the thread selection multiplexer 785 toggles to select a thread from the second or low priority queue 760.

Figure 32:
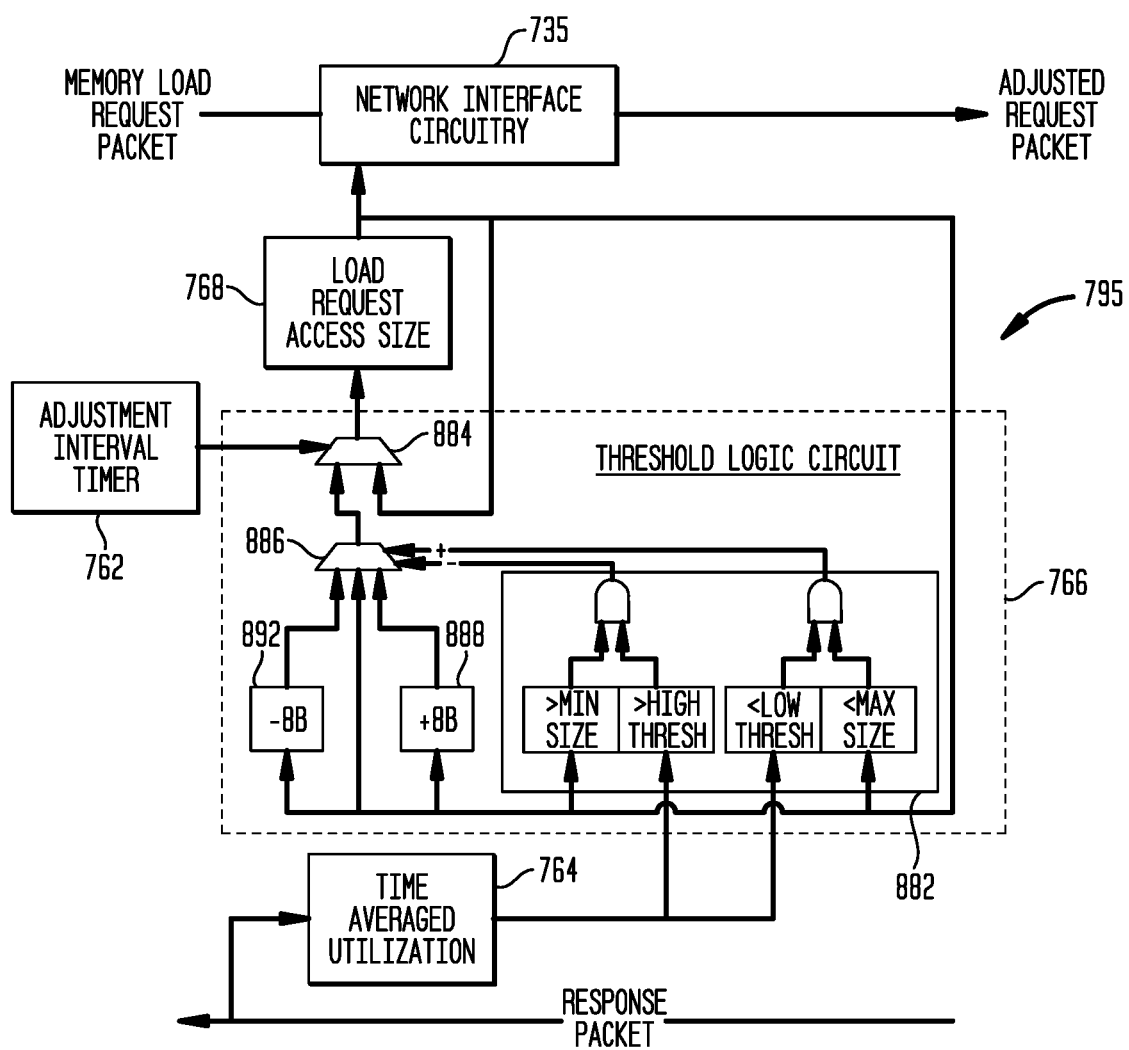
FIG. 32 is a detailed block diagram of a representative embodiment of data path control circuitry of a hybrid threading processor.

FIG. 32 is a detailed block diagram of a representative embodiment of data path control circuitry 795 of an HTP 300. As mentioned above, one or more of the HTPs 300 may also include data path control circuitry 795, which is utilized to control access sizes (e.g., memory 125 load requests) over the first interconnection network 150 to manage potential congestion, providing adaptive bandwidth.

Application performance is often limited by the bandwidth available to a processor from memory. The performance limitation can be mitigated by ensuring that only data that is needed by an application is brought into the HTP 300. The data path control circuitry 795 automatically (i.e., without user intervention) reduces the size of requests to main memory 125 to reduce the utilization of the processor interface and memory 125 subsystem.

As mentioned above, the compute resources of the system 100 may have many applications using sparse data sets, with frequent accesses to small pieces of data distributed throughout the data set. As a result, if a considerable amount of data is accessed, much of it may be unused, wasting bandwidth. For example, a cache line may be 64 bytes, but not all of it will be utilized. At other times, it will be beneficial to use all available bandwidth, such as for efficient power usage. The data path control circuitry 795 provides for dynamically adaptive bandwidth over the first interconnection network 150, adjusting the size of the data path load to optimize performance of any given application, such as adjusting the data path load down to 8-32 bytes (as examples) based upon the utilization of the receiving (e.g., response) channel of the first interconnection network 150 back to the HTP 300.

The data path control circuitry 795 monitors the utilization level on the first interconnection network 150 and reduces the size of memory 125 load (i.e., read) requests from the network interface circuitry 735 as the utilization increases. In a representative embodiment, the data path control circuitry 795 performs a time-averaged weighting (time-averaged utilization block 764) of the utilization level of the response channel of the first interconnection network 150. If after a fixed period of time (adjustment interval timer 762) the utilization is above a threshold (and the load request size is greater than the minimum), using threshold logic circuit 766 (having a plurality of comparators 882 and selection multiplexers 884, 886), then the size of load requests is reduced by the load request access size logic circuit 768 (generally by a power of 2 (e.g., 8 bytes) from the threshold logic circuit 766, using minus increment 892), such that: either (a) fewer data packets 162 will be included in the train of data packets 162, allowing that bandwidth to be utilized for routing of data packets to another location or for another process; or (b) memory 125 utilization is more efficient (e.g., 64 bytes are not requested when only 16 bytes will be utilized). If after the fixed period of time the utilization is below a threshold (and the load request size is less than the maximum), using threshold logic circuit 766, then the size of the load request is increased by the load request access size logic circuit 368, generally also by a power of 2 (e.g., 8 bytes), using plus increment 888. The minimum and maximum values for the size of a load request can be user configured, however, the minimum size generally is the size of the issuing load instruction (e.g., the maximum operand size of the HTP 300, such as 8 bytes) and the maximum size is the cache line size (e.g., 32 or 64 bytes). In an alternative embodiment, the data path control circuitry 795 can be located at the memory controller 120, adapting to the bandwidth pressure from multiple HTPs 300.

Figure 33:
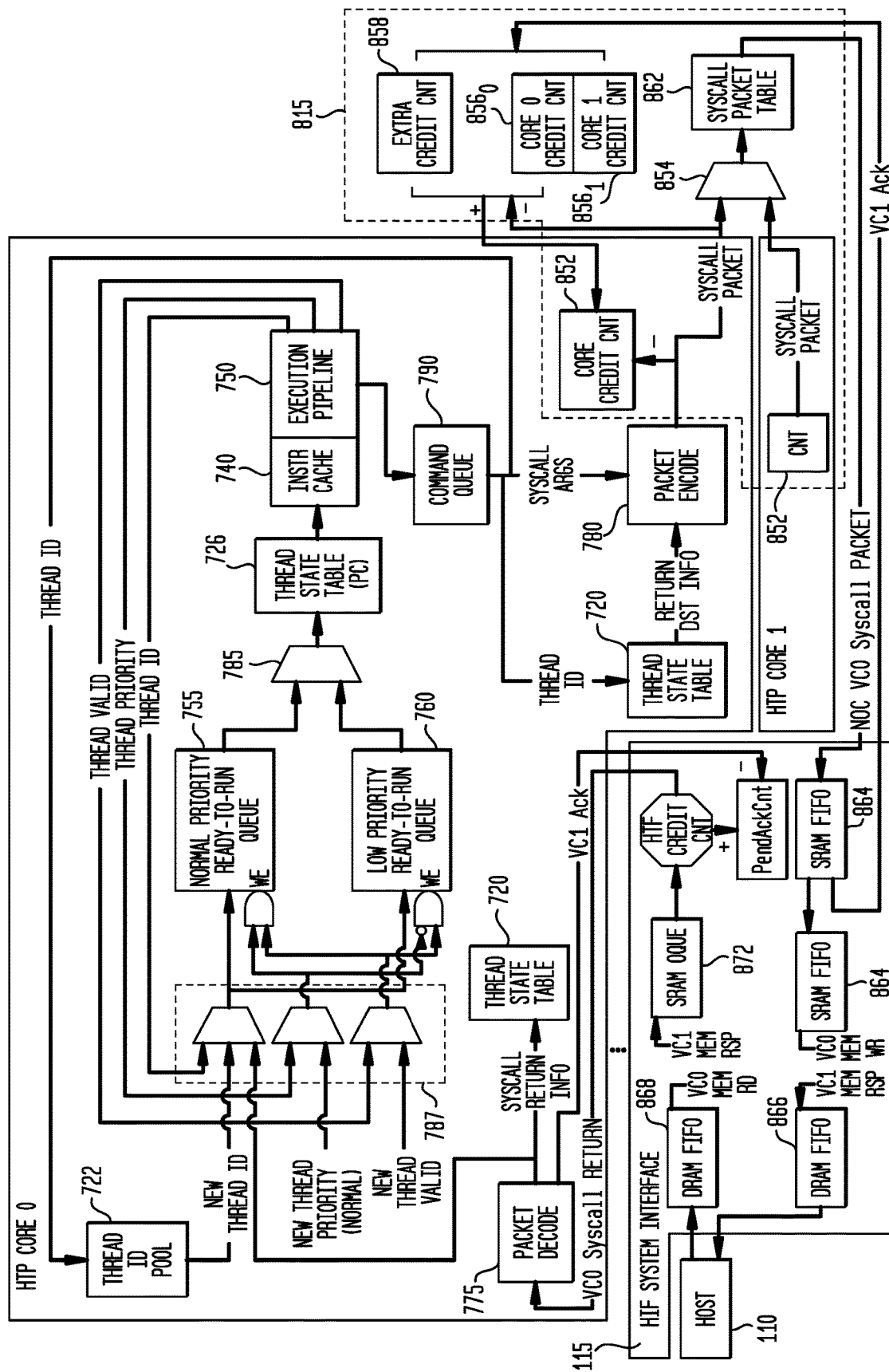
FIG. 33 is a detailed block diagram of a representative embodiment of system call circuitry of a hybrid threading processor and host interface circuitry.

FIG. 33 is a detailed block diagram of a representative embodiment of system call circuitry 815 of an HTP 300 and host interface circuitry 115. Representative system 100 embodiments allows a user mode only compute element, such as an HTP 300, to perform system calls, breakpoints and other privileged operations without running an operating system, such as to open a file, print, etc. To do so, any of these system operations are originated by an HTP 300 executing a user mode instruction. The processor's instruction execution identifies that the processor must forward the request to a host processor 110 for execution. The system request from the HTP 300 has the form of system call work descriptor packet sent to a host processor 110, and in response, the HTP 300 can receive system call return work descriptor packets.

The system call work descriptor packet, assembled and transmitted by the packet encoder 780, includes a system call identifier (e.g., a thread ID, the core 705 number, a virtual address indicated by the program counter, the system call arguments or parameters (which are typically stored in the general-purpose registers 728), and return information. The packet is sent to a host interface 115 (SRAM FIFOs 864) that writes to and queues the system call work descriptor packets in a main memory queue, such as the illustrated DRAM FIFO 866 in host processor 110 main memory, increments a write pointer, and the host interface 115 further then sends an interrupt to the host processor 110 for the host processor 110 to poll for a system call work descriptor packet in memory. The host processor's operating system accesses the queue (DRAM FIFO 866) entries, performs the requested operation and places return work descriptor data in a main memory queue (DRAM FIFO 868), and also may signal the host interface 115. The host interface 115 monitors the state of the return queue (DRAM FIFO 868) and when an entry exists, moves the data into an output queue (SRAM output queue 872) and formats a return work descriptor packet with the work descriptor data provided and sends the return work descriptor packet to the HTP 300 which originated the system call packet.

The packet decoder 775 of the HTP 300 receives the return work descriptor packet and places the returned arguments in the general-purpose registers 728 as if the local processor (HTP 300) performed the operation itself. This transparent execution as viewed by the application running on the user mode HTP 300 results in the ability to use the same programming environment and runtime libraries that are used when a processor has a local operating system, and is highly useful for a wide variety of situations, such as program debugging, using an inserted break point.

The host interface 115, however, typically has limited FIFO space, which could be problematic when multiple HTPs 300 are utilized, each having a large number of cores (e.g., 96), each of which may be running a large number of threads (e.g., 32/core). To avoid adding significant memory to the host interface 115, the overall number of system calls which can be submitted is limited, using a system call credit mechanism for each HTP 300 and each processor core 705 within an HTP 300.

Each processor core 705 includes a first register 852, as part of the system call circuitry 815, which maintains a first credit count. The system call circuitry 815, provided per HTP 300, includes a second register 858, which includes a second credit count, as a pool of available credits. When a system call work descriptor packet is generated, if there are sufficient credits available in the first register 852, the system call work descriptor packet may be transmitted, and if not, the system call work descriptor packet is queued in the system call work descriptor packet table 862, potentially with other system call work descriptor packet from other processor cores 705 of the given HTP 300 (via multiplexer 854). If there are sufficient credits available in the second register 858, providing an extra pool of credits for bursting of system calls and shared among all of the processor cores 705 of the HTP 300, the next system call work descriptor packet may be transmitted, and otherwise is held in the table.

As those system call work descriptor packets are processed by the host interface 115 and read out of the FIFO 864, the host interface 115 generates an acknowledgement back to the system call circuitry 815, which increments the credit counts per core in registers 856 (illustrated as registers 856$_0$ and 856$_1$), which can in turn increment the first credit count in the first register 852, for each processor core 705.

Alternatively, registers 856 may be utilized equivalently to a first register 852, without requiring the separate first register 852 per core, and instead maintaining the first count in the registers 856, again per core 705. As another alternative, all of the system call work descriptor packets may be queued in the system call work descriptor packet table 862, on a per core 705 basis, and transmitted when that core has sufficient first credit counts in its corresponding register 856 or sufficient credits available in the second register 858.

A mechanism is also provided for thread state monitoring, to collect the state of the set of threads running on an HTP 300 in hardware, which allows a programmer to have the visibility into the workings of an application. With this feature, a host processor 110 can periodically access and store the information for later use in generating user profiling reports, for example. With the provided visibility, a programmer can make changes to the application to improve its performance.

All thread state changes can be monitored and statistics kept on the amount of time in each state. The processor (110 or 300) that is collecting the statistics provides a means for a separate, second processor (110 or 300) to access and store the data. The data is collected as the application is running such that a report can be provided to an application analyst that shows the amount of time in each state reported on a periodic basis, which provides detailed visibility on a running application for later use by an application analyst.

In accordance with the representative embodiments, which may be implemented in hardware or software, all of the information pertaining to a thread is stored in the various registers of the thread memory 720, and can be copied and saved in another location on a regular basis. A counter can be utilized to capture the amount of time any given thread spends in a selected state, e.g., a paused state. For example, the host processor 110 can log or capture the current state of all threads and thread counters (amount of time spent in a state), or the differences (delta) between states and counts over time, and write it to a file or otherwise save it in a memory. Also for example, a program or thread may be a barrier, in which all threads have to complete before anything else can start, and it is helpful to monitor which threads are in what state as they proceed through various barriers or as they change state. The illustrated code (below) is an example of simulator code which would execute as hardware or be translatable to hardware:

```
InStateCount[N] - 6b
InStateTimeStamp[N] - 64b
InStateTotalTime[N] - 64b enum ESimR5State { eR5Idle=0, eR5Low=1, eR5Normal=2, eR5PausedMem=3, eR5PausedEar=4,
    eR5PausedEel=5, eR5PausedEer=6, eR5PausedEtr=7, eR5PausedEfj=8,
    eR5PausedEfjAll=9, eR5PausedSys=10, eR5PausedEes=11
};
// set state and collect statistics
void setR5CtxState(SimR5HwCtx * pR5Ctx, SimR5HwCtx::ESimR5State state) {
    m_coreStats.m_coreInStateTotalTime[pR5Ctx->m_r5State] +=
        (getSimTime( ) - m_coreStats.m_coreInStateTime[pR5Ctx->m_r5State]) *
        m_coreStats.m_coreInStateCount[pR5Ctx->m_r5State];
    m_coreStats.m_coreInStateTime[pR5Ctx->m_r5State] = getSimTime ( );
    m_coreStats.m_coreInStateTotalTime[state] +=
        (getSimTime ( ) - m_coreStats.m_coreInstateTime[state]) *
        m_coreStats.m_coreInStateCount[state];
    m_coreStats.m_coreInStateTime[state] = getSimTime ( );
    m_coreStats.m_coreInStateCount[pR5Ctx->m_r5State] -= 1;
    m_coreStats.m_coreInStateCount[state] += 1;
    pR5Ctx->m_r5State = state;
}
void incrementalStateStats(double incStateStats[HTP_R5_STATE_CNT]) {
    for (int state = 0; state < HTP_R5_STATE_CNT; state += 1) {
        m_coreStats.m_coreInStateTotalTime[state] +=
            (getSimTime ( ) - m_coreStats.m_coreInStateTime[state]) *
            m_coreStats.m_coreInStateCount[state];
        m_coreStats.m_coreInStateTime[state] = getSimTime ( );
        incStateStats[state] += m_coreStats.m_coreInStateTotalTime[state] -
            m_coreStats.m_coreInStatePrevTime[state];
        m_coreStats.m_coreInStatePrevTime[state] =
    m_coreStats.m_coreInStateTotalTime[state];
    }
}
```

V. System Memory and Virtual Addressing:

The system 100 architecture provides a partitioned global address space across all nodes within the system 100. Each node has a portion of the shared physical system 100 memory. The physical memory of each node is partitioned into local private memory and global shared distributed memory.

The local, private memory 125 of a node is accessible by all compute elements within that node. The compute elements within a node participate in a hardware-based cache coherency protocol. The host processor 110 and HTPs 300 each maintain small data caches to accelerate references to private memory. The HTF 200 does not have a private memory cache (other than memory 325 and configuration memory 160), but rather relies on the memory subsystem cache to hold frequently accessed values. HTF 200 read and write requests are consistent at time of access. The directory based cache coherency mechanism ensures that an HTF 200 read access obtains the most recently written value of memory and ensures that an HTF 200 write flushes dirty cache and invalidates shared processor caches prior to writing the HTF 200 value to memory.

The distributed, shared memory of system 100 is accessible by all compute elements within all nodes of the system 100, such as HTFs 200 and HTPs 300. The system 100 processing elements do not have caches for shared memory, but rather may have read/write buffers with software controlled invalidation/flushing to minimize accesses to the same memory line. The RISC-V ISA provides fence instructions that can be used to indicate a memory buffer invalidate/flush is needed. Similarly, the HTF 200 supports write pause operations to indicate that all write operations to memory have completed. These write pause operations can be used to flush the read/write buffers.

An external host processor 110 will have its own system memory. An application's node private virtual address space can include both host processor system memory and system 100 node private memory. An external host processor 110 access to system memory can be kept consistent through the host processor's cache coherency protocol. External host processor 110 access to system 100 node private memory across a PCIe or other communication interface 130 can be kept consistent by not allowing the host processor 110 to cache the data. Other host to system 100 node interfaces (i.e. CCIX or OpenCAPI) may allow the host processor to cache the accessed data. Access to host processor system memory by system 100 node compute elements across a PCIe interface can be kept consistent by not allowing the compute elements to cache the data. Other host to system 100 node interfaces (i.e. CCIX or OpenCAPI) may allow the system 100 compute elements to cache the data.

An external host processor 110 can access a node's private memory through the PCIe or other communication interface 130. These accesses are non-cacheable by the external host processor 110. Similarly, all node processing elements may access an external processor's memory through the PCIe or other communication interface 130. It is normally much higher performance for the node's processing elements to access the external host's memory rather than have the host push data to the node. The node compute elements are architected to handle a higher number of outstanding requests and tolerate longer access latencies.

As mentioned above, in a representative embodiment, a system 100 process virtual address space maps to physical memory on one or more system 100 physical nodes. The system 100 architecture includes the concept of "virtual" nodes. System 100 virtual addresses include a virtual node identifier. The virtual node identifier allows the requesting compute element to determine if the virtual address refers to local node memory or remote node memory. Virtual addresses that refer to local node memory are translated to a local node physical address by the requesting compute element. Virtual addresses that refer to remote node memory are sent to the remote node where, on entry to the node, the virtual address is translated to a remote node physical address.

The concept of a virtual node allows a process to use the same set of virtual node identifiers independent of which physical nodes the application is actually executing on. The range of virtual node identifiers for a process starts at zero and increases to the value N−1, where N is the number of virtual nodes in the process. The number of virtual nodes a process has is determined at runtime. The application makes system call(s) to acquire physical nodes. The operating system then decides how many virtual nodes a process will have. The number of physical nodes given to a process is constrained by the number of physical nodes in the system 100. The number of virtual nodes may be equal to or larger than the number of physical nodes, but must be a power of two. Having a larger number of virtual nodes allows memory 125 to be distributed across the physical nodes more uniformly. As an example, if there are 5 physical nodes, and a process is setup to use 32 virtual nodes, then shared, distributed memory can be distributed across the physical nodes in increments of $\frac{1}{32}$. The five nodes would have ($\frac{7}{32}$, $\frac{7}{32}$, $\frac{6}{32}$, $\frac{6}{32}$, $\frac{6}{32}$) of the total shared, distributed memory per node. The uniformity of memory distribution also results in more uniform bandwidth demand from the five nodes.

Having more virtual nodes than physical nodes within a process implies that multiple virtual nodes are assigned to a physical node. A node's compute elements will each have a small table of local node virtual node IDs for a process. A maximum number of virtual node IDs per physical node IDs will exist. For example, a maximum number of virtual node IDs per physical node IDs may be eight, which allows the memory and bandwidth to be fairly uniform across the physical nodes without each compute element's virtual node ID table being too large.

The system 100 architecture has defined a single common virtual address space that is used by all compute elements. This common virtual address space is used by all threads executing on the system 100 compute elements (host processor 110, HTP 300 and HTF 200) on behalf of an application. The virtual-to-physical address translation process for a scalable multi-node system is carefully defined to ensure minimal performance degradation as the system 100 scales. The system 100 architecture has pushed the virtual-to-physical address translation to the node where the physical memory resides as a solution to this scaling problem. Performing the virtual-to-physical translation implies that the referenced virtual address is transferred in the request packet that is sent to the destination node. The request packet must be routed from information in the virtual address (since the physical address is not available until the packet reaches the destination node). Virtual addresses are defined with the destination node ID embedded in the address. The exception is for external host virtual addresses to node local, private memory. This exception is required due to x86 processor virtual address space limitations.

The virtual address in current generations of x86 processors is 64 bits wide. However, for these 64-bit addresses, only the lower 48 bits are implemented. The upper 16 bits must contain the sign extended value of the lower 48 bits. The virtual address space for an application running on a standard Linux operating system is split between virtual address with the upper bits either all zero or all ones to be consistent with existing processor restrictions. FIG. 37 shows the virtual address space formats supported by the system 100 architecture.

A system 100 virtual address is defined to support the full 64-bit virtual address space. The upper three bits of the virtual address are used to specify the address format. The formats are defined in Table 31.

TABLE 31

| Virtual Address Format ID | Description |
|---|---|
| 0 | Format 0 is used to map an external host's main memory or local node's private memory into the virtual address space lower range of a Linux process. The upper 16 bits are all zero to conform to the x86 virtual address restrictions. The external host or a processing element (HTP or HTF) of the local node may reference a virtual address using this format and access the external host's main memory or local node's private memory. Note access to this address range always maps to the local node. Also note, the same virtual address, accessed by different nodes, will map to different physical pages. Memory consistency in this address range is handled by hardware. Memory in this range is cacheable with exceptions. |
| 1 | Format 1 is used to map private memory of a node into the virtual address space lower range of a Linux process. This format can be used by the internal RISC-V processor. This private memory format has the local virtual node ID embedded in the virtual address. Embedding the Node ID in the virtual address allows nodes to detect that a non-local private memory virtual address is being accessed and raise an exception. Memory consistency in this address range is handled by hardware. Memory in this range is cacheable with exceptions. |
| 2 | Format 2 is used to access shared, non-interleaved memory. Any HTP or HTF compute element executing a thread for a Linux process may reference a virtual address associated with the partitioned global address space. Note that a host processor (internal or external) is not able to reference an address in this format range. Shared memory in this range is allocated as a single contiguous block of memory from a single node. Memory consistency in this address range is managed by software and data accessed is not cacheable. |
| 3 | Format 3 is used to access shared, interleaved memory. Any HTP or HTF compute element executing a thread of a Linux process may reference a virtual address associated with the partitioned global address space. Note that a host processor (external or internal) is not able to reference an address in this format range. Shared memory in this range is allocated across the largest power of two nodes that are participating in the process. The virtual address space is interleaved on a 4 Kbyte granularity across the nodes. Memory consistency in this address range is managed by software and data accessed is not cacheable. |
| 4-5 | Formats 4 and 5 are not used. |
| 6 | Format 6 is used to map private memory of a node into the virtual address space upper range of a Linux process. This format can be used by the internal RISC-V processor. This private memory format has the local node ID embedded in the virtual address. Embedding the Node ID in the virtual address allows nodes to detect that a non-local private memory virtual address is being accessed and raise an exception. Memory consistency in this address range is handled by hardware. Memory in this range is cacheable with exceptions. |
| 7 | Format 7 is used to map an external host's main memory or local node's private memory into the virtual address space upper range of a Linux process. The upper 16 bits are all ones to conform to the x86 virtual address restrictions. The external host or a processing element (HTP or HTF) of the local node may reference a virtual address using this format and access the external host's main memory or local node's private memory. Note access to this address range always maps to the local node. Also note, the same virtual address, accessed by different nodes, will map to different physical pages. Memory consistency in this address range is handled by a hardware. Memory in this range is cacheable with exceptions. |

The exceptions referred to in Table 31 can occur due to two situations: (1) a private address is sent to a remote node HTP or HTF compute element as an argument to the sent call or return operation, or (2) a data structure in shared memory is created with a pointer to private memory.

Figure 38:
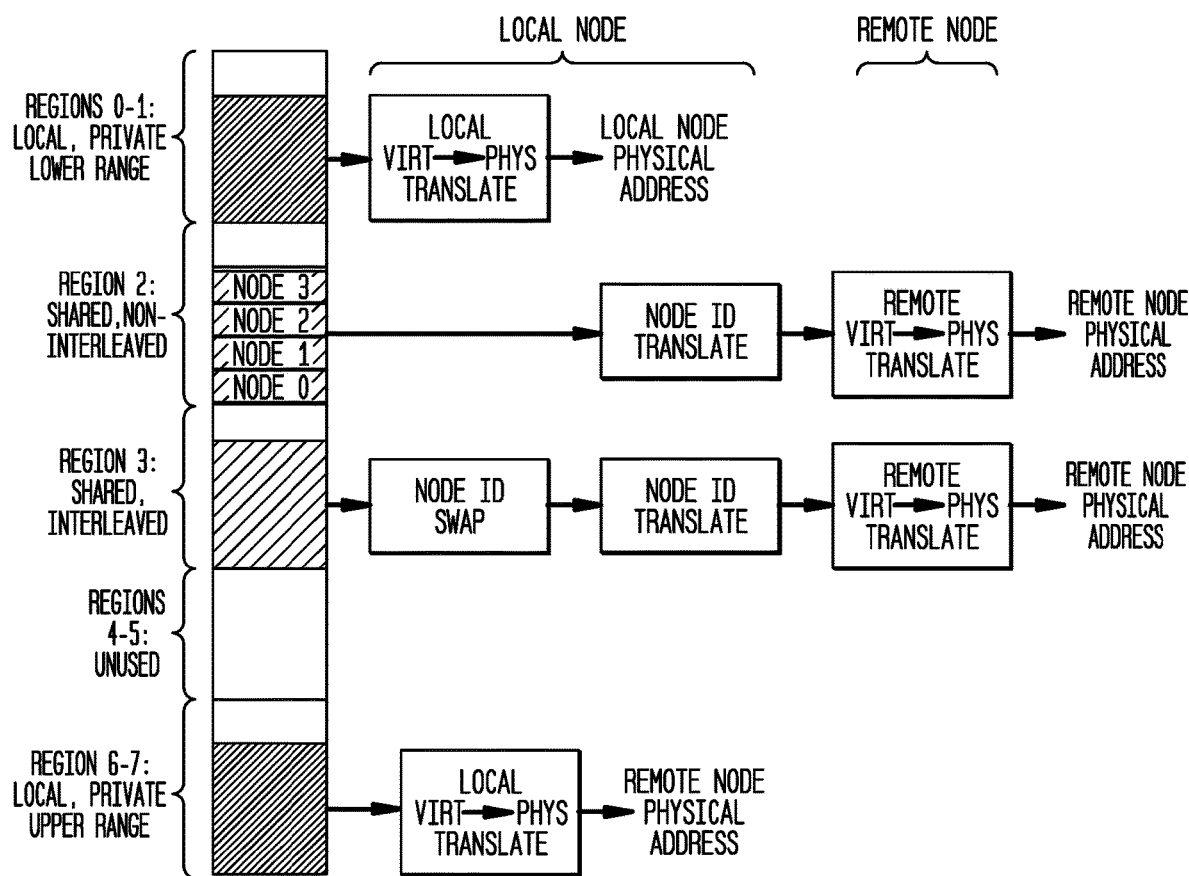
FIG. 38 illustrates a representative translation process for each virtual address format.

FIG. 38 shows the translation process for each virtual address format. Referring to FIGS. 37 and 38:

(a) Format 0 and 7 are used by the external host processor 110 and by the local node host processor 110, HTP 300 and HTF 200 compute elements to access external host memory as well as local node private memory. The source compute element of the memory request translates the virtual address to a physical address.

(b) Format 1 and 6 are used by the local node host processor 110, HTP 300 and HTF 200 compute elements to access local node private memory, as well as external host memory. It should be noted that use of this format allows a remote node device to validate that the local node private memory reference is indeed intended for the local node. The situation where this becomes valuable is if a local node's private virtual address is used by a remote node. The remote node can compare the embedded node ID with the local node ID and detect the memory reference error. It should be noted that this detection capability is not available with format 0.

(c) Format 2 is used by all node host processor 110, HTP 300 and HTF 200 compute elements to access non-interleaved, distributed shared memory. Allocations to this memory format will allocate a contiguous block of physical memory on the node where the allocation occurs. Each node of a process is numbered with a virtual node ID starting at zero and increasing to as many nodes as in the process. The virtual-to-physical address translation first translates the virtual node ID in the virtual address to a physical node ID. The node ID translation occurs at the source node. Once translated, the physical node ID is used to route the request to the destination node. It should be noted that both the Global Space ID (GSID) and virtual address are sent in the packet to the destination node. Once at the destination node, the remote node interface receives the request packet and translates the virtual address to the local node's physical address.

(d) Format 3 is used by all node host processor 110, HTP 300 and HTF 200 compute elements to access interleaved, distributed shared memory. Allocations to this memory format will allocate a block of memory on each node participating in the interleave (the largest power of two nodes in the process). References to this format are interleaved on a 4K byte granularity (the actual interleave granularity is being investigated). The first step of the translation process is to swap the virtual node ID in the virtual address from the lower bits to the upper bits (swapped into the position starting with bit 48). After the node ID is swapped, then the virtual node ID is translated to the physical node ID. The node ID swapping and translation occurs on the source node. The physical node ID is used to route the request to the destination node. It should be noted that both the Global Space ID (GSID) and virtual address are sent in the packet to the destination node. Once at the destination node, the remote node interface receives the request packet, and translates the virtual address to the local node physical address.

(e) Formats 4 and 5 are not utilized, and in a representative embodiment, these formats are illegal and will cause a reference exception.

Numerous advantages of the representative embodiments are readily apparent. The representative apparatus, system and methods provide for a computing architecture capable of providing high performance and energy efficient solutions for compute-intensive kernels, such as for computation of Fast Fourier Transforms (FFTs) and finite impulse response (FIR) filters used in sensing, communication, and analytic applications, such as synthetic aperture radar, 5G base stations, and graph analytic applications such as graph clustering using spectral techniques, machine learning, 5G networking algorithms, and large stencil codes, for example and without limitation.

Significantly, the various representative embodiments provide a multi-threaded, coarse-grained configurable computing architecture capable of being configured for any of these various applications, but most importantly, also capable of self-scheduling, dynamic self-configuration and self-reconfiguration, conditional branching, backpressure control for asynchronous signaling, ordered thread execution and loop thread execution (including with data dependencies), automatically starting thread execution upon completion of data dependencies and/or ordering, providing loop access to private variables, providing rapid execution of loop threads using a reenter queue, and using various thread identifiers for advanced loop execution, including nested loops.

Also, the representative apparatus, system and method provide for a processor architecture capable of self-scheduling, significant parallel processing and further interacting with and controlling a configurable computing architecture for performance of any of these various applications.

As used herein, a "processor core" 705 may be any type of processor core, and may be embodied as one or more processor cores configured, designed, programmed or otherwise adapted to perform the functionality discussed herein. As used herein, a "processor" 110 may be any type of processor, and may be embodied as one or more processors configured, designed, programmed or otherwise adapted to perform the functionality discussed herein. As the term processor is used herein, a processor 110 or 300 may include use of a single integrated circuit ("IC"), or may include use of a plurality of integrated circuits or other components connected, arranged or grouped together, such as controllers, microprocessors, digital signal processors ("DSPs"), array processors, graphics or image processors, parallel processors, multiple core processors, custom ICs, application specific integrated circuits ("ASICs"), field programmable gate arrays ("FPGAs"), adaptive computing ICs, associated memory (such as RAM, DRAM and ROM), and other ICs and components, whether analog or digital. As a consequence, as used herein, the term processor or controller should be understood to equivalently mean and include a single IC, or arrangement of custom ICs, ASICs, processors, microprocessors, controllers, FPGAs, adaptive computing ICs, or some other grouping of integrated circuits which perform the functions discussed herein, with associated memory, such as microprocessor memory or additional RAM, DRAM, SDRAM, SRAM, MRAM, ROM, FLASH, EPROM or $E^2$PROM. A processor 110 or 300, with associated memory, may be adapted or configured (via programming, FPGA interconnection, or hard-wiring) to perform the methodology of the invention, as discussed herein. For example, the methodology may be programmed and stored, in a processor 300 with its associated memory (and/or memory 125) and other equivalent components, as a set of program instructions or other code (or equivalent configuration or other program) for subsequent execution when the processor 110 or 300 is operative (i.e., powered on and functioning). Equivalently, when the processor 300 may implemented in whole or part as FPGAs, custom ICs and/or ASICs, the FPGAs, custom ICs or ASICs also may be designed, configured and/or hard-wired to implement the methodology of the invention. For example, the processor 110 or 300 may be implemented as an arrangement of analog and/or digital circuits, controllers, microprocessors, DSPs and/or ASICs, collectively referred to as a "processor" or "controller", which are respectively hard-wired, programmed, designed, adapted or configured to implement the methodology of the invention, including possibly in conjunction with a memory 125.

The memory 125, 325, which may include a data repository (or database), may be embodied in any number of forms, including within any computer or other machine-readable data storage medium, memory device or other storage or communication device for storage or communication of information, currently known or which becomes available in the future, including, but not limited to, a memory integrated circuit ("IC"), or memory portion of an integrated circuit (such as the resident memory within a processor 130 or processor IC), whether volatile or non-volatile, whether removable or non-removable, including without limitation RAM, FLASH, DRAM, SDRAM, SRAM, MRAM, FeRAM, ROM, EPROM or $E^2$PROM, or any other form of memory device, such as a magnetic hard drive, an optical drive, a magnetic disk or tape drive, a hard disk drive, other machine-readable storage or memory media such as a floppy disk, a CDROM, a CD-RW, digital versatile disk (DVD) or other optical memory, or any other type of memory, storage medium, or data storage apparatus or circuit, which is known or which becomes known, depending upon the selected embodiment. The memory 125, 325 may be adapted to store various look up tables, parameters, coefficients, other information and data, programs or instructions (of the software of the present invention), and other types of tables such as database tables.

As indicated above, the processor 110, 300 is hard-wired or programmed, using software and data structures of the invention, for example, to perform the methodology of the present invention. As a consequence, the system and related methods of the present invention, including the various instructions, may be embodied as software which provides such programming or other instructions, such as a set of instructions and/or metadata embodied within a non-transitory computer readable medium, discussed above. In addition, metadata may also be utilized to define the various data structures of a look up table or a database. Such software may be in the form of source or object code, by way of example and without limitation. Source code further may be compiled into some form of instructions or object code (including assembly language instructions or configuration information). The software, source code or metadata of the present invention may be embodied as any type of code, such as C, C++, Matlab, SystemC, LISA, XML, Java, Brew, SQL and its variations (e.g., SQL 99 or proprietary versions of SQL), DB2, Oracle, or any other type of programming language which performs the functionality discussed herein, including various hardware definition or hardware modeling languages (e.g., Verilog, VHDL, RTL) and resulting database files (e.g., GDSII). As a consequence, a "construct", "program construct", "software construct" or "software", as used equivalently herein, means and refers to any programming language, of any kind, with any syntax or signatures, which provides or can be interpreted to provide the associated functionality or methodology specified (when instantiated or loaded into a processor or computer and executed, including the processor 110, 300, for example).

The software, metadata, or other source code of the present invention and any resulting bit file (object code, database, or look up table) may be embodied within any tangible, non-transitory storage medium, such as any of the computer or other machine-readable data storage media, as computer-readable instructions, data structures, program modules or other data, such as discussed above with respect to the memory 125, 325, e.g., a floppy disk, a CDROM, a CD-RW, a DVD, a magnetic hard drive, an optical drive, or any other type of data storage apparatus or medium, as mentioned above.

The communication interface(s) 130 are utilized for appropriate connection to a relevant channel, network or bus; for example, the communication interface(s) 130 may provide impedance matching, drivers and other functions for a wireline or wireless interface, may provide demodulation and analog to digital conversion for a wireless interface, and may provide a physical interface, respectively, for the processor 110, 300 and/or memory 125, with other devices. In general, the communication interface(s) 130 are used to receive and transmit data, depending upon the selected embodiment, such as program instructions, parameters, configuration information, control messages, data and other pertinent information.

The communication interface(s) 130 may be implemented as known or may become known in the art, to provide data communication between the HTF 200 and/or processor 110, 300 and any type of network or external device, such as wireless, optical, or wireline, and using any applicable standard (e.g., one of the various PCI, USB, RJ 45, Ethernet (Fast Ethernet, Gigabit Ethernet, 300ase-TX, 300ase-FX, etc.), IEEE 802.11, Bluetooth, WCDMA, WiFi, GSM, GPRS, EDGE, 3G and the other standards and systems mentioned above, for example and without limitation), and may include impedance matching capability, voltage translation for a low voltage processor to interface with a higher voltage control bus, wireline or wireless transceivers, and various switching mechanisms (e.g., transistors) to turn various lines or connectors on or off in response to signaling from processor 130. In addition, the communication interface(s) 130 may also be configured and/or adapted to receive and/or transmit signals externally to the system 100, such as through hard-wiring or RF or infrared signaling, for example, to receive information in real-time for output on a display, for example. The communication interface(s) 130 may provide connection to any type of bus or network structure or medium, using any selected architecture. By way of example and without limitation, such architectures include Industry Standard Architecture (ISA) bus, Enhanced ISA (EISA) bus, Micro Channel Architecture (MCA) bus, Peripheral Component Interconnect (PCI) bus, SAN bus, or any other communication or signaling medium, such as Ethernet, ISDN, T1, satellite, wireless, and so on.

The present disclosure is to be considered as an exemplification of the principles of the invention and is not intended to limit the invention to the specific embodiments illustrated. In this respect, it is to be understood that the invention is not limited in its application to the details of construction and to the arrangements of components set forth above and below, illustrated in the drawings, or as described in the examples. Systems, methods and apparatuses consistent with the present invention are capable of other embodiments and of being practiced and carried out in various ways.

Although the invention has been described with respect to specific embodiments thereof, these embodiments are merely illustrative and not restrictive of the invention. In the description herein, numerous specific details are provided, such as examples of electronic components, electronic and structural connections, materials, and structural variations, to provide a thorough understanding of embodiments of the present invention. One skilled in the relevant art will recognize, however, that an embodiment of the invention can be practiced without one or more of the specific details, or with other apparatus, systems, assemblies, components, materials, parts, etc. In other instances, well-known structures, materials, or operations are not specifically shown or described in detail to avoid obscuring aspects of embodiments of the present invention. In addition, the various Figures are not drawn to scale and should not be regarded as limiting.

Reference throughout this specification to "one embodiment", "an embodiment", or a specific "embodiment" means that a particular feature, structure, or characteristic described in connection with the embodiment is included in at least one embodiment of the present invention and not necessarily in all embodiments, and further, are not necessarily referring to the same embodiment. Furthermore, the particular features, structures, or characteristics of any specific embodiment of the present invention may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated. In addition, every intervening sub-range within range is contemplated, in any combination, and is within the scope of the disclosure. For example, for the range of 5-10, the sub-ranges 5-6, 5-7, 5-8, 5-9, 6-7, 6-8, 6-9, 6-10, 7-8, 7-9, 7-10, 8-9, 8-10, and 9-10 are contemplated and within the scope of the disclosed range.

It will also be appreciated that one or more of the elements depicted in the Figures can also be implemented in a more separate or integrated manner, or even removed or rendered inoperable in certain cases, as may be useful in accordance with a particular application. Integrally formed combinations of components are also within the scope of the invention, particularly for embodiments in which a separation or combination of discrete components is unclear or indiscernible. In addition, use of the term "coupled" herein, including in its various forms such as "coupling" or "couplable", means and includes any direct or indirect electrical, structural or magnetic coupling, connection or attachment, or adaptation or capability for such a direct or indirect electrical, structural or magnetic coupling, connection or attachment, including integrally formed components and components which are coupled via or through another component.

With respect to signals, we refer herein to parameters that "represent" a given metric or are "representative" of a given metric, where a metric is a measure of a state of at least part of the regulator or its inputs or outputs. A parameter is considered to represent a metric if it is related to the metric directly enough that regulating the parameter will satisfactorily regulate the metric. A parameter may be considered to be an acceptable representation of a metric if it represents a multiple or fraction of the metric.

Furthermore, any signal arrows in the drawings/Figures should be considered only exemplary, and not limiting, unless otherwise specifically noted. Combinations of components of steps will also be considered within the scope of the present invention, particularly where the ability to separate or combine is unclear or foreseeable. The disjunctive term "or", as used herein and throughout the claims that follow, is generally intended to mean "and/or", having both conjunctive and disjunctive meanings (and is not confined to an "exclusive or" meaning), unless otherwise indicated. As used in the description herein and throughout the claims that follow, "a", "an", and "the" include plural references unless the context clearly dictates otherwise. Also as used in the description herein and throughout the claims that follow, the meaning of "in" includes "in" and "on" unless the context clearly dictates otherwise.

The foregoing description of illustrated embodiments of the present invention, including what is described in the summary or in the abstract, is not intended to be exhaustive or to limit the invention to the precise forms disclosed herein. From the foregoing, it will be observed that numerous variations, modifications and substitutions are intended and may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

It is claimed:

1. A system comprising:
an interconnection network;
a first processor coupled to the interconnection network; and
a configurable circuit cluster coupled to the interconnection network, the configurable circuit cluster comprising:
a plurality of configurable circuits arranged in an array, each configurable circuit, of the array of the plurality of configurable circuits, comprising:
a configurable computation circuit;
a plurality of synchronous network inputs coupled to the configurable computation circuit;
a plurality of synchronous network outputs coupled to the configurable computation circuit; and
a configuration memory circuit coupled to the configurable computation circuit, to the plurality of synchronous network inputs, and to the plurality of synchronous network outputs, the configuration memory circuit comprising:
a first instruction memory storing a first plurality of data path configuration instructions to configure a data path of the configurable computation circuit; and
a second instruction memory storing a second plurality of data path configuration instructions or instruction indices for selection of a master synchronous network input of the plurality of synchronous network inputs for receipt of a current data path configuration instruction or instruction index from an adjacent configurable circuit of the array of the plurality of configurable circuits;
an asynchronous packet network coupled to each configurable circuit of the plurality of configurable circuits of the array; and
a synchronous network coupled to the plurality of synchronous network inputs and the plurality of synchronous network outputs of each configurable circuit of the plurality of configurable circuits of the array.

2. The system of claim 1, wherein the interconnection network comprises:
a first plurality of crossbar switches having a Folded Clos configuration and a plurality of direct, mesh connections at interfaces with system endpoints.

3. The system of claim 2, wherein the asynchronous packet network comprises:
a second plurality of crossbar switches, each crossbar switch of the second plurality of crossbar switches coupled to at least one configurable circuit of the array of the plurality of configurable circuits and to another crossbar switch of the second plurality of crossbar switches.

4. The system of claim 3, wherein the synchronous network comprises:
a plurality of direct point-to-point connections coupling adjacent configurable circuits of the array of the plurality of configurable circuits.

5. The system of claim 1, wherein each configurable circuit, of the array of the plurality of configurable circuits, further comprises:
a control circuit coupled to the configurable computation circuit, the control circuit comprising: a thread control circuit and a plurality of control registers;

an asynchronous network input queue coupled to the asynchronous packet network; and an asynchronous network output queue coupled to the asynchronous packet network.

6. The system of claim 5, wherein each configurable circuit, of the array of the plurality of configurable circuits, further comprises:

an asynchronous fabric state machine coupled to the asynchronous network input queue and to the asynchronous network output queue, the asynchronous fabric state machine adapted to decode an input data packet received from the asynchronous packet network and to assemble an output data packet for transmission on the asynchronous packet network.

7. The system of claim 5, wherein each configurable circuit, of the array of the plurality of configurable circuits, further comprises:

a flow control circuit coupled to the asynchronous network output queue, the flow control circuit adapted to generate a stop signal when a predetermined threshold has been reached in the asynchronous network output queue.

8. The system of claim 7, wherein in response to the stop signal, each asynchronous network output queue of each configurable circuit, of the array of the plurality of configurable circuits, stops outputting data packets on the asynchronous packet network.

9. The system of claim 7, wherein in response to the stop signal, each configurable computation circuit, of each configurable circuit of the array of the plurality of configurable circuits, stops executing upon completion of its current instruction.

10. The system of claim 5, wherein one or more of the configurable circuits of the array of the plurality of configurable circuits are coupled in a first predetermined sequence through the synchronous network to form a first synchronous domain having a first base tile; and wherein one or more of the configurable circuits of the array of the plurality of configurable circuits are coupled in a second predetermined sequence through the synchronous network to form a second synchronous domain having a second base tile.

11. The system of claim 10, wherein the first synchronous domain is adapted to generate and transmit a continuation message to the second base tile of the second synchronous domain through the asynchronous packet network.

12. The system of claim 10, wherein the second synchronous domain is adapted to generate and transmit a completion message to the first synchronous domain through the asynchronous packet network.

13. The system of claim 5, wherein the plurality of control registers store a completion table having a plurality of thread identifiers identifying a plurality of computation threads and having a corresponding data completion count for each thread identifier of the plurality of thread identifiers.

14. The system of claim 13, wherein the plurality of control registers further store, in the completion table, an iteration count for each thread identifier of the plurality of thread identifiers.

15. The system of claim 13, wherein the plurality of control registers further store, in the completion table, for each thread identifier of the plurality of thread identifiers, an identification of a last iteration or a next thread identifier identifying a next computation thread for execution following execution of a current computation thread to provide ordered computation thread execution.

16. The system of claim 15, wherein the plurality of control registers further store, in the completion table, an identification of a first iteration.

17. The system of claim 15, wherein the thread control circuit is adapted to queue a selected computation thread of the plurality of computation threads for execution when, for the thread identifier for the selected computation thread, of the plurality of thread identifiers, the corresponding data completion count has decremented to zero and the thread identifier of the selected computation thread identifies the selected computation thread as the next computation thread for execution.

18. The system of claim 13, wherein the thread control circuit is adapted to queue a selected computation thread of the plurality of computation threads for execution when, for the thread identifier for the selected computation thread, of the plurality of thread identifiers, the corresponding data completion count indicates completion of one or more data dependencies.

19. The system of claim 13, wherein the corresponding data completion count indicates a predetermined number of completion messages to be received, for a selected computation thread of the plurality of computation threads, prior to execution of the selected computation thread.

20. The system of claim 13, wherein the plurality of control registers further store, in the completion table, a plurality of types of thread identifiers, with each type of thread identifier of the plurality of types of thread identifiers indicating a loop level for loop and nested loop execution.

21. The system of claim 20, wherein the plurality of control registers further store a top of thread identifiers stack to allow each type of thread identifier, of the plurality of types of thread identifiers, access to private variables for a selected loop.

22. The system of claim 13, wherein the plurality of control registers further store, in the completion table, a loop count of an active number of loop computation threads, and wherein in response to receipt of an asynchronous fabric message returning a thread identifier to a thread identifier pool, the control circuit decrements the loop count and, when the loop count reaches zero, the control circuit transmits an asynchronous fabric completion message.

23. The system of claim 13, wherein the control circuit further comprises:

a run queue storing one or more thread identifiers for one or more computation threads which are ready to execute;

a continuation queue; and a reenter queue.

24. The system of claim 23, wherein the continuation queue stores one or more computation threads which are ready to execute and do not have assigned thread identifiers.

25. The system of claim 24, wherein the reenter queue stores one or more thread identifiers for computation threads which are ready to execute and have assigned thread identifiers.

26. The system of claim 25, wherein the thread control circuit is adapted to provide for continuing execution of the computation threads having the one or more thread identifiers in the reenter queue by moving the one or more thread identifiers in the reenter queue into the run queue ahead of any computation threads in the continuation queue.

27. The system of claim 25, wherein the control circuit further comprises:
a priority queue, wherein any computation thread in the priority queue is executed prior to execution of any computation thread in the continuation queue or in the reenter queue.

28. The system of claim 23, wherein any computation thread in the run queue is executed upon an occurrence of a predetermined count.

29. The system of claim 5, wherein the control circuit is adapted to self-schedule a computation thread for execution.

30. The system of claim 5, wherein the control circuit is adapted to order a plurality of computation threads for execution.

31. The system of claim 5, wherein the control circuit is adapted to order a plurality of loop computation threads for execution.

32. The system of claim 5, wherein the control circuit is adapted to commence execution of a computation thread, of a plurality of computation threads, in response to one or more completion signals of data dependencies.

33. The system of claim 5, wherein each configurable circuit, of the array of the plurality of configurable circuits, further comprises:
a plurality of delay registers to synchronize data transmission and reception for thread execution.

34. The system of claim 1, wherein the second plurality of data path configuration instructions or instruction indices further comprises one or more instructions or instruction indices for selection of the current data path configuration instruction from the first plurality of data path configuration instructions for the configurable computation circuit.

35. The system of claim 1, wherein the second plurality of data path configuration instructions or instruction indices further comprises one or more instructions or instruction indices for selection of a next data path configuration instruction or instruction index for output to the master synchronous network input of a next configurable circuit of the array of the plurality of configurable circuits.

36. The system of claim 35, wherein each configurable circuit, of the array of the plurality of configurable circuits, further comprises:
a conditional logic circuit coupled to the configurable computation circuit.

37. The system of claim 36, wherein the conditional logic circuit is adapted to provide conditional branching depending upon an output from the configurable computation circuit by providing a first next data path configuration instruction or instruction index for output to the master synchronous network input of the next configurable circuit or providing a different, second next data path configuration instruction or instruction index for output to the master synchronous network input of the next configurable circuit.

38. The system of claim 36, wherein the conditional logic circuit is adapted to provide conditional branching depending upon an output from the configurable computation circuit by modifying the next data path configuration instruction or instruction index provided for output to the master synchronous network input of the next configurable circuit.

39. The system of claim 36, wherein the conditional logic circuit is adapted to provide conditional branching depending upon an output from the configurable computation circuit by modifying the next data path configuration instruction or instruction index provided on a selected synchronous network output of the plurality of synchronous network outputs.

40. The system of claim 36, wherein the conditional logic circuit, when enabled, is adapted to provide conditional branching depending upon an output from the configurable computation circuit by ORing the output from the configurable computation circuit with a least significant bit of the next data path configuration instruction or instruction index to provide the next data path configuration instruction or instruction index output to the master synchronous network input of the next configurable circuit.

41. The system of claim 1, wherein the second plurality of data path configuration instructions or instruction indices further comprises one or more instructions or instruction indices for selection of a synchronous network output of the plurality of synchronous network outputs.

42. The system of claim 1, wherein each configurable circuit, of the array of the plurality of configurable circuits, further comprises:
a configuration memory multiplexer coupled to the first instruction memory and to the second instruction memory, the configuration memory multiplexer having a selection input.

43. The system of claim 42, wherein when the selection input of the configuration memory multiplexer has a first setting, the current data path configuration instruction is selected from the first plurality of data path configuration instructions of the first instruction memory using a selected data path configuration instruction or instruction index from the second instruction memory.

44. The system of claim 43, wherein when the selection input of the configuration memory multiplexer has a second setting, the second setting different from the first setting, the current data path configuration instruction is selected using a data path configuration instruction or instruction index received from the master synchronous network input.

45. The system of claim 1, wherein the second plurality of data path configuration instructions or instruction indices further comprises one or more instructions or instruction indices for configuration of at least one portion of a selected configurable circuit, of the array of the plurality of configurable circuits, independently from the current data path configuration instruction or instruction index.

46. The system of claim 1, wherein each data path configuration instruction or instruction index of the second plurality of data path configuration instructions or instruction indices is selected according to a predetermined modulo count.

47. The system of claim 1, wherein the synchronous network comprises a plurality of communication lines, and wherein the plurality of synchronous network inputs comprise:
a plurality of input registers coupled to the plurality of communication lines of the synchronous network; and
an input multiplexer coupled to the plurality of input registers and to the second instruction memory for selection of the master synchronous network input.

48. The system of claim 47, wherein the plurality of synchronous network outputs comprise:
a plurality of output registers coupled to the plurality of communication lines of the synchronous network; and
an output multiplexer coupled to the configurable computation circuit for selection of a synchronous network output of the plurality of synchronous network outputs.

49. The system of claim 48, wherein each configurable circuit, of the array of the plurality of configurable circuits, further comprises:
a direct, pass-through connection between the plurality of input registers and the plurality of output registers.

50. The system of claim 49, wherein the direct, pass-through connection of a first configurable circuit of the array of the plurality of configurable circuits provides a direct, point-to-point connection for data transmission on the synchronous network of data received from a second configurable circuit of the array of the plurality of configurable circuits to a third configurable circuit of the array of the plurality of configurable circuits.

51. The system of claim 1, wherein each configurable circuit, of the array of the plurality of configurable circuits, further comprises:
an arithmetic, logical and bit operation circuit adapted to perform at least one integer operation selected from the group consisting of: signed and unsigned addition, absolute value, negate, logical NOT, add and negate, subtraction A−B, reverse subtraction B−A, signed and unsigned greater than, signed and unsigned greater than or equal to, signed and unsigned less than, signed and unsigned less than or equal to, comparison of equal or not equal to, logical AND operation, logical OR operation, logical XOR operation, logical NAND operation, logical NOR operation, logical NOT XOR operation, logical AND NOT operation, logical OR NOT operation, an interconversion between integer and floating point, and combinations thereof.

52. The system of claim 1, wherein each configurable circuit, of the array of the plurality of configurable circuits, further comprises:
an arithmetic, logical and bit operation circuit adapted to perform at least one floating point operation selected from the group consisting of: signed and unsigned addition, absolute value, negate, logical NOT, add and negate, subtraction A−B, reverse subtraction B−A, signed and unsigned greater than, signed and unsigned greater than or equal to, signed and unsigned less than, signed and unsigned less than or equal to, comparison of equal or not equal to, logical AND operation, logical OR operation, logical XOR operation, logical NAND operation, logical NOR operation, logical NOT XOR operation, logical AND NOT operation, logical OR NOT operation, an interconversion between integer and floating point, and combinations thereof.

53. The system of claim 1, wherein each configurable circuit, of the array of the plurality of configurable circuits, further comprises:
a multiply and shift operation circuit adapted to perform at least one integer operation selected from the group consisting of: multiply, shift, pass an input, signed and unsigned multiply, signed and unsigned shift right, signed and unsigned shift left, bit order reversal, a permutation, an interconversion between integer and floating point, and combinations thereof.

54. The system of claim 1, wherein each configurable circuit, of the array of the plurality of configurable circuits, further comprises:
a multiply and shift operation circuit adapted to perform at least one floating point operation selected from the group consisting of: multiply, shift, pass an input, signed and unsigned multiply, signed and unsigned shift right, signed and unsigned shift left, bit order reversal, a permutation, an interconversion between integer and floating point, and combinations thereof.

55. The system of claim 1, wherein the configurable circuit cluster further comprises:
a dispatch interface circuit coupled to the asynchronous packet network and to the interconnection network, the dispatch interface circuit is adapted, in response to receiving a work descriptor packet from the interconnection network, to generate and transmit on the asynchronous packet network one or more data and control packets to one or more configurable circuits of the array of the plurality of configurable circuits to configure the one or more configurable circuits of the array of the plurality of configurable circuits for execution of a selected computation.

56. The system of claim 1, wherein the first processor comprises:
a processor core adapted to execute a plurality of instructions; and
a core control circuit coupled to the processor core, the core control circuit adapted to automatically schedule an instruction of the plurality of instructions for execution by the processor core in response to a received work descriptor data packet or in response to a received event data packet.

57. The system of claim 1, wherein the first processor comprises:
a processor core adapted to execute a fiber create instruction; and
a core control circuit coupled to the processor core, the core control circuit adapted to automatically schedule the fiber create instruction for execution by the processor core, the core control circuit further adapted to generate and transmit one or more work descriptor data packets on the interconnection network to a second processor or to the array of the plurality of configurable circuits for execution of a corresponding plurality of execution threads.

58. The system of claim 1, wherein the first processor comprises:
a thread control memory;
a processor core adapted to execute a fiber create instruction; and
a core control circuit coupled to the processor core, the core control circuit adapted to reserve a predetermined amount of memory space in the thread control memory to store return arguments, the core control circuit further adapted to schedule the fiber create instruction for execution by the processor core, and the core control circuit further adapted to generate and transmit one or more work descriptor data packets to a second processor or to the array of the plurality of configurable circuits for execution of a corresponding plurality of execution threads.

59. The system of claim 1, wherein the first processor comprises:
a processor core; and
a core control circuit comprising:
an interconnection network interface;
a core control memory coupled to the interconnection network interface;
an execution queue coupled to the core control memory;
a control logic and thread selection circuit coupled to the execution queue and to the core control memory; and
an instruction cache coupled to the control logic and thread selection circuit and to the processor core.

60. The system of claim 1, wherein the first processor comprises:
a processor core; and
a core control circuit comprising:
an interconnection network interface;
a thread control memory coupled to the interconnection network interface;

a network response memory coupled to the interconnection network interface;
an execution queue coupled to the thread control memory;
a control logic and thread selection circuit coupled to the execution queue and to the thread control memory;
an instruction cache coupled to the control logic and thread selection circuit and to the processor core; and
a network command queue coupled to the processor core and to the interconnection network interface.

61. The system of claim 1, wherein the first processor comprises:
a processor core; and
a core control circuit comprising:
a thread control memory comprising a plurality of registers, the plurality of registers comprising a thread identifier pool register storing a plurality of thread identifiers, a program count register storing a received program count, a data cache, and a general-purpose register storing a received argument;
an execution queue coupled to the thread control memory; and
a control logic and thread selection circuit coupled to the execution queue and to the thread control memory, the control logic and thread selection circuit adapted to assign a thread identifier of the plurality of thread identifiers to an execution thread and to automatically place the thread identifier in the execution queue, and the control logic and thread selection circuit further adapted to periodically select the thread identifier in the execution queue for execution of an instruction of the execution thread by the processor core, the processor core using data stored in the data cache or general-purpose register.

62. The system of claim 1, wherein the first processor comprises:
a processor core; and
a core control circuit comprising:
a thread control memory comprising a plurality of registers, the plurality of registers comprising a thread identifier pool register storing a plurality of thread identifiers, a program count register storing a received program count, and a thread state register storing a valid status or a paused status for each thread identifier of the plurality of thread identifiers;
an execution queue coupled to the thread control memory; and
a control logic and thread selection circuit coupled to the execution queue and to the thread control memory, the control logic and thread selection circuit adapted to assign a thread identifier of the plurality of thread identifiers to an execution thread and to automatically place the thread identifier in the execution queue when the thread identifier has the valid status, and the control logic and thread selection circuit further adapted, for as long as the valid status of the thread identifier remains, to periodically select the thread identifier in the execution queue for execution of an instruction of the execution thread by the processor core until completion of the execution thread.

63. The system of claim 1, wherein the first processor comprises:
a processor core; and
a core control circuit comprising:
a thread control memory comprising a plurality of registers, the plurality of registers comprising a thread identifier pool register storing a plurality of thread identifiers, a program count register storing a received program count, and a thread state register storing a valid status or a paused status for each thread identifier of the plurality of thread identifiers;
an execution queue coupled to the thread control memory; and
a control logic and thread selection circuit coupled to the execution queue and to the thread control memory, the control logic and thread selection circuit adapted to assign a thread identifier of the plurality of thread identifiers to an execution thread and to automatically place the thread identifier in the execution queue when the thread identifier has the valid status, the control logic and thread selection circuit further adapted, for as long as the valid status of the thread identifier remains, to periodically select the thread identifier in the execution queue for execution of an instruction of the execution thread by the processor core, and the control logic and thread selection circuit further adapted to pause execution of the execution thread by not returning the thread identifier to the execution queue when the thread identifier has the paused status.

64. The system of claim 1, wherein the first processor comprises:
a processor core adapted to execute a plurality of instructions; and
a core control circuit coupled to the processor core, the core control circuit comprising:
an interconnection network interface coupled to the interconnection network, the interconnection network interface adapted to receive a work descriptor data packet and to decode the received work descriptor data packet into an initial program count for an execution thread and a received argument for the execution thread;
a thread control memory coupled to the interconnection network interface, the thread control memory comprising a plurality of registers, the plurality of registers comprising a thread identifier pool register storing a plurality of thread identifiers, a thread state register, a program count register storing the initial program count, a data cache, and a general-purpose register storing the received argument;
an execution queue coupled to the thread control memory;
a control logic and thread selection circuit coupled to the execution queue and to the thread control memory, the control logic and thread selection circuit adapted to assign a thread identifier, of the plurality of thread identifiers, to the execution thread and to place the thread identifier in the execution queue, the control logic and thread selection circuit further adapted to select the thread identifier in the execution queue and to access the thread control memory using the thread identifier as an index to the thread control memory to select the initial program count for the execution thread; and
an instruction cache coupled to the processor core and to the control logic and thread selection circuit to receive the initial program count for the execution thread and to provide a corresponding instruction, of the plurality of instructions, to the processor core for execution.

65. The system of claim 1, wherein the first processor comprises:
a core control circuit comprising:
an interconnection network interface coupled to the interconnection network, the interconnection network interface adapted to receive a work descriptor data packet and to decode the received work descriptor data packet into an initial program count for an execution thread and a received argument for the execution thread;

a thread control memory coupled to the interconnection network interface, the thread control memory comprising a plurality of registers, the plurality of registers comprising a thread identifier pool register storing a plurality of thread identifiers, a thread state register, a program count register storing the initial program count, a data cache, and a general-purpose register storing the received argument;

an execution queue coupled to the thread control memory;

a control logic and thread selection circuit coupled to the execution queue and to the thread control memory, the control logic and thread selection circuit adapted, in response to the received work descriptor data packet, to automatically assign a thread identifier of the plurality of thread identifiers to the execution thread and to automatically place the thread identifier in the execution queue, the control logic and thread selection circuit further adapted to periodically select the thread identifier in the execution queue and to access the thread control memory using the thread identifier as an index to the thread control memory to select the initial program count for the execution thread; and an instruction cache coupled to the control logic and thread selection circuit to receive the initial program count and provide a corresponding instruction for execution; and a processor core coupled to the instruction cache, the processor core adapted to execute the corresponding instruction using the received argument.

66. The system of claim 1, wherein the first processor comprises:

a core control circuit comprising:

an interconnection network interface coupled to the interconnection network, the interconnection network interface adapted to receive a work descriptor data packet and to decode the received work descriptor data packet into an initial program count for an execution thread;

a thread control memory coupled to the interconnection network interface, the thread control memory comprising a plurality of registers, the plurality of registers comprising a thread identifier pool register storing a plurality of thread identifiers, a thread state register, and a program count register storing the initial program count;

an execution queue coupled to the thread control memory;

a control logic and thread selection circuit coupled to the execution queue and to the thread control memory, the control logic and thread selection circuit adapted, in response to the received work descriptor data packet, to automatically assign a thread identifier of the plurality of thread identifiers to the execution thread and to place the thread identifier in the execution queue, the control logic and thread selection circuit further adapted to select the thread identifier for execution and to access the thread control memory using the thread identifier as an index to the thread control memory to select the initial program count for the execution thread; and an instruction cache coupled to the control logic and thread selection circuit to receive the initial program count and provide a corresponding instruction for execution;

and a processor core coupled to the instruction cache, the processor core adapted to execute the corresponding instruction.

67. The system of claim 1, wherein the first processor comprises:

a core control circuit comprising:

an interconnection network interface coupled to the interconnection network, the interconnection network interface adapted to receive a work descriptor data packet and to decode the received work descriptor data packet into an initial program count for an execution thread and a received argument for the execution thread;

a thread control memory coupled to the interconnection network interface, the thread control memory comprising a plurality of registers, the plurality of registers comprising a thread identifier pool register storing a plurality of thread identifiers, a thread state register, and a program count register storing the initial program count;

an execution queue coupled to the thread control memory;

a control logic and thread selection circuit coupled to the execution queue and to the thread control memory, the control logic and thread selection circuit adapted to assign a thread identifier of the plurality of thread identifiers to the execution thread and to place the thread identifier in the execution queue, and the control logic and thread selection circuit further adapted to select the thread identifier and to access the thread control memory using the thread identifier as an index to the thread control memory to select the initial program count for the execution thread, and an instruction cache coupled to the control logic and thread selection circuit to receive the initial program count and provide a corresponding instruction for execution;

and a processor core coupled to the instruction cache, the processor core adapted to execute the corresponding instruction using the received argument.

68. The system of claim 1, wherein the first processor comprises:

a core control circuit comprising:

an interconnection network interface coupled to the interconnection network, the interconnection network interface adapted to receive a call work descriptor data packet and to decode the received call work descriptor data packet into an initial program count for an execution thread and any received argument for the execution thread, and the interconnection network interface further adapted to encode and transmit one or more work descriptor packets on the interconnection network to a second processor or to the array of the plurality of configurable circuits;

a thread control memory coupled to the interconnection network interface, the thread control memory comprising a plurality of registers, the plurality of registers comprising a thread identifier pool register storing a plurality of thread identifiers, a thread state register, and a program count register storing the initial program count;

an execution queue coupled to the thread control memory;

a network response memory coupled to the interconnection network interface;

a control logic and thread selection circuit coupled to the execution queue and to the thread control memory, the control logic and thread selection circuit adapted to assign a thread identifier of the plurality of thread identifiers to the execution thread and to place the thread identifier in the execution queue, the control logic and thread selection circuit further adapted to select the thread identifier and to access the thread control memory using the thread identifier as an index to select the initial program count for the execution thread;
an instruction cache coupled to the control logic and thread selection circuit to receive the initial program count and provide a corresponding instruction for execution; and
a network command queue storing one or more commands for generation by the interconnection network interface of the one or more work descriptor packets; and
a processor core coupled to the instruction cache and to the network command queue, the processor core adapted to execute the corresponding instruction.

69. The system of claim 1, wherein the first processor comprises:
a processor core; and
a core control circuit coupled to the processor core.

70. The system of claim 69, wherein the core control circuit comprises:
an interconnection network interface coupled to the interconnection network, the interconnection network interface adapted to receive a work descriptor data packet and to decode the received work descriptor data packet into an initial program count for an execution thread and any received argument for the aft execution thread.

71. The system of claim 70, wherein the interconnection network interface is further adapted to receive an event data packet and to decode the received event data packet into an event identifier, the interconnection network interface further adapted to generate a point-to-point event data message or to generate a broadcast event data message.

72. The system of claim 70, wherein the core control circuit further comprises:
a control logic and thread selection circuit coupled to the interconnection network interface, the control logic and thread selection circuit adapted to assign a thread identifier, of a plurality of thread identifiers to the execution thread.

73. The system of claim 72, wherein the core control circuit further comprises:
a thread control memory having a plurality of registers, the plurality of registers comprising:
a thread identifier pool register storing the plurality of thread identifiers;
a thread state register; and
a program count register storing the initial program count.

74. The system of claim 73, wherein the control logic and thread selection circuit is further adapted to return a corresponding thread identifier of a selected thread to the thread identifier pool register in response to an execution of a return instruction of the selected thread by the processor core.

75. The system of claim 74, wherein the control logic and thread selection circuit is further adapted to clear one or more of the plurality of registers of the thread control memory indexed by the corresponding thread identifier of the selected thread in response to the execution of the return instruction by the processor core.

76. The system of claim 73, wherein the thread control memory further comprises one or more registers or one or more buffers selected from the group consisting of: a pending fiber return count register; a return argument buffer or register; a thread return argument link list register; a custom atomic transaction identifier register; a data cache; an event state register; an event mask register; a general-purpose register; and combinations thereof.

77. The system of claim 73, wherein the interconnection network interface is further adapted to store the initial program count for the execution thread in the thread control memory using the thread identifier as an index to the thread control memory.

78. The system of claim 73, wherein the core control circuit further comprises:
an execution queue coupled to the thread control memory, the execution queue storing one or more thread identifiers of the plurality of thread identifiers.

79. The system of claim 78, wherein the control logic and thread selection circuit is further adapted to place the thread identifier of the plurality of thread identifiers in the execution queue, and wherein the control logic and thread selection circuit is further adapted to select the thread identifier for execution from the execution queue and to access the thread control memory using the thread identifier as an index to select the initial program count for the execution thread for execution of a corresponding single instruction by the processor core.

80. The system of claim 78, wherein the control logic and thread selection circuit is further adapted to successively select a next thread identifier of the one or more thread identifiers from the execution queue for execution of a single instruction of a corresponding execution thread.

81. The system of claim 78, wherein the control logic and thread selection circuit is further adapted to perform a round-robin or barrel selection of a next thread identifier of the one or more thread identifiers from the execution queue, for execution by the processor core of a single instruction of a corresponding execution thread until completion of the corresponding execution thread.

82. The system of claim 78, wherein the control logic and thread selection circuit is further adapted to assign a valid status or a paused status to a selected thread identifier of the plurality of thread identifiers.

83. The system of claim 82, wherein the control logic and thread selection circuit is further adapted to assign a priority status to the selected thread identifier of the plurality of thread identifiers.

84. The system of claim 83, wherein the control logic and thread selection circuit is further adapted, following execution of a corresponding instruction by the processor core, to return the selected thread identifier to the execution queue with an assigned valid status and an assigned priority status.

85. The system of claim 78, wherein the execution queue further comprises:
a first priority queue storing one or more first priority thread identifiers of the plurality of thread identifiers; and
a second priority queue storing one or more second priority thread identifiers of the plurality of thread identifiers.

86. The system of claim 85, wherein the control logic and thread selection circuit comprises:
thread selection control circuitry coupled to the execution queue, the thread selection control circuitry adapted to select a first priority thread identifier of the one or more first priority thread identifiers from the first priority queue at a first frequency and to select a second priority thread identifier of the one or more second priority thread identifiers from the second priority queue at a second frequency, the second frequency lower than the first frequency.

87. The system of claim 86, wherein the thread selection control circuitry is further adapted to determine the second frequency as a skip count from selection of the one or more first priority thread identifiers from the first priority queue.

88. The system of claim 78, wherein the core control circuit further comprises:
a network command queue coupled to the processor core.

89. The system of claim 88, wherein the processor core is adapted to execute a fiber create instruction to generate and provide one or more commands to the network command queue, and wherein in response to the one or more commands in the network command queue, the interconnection network interface is further adapted to generate and transmit one or more call work descriptor packets to a second processor or to the array of the plurality of configurable circuits for execution of a corresponding plurality of execution threads.

90. The system of claim 89, wherein in response to the execution of a fiber create instruction by the processor core, the core control circuit is adapted to reserve a predetermined amount of memory space in the thread control memory.

91. The system of claim 89, wherein the thread control memory further comprises a thread return register, and wherein the core control circuit is adapted to store a thread return count in the thread return register.

92. The system of claim 91, wherein in response to receipt of a return data packet, the core control circuit is adapted to decrement the thread return count stored in the thread return register.

93. The system of claim 92, wherein when the thread return count in the thread return register has been decremented to zero, the core control circuit is further adapted to change a paused status to a valid status for a corresponding thread identifier of the plurality of thread identifiers for subsequent execution by the processor core of a thread return instruction for completion of execution of the corresponding plurality of execution threads.

94. The system of claim 88, wherein the core control circuit further comprises:
a network response memory.

95. The system of claim 94, wherein the network response memory comprises:
a memory request register; and
a thread identifier and transaction identifier register.

96. The system of claim 95, wherein the network response memory further comprises one or more registers selected from the group consisting of:
a request cache line index register; a bytes register; a general-purpose register index and type register; and combinations thereof.

97. The system of claim 94, wherein the interconnection network interface comprises:
an input queue;
a packet decoder circuit coupled to the input queue, to the control logic and thread selection circuit, and to the thread control memory;
an output queue; and
a packet encoder circuit coupled to the output queue, to the network response memory, and to the network command queue.

98. The system of claim 88, wherein the core control circuit is adapted, in response to a request from a host processor, to generate and provide a monitoring thread state command to the network command queue, and in response to the monitoring thread state command, the interconnection network interface is further adapted to copy and transmit all data from the thread control memory corresponding to a selected thread identifier of the plurality of thread identifiers for the host processor to monitor thread state.

99. The system of claim 73, wherein the interconnection network interface is further adapted to receive an event data packet, wherein the plurality of registers further comprise an event mask register, and wherein the control logic and thread selection circuit is further adapted to use an event mask stored in the event mask register to respond to the received event data packet.

100. The system of claim 73, wherein the plurality of registers further comprise a data cache and a general-purpose register, and wherein the processor core is adapted to execute a non-cached read or load instruction to designate the general-purpose register for storage of data received from a memory.

101. The system of claim 100, wherein the processor core is further adapted to execute a non-cached write or store instruction to designate data in the general-purpose register for storage in the memory.

102. The system of claim 73, wherein the core control circuit is adapted to assign a transaction identifier to a load or store request to a memory and to correlate the transaction identifier with a selected thread identifier of the plurality of thread identifiers.

103. The system of claim 72, wherein the core control circuit further comprises:
an instruction cache coupled to the control logic and thread selection circuit to receive the initial program count and provide a corresponding instruction for execution by the processor core.

104. The system of claim 72, wherein the control logic and thread selection circuit is further adapted to assign an initial valid status to the execution thread.

105. The system of claim 72, wherein the control logic and thread selection circuit is further adapted to assign a paused status to the execution thread in response to the processor core executing a memory load instruction or a memory store instruction.

106. The system of claim 72, wherein the control logic and thread selection circuit is further adapted to end execution of a selected thread in response to an execution of a return instruction of the selected thread by the processor core.

107. The system of claim 106, wherein the interconnection network interface is further adapted to generate and transmit a return work descriptor packet on the interconnection network in response to the execution of the return instruction by the processor core.

108. The system of claim 72, wherein the interconnection network interface is further adapted to receive an event data packet, and wherein the control logic and thread selection circuit is further adapted to determine an event number corresponding to the received event data packet.

109. The system of claim 72, wherein the interconnection network interface is further adapted to receive an event data packet, and wherein the control logic and thread selection circuit is further adapted to change a status of the thread identifier from a paused status to a valid status in response to the received event data packet to resume execution of a corresponding execution thread.

110. The system of claim 72, wherein the interconnection network interface is further adapted to receive an event data packet, and wherein the control logic and thread selection circuit is further adapted to change a status of the thread identifier from a paused status to a valid status in response to an event number of the received event data packet to resume execution of a corresponding execution thread.

111. The system of claim 72, wherein the core control circuit further comprises:
data path control circuitry adapted to control access size over the interconnection network.

112. The system of claim 72, wherein the core control circuit further comprises:
data path control circuitry adapted to increase or decrease memory load access size in response to time-averaged usage levels.

113. The system of claim 72, wherein the core control circuit further comprises:
data path control circuitry adapted to increase or decrease memory store access size in response to time-averaged usage levels.

114. The system of claim 72, wherein the control logic and thread selection circuit is further adapted to increase a size of a memory load access request to correspond to a cache line boundary of a data cache.

115. The system of claim 72, wherein the core control circuit further comprises:
system call circuitry adapted to generate one or more system calls to a host processor.

116. The system of claim 115, wherein the system call circuitry comprises:
a plurality of system call credit registers storing a predetermined credit count to modulate a number of the one or more system calls in a predetermined period of time.

117. The system of claim 69, wherein the processor core is adapted to execute a waiting or nonwaiting fiber join instruction.

118. The system of claim 69, wherein the processor core is adapted to execute a fiber join all instruction.

119. The system of claim 69, wherein the processor core is adapted to execute a first thread priority instruction to assign a first priority to an execution thread having a corresponding thread identifier.

120. The system of claim 119, wherein the processor core is adapted to execute a second thread priority instruction to assign a second priority to an execution thread having a corresponding thread identifier.

121. The system of claim 69, wherein the processor core is adapted to execute a custom atomic return instruction to complete an executing thread of a custom atomic operation.

122. The system of claim 69, wherein in conjunction with a memory controller, the processor core is adapted to execute a floating point atomic memory operation.

123. The system of claim 69, wherein in conjunction with a memory controller, the processor core is adapted to execute a custom atomic memory operation.

124. The system of claim 1, wherein data communication over the interconnection network is performed using virtual addressing across a plurality of nodes independently of a physical address of the plurality of nodes.

125. The system of claim 1, wherein data communication over the interconnection network is performed using a plurality of virtual node identifiers.

126. The system of claim 1, further comprising:
one or more memory circuits operable in a private and not shared mode, or in a shared and interleaved mode, or in a shared and non-interleaved mode.

127. The system of claim 1, wherein data communication over the interconnection network is performed using a split header and payload configuration for pipelining a plurality of communications.

128. The system of claim 127, wherein the interconnection network is adapted to use the split header and payload configuration for delayed payload switching.

129. The system of claim 127, wherein the interconnection network is adapted to use a single header to route a plurality of data payloads as a sequential data burst.

130. The system of claim 1, wherein the interconnection network is adapted to interleave a first acknowledgment message to a destination in an unused header field of a second message to the destination.

131. The system of claim 1, wherein the interconnection network is adapted to provide power gating or clock gating based on load requirements.

132. The system of claim 1, wherein the configurable circuit cluster further comprises:
a dispatch interface circuit coupled to the asynchronous packet network and to the interconnection network, the dispatch interface circuit adapted to receive a work descriptor packet and to assign the work descriptor packet to one or more selected configurable circuits of the array of the plurality of configurable circuits based on load balancing.

133. The system of claim 1, wherein the configurable circuit cluster further comprises:
a dispatch interface circuit coupled to the asynchronous packet network and to the interconnection network, the dispatch interface circuit adapted to receive one or more completion messages from one or more configurable circuits of the array of the plurality of configurable circuits, and the dispatch interface circuit is further adapted to generate a return work descriptor packet having one or more return values.

134. The system of claim 1, wherein one or more configurable circuits of the array of the plurality of configurable circuits is adapted to utilize an execution mask for selection of one or more valid data elements.

135. A system comprising:
an interconnection network;
a processor coupled to the interconnection network;
a plurality of configurable circuits arranged in an array;
a synchronous network coupled to each configurable circuit of the plurality of configurable circuits of the array; and
an asynchronous packet network coupled to each configurable circuit of the plurality of configurable circuits of the array;
wherein each configurable circuit of the array of the plurality of configurable circuits comprises:
a configurable computation circuit;
a plurality of synchronous network inputs coupled to the configurable computation circuit and to the synchronous network;
a plurality of synchronous network outputs coupled to the configurable computation circuit and to the synchronous network;
an asynchronous network input queue coupled to the asynchronous packet network;
an asynchronous network output queue coupled to the asynchronous packet network;
a configuration memory circuit coupled to the configurable computation circuit, to the plurality of synchronous network inputs, and to the plurality of synchronous network outputs, the configuration memory circuit comprising:
a first instruction memory storing a first plurality of data path configuration instructions to configure a data path of the configurable computation circuit; and a second instruction memory storing a second plurality of data path instructions or instruction indices for selection of a current data path configuration instruction of the first plurality of data path configuration instructions from the first instruction memory, for selection of a master synchronous network input of the plurality of synchronous network inputs for receipt of the current data path configuration instruction or instruction index from an adjacent configurable circuit of the array of the plurality of configurable circuits, and for selection of a next data path configuration instruction or instruction index for a next configurable circuit of the array of the plurality of configurable circuits;

and a control circuit coupled to the configurable computation circuit, the control circuit comprising:

a plurality of control registers, wherein the plurality of control registers store a completion table having a data completion count; and a thread control circuit adapted to queue a thread for execution by the configurable computation circuit.

136. A system comprising:

an interconnection network;

a plurality of configurable circuits arranged in an array; and a processor coupled to the interconnection network, the processor comprising:

a processor core adapted to execute a plurality of instructions; and a core control circuit coupled to the processor core, the core control circuit comprising:

an interconnection network interface coupled to the interconnection network, the interconnection network interface adapted to receive a work descriptor data packet and to decode the received work descriptor data packet into an initial program count for an execution thread and a received argument for the execution thread;

a thread control memory coupled to the interconnection network interface, the thread control memory comprising a plurality of registers, the plurality of registers comprising a thread identifier pool register storing a plurality of thread identifiers, a thread state register, a program count register storing the initial program count, a data cache, and a general-purpose register storing the received argument;

an execution queue coupled to the thread control memory;

a control logic and thread selection circuit coupled to the execution queue and to the thread control memory, the control logic and thread selection circuit adapted, in response to the received work descriptor data packet, to assign a thread identifier of the plurality of thread identifiers to the execution thread and to place the thread identifier in the execution queue, the control logic and thread selection circuit further adapted to select the thread identifier for execution and to access the thread control memory using the thread identifier as an index to select the initial program count for the execution thread; and an instruction cache coupled to the processor core and to the control logic and thread selection circuit to receive the initial program count and provide to the processor core a corresponding instruction of the plurality of instructions.

* * * * *